(12) United States Patent
Jones et al.

(10) Patent No.: US 10,840,504 B2
(45) Date of Patent: Nov. 17, 2020

(54) HIGH PERFORMANCE INORGANIC COMPLEXES FOR NEXT-GENERATION REDOX FLOW BATTERIES

(71) Applicant: CALIFORNIA INSTITUTE OF TECHNOLOGY, Pasadena, CA (US)

(72) Inventors: Simon C. Jones, Whittier, CA (US); Emmanuelle Despagnet-Ayoub, Pasadena, CA (US); Brendon McNicholas, North Hollywood, CA (US); Harry B. Gray, Pasadena, CA (US); Robert H. Grubbs, South Pasadena, CA (US); Danh Ngo, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 38 days.

(21) Appl. No.: 15/903,553

(22) Filed: Feb. 23, 2018

(65) Prior Publication Data

US 2018/0254478 A1    Sep. 6, 2018

Related U.S. Application Data

(60) Provisional application No. 62/462,727, filed on Feb. 23, 2017.

(51) Int. Cl.
*H01M 4/36* (2006.01)
*H01M 8/18* (2006.01)
(Continued)

(52) U.S. Cl.
CPC ............ *H01M 4/368* (2013.01); *C07F 11/00* (2013.01); *C07F 13/00* (2013.01); *C07F 15/02* (2013.01);
(Continued)

(58) Field of Classification Search
CPC ..... H01M 4/368; H01M 4/9008; H01M 8/188
See application file for complete search history.

(56) References Cited

U.S. PATENT DOCUMENTS

| 4,990,227 A | 2/1991 | Steiniger et al. |
| 5,464,508 A | 11/1995 | Hermeling et al. |

(Continued)

FOREIGN PATENT DOCUMENTS

| EP | 0339523 B1 | 8/1992 |
| JP | 06/173055 A | 6/1994 |
| WO | WO 2005-067487 A2 | 7/2005 |

OTHER PUBLICATIONS

Alexander, et al., "Electronic structures of hexacyanometalate complexes", *J. Am. Chem. Soc.*, 90(16): 4260-4271 (1968).
(Continued)

*Primary Examiner* — Jonathan G Leong
(74) *Attorney, Agent, or Firm* — Leydig, Voit & Mayer, Ltd.

(57) ABSTRACT

In an aspect, a redox flow battery comprises a catholyte and an anolyte; wherein at least one of said catholyte and said anolyte is a metal-coordination complex, said metal-coordination complex comprising: (i) a metal; (ii) one or more first ligands coordinated with said metal atom, wherein each of said first ligands is independently a Lewis basic ligand; and one or more second ligands associated with said one or more first ligands, wherein each of said second ligands is independently a Lewis acid ligand; and a nonaqueous solvent, wherein said catholyte, said anolyte or both are dissolved in said nonaqueous solvent. One or more first ligands may be provided in a primary coordination sphere of said metal-coordination complex and one or more second ligands may be provided in a secondary coordination sphere of said metal-coordination complex. The one or more first ligands independently may comprise a Lewis basic functional group
(Continued)

and each of said one or more second ligands independently may comprise a Lewis acidic functional group.

30 Claims, 75 Drawing Sheets

(51) Int. Cl.
| | |
|---|---|
| *H01M 8/0202* | (2016.01) |
| *C07F 15/06* | (2006.01) |
| *C07F 13/00* | (2006.01) |
| *C07F 11/00* | (2006.01) |
| *C07F 15/02* | (2006.01) |
| *H01M 4/90* | (2006.01) |

(52) U.S. Cl.
CPC ............ *C07F 15/06* (2013.01); *H01M 4/9008* (2013.01); *H01M 8/0202* (2013.01); *H01M 8/188* (2013.01); *H01M 2300/0025* (2013.01); *Y02E 60/528* (2013.01)

(56) References Cited

U.S. PATENT DOCUMENTS

| | | | |
|---|---|---|---|
| 2011/0195283 | A1 | 8/2011 | Sun et al. |
| 2014/0051002 | A1 | 2/2014 | Esswein et al. |
| 2014/0099569 | A1 | 4/2014 | Oh et al. |
| 2015/0255823 | A1 | 9/2015 | Anderson et al. |
| 2016/0010226 | A1 | 1/2016 | Dyballa |
| 2016/0152648 | A1 | 6/2016 | Bloomfield et al. |
| 2018/0254478 | A1 | 9/2018 | Jones et al. |

OTHER PUBLICATIONS

Bard, et al., *Electrochemical methods: fundamentals and applications*, Hoboken: John Wiley & Sons (2007).
Buschmann, et al., "Structure and physical properties of hexacyanomanganate(III), $[Mn^{III}(Cn)6]^{3-}$", *Inorganica Chimica Acta.*, 284(2): 175-179 (1999).
Carino, et al., "Tuning the Stability of Organic Active Materials for Non-Aqueous Redox Flow Batteries via Reversible, Electrochemically-Mediated Li+ Coordination", Chem. Mater., 28(8), 2529-2539 (2016).
Contakes, et al., "Preparative and Structural 10 Studies on the Carbonyl Cyanides of Iron, Manganese, and Ruthenium: Fundamentals Relevant to the Hydrogenases", *Inorganic Chemistry*, 41(6):1670-1678 (2002).
Darling, et al., "Pathways to low-cost electrochemical energy storage: a comparison of aqueous and nonaqueous flow batteries", *Energy Environ. Sci.*, 7: 3459-3477 (2014).
Ding, et al., "Molecular engineering of organic electroactive materials for redox flow batteries", *Chem. Soc. Rev.*, 47: 69-103 (2018).
Ding, et al., "A High-Performance All-Metallocene-Based, Non-Aqueous Redox Flow Battery", *Energy Environ. Sci.*, 10: 491-497 (2017).
Dmello, et al., "Cost-driven materials selection criteria for redox flow battery electrolytes", *J. Power Sources*, 20: 330, 261-272 (2016).
Ferranti, et al., "Conducatance of Aqueous Solutions of Cobalticyanides, Ferrocyanides, and Molybdocyanides of Potassium and of Tetraalkylammonium Ions", *Journal of Solution Chemistry*, 3(8):619-627 (1973).
Gong, et al., "Nonaqueous redox-flow batteries: organic solvents, supporting electrolytes, and redox pairs", *Energy Environ. Sci.*, (8), 3515-3530 (2015).
Gray et al., "The Electronic Structures of Octahedral Metal Complexes. I. Metal Hexacarbonyls and Hexacyanides", *J. Am. Chem. Soc.*, 85(19): 2922-2927 (1963).
Hendriks, et al., "Multielectron Cycling of a Low-Potential Anolyte in Alkali Metal Electrolytes for Nonaqueous Redox Flow Batteries", *ACS Energy Lett.*, 2: 2430-2435 (2017).
Kristoff, et al., "Metal complexes as probes of donor-acceptor interaction. Vibrational spectra of (.pi.-05H5)Fe(Co)2(CNMX3)

(M = Boron, X = Hydrogen, fluorine, chlorine, bromine, or methyl; M = aluminum or gallium, X = chlorine or methyl)", *Inorg. Chem.*, 12(8): 1788-1793 (1973).
Milder, et al., "Photochemistry of hexacyanocobaltate(III) in haloalkanes", *J. Am. Chem. Soc.*, 106(13), 3764-3767 (1984).
Milshtein, et al., "Towards Low Resistance Nonaqueous Redox Flow Batteries", *Journal of the Electrochemical Society*, 164(12), A2487-A2499 (2017).
Milton, et al., "Molecular Materials for Nonaqueous Flow Batteries with a High Coulombic Efficiency and Stable Cycling", *Nano. Lett.*, 17 (12): 7859-7863 (2017).
Prat, et al., "Sanofi's Solvent Selection Guide: A Step Toward More Sustainable Processes", *Org. Process Res. Dev.*, 17(12):1517-1525 (2013).
Rowe, et al., "Unraveling the reactive species of a functional non-heme iron monooxygenase model using stopped-flow UV-vis spectroscopy", *Inorg. Chem.*, 46(25):10594-606 (2007).
Rosa, et al., "Human drivers of national greenhouse-gas emissions", *Nature Climate Change*, 2: 581-586 (2012).
Renewable Energy Integration in Power Grids, IRENA Technology Brief E15—Apr. 2015, http://www.irena.org/Publications.
Schelter, et al., "Unexpected conversion of a hexacyanometallate to a homoleptic nitrile complex with triphenylborane substituents", *Chem. Commun.*, 0: 1417-1419 (2005).
Schriver, et al., "Preparation and Structures of Metal Cyanide-Lewis Acid Bridge Compounds", *J. Am. Chem. Soc.*, 85 (10): 1405-1408 (1963).
Sevov, et al., "Mechanism-Based Development of a Low-Potential, Soluble, and Cyclable Multielectron Anolyte for Nonaqueous Redox Flow Batteries", *J. Am. Chem. Soc.*, 138 (47):15378-15384 (2016).
Shriver, "Bridge Adducts—the Interaction of $BF_3$ with Transition Metal Cyanide Complexes", *J. Am. Chem. Soc.*, 84(23):4610-4611 (1962).
Shriver, et al., "Bridge Addition Compounds. III. The Influence of Boron-25 Containing Lewis Acids on Electronic Spectra, Vibrational Spectra, and Oxidation Potentials of Some Iron-Cynanide Complexes", *Journal of the American Chemical Society*, 88(8):1672-1677 (1966).
Sivaev, et al., "Lewis acidity of boron compounds", *Coordination Chemistry Reviews*, 270-271:75-88 (2014).
Soloveichik, et al., "Metal-free energy storage", *Nature*, 505, 163-165 (2014).
Soloveichik, et al., "Flow Batteries: Current Status and Trends", *Chem. Rev.*, 115(20): 11533-11558 (2015).
Stauber, et al. "Cobalt and Vanadium Trimetaphosphate Polyanions: Synthesis, Characterization, and Electrochemical Evaluation for Non-aqueous Redox-Flow Battery Applications", J. Am. Chem. Soc. 140 (2), 538-541, (Dec. 12, 2017).
Steffen, et al., "Planetary boundaries: Guiding human development on a changing planet", *Science*, 13 (347), Issue 6223 (2015).
Suttil, et al., "Metal acetylacetonate complexes for high energy density non-aqueous redox flow batteries", *J. Mater. Chem.* A, 3: 7929 (2015).
Weber, et al., "Redox flow batteries: a review", *J. Appl. Electrochem.*, 41:1137-1164 (2011).
Wei, et al., "Materials and Systems for Organic Redox Flow Batteries: Status and Challenges", *ACS Energy Lett.* 2: 2187-2204 (2017).
Winsberg, et al., "Redox-Flow Batteries: From Metals to Organic Redox-Active Materials", *Angew.Chem. Int. Ed.*, 56(3): 686-711 (2017).
Zhou, et al., "Synthesis, Structures, and Reactivity of Weakly Coordinating Anions with Delocalized Borate Structure: The Assessment of Anion Effects in Metallocene Polymerization Catalysts", *J. Am. Chem. Soc.*, 123: 223-237 (2001).
Korean Intellectual Property Office, International Search Report in International Application No. PCT/US2017/046503 (dated Nov. 27, 2017).
Vei, et al., "Synthesis and study of new binuclear compounds containing bridging (ν-CN)B($C_6F_5$)₃ and (ν-NC)B($C_6F_5$)₃ systems", *Dalton Trans.*, 2550-2557 (2003).

(56) References Cited

OTHER PUBLICATIONS

Krossing, et al., "Noncoordinating Anions—Fact or Fiction? A Survey of Likely Candidates," *Angew. Chem. Int. Ed.*, 43, 2066-2090 (2004).

McNicholas, et al., "Tuning the formal potential of ferrocyanide over a 2.1 V range," *Chem. Sci.*, 10, 3623-3626 (2019).

Rillema, et al., "Structure of Tris(2,2'-bipyridyl)ruthenium(II) Hexafluorophosphate, [Ru(bipy)$_3$][PF$_6$]$_2$; X-Ray Crystallographic Determination," *J.C.S. Chem. Comm.*, 849-851 (1979).

Woodcock, et al., "Electrochemistry and Spectroscopy of Fe(phen)$_2$(CN)$_2$, Cp$_4$Fe$_4$(CO)$_4$, and CpFe(CO)$_2$CN in an Acidic Molten Salt," *Inorg. Chem.*, 2137-2142 (1986).

[Fe(CN)$_6$•(BPh$_3$)$_6$]$^{4-}$

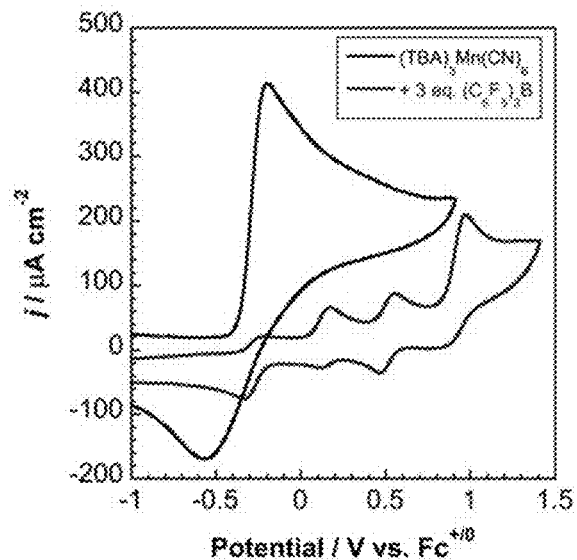
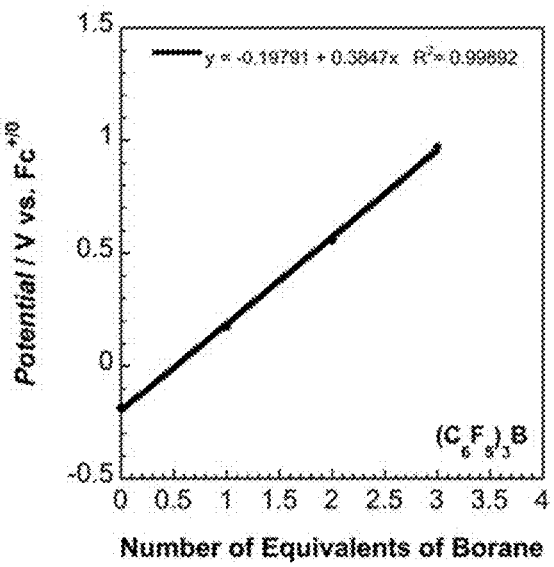
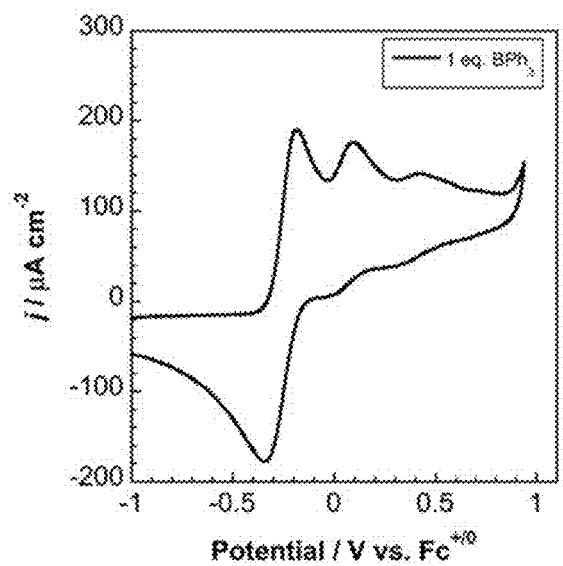
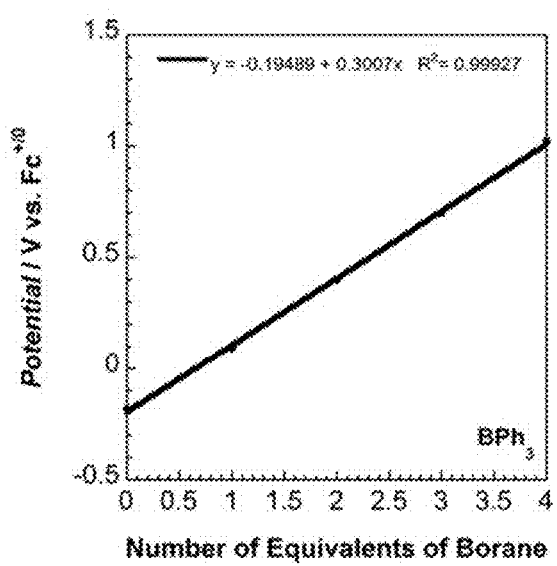
FIG. 12

Before Experiment   During Oxidation Cycle   During Reduction Cycle

FIG. 49

Cyanide-borane adducts of boxed metals have been prepared previously

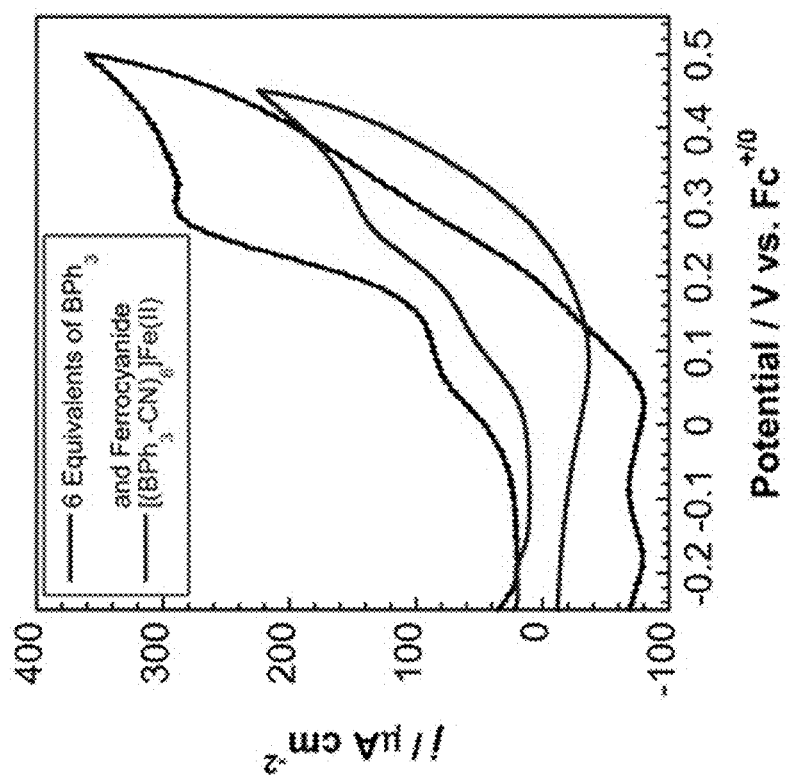
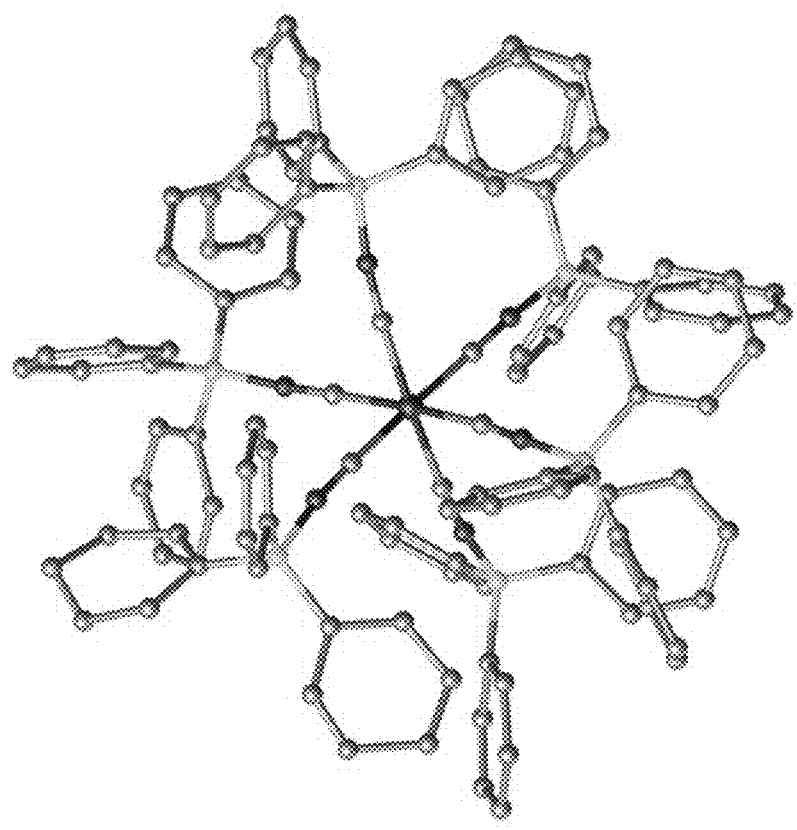
FIG. 51

| Redox Process | 0 Eq. | 0.5 Eq. | 1 Eq. | 2 Eq. | 3 Eq. | 4 Eq. | 5 Eq. | 6 Eq. |
|---|---|---|---|---|---|---|---|---|
| 1 | -1.25 V | -1.25 V | -1.23 V | -1.23 V | -1.18 V | --- | --- | --- |
| 2 | --- | --- | -1.01 V | -1.01 V | -0.98 V | --- | --- | --- |
| 3 | --- | --- | -0.76 V | -0.76 V | -0.73 V | -0.72 V | --- | --- |
| 4 | --- | --- | -0.48 V | -0.48 V | -0.46 V | -0.46 V | --- | --- |
| 5 | --- | --- | --- | -0.23 V | -0.21 V | -0.20 V | -0.19 V | -0.19 V |
| 6 | --- | --- | --- | 0.06 V | 0.04 V | 0.03 V | --- | 0.02 V |
| 7 | --- | --- | --- | 0.27 V | 0.27 V | 0.25 V | 0.25 V | 0.24 V |

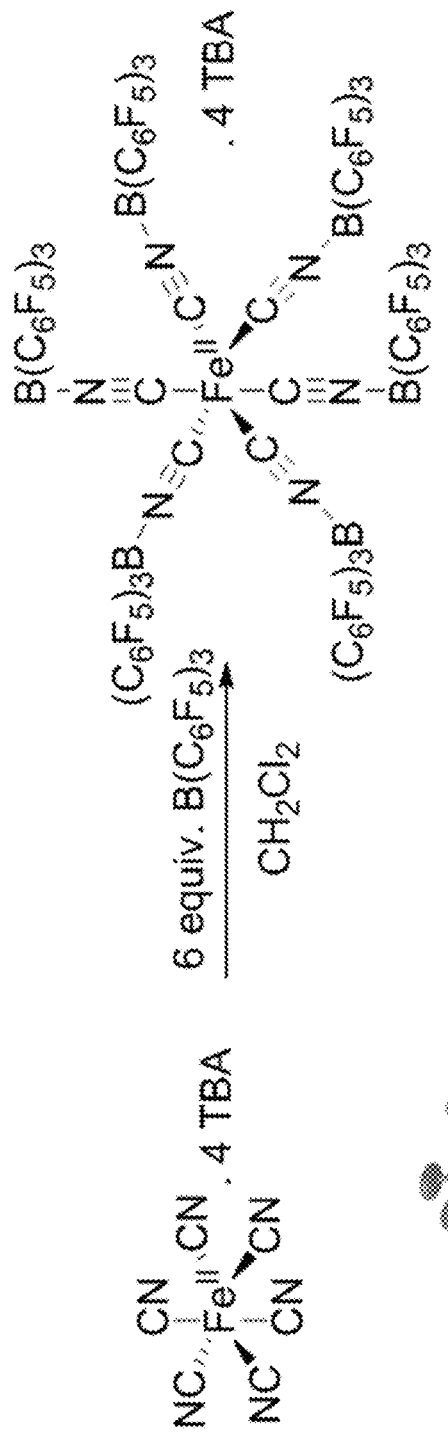
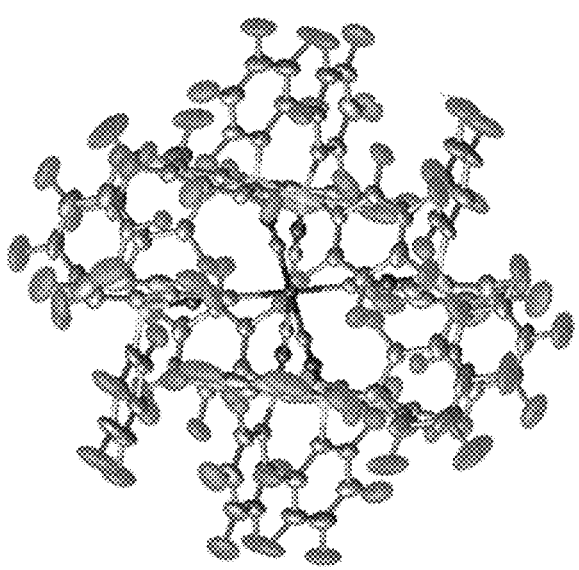
- Relevant Bond Lengths: Fe-C: 1.93 Å, C-N: 1.14 Å, N-B: 1.57 Å
- Fe-C in hexacyanoferrate with no borane is 1.92 Å
TBA+ omitted for clarity.
FIG. 54

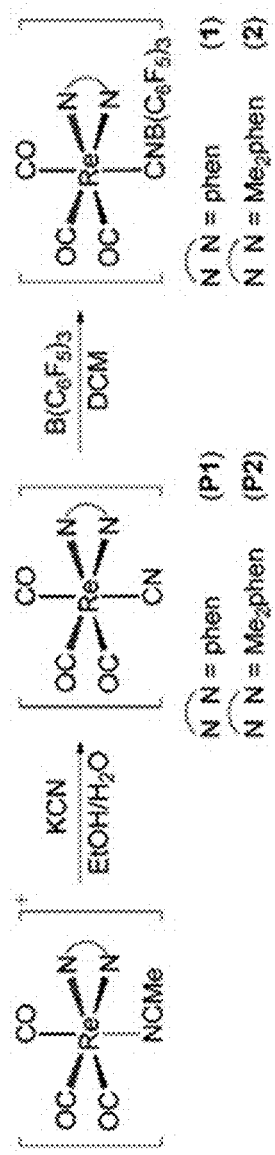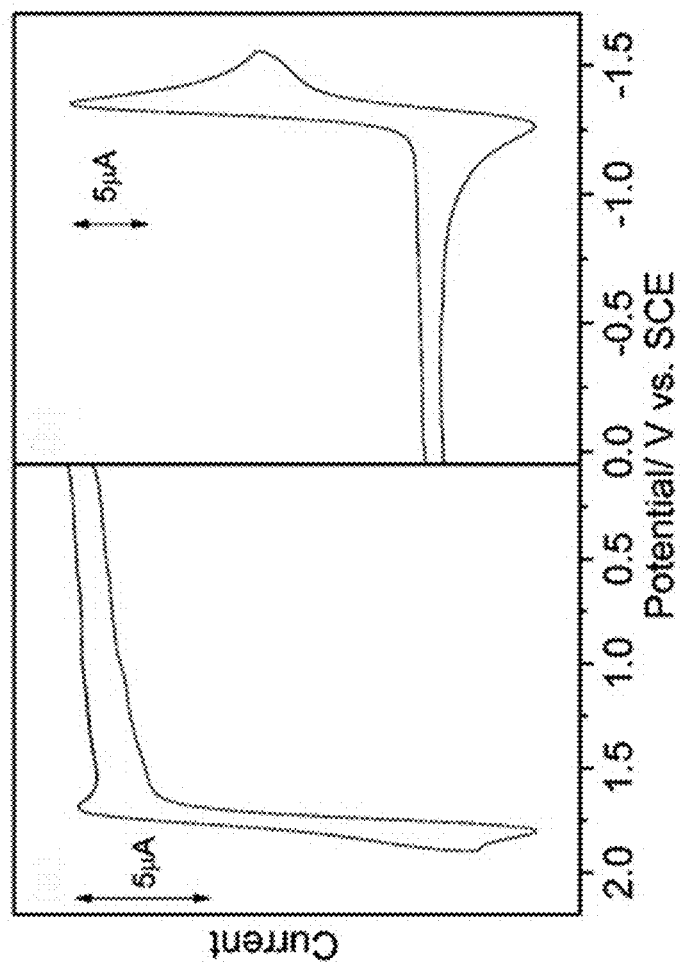
FIG. 65

- Iron chloride and TEACN
- Intermediate and phenanthroline/bpy
- Complex + Borane

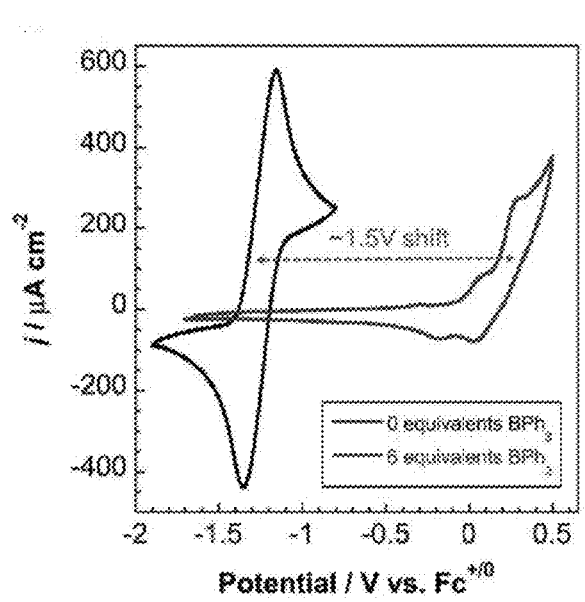 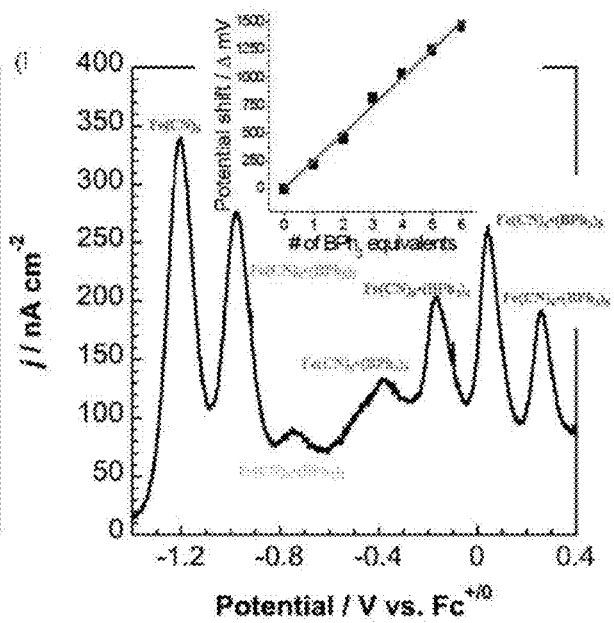
FIG. 72    FIG. 73

| Redox Process | 0 Eq. | 0.5 Eq. | 1 Eq. | 2 Eq. | 3 Eq. | 4 Eq. | 5 Eq. | 6 Eq. |
|---|---|---|---|---|---|---|---|---|
| 1 | -1.25 V | -1.25 V | -1.23 V | -1.23 V | -1.18 V | --- | --- | --- |
| 2 | --- | --- | -1.01 V | -1.01 V | -0.98 V | --- | --- | --- |
| 3 | --- | --- | -0.76 V | -0.76 V | -0.73 V | -0.72 V | --- | --- |
| 4 | --- | --- | -0.48 V | -0.48 V | -0.45 V | -0.46 V | --- | --- |
| 5 | --- | --- | --- | -0.23 V | -0.21 V | -0.20 V | -0.19 V | -0.19 V |
| 6 | --- | --- | --- | 0.06 V | 0.04 V | 0.03 V | --- | 0.02 V |
| 7 | --- | --- | --- | 0.27 V | 0.27 V | 0.25 V | 0.25 V | 0.24 V |

FIG. 77

$Fe^{II}(CN)_6$ + Lewis Acid ($BR_3$) : *Flow Batteries*
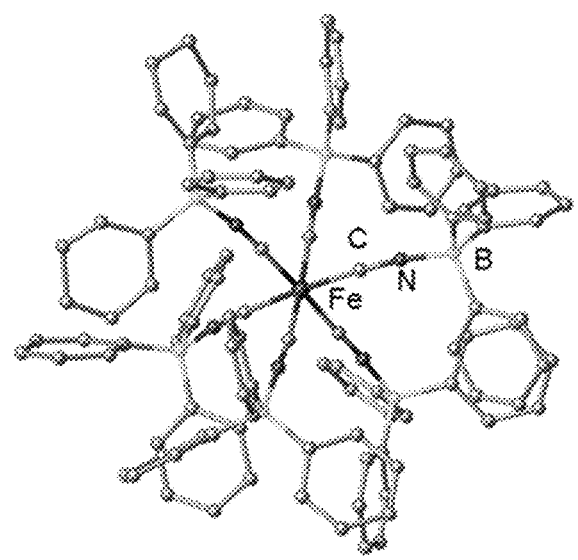
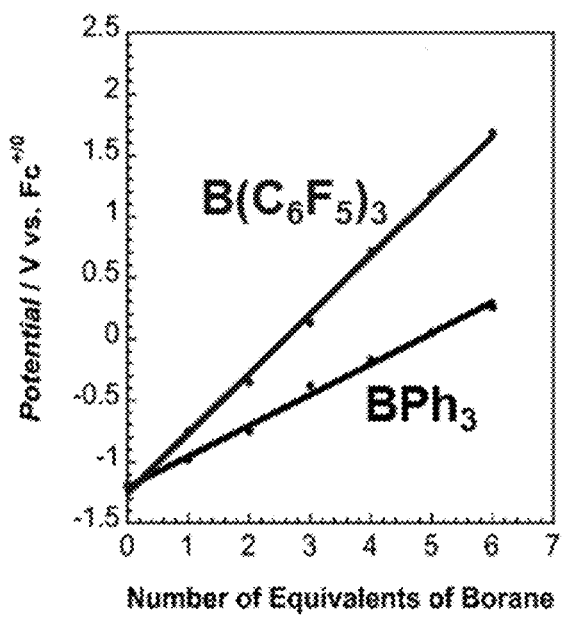
$[Fe(CN)_6 \cdot (BPh_3)_6]^{4-}$
FIG. 79

Solution: 5-10 mM in $CH_3CN/[TBA][PF_6]$

Scan rate between 100-250 mV/s

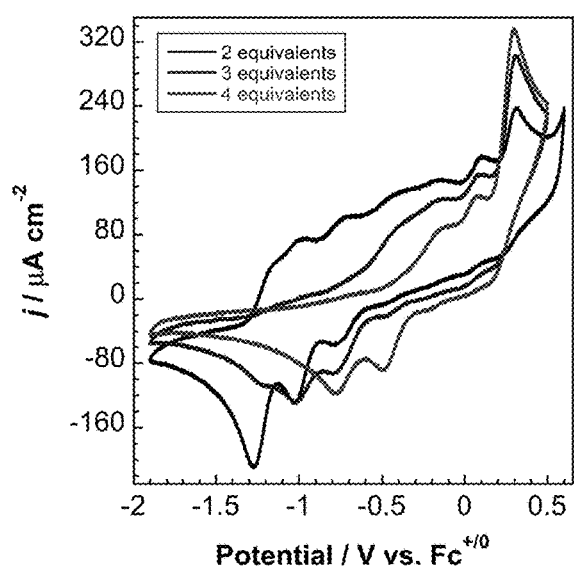
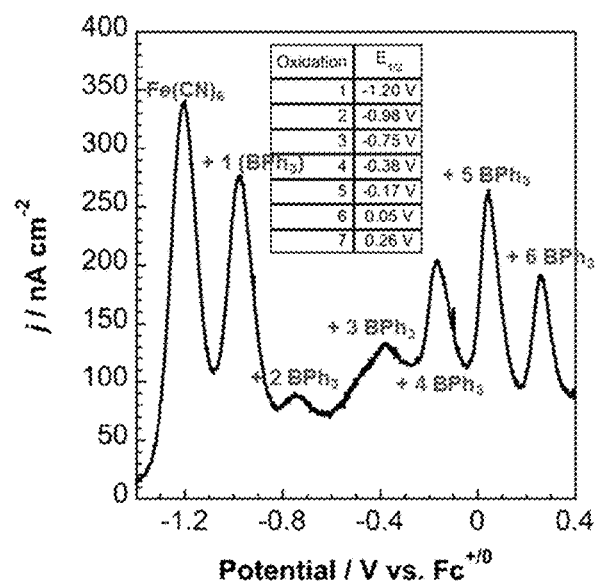
FIG. 83A                  FIG. 83B

Hydrogen and TEA omitted for clarity

Fe-C: 1.91 Å
C-N: 1.16 Å
N-B: 1.57 Å

*Fe-C$_{[Fe(CN)6]}$: 1.92 Å*

*Higher energy density*

TBA omitted for clarity.

Fe-C: 1.93 Å
C-N: 1.14 Å
N-B: 1.57 Å

*Fe-C$_{[Fe(CN)6]}$: 1.92 Å*

Fe-C: 1.89 Å
C-N: 1.15 Å

*Fe-C$_{[Fe(CN)6]}$: 1.92 Å*

| Lewis Acid | Shift Per Equivalent | Average Fe-C Bond Length | Average C-N Bond Length | Average N-B Bond Length | $E^0_{cell}$ |
|---|---|---|---|---|---|
| $BPh_3$ | 248 mV | 1.91 Å | 1.16 Å | 1.57 Å | + 1.5 V |
| $(C_6F_5)_3B$ | 372 mV | 1.93 Å | 1.14 Å | 1.57 Å | + 2.23 V |
| $Me^+$ | 471 mV | 1.89 Å | 1.15 Å | - | + 2.83 V |
| $NMe_2(t\text{-}bu)_2B$ | 150 mV | - | - | - | + 0.9 V |

$E^0_{cell} = E^0_{cathode} - E^0_{anode}$ (-1.25 V)

FIG. 87

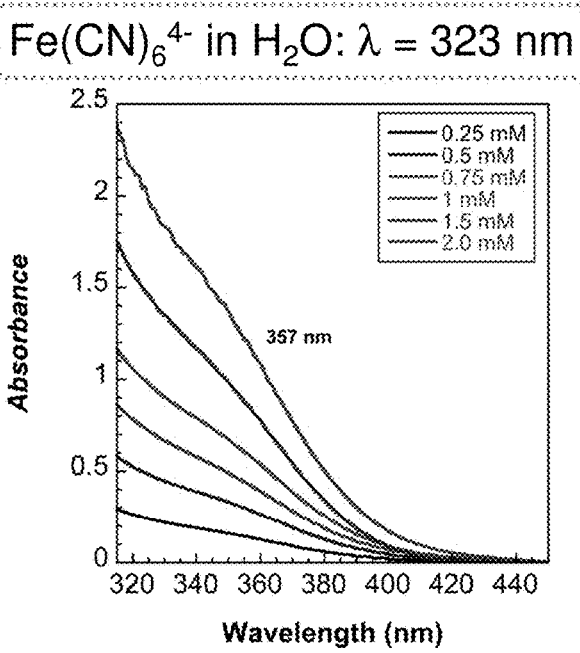
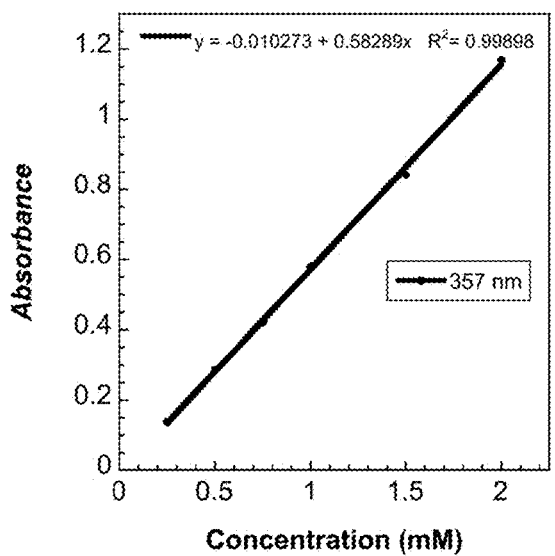
FIG. 89A    FIG. 89B

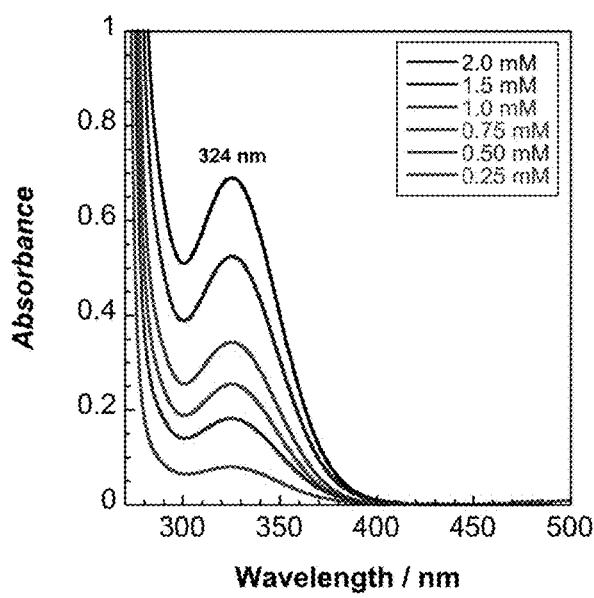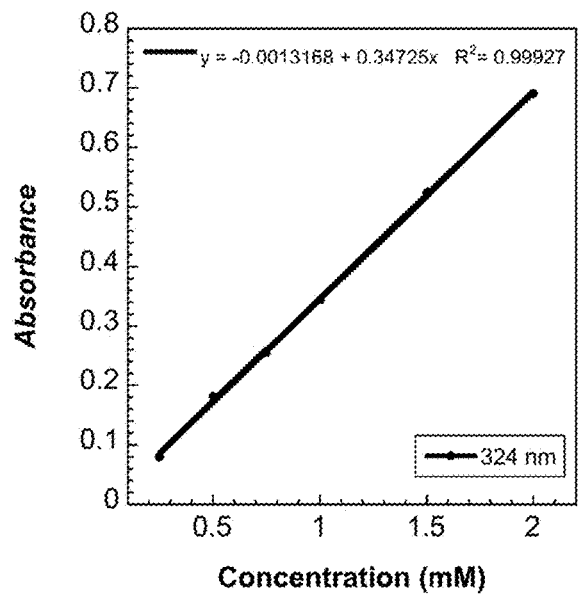
FIG. 90A
FIG. 90B

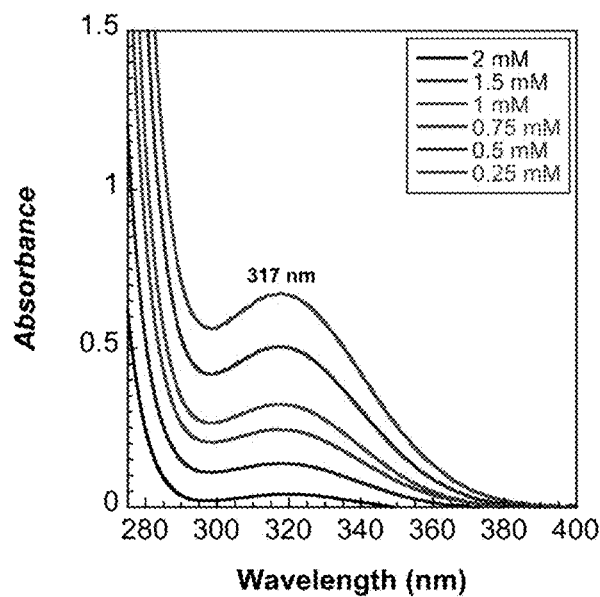
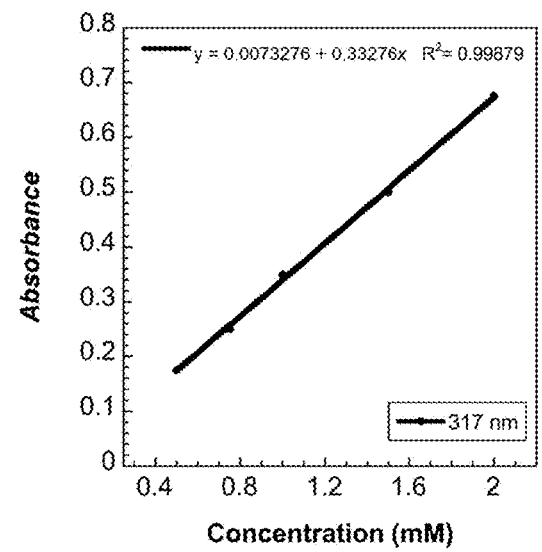
FIG. 91A
FIG. 91B

| Complexes in ACN | $\lambda_{MC}$ ($A_{2g}$) (nm) | $\varepsilon$ (L mol$^{-1}$ cm$^{-1}$) | $Dq$ (cm$^{-1}$) |
|---|---|---|---|
| [Fe(CN)$_6$][TBA]$_4$ | 357 | 583 | 2 801 |
| [Fe(CN)$_6$][TBA]$_4$ in H$_2$O | 323 | - | 3 096 |
| [Fe(CNBPh$_3$)$_6$][TEA]$_4$ | 324 | 347 | 3 086 |
| [Fe(CNB(C$_6$F$_5$)$_3$))$_6$][TBA]$_4$ | 317 | 333 | 3 155 |

FIG. 92

HIGH PERFORMANCE INORGANIC COMPLEXES FOR NEXT-GENERATION REDOX FLOW BATTERIES

CROSS-REFERENCE TO RELATED APPLICATIONS

This application claims the benefit of and priority to U.S. Provisional Application No. 62/462,727, filed Feb. 23, 2017, which is hereby incorporated in its entirety.

STATEMENT REGARDING FEDERALLY SPONSORED RESEARCH OR DEVELOPMENT

The invention described herein was made in the performance of work under a NASA contract NNN12AA01C, and is subject to the provisions of Public Law 96-517 (35 USC 202) in which the Contractor has elected to retain title.

BACKGROUND OF INVENTION

There is increasing demand for increased utilization of renewable energy sources such as wind and solar in traditional grids and microgrids. However, the intermittency of these energy sources poses significant obstacles. These obstacles may be addressed through improved energy storage systems, namely batteries, though significant challenges remain in developing and manufacturing batteries that are cost-effective, have high energy densities, and are reliable and safe.

One energy storage technology that may address these challenges is that of redox flow batteries. In a redox flow battery, electrochemically active species, such as the catholyte and anolyte, are stored in their respective reservoirs and are pumped into the region(s) where electrochemical reaction may take place. As charged electrochemical species may be introduced into the reaction region, discharged species may be removed. Flow of electric current and corresponding reduction and oxidation of the electrochemical species are aided by cathode and anode electrodes, which typically do not themselves participate in the electrochemical reactions of the battery. These designs provide for independent scaling of energy and power. Redox flow batteries have the potential for cost-effective large scale battery applications with long life.

Important aspects of redox flow batteries, aside from the design, are the choices of electrochemically active species, the catholyte and anolyte, and the solvent. The solubility of the catholyte and anolyte in the solvent affects the energy density of the battery, the redox potentials of the catholyte and anolyte affect the cell voltage of the battery, the stability of the catholyte and anolyte affects the lifetime of the battery, and the cost of these materials affects the battery cost. Certain challenges have prevented wider utilization of redox flow batteries. For example, aqueous systems tend to have higher catholyte and anolyte solubilities than nonaqueous systems. On the other hand, aqueous systems have a limited cell voltage (<2 V) due to the limited potential window of water in contrast to nonaqueous systems. A significant trade-off is thus solubility (or, energy density) versus voltage. Provided herein are redox flow batteries that address these, and other, challenges.

SUMMARY OF THE INVENTION

Provided herein are redox flow batteries, and associated methods, that address the significant challenges associated with commercial-scale utilization of redox flow batteries for energy storage. In particular, provided herein are highly-tunable metal-coordination complexes that have high solubilities in nonaqueous solvents and a wide range of redox potentials. The metal-coordination complexes provided herein are used as catholyte(s) and/or anolyte(s) in the redox flow batteries disclosed herein. Thus, the metal-coordination complexes disclosed herein reduce or eliminate the difficult challenge of choosing between redox flow batteries with high energy density (via solubility) and high cell voltage. The metal-coordination complexes disclosed herein are compatible with a wide range of nonaqueous solvents. The redox flow batteries provided herein may also comprise a separator, which is optionally charged to reduce or eliminate catholyte and/or anolyte crossover. The separator may be porous with an average pore size selected to reduce or eliminate catholyte and anolyte crossover.

In an aspect, a redox flow battery comprises a catholyte and an anolyte; wherein at least one of the catholyte and the anolyte is a metal-coordination complex, the metal-coordination complex comprising: (i) a metal; (ii) one or more first ligands coordinated with the metal atom, wherein each of the first ligands is independently a Lewis basic ligand; and (iii) one or more second ligands associated with the one or more first ligands, wherein each of the second ligands is independently a Lewis acidic ligand; and a nonaqueous solvent, wherein the catholyte, the anolyte or both are dissolved in the nonaqueous solvent.

In an embodiment of some of the redox flow batteries disclosed herein, the one or more first ligands are provided in a primary coordination sphere of the metal-coordination complex. In an embodiment of some of the redox flow batteries disclosed herein, the one or more second ligands are provided in a secondary coordination sphere of the metal-coordination complex. In an embodiment of some of the redox flow batteries disclosed herein, each of the one or more first ligands independently comprises a Lewis basic functional group and each of the one or more second ligands independently comprises a Lewis acidic functional group. In an embodiment of some of the redox flow batteries disclosed herein, the one or more second ligands associate with the first ligands to result in electron density being distributed away from the Lewis basic functional groups and to the Lewis acidic functional groups. In an embodiment of some of the redox flow batteries disclosed herein, each of the catholyte and the anolyte is independently a metal-coordination complex.

The metal-coordination complexes disclosed herein have a metal atom or ion with primary ligands associated with the metal atom or ion and secondary ligands associated with the primary ligands, and indirectly associated with the metal atom or ion. The secondary ligands, which form a secondary coordination sphere, favorably contribute to the solubility of the metal-coordination complex in a nonaqueous solvent and favorably contribute to the redox potential of the metal-coordination complex. These metal-coordination complexes and their properties are highly tunable at least because of the incorporation of the secondary ligands.

In an embodiment of some of the redox flow batteries disclosed herein, the metal-coordination complex is characterized by the formula (F1):

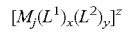
(F1), wherein:

M is the metal selected from the group consisting of Cr, Mn, Fe, Co, Ni, Mo, Tc, Ru, Re, Os, W, Rh, Ir, Pd, and Pt; each of $L^1$ is independently the first ligand; each of $L^2$ is independently the second ligand; z is 0 or an integer selected from the range of −5 to 5; each of x and y is independently an integer selected from the range of 1 to 8; and j is an integer selected from the range of 1 to 3. In some embodiments, z is a charge of the metal coordination complex.

In an embodiment of some of the redox flow batteries disclosed herein, the metal-coordination complex is characterized by the formula (F1A):

$$[M(L^1)_x(L^2)_y]^z \quad \text{(F1A), wherein:}$$

M is the metal selected from the group consisting of Cr, Mn, Fe, Co, Ni, Mo, Tc, Ru, Re, Os, W, Rh, Ir, Pd, and Pt; each of $L^1$ is independently the first ligand; each of $L^2$ is independently the second ligand; z is 0 or an integer selected from the range of −5 to 5; each of x and y is independently an integer selected from the range of 1 to 8. In some embodiments, z is a charge of the metal coordination complex.

In an embodiment of some of the redox flow batteries disclosed herein, each $L^1$ is independently nitrogen or a substituted or unsubstituted functional group or molecule corresponding to a nitrile, a pyridyl, a diamine, a triamine, an imine, an amine, an azide, a diimine, a triimine, an amide, a diimide, pyridine, pyrazine, imidazole, pyrazole, pyridazine, pyrimidine, triazine, quinoline, isoquinoline, quinoxaline, acridine, quinazoline, cinnoline, phthalazine, indazole, indole, isoindole, pyrrole, benzimidazole, purine, oxazole, bipyridine, terpyridine, phenanthroline, or any combination thereof. In an embodiment of some of the redox flow batteries disclosed herein, each of any one or more $L^1$ is independently nitrogen. In an embodiment of some of the redox flow batteries disclosed herein, each of any one or more $L^1$ is independently a substituted or unsubstituted functional group or molecule corresponding to a nitrile, a pyridyl, a diamine, a triamine, an imine, an amine, an azide, a diimine, a triimine, an amide, a diimide, pyridine, pyrazine, imidazole, pyrazole, pyridazine, pyrimidine, triazine, quinoline, isoquinoline, quinoxaline, acridine, quinazoline, cinnoline, phthalazine, indazole, indole, isoindole, pyrrole, benzimidazole, purine, oxazole, bipyridine, terpyridine, phenanthroline, or any combination thereof.

In an embodiment of some of the redox flow batteries disclosed herein, each $L^2$ is independently —$G^a(G^b)_q$; where: $G^a$ is selected from the group consisting of B, Si, Ge, Al, Zn, Sn, Sb, Te, Bi, and Pb; each of $G^b$ is independently selected from the group consisting of a hydrogen, a halide, nitrogen, and a substituted or an unsubstituted $C_1$-$C_{10}$ alkyl, $C_3$-$C_{10}$ cycloalkyl, $C_5$-$C_{10}$ aryl, $C_5$-$C_{10}$ heteroaryl, $C_1$-$C_{10}$ acyl, $C_1$-$C_{10}$ hydroxyl, $C_1$-$C_{10}$ alkoxy, $C_2$-$C_{10}$ alkenyl, $C_2$-$C_{10}$ alkynyl, $C_5$-$C_{10}$ alkylaryl, $C_3$-$C_{10}$ arylene, $C_3$-$C_{10}$ heteroarylene, $C_2$-$C_{10}$ alkenylene, $C_3$-$C_{10}$ cycloalkenylene, $C_2$-$C_{10}$ alkynylene, cyanide, pyridine, pyrazine, imidazole, pyrazole, pyridazine, pyrimidine, bipyridine, terpyridine, phenanthroline, a diamine, a triamine, an imine, an amine, an azide, a diimine, a triimine, an amide, or any combination thereof; and q is an integer selected from the range of 1 to 8.

In an embodiment of some of the redox flow batteries disclosed herein, each $L^2$ is independently —$G^a(G^b)_q$; where: $G^a$ is selected from the group consisting of C, B, Si, Ge, Al, Zn, Sn, Sb, Te, Bi, and Pb; each of $G^b$ is independently selected from the group consisting of a hydrogen, a halide, nitrogen, and a substituted or an unsubstituted $C_1$-$C_{10}$ alkyl, $C_3$-$C_{10}$ cycloalkyl, $C_5$-$C_{10}$ aryl, $C_5$-$C_{10}$ heteroaryl, $C_1$-$C_{10}$ acyl, $C_1$-$C_{10}$ hydroxyl, $C_1$-$C_{10}$ alkoxy, $C_2$-$C_{10}$ alkenyl, $C_2$-$C_{10}$ alkynyl, $C_5$-$C_{10}$ alkylaryl, $C_3$-$C_{10}$ arylene, $C_3$-$C_{10}$ heteroarylene, $C_2$-$C_{10}$ alkenylene, $C_3$-$C_{10}$ cycloalkenylene, $C_2$-$C_{10}$ alkynylene, cyanide, pyridine, pyrazine, imidazole, pyrazole, pyridazine, pyrimidine, bipyridine, terpyridine, phenanthroline, a diamine, a triamine, an imine, an amine, an azide, a diimine, a triimine, an amide, or any combination thereof; and q is an integer selected from the range of 1 to 8.

In an embodiment of some of the redox flow batteries disclosed herein, $G^b$ is characterized by the formula (F2):

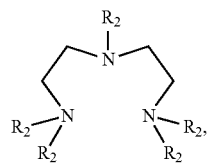

(F2)

wherein:
each of $R^2$ is independently selected from the group consisting of a hydrogen, a halide, a $C_5$-$C_6$ aryl, a $C_1$-$C_5$ alkyl, and any combination thereof. In an embodiment of some of the redox flow batteries disclosed herein, $G^a$ is B and each $G^b$ is independently a singly, doubly, triply, quadruply, or quintuply fluorinated phenyl group. In an embodiment of some of the redox flow batteries disclosed herein, $G^b$ is a quintuply fluorinated phenyl group [—$(C_6F_5)$]. In an embodiment of some of the redox flow batteries disclosed herein, $L^1$ is characterized by the formula (F3), (F4), (F5a), (F5b), (F5c), (F5d), or (F5e):

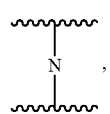

(F3)

(F4)

(F5a)

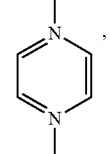

(F5b)

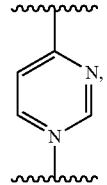

(F5c)

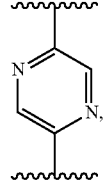

-continued

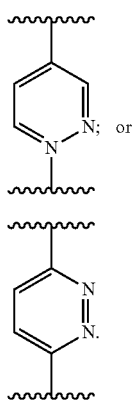
(F5d)

(F5e)

In an embodiment of some of the redox flow batteries disclosed herein, $L^2$ is characterized by the formula (F6), (F7), or (F8):

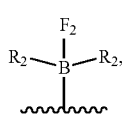
(F6)

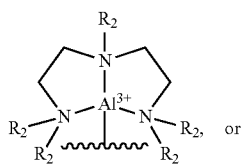
(F7)

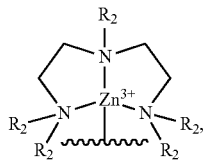
(F8)

where: each of $R^2$ is independently selected from the group consisting of a hydrogen, a halide, a $C_5$-$C_6$ aryl, a $C_1$-$C_5$ alkyl, and any combination thereof.

In an embodiment of some of the redox flow batteries disclosed herein, x and y (of F1) are equivalent to each other. In an embodiment of some of the redox flow batteries disclosed herein, j (of F1) is 1.

In an embodiment of some of the redox flow batteries disclosed herein, the metal-coordination complex is selected from the group consisting of $[Fe(CN)_6(BPh_3)_6]^{3-\ or\ 4-\ or\ 5-}$, $[Fe(CN)_6(B(C_6F_5)_3)_6]^{3-\ or\ 4-\ or\ 5-}$, $[Mn(CN)_6(BPh_3)_6]^{2-\ or\ 3-\ or\ 4-\ or\ 5-}$, $[Mn(CN)_6(B(C_6F_5)_3)_6]^{2-\ or\ 3-\ or\ 4-\ or\ 5-}$, $[Co(CN)_6(BPh_3)_6]^{3-\ or\ 4-}$, $[Co(CN)_6(B(C_6F_5)_3)_6]^{3-\ or\ 4-}$, $[Mo(CN)_8(BPh_3)_8]^{4-\ or\ 5-}$, $[Mo(CN)_8(B(C_6F_5)_3)_8]^{4-\ or\ 5-}$, $[Mo(CN)_8(BPh_3)_6]^{4-\ or\ 5-}$, and $[Mo(CN)_8(B(C_6F_5)_3)_6]^{4-\ or\ 5-}$.

In an embodiment of some of the redox flow batteries disclosed herein, the metal-coordination complex is selected from the group consisting of $[Fe(CN)_6(BPh_3)_6]^{3-\ or\ 4-\ or\ 5-}$, $[Fe(CN)_6(B(C_6F_5)_3)_6]^{3-\ or\ 4-\ or\ 5-}$, $[Mn(CN)_6(BPh_3)_6]^{2-\ or\ 3-\ or\ 4-\ or\ 5-}$, $[Mn(CN)_6(B(C_6F_5)_3)_6]^{2-\ or\ 3-\ or\ 4-\ or\ 5-}$, $[Co(CN)_6(BPh_3)_6]^{3-\ or\ 4-}$, $[Co(CN)_6(B(C_6F_5)_3)_6]^{3-\ or\ 4-}$, $[Mo(CN)_8(BPh_3)_8]^{4-\ or\ 5-}$, $[Mo(CN)_8(B(C_6F_5)_3)_8]^{4-\ or\ 5-}$, $[Mo(CN)_8(BPh_3)_6]^{4-\ or\ 5-}$, $[Mo(CN)_8(B(C_6F_5)_3)_6]^{4-\ or\ 5-}$ and $[Fe(CN)_6(CH_3)_6]^{3+\ or\ 2+\ or\ 1+}$.

In an embodiment of some of the redox flow batteries disclosed herein, the metal-coordination complex has a charge selected from the group consisting of −5, −4, −3, and −2 during charging of the battery.

The highly tunable chemistry of the metal-coordination complexes disclosed herein allow for tunability of the properties of the metal-coordination complexes, such as properties that are relevant to the parameters of the redox flow batteries disclosed herein.

In an embodiment of some of the redox flow batteries disclosed herein, a redox potential of the metal-coordination complex increases by ΔP milliVolts; wherein ΔP=(m)(x), m is selected from the range of 200 to 700, and x is the number of first ligands ($L^1$) coordinated with the metal ($M^1$) in the metal-coordination complex. In an embodiment of some of the redox flow batteries disclosed herein, m is 250. In an embodiment of some of the redox flow batteries disclosed herein, m is 270. In an embodiment of some of the redox flow batteries disclosed herein, m is 380. In an embodiment of some of the redox flow batteries disclosed herein, m is 400. In an embodiment of some of the redox flow batteries disclosed herein, m is 484. In an embodiment of some of the redox flow batteries disclosed herein, m is 550. In an embodiment of some of the redox flow batteries disclosed herein, m is 630.

In an embodiment of some of the redox flow batteries disclosed herein, a redox potential of the metal-coordination complex is selected from the range of −1.77 V to 2.30 V vs. $Fc^{+/0}$.

In an embodiment of some of the redox flow batteries disclosed herein, a solubility limit of the metal-coordination complex in the nonaqueous solvent is at least 1.0 M. In an embodiment of some of the redox flow batteries disclosed herein, a solubility limit of the metal-coordination complex in the nonaqueous solvent is at least 1.5 M. In an embodiment of some of the redox flow batteries disclosed herein, a solubility limit of the metal-coordination complex in the nonaqueous solvent is at least 2.0 M.

The redox flow batteries disclosed herein have a wide range of tunable and favorable parameters, including high voltages, in part because the catholyte and anolyte may be selected to result in the desired parameters.

In an embodiment of some of the redox flow batteries disclosed herein, the catholyte and the anolyte are selected such that the redox flow battery has a theoretical open circuit voltage greater than 1.0 V. In an embodiment of some of the redox flow batteries disclosed herein, the catholyte and the anolyte are selected such that the redox flow battery has a theoretical open circuit voltage greater than or equal to 2 V. In an embodiment of some of the redox flow batteries disclosed herein, the catholyte and the anolyte are selected such that the redox flow battery has a theoretical open circuit voltage greater than or equal to 3 V. In an embodiment of some of the redox flow batteries disclosed herein, the catholyte and the anolyte are selected such that the redox flow battery has a theoretical open circuit voltage greater than or equal to 4 V.

In an embodiment of some of the redox flow batteries disclosed herein, the catholyte is dissolved in the nonaqueous solvent. In an embodiment of some of the redox flow batteries disclosed herein, the anolyte is dissolved in the nonaqueous solvent. In an embodiment of some of the redox flow batteries disclosed herein, a concentration of the metal-coordination complex in the nonaqueous solvent is at least 1.0 M. In an embodiment of some of the redox flow batteries disclosed herein, a concentration of the metal-coordination complex in the nonaqueous solvent is at least 1.5 M. In an embodiment of some of the redox flow batteries disclosed herein, a concentration of the metal-coordination complex in the nonaqueous solvent is at least 2.0 M.

In an embodiment of some of the redox flow batteries disclosed herein, the redox flow battery has an operating potential equal to or greater than 1 V. In an embodiment of some of the redox flow batteries disclosed herein, the redox flow battery has an operating potential equal to or greater than 1.23 V. In an embodiment of some of the redox flow batteries disclosed herein, the redox flow battery has an operating potential equal to or greater than 2 V. In an embodiment of some of the redox flow batteries disclosed herein, the redox flow battery has an operating potential equal to or greater than 3 V.

In an embodiment of some of the redox flow batteries disclosed herein, the redox flow battery has an energy density equal to or greater than 50 Wh/L. In an embodiment of some of the redox flow batteries disclosed herein, the redox flow battery has an energy density equal to or greater than 75 Wh/L. In an embodiment of some of the redox flow batteries disclosed herein, the redox flow battery has an energy density equal to or greater than 150 Wh/L. In an embodiment of some of the redox flow batteries disclosed herein, the redox flow battery has an energy density equal to or greater than 160 Wh/L.

In an embodiment of some of the redox flow batteries disclosed herein, the redox flow battery has a lifetime of at least 200 cycles of discharging and charging. In an embodiment of some of the redox flow batteries disclosed herein, the redox flow battery has a lifetime of at least 300 cycles of discharging and charging. In an embodiment of some of the redox flow batteries disclosed herein, the redox flow battery has a lifetime of at least 2000 cycles of discharging and charging. In an embodiment of some of the redox flow batteries disclosed herein, the redox flow battery has a lifetime of at least 3000 cycles of discharging and charging.

In an embodiment of some of the redox flow batteries disclosed herein, the redox flow battery has a Coulombic efficiency of at least 90%. In an embodiment of some of the redox flow batteries disclosed herein, the redox flow battery has a Coulombic efficiency of at least 95%.

The redox flow batteries disclosed herein may include one or more separators. A separator may be used to isolate the catholyte and anolyte in their respective compartments and prevent crossover. The separator may facilitate the flow of current in the redox flow battery via the electrodes, and optionally other circuitry, by, for example, preventing direct charge exchange between the catholyte and anolyte.

In an embodiment of some of the redox flow batteries disclosed herein, the redox flow batteries further comprise a separator configured to separate the catholyte and the anolyte. In an embodiment of some of the redox flow batteries disclosed herein, the separator is an ion-exchange membrane. In an embodiment of some of the redox flow batteries disclosed herein, the separator is selected from the group consisting of Nafion, Asahi Selemion, Asahi Aciplex, FumaTech FK, Ionics Inc CR, MEGA Ralex, Solvay Morgane, Solvay Aquivion, Neosepta ACS ion-exchange membranes, and any combination thereof. In an embodiment of some of the redox flow batteries disclosed herein, the metal-coordination complex is positively charged and the separator is positively charged or the metal-coordination complex is negatively charged and the separator is negatively charged. In an embodiment of some of the redox flow batteries disclosed herein, the redox flow batteries further comprise a plurality of counter ions associated with the metal-coordination complex. In an embodiment of some of the redox flow batteries disclosed herein, counter ions are configured to pass through the separator during charging and discharging of the redox flow battery. In an embodiment of some of the redox flow batteries disclosed herein, the separator is porous and wherein a size of the metal-coordination complex is greater than an average size of pores of the separator.

In an embodiment of some of the redox flow batteries disclosed herein, the nonaqueous solvent is an aprotic non-aqueous solvent. In an embodiment of some of the redox flow batteries disclosed herein, the solvent is selected from the group consisting of acetonitrile, 2-m ethyltetrahydrofuran, tetrahydrofuran, propylene carbonate, dichloromethane, dichloroethane, an ionic liquid, and any combination thereof.

Some of the metal-coordination complexes provided herein are a new class of metal-coordination complexes. Some of the metal-coordination complexes provided herein may be useful in a wide range of applications.

In an aspect, a metal-coordination complex has the formula (F10):

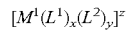 (F10), wherein:

$M^1$ is a metal atom selected from the group consisting of Mn, Fe, Co, and Mo; each of $L^1$ is independently a cyano group (—CN—); each of $L^2$ is independently a pentafluorophenyl borane group ($B[C_6F_5]_3$) or a methyl group; z is a charge and is an integer selected from the range consisting of −3 to −5 or the range consisting of 1 to 3; x and y are each 6 when $M^1$ is Fe, Co, or Mn; and x is 8 and y is 6 or 8 when $M^1$ is Mo.

In an embodiment of some of the metal-coordination complexes disclosed herein, metal-coordination complex is selected from the group consisting of consisting of $[Fe(CN)_6(BPh_3)_6]^{3-\ or\ 4-}$, $[Fe(CN)_6(B(C_6F_5)_3)_6]^{3-\ or\ 4-}$, $[Mn(CN)_6(BPh_3)_6]^{2-\ or\ 3-\ or\ 4-\ or\ 5-}$, $[Mn(CN)_6(B(C_6F_5)_3)_6]^{2-\ or\ 3-\ or\ 4-\ or\ 5-}$, $[Co(CN)_6(BPh_3)_6]^{3-\ or\ 4-}$, $[Co(CN)_6(B(C_6F_5)_3)_6]^{3-\ or\ 4-}$, $[Mo(CN)_8(BPh_3)_8]^{4-\ or\ 5-}$, $[Mo(CN)_8(B(C_6F_5)_3)_8]^{4-\ or\ 5-}$, $[Mo(CN)_8(BPh_3)_6]^{4-\ or\ 5-}$, $[Mo(CN)_8(B(C_6F_5)_3)_6]^{4-\ or\ 5-}$ and $[Fe(CN)_6(CH_3)_6]^{3+\ or\ 2+\ or\ 1+}$.

Also provided herein are methods for forming redox flow batteries and methods for using redox flow batteries that include some of the metal-coordination complexes disclosed herein.

In an aspect, a method for forming a redox flow battery, comprises the steps of: dissolving a catholyte, dissolving an anolyte in the nonaqueous solvent, or dissolving both the catholyte and the anolyte in the nonaqueous solvent; providing a cathode in electrochemical communication with the catholyte; and providing an anode in electrochemical communication with the anolyte; wherein at least one of the catholyte and the anolyte is a metal-coordination complex, the metal-coordination complex comprising: (i) a metal; (ii) one or more first ligands coordinated with the metal atom, wherein each of the first ligands is independently a Lewis basic ligand; and (iii) one or more second ligands associated with the one or more first ligands, wherein each of the second ligands is independently a Lewis acid ligand.

In an aspect, a method for discharging a redox flow battery comprises the steps of: reducing a catholyte and oxidizing an anolyte; wherein the catholyte, the anolyte, or both the catholyte and the anolyte are dissolved in a non-aqueous solvent; wherein at least one of the catholyte and the anolyte is a metal-coordination complex, the metal-coordination complex comprising: (i) a metal; (ii) one or more first ligands coordinated with the metal atom, wherein each of the first ligands is independently a Lewis basic ligand; and (iii) one or more second ligands associated with the one or more first ligands, wherein each of the second ligands is independently a Lewis acid ligand.

In an embodiment of some of the methods disclosed herein, the one or more first ligands are provided in a primary coordination sphere of the metal-coordination complex. In an embodiment of some of the methods disclosed herein, the one or more second ligands are provided in a secondary coordination sphere of the metal-coordination complex. In an embodiment of some of the methods disclosed herein, each of the one or more first ligands independently comprises a Lewis basic functional group and each of the one or more second ligands independently comprises a Lewis acidic functional group. In an embodiment of some of the methods disclosed herein, the one or more second ligands associate with the first ligands to result in electron density being distributed away from the Lewis basic functional groups and to the Lewis acidic functional groups. In an embodiment of some of the methods disclosed herein, each of the catholyte and the anolyte is independently a metal-coordination complex.

The metal-coordination complexes disclosed herein have a metal atom or ion with primary ligands associated with the metal atom or ion and secondary ligands associated with the primary ligands, and indirectly associated with the metal atom or ion. The secondary ligands, which form a secondary coordination sphere, favorably contribute to the solubility of the metal-coordination complex in a nonaqueous solvent and favorably contribute to the redox potential of the metal-coordination complex. These metal-coordination complexes and their properties are highly tunable at least because of the incorporation of the secondary ligands.

In an embodiment of some of the methods disclosed herein, the metal-coordination complex is characterized by the formula (F1):

  (F1), wherein:

M is the metal selected from the group consisting of Cr, Mn, Fe, Co, Ni, Mo, Tc, Ru, Re, Os, W, Rh, Ir, Pd, and Pt; each of $L^1$ is independently the first ligand; each of $L^2$ is independently the second ligand; z is 0 or an integer selected from the range of −5 to 5; each of x and y is independently an integer selected from the range of 1 to 8; and j is an integer selected from the range of 1 to 3. In some embodiments, z is a charge of the metal coordination complex.

In an embodiment of some of the methods disclosed herein, the metal-coordination complex is characterized by the formula (F1A):

  (F1A), wherein:

M is the metal selected from the group consisting of Cr, Mn, Fe, Co, Ni, Mo, Tc, Ru, Re, Os, W, Rh, Ir, Pd, and Pt; each of $L^1$ is independently the first ligand; each of $L^2$ is independently the second ligand; z is 0 or an integer selected from the range of −5 to 5; each of x and y is independently an integer selected from the range of 1 to 8. In some embodiments, z is a charge of the metal coordination complex.

In an embodiment of some of the methods disclosed herein, each $L^1$ is independently nitrogen or a substituted or unsubstituted functional group or molecule corresponding to a nitrile, a pyridyl, a diamine, a triamine, an imine, an amine, an azide, a diimine, a triimine, an amide, a diimide, pyridine, pyrazine, imidazole, pyrazole, pyridazine, pyrimidine, triazine, quinoline, isoquinoline, quinoxaline, acridine, quinazoline, cinnoline, phthalazine, indazole, indole, isoindole, pyrrole, benzimidazole, purine, oxazole, bipyridine, terpyridine, phenanthroline, or any combination thereof.

In an embodiment of some of the methods disclosed herein, each $L^2$ is independently $-G^a(G^b)_q$; where: $G^a$ is selected from the group consisting of C, B, Si, Ge, Al, Zn, Sn, Sb, Te, Bi, and Pb; each of $G^b$ is independently selected from the group consisting of a hydrogen, a halide, nitrogen, and a substituted or an unsubstituted $C_1$-$C_{10}$ alkyl, $C_3$-$C_{10}$ cycloalkyl, $C_5$-$C_{10}$ aryl, $C_5$-$C_{10}$ heteroaryl, acyl, $C_1$-$C_{10}$ hydroxyl, $C_1$-$C_{10}$ alkoxy, $C_2$-$C_{10}$ alkenyl, $C_2$-$C_{10}$ alkynyl, $C_5$-$C_{10}$ alkylaryl, $C_3$-$C_{10}$ arylene, $C_3$-$C_{10}$ heteroarylene, $C_2$-$C_{10}$ alkenylene, $C_3$-$C_{10}$ cycloalkenylene, $C_2$-$C_{10}$ alkynylene, cyanide, pyridine, pyrazine, imidazole, pyrazole, pyridazine, pyrimidine, bipyridine, terpyridine, phenanthroline, a diamine, a triamine, an imine, an amine, an azide, a diimine, a triimine, an amide, or any combination thereof; and q is an integer selected from the range of 1 to 8. In an embodiment of some of the methods disclosed herein, $G^b$ is characterized by the formula (F2):

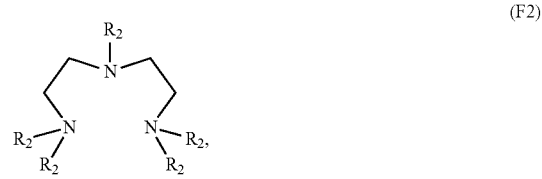

(F2)

wherein:

each of $R^2$ is independently selected from the group consisting of a hydrogen, a halide, a $C_5$-$C_6$ aryl, a $C_1$-$C_5$ alkyl, and any combination thereof. In an embodiment of some of the methods disclosed herein, $G^a$ is B and each $G^b$ is independently a singly, doubly, triply, quadruply, or quintuply fluorinated phenyl group. In an embodiment of some of the methods disclosed herein, $G^b$ is a quintuply fluorinated phenyl group [—($C_6F_5$)]. In an embodiment of some of the methods disclosed herein, $L^1$ is characterized by the formula (F3), (F4), (F5a), (F5b), (F5c), (F5d), or (F5e):

(F3)

(F4)

(F5a)

-continued

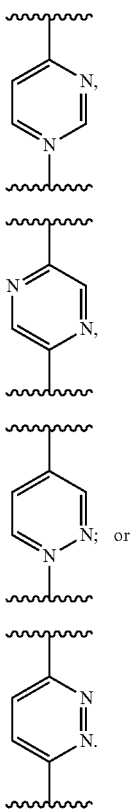
(F5b)
(F5c)
(F5d)
(F5e)

In an embodiment of some of the methods disclosed herein, $L^2$ is characterized by the formula (F6), (F7), or (F8):

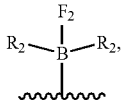
(F6)

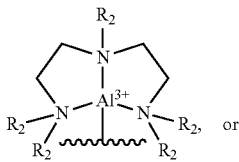
(F7)

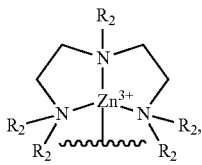
(F8)

where: each of $R^2$ is independently selected from the group consisting of a hydrogen, a halide, a $C_5$-$C_6$ aryl, a $C_1$-$C_5$ alkyl, and any combination thereof.

In an embodiment of some of the methods disclosed herein, x and y (of F1) are equivalent to each other. In an embodiment of some of the methods disclosed herein, j (of F1) is 1.

In an embodiment of some of the methods disclosed herein, the metal-coordination complex is selected from the group consisting of $[Fe(CN)_6(BPh_3)_6]^{3- \, or \, 4- \, or \, 5-}$, $[Fe(CN)_6(B(C_6F_5)_3)_6]^{3- \, or \, 4- \, or \, 5-}$, $[Mn(CN)_6(BPh_3)_6]^{2- \, or \, 3- \, or \, 4- \, or \, 5-}$, $[Mn(CN)_6(B(C_6F_5)_3)_6]^{2- \, or \, 3- \, or \, 4- \, or \, 5-}$, $[Co(CN)_6(BPh_3)_6]^{3- \, or \, 4-}$, $[Co(CN)_6(B(C_6F_5)_3)_6]^{3- \, or \, 4-}$, $[Mo(CN)_8(BPh_3)_8]^{4- \, or \, 5-}$, $[Mo(CN)_8(B(C_6F_5)_3)_8]^{4- \, or \, 5-}$, $[Mo(CN)_8(BPh_3)_6]^{4- \, or \, 5-}$, and $[Mo(CN)_8(B(C_6F_5)_3)_6]^{4- \, or \, 5-}$.

In an embodiment of some of the methods disclosed herein, the metal-coordination complex is selected from the group consisting of $[Fe(CN)_6(BPh_3)_6]^{3- \, or \, 4- \, or \, 5-}$, $[Fe(CN)_6(B(C_6F_5)_3)_6]^{3- \, or \, 4- \, or \, 5-}$, $[Mn(CN)_6(BPh_3)_6]^{2- \, or \, 3- \, or \, 4- \, or \, 5-}$, $[Mn(CN)_6(B(C_6F_5)_3)_6]^{2- \, or \, 3- \, or \, 4- \, or \, 5-}$, $[Co(CN)_6(BPh_3)_6]^{3- \, or \, 4-}$, $[Co(CN)_6(B(C_6F_5)_3)_6]^{3- \, or \, 4-}$, $[Mo(CN)_8(BPh_3)_8]^{4- \, or \, 5-}$, $[Mo(CN)_8(B(C_6F_5)_3)_8]^{4- \, or \, 5-}$, $[Mo(CN)_8(BPh_3)_6]^{4- \, or \, 5-}$, $[Mo(CN)_8(B(C_6F_5)_3)_6]^{4- \, or \, 5-}$ and $[Fe(CN)_6(CH_3)_6]^{3+ \, or \, 2+ \, or \, 1+}$.

In an embodiment of some of the methods disclosed herein, the metal-coordination complex has a charge selected from the group consisting of −5, −4, −3, and −2 during charging of the battery.

The highly tunable chemistry of the metal-coordination complexes disclosed herein allow for tunability of the properties of the metal-coordination complexes, such as properties that are relevant to the parameters of the redox flow batteries disclosed herein.

In an embodiment of some of the methods disclosed herein, a redox potential of the metal-coordination complex increases by ΔP milliVolts; wherein ΔP=(m)(x), m is selected from the range of 200 to 700, and x is the number of first ligands ($L^1$) coordinated with the metal ($M^1$) in the metal-coordination complex. In an embodiment of some of the methods disclosed herein, m is 250. In an embodiment of some of the methods disclosed herein, m is 270. In an embodiment of some of the methods disclosed herein, m is 380. In an embodiment of some of the methods disclosed herein, m is 400. In an embodiment of some of the methods disclosed herein, m is 484. In an embodiment of some of the methods disclosed herein, m is 550. In an embodiment of some of the methods disclosed herein, m is 630.

In an embodiment of some of the methods disclosed herein, a redox potential of the metal-coordination complex is selected from the range of −1.77 V to 2.3 V vs. $Fc^{+/0}$.

In an embodiment of some of the methods disclosed herein, a solubility limit of the metal-coordination complex in the nonaqueous solvent is at least 1.0 M. In an embodiment of some of the methods disclosed herein, a solubility limit of the metal-coordination complex in the nonaqueous solvent is at least 1.5 M. In an embodiment of some of the methods disclosed herein, a solubility limit of the metal-coordination complex in the nonaqueous solvent is at least 2.0 M.

The redox flow batteries disclosed herein have a wide range of tunable and favorable parameters, including high voltages, in part because the catholyte and anolyte may be selected to result in the desired parameters.

In an embodiment of some of the methods disclosed herein, the catholyte and the anolyte are selected such that the redox flow battery has a theoretical open circuit voltage greater than 1.0 V. In an embodiment of some of the methods disclosed herein, the catholyte and the anolyte are selected such that the redox flow battery has a theoretical open circuit voltage greater than or equal to 2 V. In an embodiment of some of the methods disclosed herein, the catholyte and the anolyte are selected such that the redox flow battery has a theoretical open circuit voltage greater than or equal to 3 V. In an embodiment of some of the methods disclosed herein, the catholyte and the anolyte are selected such that the redox flow battery has a theoretical open circuit voltage greater than or equal to 4 V.

In an embodiment of some of the methods disclosed herein, the catholyte is dissolved in the nonaqueous solvent. In an embodiment of some of the methods disclosed herein, the anolyte is dissolved in the nonaqueous solvent. In an embodiment of some of the methods disclosed herein, a concentration of the metal-coordination complex in the nonaqueous solvent is at least 1.0 M. In an embodiment of some of the methods disclosed herein, a concentration of the metal-coordination complex in the nonaqueous solvent is at least 1.5 M. In an embodiment of some of the methods disclosed herein, a concentration of the metal-coordination complex in the nonaqueous solvent is at least 2.0 M.

In an embodiment of some of the methods disclosed herein, the redox flow battery has an operating potential equal to or greater than 1 V. In an embodiment of some of the methods disclosed herein, the redox flow battery has an operating potential equal to or greater than 1.23 V. In an embodiment of some of the methods disclosed herein, the redox flow battery has an operating potential equal to or greater than 2 V. In an embodiment of some of the methods disclosed herein, the redox flow battery has an operating potential equal to or greater than 3 V.

In an embodiment of some of the methods disclosed herein, the redox flow battery has an energy density equal to or greater than 50 Wh/L. In an embodiment of some of the methods disclosed herein, the redox flow battery has an energy density equal to or greater than 75 Wh/L. In an embodiment of some of the methods disclosed herein, the redox flow battery has an energy density equal to or greater than 150 Wh/L. In an embodiment of some of the methods disclosed herein, the redox flow battery has an energy density equal to or greater than 160 Wh/L.

In an embodiment of some of the methods disclosed herein, the redox flow battery has a lifetime of at least 200 cycles of discharging and charging. In an embodiment of some of the methods disclosed herein, the redox flow battery has a lifetime of at least 300 cycles of discharging and charging. In an embodiment of some of the methods disclosed herein, the redox flow battery has a lifetime of at least 2000 cycles of discharging and charging. In an embodiment of some of the methods disclosed herein, the redox flow battery has a lifetime of at least 3000 cycles of discharging and charging.

In an embodiment of some of the methods disclosed herein, the redox flow battery has a Coulombic efficiency of at least 90%. In an embodiment of some of the methods disclosed herein, the redox flow battery has a Coulombic efficiency of at least 95%.

The redox flow batteries disclosed herein may include one or more separators. A separator may be used to isolate the catholyte and anolyte in their respective compartments and prevent crossover. The separator may facilitate the flow of current in the redox flow battery via the electrodes, and optionally other circuitry, by, for example, preventing direct charge exchange between the catholyte and anolyte.

In an embodiment of some of the methods disclosed herein, the redox flow batteries further comprise a separator configured to separate the catholyte and the anolyte. In an embodiment of some of the methods disclosed herein, the separator is an ion-exchange membrane. In an embodiment of some of the methods disclosed herein, the separator is selected from the group consisting of Nafion, Asahi Selemion, Asahi Aciplex, FumaTech FK, Ionics Inc CR, MEGA Ralex, Solvay Morgane, Solvay Aquivion, Neosepta ACS ion-exchange membranes, and any combination thereof. In an embodiment of some of the methods disclosed herein, the metal-coordination complex is positively charged and the separator is positively charged or the metal-coordination complex is negatively charged and the separator is negatively charged. In an embodiment of some of the methods disclosed herein, the redox flow batteries further comprise a plurality of counter ions associated with the metal-coordination complex. In an embodiment of some of the methods disclosed herein, counter ions are configured to pass through the separator during charging and discharging of the redox flow battery. In an embodiment of some of the methods disclosed herein, the separator is porous and wherein a size of the metal-coordination complex is greater than an average size of pores of the separator.

In an embodiment of some of the methods disclosed herein, the nonaqueous solvent is an aprotic nonaqueous solvent. In an embodiment of some of the methods disclosed herein, the solvent is selected from the group consisting of acetonitrile, 2-m ethyltetrahydrofuran, tetrahydrofuran, propylene carbonate, dichloromethane, dichloroethane, an ionic liquid, and any combination thereof.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 12. Cyclic Voltammetry data for the addition of equivalents of borane adducts to $(TBA)_3Mn(CN)_6$ (left panels) and linear fits for the shift in potential per equivalent added (right panels). An observed peak is the Mn(III/IV) oxidation.

FIG. 49 shows a periodic table of elements where highlighted are exemplary metal elements which may be used in the metal-coordination complexes, such as cyano-borane containing metal-coordination complexes, in accordance with the present invention.

FIG. 51. Voltammetry and structure corresponding to $(TEA)_4[Fe(CN-BPh_3)_6]$.

FIG. 54. Illustration corresponding to synthesis of $(TBA)_4[Fe(CN-B(C_6F_5)_3)_6]$ and molecular structure thereof.

FIG. 65 summarizes formation processes for forming metal-coordination complexes with various heteroleptic ligands, including borane secondary ligands. FIG. 65 also shows cyclic voltammetry data corresponding to such metal-coordination complexes.

FIG. 72 is a plot of current density versus potential for [Fe(CN)$_6$][TEA]$_4$ and [Fe(CN)$_6$(BPh$_3$)$_6$][TEA]$_4$.

FIG. 73 is a plot of differential pulse voltammetry, and inset plot showing potential shift as a function of addition of secondary ligands of BPh$_3$, for [Fe(CN)$_6$][TEA]$_4$ and additions of various equivalents secondary ligands up to [Fe(CN)$_6$(BPh$_3$)$_6$][TEA]$_4$. The seven resolved peaks in the differential pulse voltammetry correspond to the borane ligand equivalents in the metal-coordination complex.

FIG. 77 is a table showing redox potentials for metal-coordination complexes between [Fe(CN)$_6$] and [Fe(CN-BPh$_3$)$_6$], which different amounts of BPh$_3$ secondary ligands in the complex.

FIG. 79 is chemical structure for [Fe(CNBPh$_3$)$_6$]$^{4-}$ and a plot of potential as a function of amount of BPh$_3$ or B(C$_6$F$_5$)$_3$ secondary ligands in metal-coordination complexes.

FIGS. 83A and 83B are plots of current density versus potential corresponding to different amounts of BPh$_3$ secondary ligands in exemplary metal-coordination complexes. FIG. 83A shows cyclic voltammetry data and FIG. 83B shows differential pulse voltammetry data.

FIG. 87 is a table summarizing redox potentials and other parameters for some metal-coordination complexes corresponding to the different secondary ligands ("Lewis acids").

FIG. 89A is a plot of absorbance versus wavelength and FIG. 89B is a plot of absorbance versus concentration corresponding to [Fe(CN)$_6$][TBA]4.

FIG. 90A is a plot of absorbance versus wavelength and FIG. 90B is a plot of absorbance versus concentration corresponding to [Fe(CN)$_6$(BPh$_3$)$_6$][TEA]$_4$.

FIG. 91A is a plot of absorbance versus wavelength and FIG. 91B is a plot of absorbance versus concentration corresponding to [Fe(CN)$_6$(B(C$_6$F$_5$)$_3$)$_6$][TEA]$_4$.

FIG. 92 is a table showing various parameters corresponding to certain metal-coordination complexes, including those corresponding to FIGS. 89-91.

STATEMENTS REGARDING CHEMICAL COMPOUNDS AND NOMENCLATURE

Figure 1:
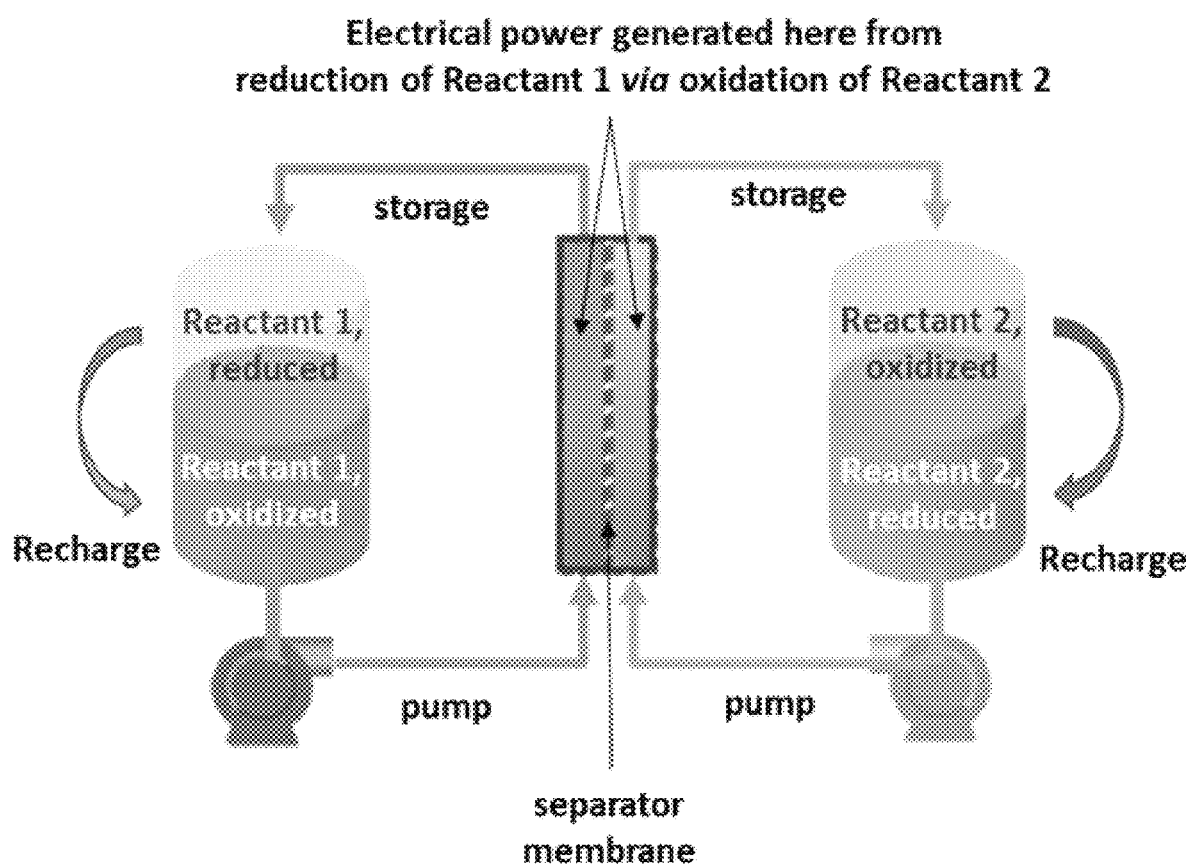
FIG. 1. Schematic of a redox flow battery.

In general, the terms and phrases used herein have their art-recognized meaning, which can be found by reference to standard texts, journal references and contexts known to those skilled in the art. The following definitions are provided to clarify their specific use in the context of the invention.

In an embodiment, a composition or compound of the invention, such as a metal-coordination complex composition or formulation, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

Many of the molecules disclosed herein contain one or more ionizable groups. Ionizable groups include groups from which a proton can be removed (e.g., —COOH) or added (e.g., amines) and groups that can be quaternized (e.g., amines). All possible ionic forms of such molecules and salts thereof are intended to be included individually in the disclosure herein. With regard to salts of the compounds herein, one of ordinary skill in the art can select from among a wide variety of available counterions that are appropriate for preparation of salts of this invention for a given application. In specific applications, the selection of a given anion or cation for preparation of a salt can result in increased or decreased solubility of that salt.

The compounds of this invention can contain one or more chiral centers. Accordingly, this invention is intended to include racemic mixtures, diastereomers, enantiomers, tautomers and mixtures enriched in one or more stereoisomer. The scope of the invention as described and claimed encompasses the racemic forms of the compounds as well as the individual enantiomers and non-racemic mixtures thereof.

As used herein, the term "group" may refer to a functional group of a chemical compound. Groups of the present compounds refer to an atom or a collection of atoms that are a part of the compound. Groups of the present invention may be attached to other atoms of the compound via one or more covalent bonds. Groups may also be characterized with respect to their valence state. The present invention includes groups characterized as monovalent, divalent, trivalent, etc. valence states.

As used herein, the term "substituted" refers to a compound wherein a hydrogen is replaced by another functional group, including, but not limited to: an alkyl, a cycloalkyl, an aryl, a heteroaryl, an acyl, an alkoxy, an alkenyl, an alkynyl, an alkylaryl, an arylene, a heteroarylene, an alkenylene, a cycloalkenylene, an alkynylene, a hydroxyl (—OH), a carbonyl (RCOR'), a sulfide (e.g., RSR'), a phosphate (ROP(=O)(OH)$_2$), an azo (RNNR'), a cyanate (ROCN), an amine (e.g., primary, secondary, or tertiary), an imine (RC(=NH)R'), a nitrile (RCN), a pyridinyl (or pyridyl), a diamine, a triamine, an azide, a diimine, a triimine, an amide, a diimide, an ether (ROR'), a halogen or a halide group; where each of R and R' is independently a hydrogen or a substituted or unsubstituted alkyl group, aryl group, alkenyl group, or a combination of these. Optional substituent functional groups are also described below.

Alkyl groups include straight-chain, branched and cyclic alkyl groups. Alkyl groups include those having from 1 to 30 carbon atoms. Alkyl groups include small alkyl groups having 1 to 3 carbon atoms. Alkyl groups include medium length alkyl groups having from 4-10 carbon atoms. Alkyl groups include long alkyl groups having more than 10 carbon atoms, particularly those having 10-30 carbon atoms. The term cycloalkyl specifically refers to an alky group having a ring structure such as ring structure comprising 3-30 carbon atoms, optionally 3-20 carbon atoms and optionally 2-10 carbon atoms, including an alkyl group having one or more rings. Cycloalkyl groups include those having a 3-, 4-, 5-, 6-, 7-, 8-, 9- or 10-member carbon ring(s) and particularly those having a 3-, 4-, 5-, 6-, 7- or 8-member ring(s). The carbon rings in cycloalkyl groups can also carry alkyl groups. Cycloalkyl groups can include bicyclic and tricycloalkyl groups. Alkyl groups are optionally substituted. Substituted alkyl groups include among others those which are substituted with aryl groups, which in turn can be optionally substituted. Specific alkyl groups include methyl, ethyl, n-propyl, iso-propyl, cyclopropyl, n-butyl, s-butyl, t-butyl, cyclobutyl, n-pentyl, branched-pentyl, cyclopentyl, n-hexyl, branched hexyl, and cyclohexyl groups, all of which are optionally substituted. Substituted alkyl groups include fully halogenated or semihalogenated alkyl groups, such as alkyl groups having one or more hydrogens replaced with one or more fluorine atoms, chlorine atoms, bromine atoms and/or iodine atoms. Substituted alkyl groups include fully fluorinated or semifluorinated alkyl groups, such as alkyl groups having one or more hydrogens replaced with one or more fluorine atoms. Substituted alkyl groups may include substitution to incorporate one or more silyl groups, for example wherein one or more carbons are replaced by Si.

An alkoxy group is an alkyl group that has been modified by linkage to oxygen and can be represented by the formula R—O and can also be referred to as an alkyl ether group. Examples of alkoxy groups include, but are not limited to, methoxy, ethoxy, propoxy, butoxy and heptoxy. Alkoxy groups include substituted alkoxy groups wherein the alky portion of the groups is substituted as provided herein in connection with the description of alkyl groups. As used herein MeO— refers to CH$_3$O—.

Alkenyl groups include straight-chain, branched and cyclic alkenyl groups. Alkenyl groups include those having 1, 2 or more double bonds and those in which two or more of the double bonds are conjugated double bonds. Alkenyl groups include those having from 2 to 20 carbon atoms. Alkenyl groups include small alkenyl groups having 2 to 3 carbon atoms. Alkenyl groups include medium length alkenyl groups having from 4-10 carbon atoms. Alkenyl groups include long alkenyl groups having more than 10 carbon atoms, particularly those having 10-20 carbon atoms. Cycloalkenyl groups include those in which a double bond is in the ring or in an alkenyl group attached to a ring. The term cycloalkenyl specifically refers to an alkenyl group having a ring structure, including an alkenyl group having a 3-, 4-, 5-, 6-, 7-, 8-, 9- or 10-member carbon ring(s) and particularly those having a 3-, 4-, 5-, 6-, 7- or 8-member ring(s). The carbon rings in cycloalkenyl groups can also carry alkyl groups. Cycloalkenyl groups can include bicyclic and tricyclic alkenyl groups. Alkenyl groups are optionally substituted. Substituted alkenyl groups include among others those that are substituted with alkyl or aryl groups, which groups in turn can be optionally substituted. Specific alkenyl groups include ethenyl, prop-1-enyl, prop-2-enyl, cycloprop-1-enyl, but-1-enyl, but-2-enyl, cyclobut-1-enyl, cyclobut-2-enyl, pent-1-enyl, pent-2-enyl, branched pentenyl, cyclopent-1-enyl, hex-1-enyl, branched hexenyl, cyclohexenyl, all of which are optionally substituted. Substituted alkenyl groups include fully halogenated or semihalogenated alkenyl groups, such as alkenyl groups having one or more hydrogens replaced with one or more fluorine atoms, chlorine atoms, bromine atoms and/or iodine atoms. Substituted alkenyl groups include fully fluorinated or semifluorinated alkenyl groups, such as alkenyl groups having one or more hydrogen atoms replaced with one or more fluorine atoms.

Aryl groups include groups having one or more 5-, 6-, 7- or 8-member aromatic rings, including heterocyclic aromatic rings. The term heteroaryl specifically refers to aryl groups having at least one 5-, 6-, 7- or 8-member heterocyclic aromatic rings. Aryl groups can contain one or more fused aromatic rings, including one or more fused heteroaromatic rings, and/or a combination of one or more aromatic rings and one or more nonaromatic rings that may be fused or linked via covalent bonds. Heterocyclic aromatic rings can include one or more N, O, or S atoms in the ring. Heterocyclic aromatic rings can include those with one, two or three N atoms, those with one or two O atoms, and those with one or two S atoms, or combinations of one or two or three N, O or S atoms. Aryl groups are optionally substituted. Substituted aryl groups include among others those that are substituted with alkyl or alkenyl groups, which groups in turn can be optionally substituted. Specific aryl groups include phenyl, biphenyl groups, pyrrolidinyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, and naphthyl groups, all of which are optionally substituted. Substituted aryl groups include fully halogenated or semihalogenated aryl groups, such as aryl groups having one or more hydrogens replaced with one or more fluorine atoms, chlorine atoms, bromine atoms and/or iodine atoms. Substituted aryl groups include fully fluorinated or semifluorinated aryl groups, such as aryl groups having one or more hydrogens replaced with one or more fluorine atoms. Aryl groups include, but are not limited to, aromatic group-containing or heterocylic aromatic group-containing groups corresponding to any one of the following: benzene, naphthalene, naphthoquinone, diphenylmethane, fluorene, anthracene, anthraquinone, phenanthrene, tetracene, tetracenedione, pyridine, quinoline, isoquinoline, indoles, isoindole, pyrrole, imidazole, oxazole, thiazole, pyrazole, pyrazine, pyrimidine, purine, benzimidazole, furans, benzofuran, dibenzofuran, carbazole, acridine, acridone, phenanthridine, thiophene, benzothiophene, dibenzothiophene, xanthene, xanthone, flavone, coumarin, azulene or anthracycline. As used herein, a group corresponding to the groups listed above expressly includes an aromatic or heterocyclic aromatic group, including monovalent, divalent and polyvalent groups, of the aromatic and heterocyclic aromatic groups listed herein provided in a covalently bonded configuration in the compounds of the invention at any suitable point of attachment. In embodiments, aryl groups contain between 5 and 30 carbon atoms. In embodiments, aryl groups contain one aromatic or heteroaromatic six-member ring and one or more additional five- or six-member aromatic or heteroaromatic ring. In embodiments, aryl groups contain between five and eighteen carbon atoms in the rings. Aryl groups optionally have one or more aromatic rings or heterocyclic aromatic rings having one or more electron donating groups, electron withdrawing groups and/or targeting ligands provided as substituents.

Arylalkyl groups are alkyl groups substituted with one or more aryl groups wherein the alkyl groups optionally carry additional substituents and the aryl groups are optionally substituted. Specific alkylaryl groups are phenyl-substituted alkyl groups, e.g., phenylmethyl groups. Alkylaryl groups are alternatively described as aryl groups substituted with one or more alkyl groups wherein the alkyl groups optionally carry additional substituents and the aryl groups are optionally substituted. Specific alkylaryl groups are alkyl-substituted phenyl groups such as methylphenyl. Substituted arylalkyl groups include fully halogenated or semihalogenated arylalkyl groups, such as arylalkyl groups having one or more alkyl and/or aryl groups having one or more hydrogens replaced with one or more fluorine atoms, chlorine atoms, bromine atoms and/or iodine atoms.

As used herein, the terms "alkylene" and "alkylene group" are used synonymously and refer to a divalent group derived from an alkyl group as defined herein. The invention includes compounds having one or more alkylene groups. Alkylene groups in some compounds function as attaching and/or spacer groups. Compounds of the invention may have substituted and/or unsubstituted $C_1$-$C_{20}$ alkylene, $C_1$-$C_{10}$ alkylene and $C_1$-$C_5$ alkylene groups.

As used herein, the terms "cycloalkylene" and "cycloalkylene group" are used synonymously and refer to a divalent group derived from a cycloalkyl group as defined herein. The invention includes compounds having one or more cycloalkylene groups. Cycloalkyl groups in some compounds function as attaching and/or spacer groups. Compounds of the invention may have substituted and/or unsubstituted $C_3$-$C_{20}$ cycloalkylene, $C_3$-$C_{10}$ cycloalkylene and $C_3$-$C_5$ cycloalkylene groups.

As used herein, the terms "arylene" and "arylene group" are used synonymously and refer to a divalent group derived from an aryl group as defined herein. The invention includes compounds having one or more arylene groups. In an embodiment, an arylene is a divalent group derived from an aryl group by removal of hydrogen atoms from two intra-ring carbon atoms of an aromatic ring of the aryl group. Arylene groups in some compounds function as attaching and/or spacer groups. Arylene groups in some compounds function as chromophore, fluorophore, aromatic antenna, dye and/or imaging groups. Compounds of the invention include substituted and/or unsubstituted $C_3$-$C_{30}$ arylene, $C_3$-$C_{20}$ arylene, $C_3$-$C_{10}$ arylene and $C_1$-$C_5$ arylene groups.

As used herein, the terms "heteroarylene" and "heteroarylene group" are used synonymously and refer to a divalent group derived from a heteroaryl group as defined herein. The invention includes compounds having one or more heteroarylene groups. In an embodiment, a heteroarylene is a divalent group derived from a heteroaryl group by removal of hydrogen atoms from two intra-ring carbon atoms or intra-ring nitrogen atoms of a heteroaromatic or aromatic ring of the heteroaryl group. Heteroarylene groups in some compounds function as attaching and/or spacer groups. Heteroarylene groups in some compounds function as chromophore, aromatic antenna, fluorophore, dye and/or imaging groups. Compounds of the invention include substituted and/or unsubstituted $C_3$-$C_{30}$ heteroarylene, $C_3$-$C_{20}$ heteroarylene, $C_1$-$C_{10}$ heteroarylene and $C_3$-$C_5$ heteroarylene groups.

As used herein, the terms "alkenylene" and "alkenylene group" are used synonymously and refer to a divalent group derived from an alkenyl group as defined herein. The invention includes compounds having one or more alkenylene groups. Alkenylene groups in some compounds function as attaching and/or spacer groups. Compounds of the invention include substituted and/or unsubstituted $C_2$-$C_{20}$ alkenylene, $C_2$-$C_{10}$ alkenylene and $C_2$-$C_5$ alkenylene groups.

As used herein, the terms "cycloalkenylene" and "cycloalkenylene group" are used synonymously and refer to a divalent group derived from a cycloalkenyl group as defined herein. The invention includes compounds having one or more cycloalkenylene groups. Cycloalkenylene groups in some compounds function as attaching and/or spacer groups. Compounds of the invention include substituted and/or unsubstituted $C_3$-$C_{20}$ cycloalkenylene, $C_3$-$C_{10}$ cycloalkenylene and $C_3$-$C_5$ cycloalkenylene groups.

As used herein, the terms "alkynylene" and "alkynylene group" are used synonymously and refer to a divalent group derived from an alkynyl group as defined herein. The invention includes compounds having one or more alkynylene groups. Alkynylene groups in some compounds function as attaching and/or spacer groups. Compounds of the invention include substituted and/or unsubstituted $C_2$-$C_{20}$ alkynylene, $C_2$-$C_{10}$ alkynylene and $C_2$-$C_5$ alkynylene groups.

As used herein, the term "halo" refers to a halogen group such as a fluoro (—F), chloro (—Cl), bromo (—Br), iodo (—I) or astato (—At).

The term "heterocyclic" refers to ring structures containing at least one other kind of atom, in addition to carbon, in the ring. Examples of such heteroatoms include nitrogen, oxygen and sulfur. Heterocyclic rings include heterocyclic alicyclic rings and heterocyclic aromatic rings. Examples of heterocyclic rings include, but are not limited to, pyrrolidinyl, piperidyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, triazolyl and tetrazolyl groups. Atoms of heterocyclic rings can be bonded to a wide range of other atoms and functional groups, for example, provided as substituents.

The term "carbocyclic" refers to ring structures containing only carbon atoms in the ring. Carbon atoms of carbocyclic rings can be bonded to a wide range of other atoms and functional groups, for example, provided as substituents.

The term "alicyclic ring" refers to a ring, or plurality of fused rings, that is not an aromatic ring. Alicyclic rings include both carbocyclic and heterocyclic rings.

The term "aromatic ring" refers to a ring, or a plurality of fused rings, that includes at least one aromatic ring group. The term aromatic ring includes aromatic rings comprising carbon, hydrogen and heteroatoms. Aromatic ring includes carbocyclic and heterocyclic aromatic rings. Aromatic rings are components of aryl groups.

The term "fused ring" or "fused ring structure" refers to a plurality of alicyclic and/or aromatic rings provided in a fused ring configuration, such as fused rings that share at least two intra ring carbon atoms and/or heteroatoms.

As used herein, the term "alkoxyalkyl" refers to a substituent of the formula alkyl-O-alkyl.

As used herein, the term "polyhydroxyalkyl" refers to a substituent having from 2 to 12 carbon atoms and from 2 to 5 hydroxyl groups, such as the 2,3-dihydroxypropyl, 2,3,4-trihydroxybutyl or 2,3,4,5-tetrahydroxypentyl residue.

As used herein, the term "polyalkoxyalkyl" refers to a substituent of the formula alkyl-(alkoxy)n-alkoxy wherein n is an integer from 1 to 10, preferably 1 to 4, and more preferably for some embodiments 1 to 3.

As used herein, the term "ammonium ion" refers to a positively charged group having the formula $[NH_4]^+$. In some embodiments, for example, the ammonium ion is substituted, such that one or more of the hydrogens are replaced by another functional group, such as some those described above.

As used herein, the term "phosphate ion" refers to a negatively charged group having the formula $[PO_4]^{3-}$.

As used herein, the term "hexafluorophosphate ion" refers to a negatively charged group having the formula $[PF_6]^-$.

As to any of the groups described herein that contain one or more substituents, it is understood that such groups do not contain any substitution or substitution patterns which are sterically impractical and/or synthetically non-feasible. In addition, the compounds of this invention include all stereochemical isomers arising from the substitution of these compounds. Optional substitution of alkyl groups includes substitution with one or more alkenyl groups, aryl groups or both, wherein the alkenyl groups or aryl groups are optionally substituted. Optional substitution of alkenyl groups includes substitution with one or more alkyl groups, aryl groups, or both, wherein the alkyl groups or aryl groups are optionally substituted. Optional substitution of aryl groups includes substitution of the aryl ring with one or more alkyl groups, alkenyl groups, or both, wherein the alkyl groups or alkenyl groups are optionally substituted.

Optional substituents for any alkyl, alkenyl and aryl group includes substitution with one or more of the following substituents, among others:

halogen, including fluorine, chlorine, bromine or iodine;
pseudohalides, including —CN;
—COOR, where R is a hydrogen or an alkyl group or an aryl group and more specifically where R is a methyl, ethyl, propyl, butyl, or phenyl group all of which groups are optionally substituted;
—COR, where R is a hydrogen or an alkyl group or an aryl group and more specifically where R is a methyl, ethyl, propyl, butyl, or phenyl group all of which groups are optionally substituted;
—CON(R)$_2$, where each R, independently of each other R, is an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;
—OCON(R)$_2$, where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;
—N(R)$_2$, where each R, independently of each other R, is a hydrogen, or an alkyl group, or an acyl group or an aryl group and more specifically where R is a methyl, ethyl, propyl, butyl, phenyl or acetyl group, all of which are optionally substituted; and where R and R can form a ring that can contain one or more double bonds and can contain one or more additional carbon atoms;
—SR, where R is hydrogen or an alkyl group or an aryl group and more specifically where R is hydrogen, methyl, ethyl, propyl, butyl, or a phenyl group, which are optionally substituted;
—SO$_2$R, or —SOR, where R is an alkyl group or an aryl group and more specifically where R is a methyl, ethyl, propyl, butyl, or phenyl group, all of which are optionally substituted;
—OCOOR, where R is an alkyl group or an aryl group;
—SO$_2$N(R)$_2$, where each R, independently of each other R, is a hydrogen, or an alkyl group, or an aryl group all of which are optionally substituted and wherein R and R can form a ring that can contain one or more double bonds and can contain one or more additional carbon atoms; and
—OR, where R is H, an alkyl group, an aryl group, or an acyl group all of which are optionally substituted. In a particular example R can be an acyl yielding —OCOR", wherein R" is a hydrogen or an alkyl group or an aryl group and more specifically where R" is methyl, ethyl, propyl, butyl, or phenyl groups all of which groups are optionally substituted.

Specific substituted alkyl groups include haloalkyl groups, particularly trihalomethyl groups and specifically trifluoromethyl groups. Specific substituted aryl groups include mono-, di-, tri, tetra- and pentahalo-substituted phenyl groups; mono-, di-, tri-, tetra-, penta-, hexa-, and hepta-halo-substituted naphthalene groups; 3- or 4-halo-substituted phenyl groups, 3- or 4-alkyl-substituted phenyl groups, 3- or 4-alkoxy-substituted phenyl groups, 3- or 4-RCO-substituted phenyl, 5- or 6-halo-substituted naphthalene groups. More specifically, substituted aryl groups include acetylphenyl groups, particularly 4-acetylphenyl groups; fluorophenyl groups, particularly 3-fluorophenyl and 4-fluorophenyl groups; chlorophenyl groups, particularly 3-chlorophenyl and 4-chlorophenyl groups; methylphenyl groups, particularly 4-methylphenyl groups; and methoxyphenyl groups, particularly 4-methoxyphenyl groups.

The term "Earth abundant metal" refers to metallic elements that are abundant in the Earth's crust. As used herein, Earth abundant metals are those having a relative availability in the Earth's crust greater than or equal to $10^{-2}$ atoms per $10^6$ atoms of Si according to the chart shown in FIG. 4 of the United States Geological Survey Fact Sheet 087-02 available at https://pubs.usgs.gov/fs/2002/fs087-02/; last accessed Aug. 2, 2017.

The terms "non-aqueous solvent", "nonaqueous solvent", and "organic solvent" may be used interchangeably and refer to a non-water liquid in which may dissolve a solute, such as a metal-coordination complex. The non-aqueous solvent may include small amounts of water, such that the water is a solute or impurity dissolved in the non-aqueous solvent. The non-aqueous solvent may include small amounts of water but such that the predominant phase of the solution is the non-water liquid and the solute(s) remains substantially dissolved in the non-water phase. In some of the embodiments disclosed herein, non-aqueous solvent may be acetonitrile, 2-m ethyltetrahydrofuran, tetrahydrofuran, nitromethane, dichloromethane, propylene carbonate, liquid sulfur dioxide (l-SO$_2$), dimethyl formamide, ionic liquid, perfluorinated liquid, or any combination of these.

An "aprotic nonaqueous solvent" refers to a nonaqueous solvent, as described above, that lacks an O—H bond and a N—H bond. In some of the embodiments disclosed herein, a nonaqueous solvent and/or an aprotic nonaqueous solvent may have a dipole moment greater than or equal to 1.0 debye, or greater than or equal to 1.5 debye.

"Anodic bias" refers to a bias (i.e., potential or voltage) applied to an electrode, for example, such as a working electrode, such that conventional current flows into the electrode (i.e., the anode).

The term "normal temperature and pressure" or "NTP" refers to standard conditions defined as a temperature of 20° C. and an absolute pressure of 1 atm (14.696 psi, 101.325 kPa).

The term "ligand", as used herein, refers to an atom, ion, functional group, or molecule that is directly or indirectly associated with one or more metal atoms or metal ions, or directly or indirectly associated with another species that is coordinated with one or more metal atoms or metal ions. In an embodiment, "associated" refers to a covalent bond, an ionic bond, or a coordination bond, which is also referred to as a coordinate covalent bond or a dative bond. In an embodiment, a ligand directly associated with a metal atom or metal ion refers to a ligand that is coordinated with (i.e., in a coordination bond with) the metal atom or metal ion. In an example, the cyano groups in ferricyanide are directly associated with, or directly coordinated with, the central iron ion. In an embodiment, a ligand indirectly associated with a metal atom or metal ion refers to a second ligand that is associated with a first ligand, where the first ligand is directly associated with a metal atom or metal ion, and where the first ligand, the second ligand, and the metal atom or metal ion form a metal-coordination complex, or a portion thereof. Systems and methods of the invention may include ligands that are Lewis acidic ligands or Lewis basic ligands in a metal coordination complex. In an exemplary metal-coordination complex, a Lewis basic ligand is directly coordinated with a metal ion and a Lewis acidic ligand is directly associated with the Lewis basic ligand and, optionally, is indirectly associated with the metal ion. A ligand indirectly associated with a metal atom or metal ion affects the electron distribution at the metal atom or metal ion with which it is indirectly associated. A ligand may be monodentate or polydentate. Systems and methods of the invention include, for example, monodentate, bidentate, tridentate, tetradentate or higher denticity ligands.

A "Lewis acid" refers to a chemical species, such as an atom, ion, functional group, or molecule, which contains an empty electron orbital which is capable of accepting an electron pair from a Lewis base. A "Lewis base" refers to a chemical species which contains a filled electron orbital containing an electron pair which is capable of forming a dative bond with a Lewis acid. Exemplary Lewis acids include boranes, such as boron trifluoride (BF$_3$), organoboranes, such as triphenylborane (BPh$_3$, or B(C$_6$F$_5$)$_3$), and certain metal atoms or metal ions, such as high oxidation state transition metal cations. The term "Lewis acidic" refers to a chemical species at least a portion of which is a Lewis acid. For example, the molecule BF$_3$ is Lewis acidic because the B in BF$_3$ is a Lewis acid. The term "Lewis basic" refers to a chemical species at least a portion of which is a Lewis base. For example, the molecule NH$_3$ is Lewis basic because the N in NH$_3$ is a Lewis base. In an embodiment, a metal ion that is part of a metal-coordination complex is a Lewis acid capable of forming at least one more dative bonds with another chemical species. For example, the Al$^{3+}$ of the complex represented by formula F100,

(F100)

is Lewis acidic and may coordinate with another chemical species, such as a cyano group, which is Lewis basic. In the complex (F8, see above), the species represented by formula F101

(F101)

is an exemplary Lewis basic ligand. The triamine ligand represented by F101 in the above complex of formula F100 is a tridentate Lewis basic ligand.

The term "metal-coordination complex" refers to a chemical species that comprises a metal, which is a metal atom or a metal ion, where the metal is associated with at least one ligand. A metal-coordination complex has at least one ligand directly associated with the metal. The one or more ligands that are directly associated with the metal may be referred to as the primary ligands and may be characterized as forming a "primary coordination sphere" about the central metal of the metal-coordination complex. A metal-coordination complex may also comprise at least one ligand that is indirectly associated with the metal and is directly associated with one or more primary ligands. The one or more ligands that are each (i) directly associated with one or more primary ligands and each of which is (ii) indirectly associated with the metal may be referred to as the secondary ligands and may be characterized as forming a "secondary coordination sphere" about the metal of the metal-coordination complex. A metal-coordination complex may be neutral with a charge of 0. A metal-coordination complex may be charged. An exemplary metal-coordination complex is Fe[(CN)(BPh$_3$)]$_6^{4-}$. Fe[(CN)(BPh$_3$)]$_6^{4-}$ has an iron ion as the central metal, six cyano groups as primary ligands forming a primary coordination sphere, six triphenylboranes as secondary ligands forming a secondary coordination sphere, and a charge of −4. The one or more primary ligands and one or more secondary ligands may form one or more Lewis adducts. In the exemplary metal-coordination complex Fe[(CN)(BPh$_3$)]$_6^{4-}$, each cyano group forms a Lewis adduct with one triphenylborane. In an embodiment, the one or more primary ligands of a metal-coordination complex are each Lewis basic ligands. In an embodiment, the one or more secondary ligands of a metal-coordination complex are each Lewis acidic ligands. In an embodiment, the primary ligands of a metal-coordination complex, when more than one primary ligand is present, are identical. In an embodiment, a metal-coordination complex has one, at least two, at least three, at least four, at least five, at least six, at least seven, or at least eight primary ligands. In an embodiment, the primary ligands of a metal-coordination complex are characterized by one, at least two, at least three, at least four, at least five, at least six, at least seven, or at least eight different chemical species. In an embodiment, the one or more primary ligands are each coordinated with the metal of the metal-coordination complex. In an embodiment, each of the one or more secondary ligands is coordinated with one or more primary ligands. In an embodiment, one or more ligands of the metal-coordination complex may be reversibly or irreversibly associated or bound in the metal-coordination complex. A metal-coordination complex may be provided with one or more counter ions, such as when the metal-coordination complex is provided in solid form, such as a powder. When dissolved in a solvent, a metal-coordination complex may have counter ions associated with or otherwise in proximity of the metal-coordination complex. Counter ions, when present, whether in a solvent or in solid form, balance out the charge of the metal-coordination complex. For example, a metal-coordination complex having a charge of −4, such as complex $Fe[(CN)(BPh_3)]_6^{4-}$, may be provided with four counter ions, such as tetraethylammonium or tetrabutylammonium. In some embodiments of the metal-coordination complexes disclosed herein, a metal-coordination complex has more than one metal. In some embodiments of the metal-coordination complexes disclosed herein, a metal-coordination complex has two metals. In a metal-coordination complex having more than two metals, the metals may be indirectly associated with each other: for example, a ligand may be associated with more than one metal of the metal-coordination complex.

The term "redox potential" refers to the potential at which a chemical species acquires one or more electrons and is thereby reduced. Potential may be measured in volts (V) or millivolts (mV).

The term "solubility", as used herein, refers to the ability of a chemical species to dissolve in a liquid solvent. The term "solubility limit", when referring to a chemical species, is the maximum concentration at which the chemical species may be dissolved in a solvent, for a given temperature and pressure, before the chemical species precipitates out of solution or beyond which no further amount of the chemical species will dissolve in the solvent. Unless otherwise noted, the solubility limit is determined under standard temperature and pressure (STP), which is 0° C. and absolute pressure of 100 kPa.

The term "size" when referring to a metal-coordination complex or other chemical species refers to the hydrodynamic diameter of the metal-coordination complex or chemical species.

The term "electrochemical communication" refers to the ability of two or more elements, materials, chemical species, and/or structures to transfer charge, such as in the form of electrons, between each other through a solution. In some embodiments, components in electrochemical communication are in direct electrical communication wherein an electron is directly transferred from one component to another. In some embodiments, components in electrochemical communication are in indirect electrical communication wherein an electron is indirectly transferred from one component to another via one or more intermediate components.

The term "charge" refers to a formal charge, a net or total charge of a chemical species. A negative charge may be represented as −X or X− and a positive charge may be represented as +X or X+, where X itself is the absolute value of the charge for the purpose of this definition (e.g., a charge of negative four is represented as −4 or 4−, where X is 4; a charge of positive three is represented by +3 or 3+, where X is 3).

The term "catholyte" refers to a chemical species that is in electrochemical communication with a cathode of an electrochemical cell and which is reduced during discharging of the electrochemical cell. A catholyte is reduced when its charge is reduced (e.g., the charge of a cathlyte becomes more negative or becomes less positive). The term "anolyte" refers to a chemical species that is in electrochemical communication with an anode of an electrochemical cell and which is oxidized during discharging of the electrochemical cell. In an embodiment, an electrochemical cell is a battery. In an embodiment, an electrochemical cell is a redox flow battery. A catholyte and an electrolyte are each an exemplary electrolyte, or a portion thereof. An electrolyte is a chemical species that increases the electrical conductivity of a solution when the chemical species is dissolved in a solvent of the solution.

Figure 17:
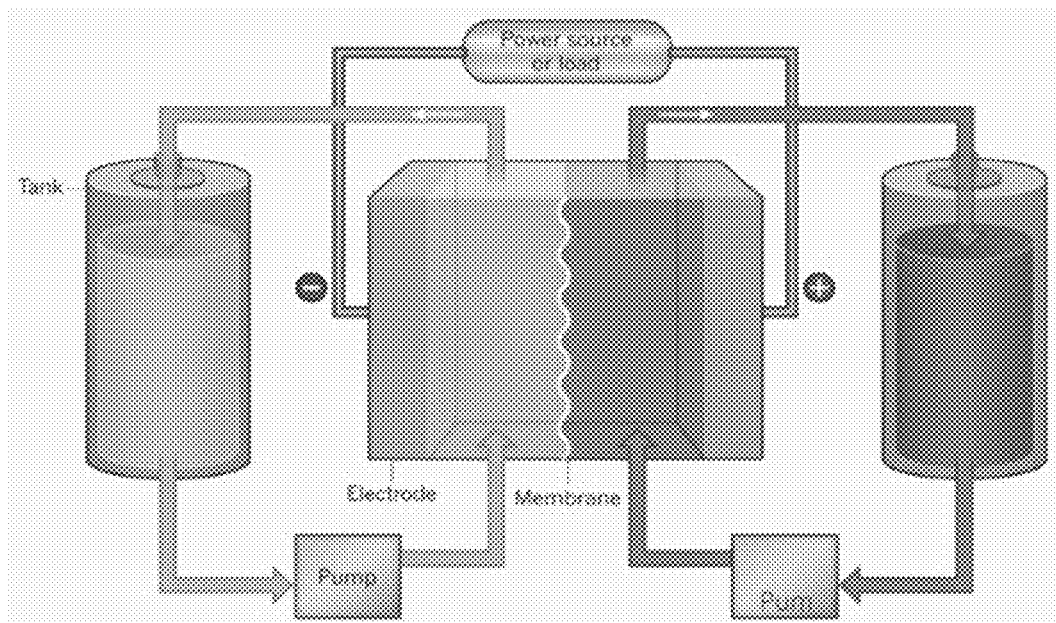
FIG. 17. Schematic of a redox flow battery. In this set-up, two solutions of electroactive materials (left and right) are stored in external tanks and pumped to flow-through electrodes in an electrochemical cell. The materials undergo reactions at the electrodes, generating electricity when a load is connected. A membrane between the electrodes prevents the solutions from mixing, but allows the transport of charge-carrying ions, thus allowing electrical neutrality in the system to be maintained. In charging mode, the power source generates a potential difference across the cell.
Figure 46:
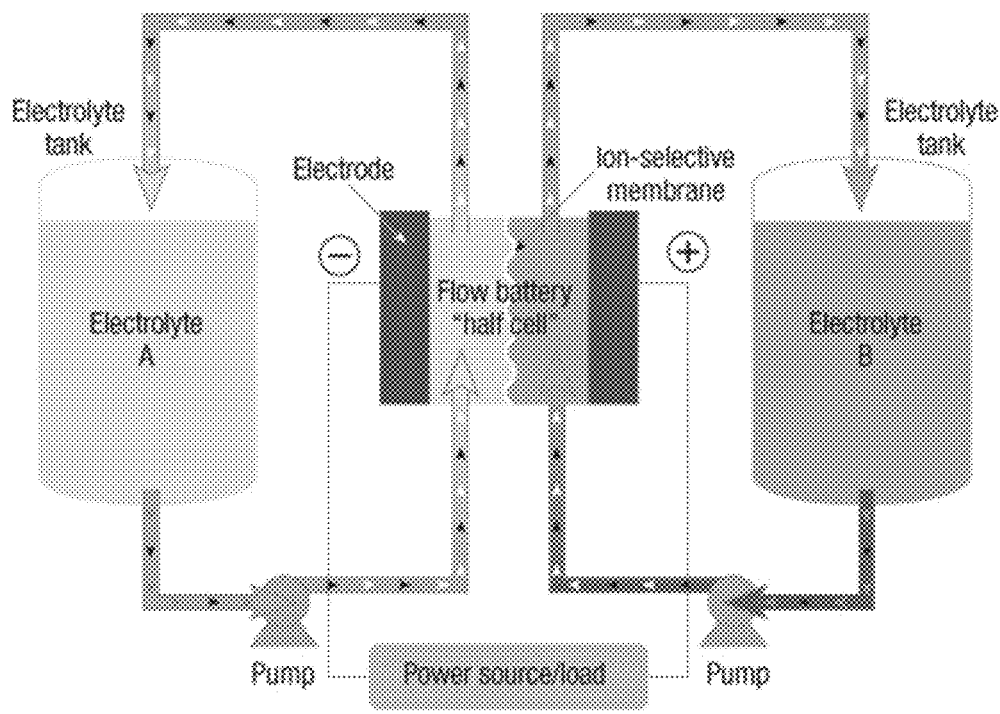
FIG. 46. Schematic of a non-aqueous redox flow battery.

The term "redox flow battery" refers to a type of electrochemical cell. A redox flow battery comprises a cathode, an anode, a catholyte, an anolyte, and at least one solvent. A redox flow battery may further comprise additional chemical species such as counter ions and other ions. A redox flow battery has a compartment or region where reduction and oxidation processes occur, such as the reduction of a catholyte and oxidation of an anolyte during discharging of the redox flow battery. In an embodiment, a redox flow battery further comprises a separator, such as an ion exchange membrane, that separates the reduction and oxidation region into at least two compartments. For example, a separator separates the compartment having the catholyte(s) and the compartment having the anolyte(s). A redox flow battery may include a storage compartment or tank for storing a solution having catholyte and a storage compartment or tank for storing a solution having anolyte. The tank having catholyte is in fluid communication with a compartment which has a cathode and the tank having anolyte is in fluid communication with a compartment which has an anode. The solution having catholyte may be circulated in and out of the respective reduction and/or oxidation compartment and the solution having anolyte may be circulated in and out of the respective oxidation and/or reduction compartment. Optionally, circulation is aided by one or more pumps. Exemplary redox flow batteries are illustrated in FIGS. 1, 17, and 46. In some embodiments, the separator is positively charged. In some embodiments, the separator is negatively charged. The functional benefits of having a charged separator is to prevent like-charged (i.e., positive or negative) catholyte(s) and/or anolyte(s) from crossing or passing through the separator. In some embodiments, a redox flow battery comprises more than one separator. In some embodiments, a separator is porous. The pores of a porous separator may be characterized by an average pore size (diameter) which is less than the size of the catholyte(s) and/or anolyte(s).

"Standard cell potential" is a function of the standard redox potentials of the catholyte(s) and anolyte(s) in an electrochemical cell, such as a redox flow battery. The standard cell potential, $E_{cell}^0$, may be determined using Equation (1) or Equation (2):

$$E_{cell}^0 = E_{reduction,cathode}^0 + E_{oxidation,anode}^0 \quad (1)$$

$$E_{cell}^0 = E_{reduction,cathode}^0 - E_{reduction,anode}^0 \quad (2)$$

Where $E_{reduction,cathode}^0$ is the standard reduction potential of the reaction occurring at the cathode (e.g., reduction of catholyte), $E_{oxidation,anode}^0$ is the standard oxidation potential of the reaction occurring at the anode (e.g., oxidation of the anolyte), and $E_{reduction,anode}^0$ is the standard reduction potential of the reaction at the anode (e.g., reduction of the anolyte). The standard cell potential thus may correspond to the maximum ideal open circuit voltage of an electrochemical cell, or redox flow battery, at conditions corresponding to standard electrode potentials: temperature of 25° C., effective concentration of 1 mol/L, a pressure of 1 atm, and thermodynamic activity coefficient of one for each species.

The term "theoretical open circuit voltage" refers to the maximum ideal open circuit voltage of a redox flow battery given the parameters corresponding to the selected solvent(s), selected catholyte(s), selected anolyte(s), concentrations of the catholyte(s) and anolyte(s) in their respective compartment(s) and solvent(s), and thermodynamic activity coefficient of one for each of the catholyte(s) and anolyte(s). In other words, the theoretical open circuit voltage refers to the maximum open circuit voltage of a battery if practical limitations and inefficiencies are ignored.

The term "operating potential", when applied to an electrochemical cell system such as a redox flow battery, refers to the measured voltage generated by the electrochemical cell system.

The term "energy density", when applied to a battery such as a redox flow battery, refers to the energy capacity of a battery per unit of volume. Typically, energy density is expressed in units of Wh/L.

The term "lifetime", when applied to a battery such as a redox flow battery, refers to the number of complete charge-and-discharge cycles that a battery is able to support before its capacity (measured in ampere-hour, Ah) decreases to 80% of the initial capacity. A complete charge-and-discharge cycle refers to charging the battery to ≥99.9% of its capacity and discharging the battery to ≤0.01% of its capacity.

The term "Coulombic efficiency", when applied to a battery such as a redox flow battery, refers to the Faradaic efficiency of the battery and describes the charge efficiency of electron transfer in the battery. The Coulombic efficiency is the ratio of the total charge extracted from the battery to the total charge put into the battery over a full charge cycle.

The term "crossover" refers to a species, usually the catholyte or anolyte, passing through a separator from one compartment to another.

The term "$Fc^{+/0}$" or "$Fc^{0/+}$" refers to a ferrocene/ferrocenium ion redox couple used as a reference potential. For example, current-vs-voltage plots demonstrating redox reactions corresponding to a metal-coordination complex may be plotted as a function of potential with respect to the potential of a ferrocene/ferrocenium ion redox couple, or $Fc^{+/0}$.

The term "outer-sphere complex" or "outer-sphere metal-coordination complex" refers to metal-coordination complexes with a primary coordination sphere, having primary ligands, and a secondary coordination sphere, having secondary ligands, in accordance with the present invention. For example, the primary coordination sphere has primary ligands that are Lewis basic and the secondary coordination sphere has secondary ligands that are Lewis acidic.

The term "equivalents" may be used herein to refer to an addition of an amount of secondary ligands (or adducts having the secondary ligand) to a solution having some quantity of metal-coordination complex(es). In this context, the term refers to adding secondary ligands to the respective metal-coordination complex. When X equivalents are added, X is a multiple of the quantity of metal-coordination complex(es) present in the solution. In other words, for example, adding 2 equivalents of an organoborane compound to a solution refers to introducing a quantity of the organoborane compound that is twice the stoichiometric quantity of the metal-coordination complex(es) present in the solution. The resulting solution may have more than one type of metal-coordination complexes. For example, addition of 6 equivalents of $BPh_3$ to a solution with $Fe(CN)_6$ may result in the presence of one or more of the complexes represented by $Fe(CN)_5(CN-BPh_3)_1$, $Fe(CN)_4(CN-BPh_3)_2$, $Fe(CN)_3(CN-BPh_3)_3$, $Fe(CN)_2(CN-BPh_3)_4$, $Fe(CN)_1(CN-BPh_3)_5$, and $Fe(CN-BPh_3)_6$. The resulting solution may also or instead have metal-coordination complexes where the central metal atom or ion has a different coordination number than that in the starting complex before the equivalents of a secondary ligand compound, or adduct having a secondary ligand compound, are added. In some embodiments, the majority of the product complexes is the complex having a number of secondary ligands equivalent to the number of equivalents added, which in the previous example corresponds to $Fe(CN-BPh_3)_6$.

The term "adduct" refers to a compound having or formed of a primary ligand associated with a secondary ligand. For example, the coordination of a Lewis basic ligand with a Lewis acidic ligand may form an adduct. In a metal-coordination complex, the constituent ligands of an adduct are still referred to as a primary or secondary ligand of the primary or secondary coordination sphere, respectively. In some examples, the term adduct is referred to in conjunction with an exemplary secondary ligand such as in the case of "borane adduct" in which case the "borane" is an exemplary secondary ligand and "adduct" refers to the resulting compound when the borane secondary ligand is added to the complex which has primary ligand(s) such as cyano group(s), thereby forming cyano-borane adduct(s), for example, of which the cyano ligand is in the primary coordination sphere and the borane ligand is in the secondary coordination sphere.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

The invention can be further understood by the following non-limiting examples.

Example 1: Redox Flow Batteries with Metal Coordination Complex Pairs

It has been estimated that the total installed energy storage capability of the power grid in the United States corresponds to less than 5% of its power generating capacity.[1] This mismatch translates to a very poor system-wide efficiency, and poses a significant challenge for the greater adoption and integration of renewable sources due to the intermittent nature of their operation. New technologies are needed that can enable "smart grids" with distributed storage and supply to better balance generation and demand, and these offer considerable commercial and environmental opportunities. Redox flow batteries are particularly well-suited for grid-level energy storage as they offer long cycle lifetimes and high energy efficiencies.[2] However, conventional redox flow technologies are limited in their energy density and use expensive materials, resulting in a high cost per unit energy stored ($/kWh). This example provides a new class of redox flow batteries using inexpensive, highly-stable inorganic materials that offer substantially improved energy density and long lifetime with a favorable cost structure. The present systems and methods are beneficial to hasten the adoption of this energy storage technology as part of the renewable energy infrastructure with environmental benefits equivalent to eradicating emissions from around 50 million passenger vehicles.[1,3]

Redox flow batteries convert energy through reversible redox processes between electroactive materials (the anolyte and the catholyte) in a solution or slurry.[2] In a redox flow battery, these electroactive materials are stored in separate chambers until use, then are pumped through an area where electrochemical reaction can occur during operation (converting chemical energy to electrical energy upon discharge), and are then pumped into storage tanks where they may be re-charged mechanically, chemically or electrochemically (FIG. 1). During operation, anolyte and catholyte active materials pass along an inert electrode/current collector separated by an ionically-conducting membrane, similar to a conventional battery; however, there is no transfer of active material from solution to the electrode surface, nor (in the ideal case) does any transport of anolyte or catholyte material occur through the separator membrane (supporting electrolyte ions moving to balance charges as required). Redox flow batteries have certain advantages over conventional batteries (in particular, Li-ion type), as the electrochemical reactions are typically highly reversible (as they occur between solution-phase species across an inert electrode, with no exchange of material) and, hence, these systems offer a very long useful cycle life of 10 years or more. The redox reactions are fast and do not vary significantly with state-of-charge, so redox flow batteries are able to support a high power density (charge/discharge rate) useful for grid scale applications. Most usefully, redox flow batteries can be configured independently for power (stack design, pump size) and energy (storage tank capacity) to meet a specific installation requirement.

Figure 2A:
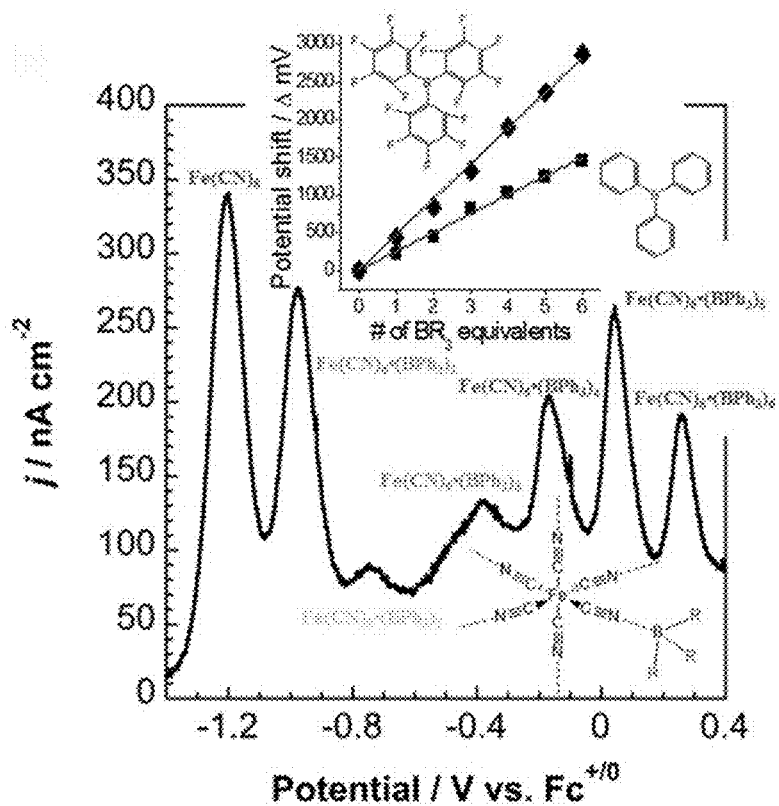
FIG. 2A. Outer-sphere complex redox performance showing ~+1.5 V potential shift measured by differential pulse voltammetry upon sequential coordination of 6 $BPh_3$ Lewis acid (secondary) ligands to $Fe(CN)_6^{4-}$; inset shows sequential shifts of +250 mV and +380 mV upon coordination of individual $BPh_3$ or $B(C_6F_5)_3$ ligands, respectively, indicating a shift (and, hence, operating voltage) of at least +2.1 V is possible by tuning the $BR_3$ secondary ligand type.
Figure 2B:
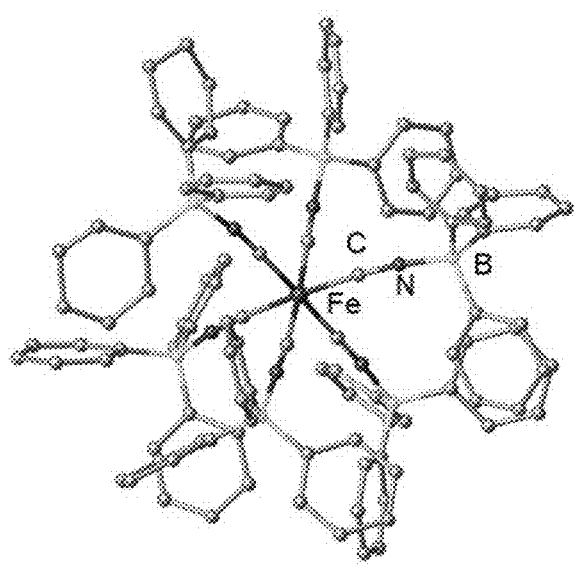
FIG. 2B. Molecular structure of metal-coordination complex [Fe $(CN)_6.(BPh_3)_6$][TEA]$_4$. Hydrogen atoms and counter ions of TEA (tetraethylammonium) cations are omitted for clarity.

Existing redox-flow technologies are not currently widely adopted for grid storage applications due to major challenges in their cost and performance. Current commercial systems use expensive materials (e.g., rare metals such as V) in aqueous solution, a solvent that limits their operation to <2V and results in a low energy density (<100 Wh/L), with concomitant high cost per kWh (>$350/kWh). To address this, higher voltage systems in non-aqueous solvents have been explored but with limited success to-date due to the poor solubility and poor electrochemical reversibility of the materials studied. The present systems and methods address these previously-limiting issues. The present systems and methods utilize active materials that feature cheap, highly-abundant metals and display extremely-reversible redox behavior, such as $Fe(CN)_6^{3-/4-}$ and $Mo(CN)_8^{4-/5-}$, in combination with organoboranes to give new outer-sphere (i.e., having secondary ligand coordination sphere) metal-coordination complexes that are very soluble in non-aqueous solvents. The redox potentials of these new metal-coordination complexes are tunable by suitable choice of organoborane, and their use as electroactive materials enable the ability to extend the operating voltage and energy density of redox flow batteries to achieve their maximum possible values. Experimental results are provide in FIG. 2A demonstrating outer-sphere metal-coordination complex redox performance showing ~+1.5 V potential shift measured by differential pulse voltammetry upon sequential coordination of 6 $BPh_3$ Lewis acid (secondary) ligands to $Fe(CN)_6^{4-}$; inset shows sequential shifts of +250 mV and +380 mV upon coordination of individual BPh or $B(C_6F_5)_3$ ligands, respectively, indicating a shift (and, hence, operating voltage) of at least +3.0 V is possible by tuning the $BR_3$ secondary ligand type. The present metal complex-based systems have promise to enable a system with energy density >150 Wh/L and lifetime >3000 cycles at a cost target of ≤$250/kWh, effectively improving energy density by 50% while reducing cost by 50% compared to existing technologies.

Embodiments for the present systems and methods may include:

Embodiment 1: Demonstrating a bulk cycling of both anolyte and catholyte materials in individual laboratory bulk electrolysis cells with cycling >3000 cycles at >95% coulombic efficiency.

Embodiment 2: Demonstrating operation of anolyte/catholyte pair in a laboratory-scale redox flow battery with cycling >3000 cycles at >90% coulombic efficiency.

Embodiment 3: Performing anolyte/catholyte material pair cost analysis integrated into realistic full cell cost projection to establish technology $/kWh, targeting ≤$250/kWh.

Embodiment 4: Demonstrating kW-size redox flow battery with cycling >3000 cycles at >90% coulombic efficiency (metrics directly relevant to commercial operation).

An important prospective market for next-generation redox flow batteries is the renewable energy grid storage space. Wind and solar installed capacity has been growing 25-50% per year worldwide since 2010, although, again, the associated energy storage component typically represents <5% of the total generating capacity from these sources.[4] Two major factors prevent more widespread adoption of energy storage as part of the renewable energy infrastructure: i) cost in $/kWh for suitable energy storage technologies and ii) available footprint for installation (which can be challenging for smaller sites with geographical idiosyncrasies, as is often the case with renewable sources). Conventional gas- or coal-fired power plants are typically of very large size, so energy storage technologies that are lower-cost than batteries (at huge scales) such as pumped hydro or compressed air energy storage may be more attractive as longer-term grid storage prospects; hence, the improved redox flow technology are attractive in smaller-scale renewable energy grid applications, although there are no fundamental reasons why it cannot be utilized in larger installations. Other electrochemical systems (in particular, conventional batteries such as Li-ion and lead-acid) may also appear to be a good fit, although these have considerably greater challenges with regard to cycle life and cost (e.g., Li-ion batteries are >$250/kWh with ~2000 cycles or fewer for typical systems).

In an attempt to provide a cost basis for our technology, we have adapted scaling factors for state-of-the-art aqueous vanadium and zinc-bromine systems from a published analysis of redox flow batteries,[5] and used these to project an estimated $/kWh range for our non-aqueous system based on its approximate material cost:

TABLE 1

|  | Vanadium technology | | Zn-Br$_2$ technology | | Present technology | |
| --- | --- | --- | --- | --- | --- | --- |
| Catholyte material ($/kg) | V | 29 | Zn | 2 | Fe(CN)$_6^{3-}$ | 5 |
| Anolyte material ($/kg) | V | 29 | Br$_2$ | 15 | Mo(CN)$_8^{4-}$•8 BR$_3$ | 15 |
| Electrolyte ($/kg) | Aqueous acid | 0.1 | Water/surfactant | 0.2 | Acetonitrile/salt | 15 |
| Separator ($/kg) | Nafion | 700 | Microporous polyethylene | 205 | Ion-exchange membrane | 200 |
| Est. cell component cost ($/kAh) | $105 | | $53 | | $71 | |
| Voltage factor* | 1.2 | | 1.8 | | 3.0 | |
| Balance-of-plant scaling factor§ | 6 | | 12 | | 6-12 | |
| $/kWh est. | $564 | | $355 | | $142-284 | |

Notes: *Cell component cost is divided by voltage factor to enable comparison per kWh. § Unit material cost per kWh is multiplied by this factor to get the estimated $/kWh, per the published analysis.[5] This enables a reasonable cost boundary range (i.e., 6-12× component cost) to be projected for the proposed technology without being extremely sensitive to small differences in mass or concentration between active components.

Hence, we believe the present technology can be produced in the $150-250/kWh range, broadly consistent with the 2015 DOE targets for stationary energy storage.[6] We note that this attractive cost structure arises from a number of factors: i) lower-cost active materials compared to vanadium systems (reflecting the high cost of V compared to Fe, Mo and B); ii) use of an ion-exchange separator material (constructed from an inexpensive hydrocarbon backbone) that is more cost-effective than the fluorinated Nafion material used in vanadium systems; and iii) lower cost per kWh compared to Zn—Br$_2$ systems due to the higher operating potential. The relatively higher cost of the electrolyte is not expected to be a major factor here, due to the reasonably low absolute cost (for an organic solvent) of acetonitrile (~$1.50/kg at bulk volumes);[7] a larger value than this is used in the calculation to reflect unknown additional costs that may arise.

The present technology is scalable to enable kW-to-MW-size stationary installations, as it simply requires more material to be manufactured and utilized. The processes for manufacturing such materials are well-established. However, it is worth noting that, with an energy density of ~150 Wh/L, a 500 MW-sized flow battery with 6 hour capacity would require about 25,000 tonnes of acetonitrile, equivalent to about 30% of the annual worldwide production capacity. The present systems and methods also are compatible with bio-derived, renewable "Green Solvent" materials such as 2-methyltetrahydrofuran.[8]

REFERENCES CORRESPONDING TO EXAMPLE 1

1 Department of Energy (2009, May) "President Obama Announces $3.4 billion investment to spur transition to smart grid." http://www.energy.gov/news2009/8216.html
2 G. I. Soloveichik, Chem. Rev., 2015, 115, 11533-11558.
3 A. Z. Weber, M. M. Mench, J. P. Meyers, P. N. Ross, J. T. Gostick, Q. Liu, J. Appl. Electrochem., 2011, 41, 1137-1164.
4 "Renewable Energy Integration in Power Grids", IRENA Technology Brief E15-April 2015, http://www.irena.org/Publications
5 R. M. Darling, K. G. Gallagher, J. A. Kowalski, S. Haac, F. R. Brushett, Energy Environ. Sci., 2014, 7, 3459-3477.
6 US DOE OE Energy Storage Program Plan 2011, http://energy.gov/sites/prod/files/oeprod/DocumentsandMedia/OE_Energy_Storage_Program_Plan_Feburary_2011v3.pdf
7 http://www.icis.com/chemicals/channel-info-chemicals-a-z/
8 D. Prat, O. Pardigon, H.-W. Flemming, S. Letestu, V. Ducandas, P. Isnard, E. Guntrum, T. Senac, S. Ruisseau, P. Cruciani, P. Hosek, Org. Process Res. Dev., 2013, 17, 1517-1525.

Example 2: Borane Adducts of Hexacyanoferrate(II): Modifying the Voltage of Reversible Redox Couples Access to rare, earth-abundant high voltage reversible redox couples is reported through the synthesis and characterization of novel homoleptic borane adducts of hexacyanoferrate(II). Control over redox properties is established with respect to borane Lewis acidity, reflected in half-wave potential shifts per borane equivalent (secondary ligand) of +250 mV for BPh$_3$ and +380 mV for B(C$_6$F$_5$)$_3$, yielding total half-wave potential shifts of +1.5 V and +2.1 V, respectively, from the parent Fe$^{III/II}$ redox couple. Control over electronic structure is also demonstrated with borane coordination by an observed blueshift in d-d transitions. This technique provides an avenue for discrete modifications to the electronic structures and electrochemical properties of cyanometallates, allowing for the eventual characterization of a library of metal isocyanoborates.

Few examples of high-voltage, reversible redox couples exist in the literature. Therefore, alternative methods for modulating redox potentials are necessary. A small number of borane adducts have exhibited drastically modulated redox potentials via perturbation of the σ-bonding framework.

The oscillopolarography of CN—BX$_3$ adducts in dichloromethane (DCM) of Fe(phen)$_2$(CN)$_2$ showed an approximately 300 mV increase in half-wave potential (E$_{1/2}$) per borane, with BBr$_3$ effecting the largest shift. Cyanorhenate (I), Re(R$_2$phen)(CO)$_3$[CNB(C$_6$F$_5$)$_3$], where R=H, Me, displayed an ~320 mV shift in peak anodic potential (E$_{p,a}$) in acetonitrile (MeCN) compared to the base complex. Interestingly, the reduction is only shifted anodically by ~50 mV, presumably due to the reduction being phenanthroline-based. Cyanoosmate(III) complexes, [Os(4,4'-R$_2$(bpy))$_2$(CNBL$_3$)$_2$], where R=H, Me, displayed an ~420 mV and ~290 mV anodic shift per borane for L=(C$_6$F$_5$)$_3$B and BPh$_3$ in MeCN, respectively. Again, the reversible, ligand-based reductions exhibited negligible shifts in potential.

Aside from work done by Shriver et al., little research on structural characterization of borane adducts of cyanometalates exists. Two borane adducts have been crystallographically characterized, tetraethylammonium hexacyanochromate coupled with triphenylborane (BPh$_3$) and trityl tetracyanonickelate coupled with tris(pentafluorophenyl)borane (($C_6F_5$)$_3$B). Notably, the chromate complex isomerizes to form the homoleptic nitrile complex. The isomerization was crystallographically verified and justified with HSAB theory, with the hard Cr(III) preferring coordination to nitrogen. Additionally, little research exists on the voltammetry of coordinatively-saturated borane adducts of hexacyanometalates.

Herein, we characterize new borane adducts of hexacyanoferrate(II) and expand upon the work by Shriver on CN—BX$_3$ adducts of transition metal cyanometalates. We demonstrate discrete control of half-wave potential for the Fe$^{III/II}$ redox couple of hexacyanoferrate(II) using boranes of varying Lewis acidity.

Tetrabutylammonium (TBA) or tetraethylammonium (TEA) hexacyanoferrate(II) ("compound (1)") was prepared using an original procedure. Neutralization of H$_4$[Fe(CN)$_6$] with TBAOH or TEAOH in water generated the alkylammonium salt in quantitative yield. $^1$H NMR, $^{13}$C NMR, UV-Vis spectroscopy, and voltammetry confirmed the purity of 1, with a single, reversible redox couple with $E_{1/2}$=−1.25 V vs. Fc$_{+/0}$ in MeCN.

Figure 3:
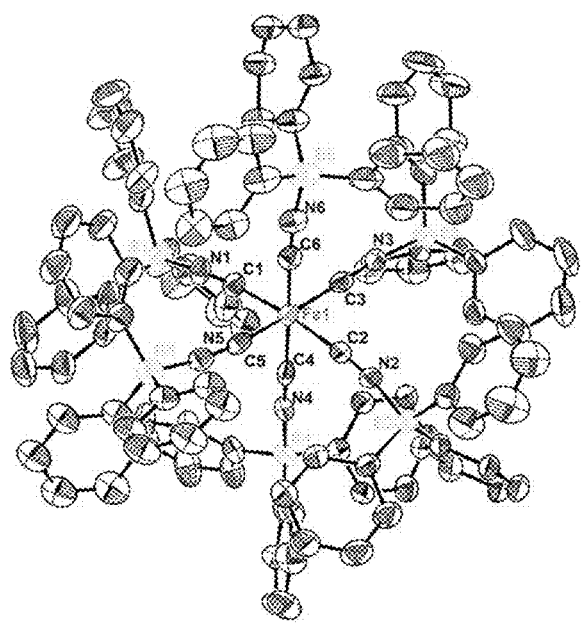
FIG. 3. Molecular structure of $(TEA)_4[Fe(CN-BPh_3)_6]$, where each TEA is a counter ion and is tetraethylammonium and $[Fe(CN-BPh_3)_6]$ is an exemplary metal-coordination complex of the present invention. Thermal ellipsoids set at 50% probability. Cations (TEA; counter ions) and protons omitted for clarity.

The borane adducts of compound (1) were synthesized by combining six equivalents of borane with one equivalent of compound (1) dissolved in DCM or MeCN in a nitrogen-filled glove box. Coordination of borane generated (TEA)$_4$[Fe(CN—BPh$_3$)$_6$] ("compound (2)") and (TBA)$_4$[Fe(CN—B($C_6F_5$)$_3$)$_6$] ("compound (3)"). Each complex was purified and subsequently analyzed by $^{11}$B NMR, X-ray crystallography, UV-Vis spectroscopy, and voltammetry. Hexavalent coordination for all species was confirmed by X-ray crystallographic data, with a representative structure depicted in FIG. 3.

Figure 4A:
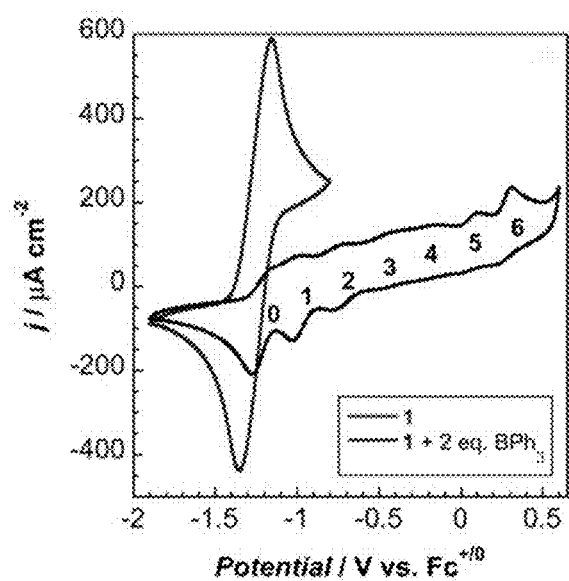
FIG. 4A. Cyclic voltammograms of 5 mM $(TEA)_4[Fe(CN)_6]$ and 5 mM $(TEA)_4[Fe(CN)_6]$ with two equivalents of triphenylborane ($BPh_3$) in DCM (i.e., $(TEA)_4[Fe(CN)_4(CN-BPh_3)_n]$.
Figure 4B:
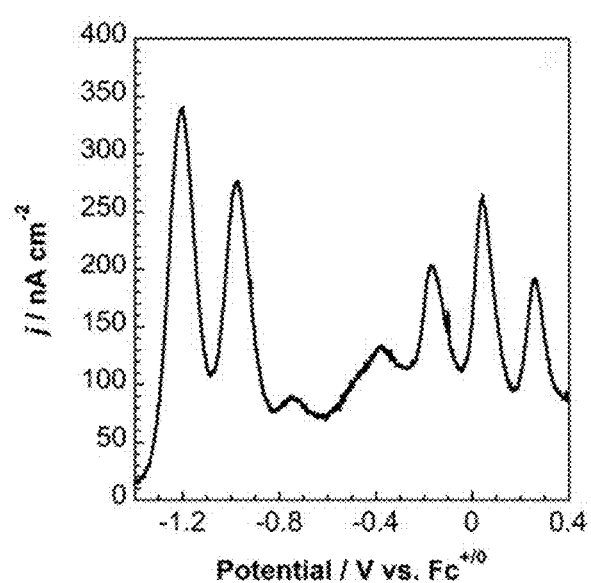
FIG. 4B. Differential pulse voltammetry of $(TEA)_4[Fe(CN)_4(CN-BPh_3)_n]$.
Figure 4C:
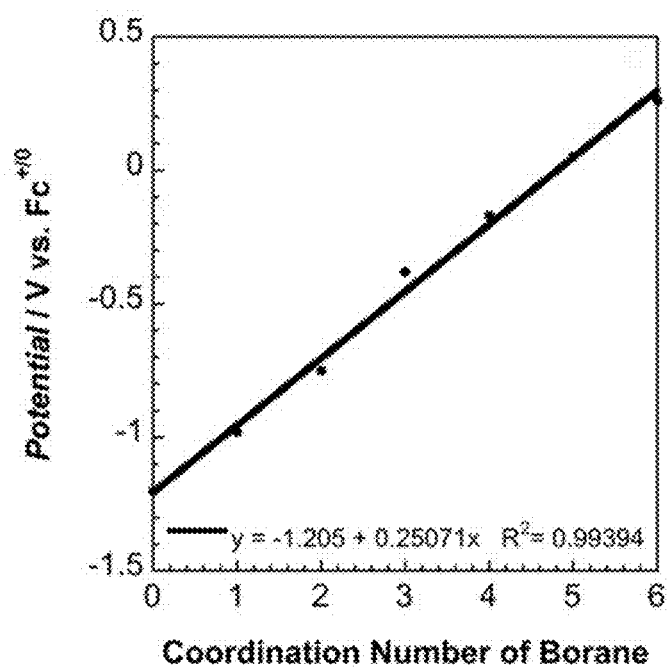
FIG. 4C. Linear regression of peak anodic potential versus coordination number of $BPh_3$. The subscript "n" is used in $(TEA)_4[Fe(CN)_4(CN-BPh_3)_n]$ to indicate that metal-coordination complexes corresponding to one or more different coordination numbers of the metal (Fe) may be observed when 2 equivalents of triphenylborane ($BPh_3$) are added, including metal-coordination complexes where n is 2.

FIG. 4A displays the voltammetry of compound (1) and of compound (1) with two equivalents of BPh$_3$ added to solution. Seven anodic peaks are visible, corresponding to all possible coordination numbers of borane to hexacyanoferrate(II). These seven anodic peaks are clearly seen in FIG. 4B, which displays the differential pulse voltammetry. Interestingly, the trend in anodic potential shift per borane added to hexacyanoferrate(II), shown in FIG. 4C, is linear, suggesting an electron withdrawing effect that is dependent on the Lewis acidity of the borane, which perturbs both the σ-bonding and π-backbonding effects in hexacyanoferrate (II). It is well understood that isocyanoborate complexes experience decreased σ-bonding relative to cyanide complexes due to reduced electron density on carbon. Conversely, isocyanoborate complexes experience greater π-backbonding relative to cyanide complexes due to decreased π*(CN) energies.

Despite confirmation of hexavalent coordination of borane for complex compound (2), the voltammetry of compound (2) in both DCM and MeCN suggests the presence of both pentavalent and hexavalent species. The presence of both species is likely due to the dissociation of BPh$_3$ since BPh$_3$ is a relatively weak Lewis acid. The voltammetry for the hexavalent species is not electrochemically reversible, which suggests dissociation of BPh$_3$ from the Fe(III) state. Table 2 summarizes relevant electrochemical and spectroscopic data.

TABLE 2

Half-wave potentials, potential shifts per borane, $^{11}$B chemical shifts, and absorbance maxima for borane adducts of hexacyanoferrate(II).

| Complex | $E_{1/2}$ of Fe$^{III/II}$ (V vs. Fc$^{+/0}$) | Potential Shift per Borane (mV) | $^{11}$B NMR Shift (ppm) | Absorbance Maxima (nm) (ε (M$^{-1}$ cm$^{-1}$)) |
|---|---|---|---|---|
| 1 | −1.25 | — | — | 357 (583) 255 (7, 204) 227 (10, 130) |
| 2 | 0.15 | 251 | ! | 324 (347) |
| 3 | 0.85 | 350 | ! | 317 (333) 265 (9, 540) 230 (35, 650) |

Figure 5:
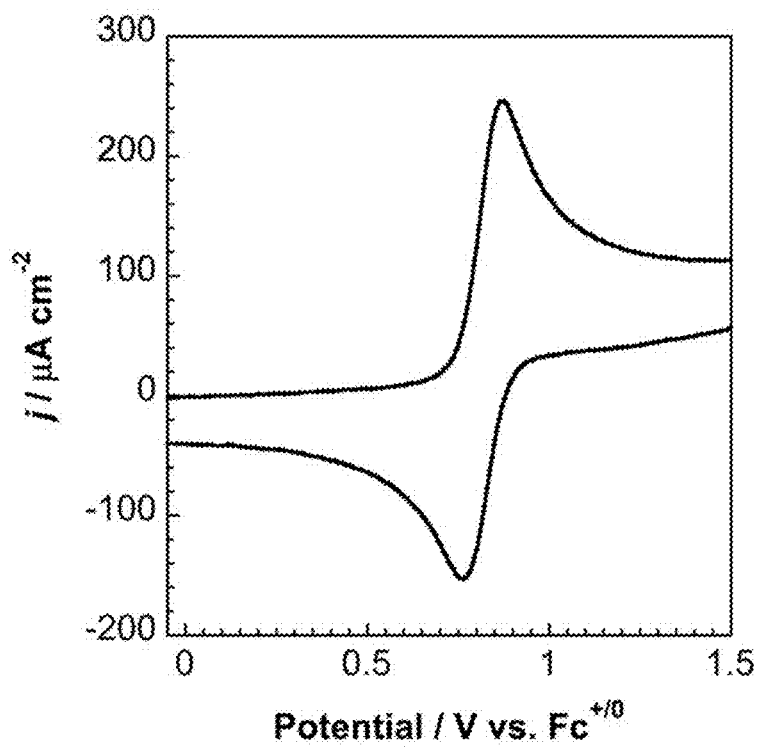
FIG. 5. Cyclic voltammetry of $(TEA)_4[Fe(CN-B(C_6F_5)_3)_6]$ in acetonitrile with 0.1 M $TBAPF_6$. Potential shifted relative to the half-wave potential of ferrocene.

In contrast to complex compound (2), complex compound (3) displays a single, electrochemically reversible redox event with a half-wave potential $E_{1/2}$=0.85 V vs. Fc$^{+/0}$. FIG. 5 depicts this redox couple, which corresponds to a 2.1 V anodic shift in half-wave potential for the Fe$^{III/II}$ couple, a 350 mV anodic shift per B($C_6F_5$)$_3$ added to hexacyanoferrate(II). The potential shift is quite similar to that observed for the aforementioned Re(I) and Os(III) complexes, indicating primary dependence on the Lewis acidity of the borane.

The UV-Vis spectra of the adducts display a trend in the lowest-energy transition, previously assigned as $^1A_{1g} \rightarrow {}^1T_{1g}$. This band, 296 nm in water, redshifts to 357 nm in MeCN due to lower solvent acceptor number. Upon coordination of BPh$_3$ and B($C_6F_5$)$_3$, compound (2) and compound (3) exhibit blueshifted absorbance maxima for this transition due to both σ and π effects, where increased backbonding outweighs decreased σ bonding.

Figure 6:
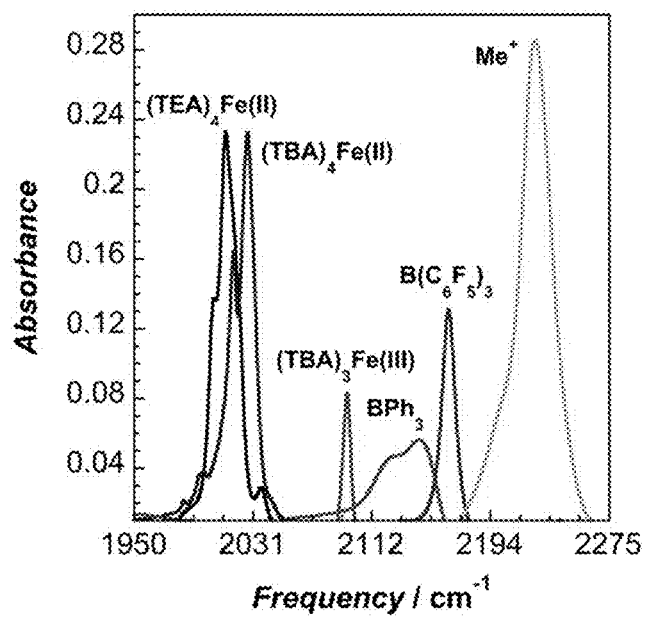
FIG. 6. ATIR (attenuated total internal reflection) spectra of base complexes and borane adducts of hexacyanoferrate.

FIG. 6 provides ATIR spectra of base complexes and borane adducts of hexacyanoferrate.

Example 3: High Voltage Hexacyanometallates for Non-Aqueous Flow Batteries

In this example, we demonstrate the coordination complex [Mn(CN)$_6^{3-}$] and characterize its behavior with and without secondary sphere (or, "outer-sphere") borane secondary ligands, specifically BPh$_3$ and ($C_6F_5$)$_3$B, to demonstrate its viability in flow battery technology. Binding of highly soluble Lewis acids with stable redox active cores has been shown to lower the electron density of the central metal atom while preserving the substitutional stability and electrochemical reversibility. These benefits allow for increased energy densities while preserving cost-efficiency and adaptability in flow batteries. Characterization was accomplished by UV-Vis spectroscopy, cyclic voltammetry, X-ray crystallography, EPR spectroscopy, and spectroelectrochemistry. The addition of borane secondary ligands to in the metal-coordination complex was found to anodically shift the redox couples by consistent intervals per secondary ligand, and reversible and quasireversible peaks were observed for the Mn(III/II) and Mn(II/I) couples of the six-coordinate complex respectively in acetonitrile and DCM. Electrochemical reversibility and cyclic stability indicate that [Mn(CN)$_6^{3-}$] is a useful complex in model flow battery systems. We expand our library of low-cost metal organic complexes by characterizing hexacyanocobaltate in a similar fashion.

Alternative energy provides an incredible opportunity to harvest natural forces to power human development, but the intermittent nature of many natural resources does not coincide with the rise and fall of energy demand. Energy is wasted during off-peak periods and extraneously generated during high demand periods[1,2]. Both traditional and renewable power generation facilities would benefit immensely from effective, flexible, and cost-efficient energy storage capabilities. Adoption of a "smart grid" system would reduce energy use, reduce emissions, and open up greater opportunities for sustainable energy consumption.

Redox flow batteries present a method of energy storage that has the potential to improve energy storage capabilities[3]. Redox flow batteries are rechargeable batteries that operate by converting chemical energy to electrical energy through reversible redox reactions between electroactive species dissolved in solution. Two electroactive solutions (anolyte/catholyte) are contained in separate tanks; during charge or discharge, pumps circulate the solutions through a separator chamber that contains an ionically conducting membrane to keep the solutions separated, but allow for supporting electrolyte ions to move to balance charge. The electroactive liquids pass along electrodes that act as walls of the separator chamber which collect charge and carry current. Unlike a traditional battery, there is no transfer of active materials from solution to electrode and no movement of anolyte or catholyte through the membrane[4]. Redox batteries are an appealing form of energy storage because of high reversibility and consistent energy delivery with life cycles of up to ten years. The redox reactions occur quickly and are independent of state-of-charge, allowing redox flow batteries to support a high power density and battery components such as stack design, pump size and storage tank capacity can be independently adjusted to meet a wide range of requirements. These performance strengths of redox flow batteries make them particularly suitable as stationary energy storage systems.

The most common systems in use are aqueous flow batteries. Despite attractive costs and high solubility, the energy density of aqueous flow batteries is limited by the relatively narrow voltage window of water (around 2 V) which translates to a limited maximum obtainable voltage[3]. Since non-aqueous solvents provide greater potential ranges, non-aqueous flow batteries are being explored to ameliorate this issue; however, difficulties with material solubility, crossover, precious metal complexes (e.g. ruthenium) and electrochemical irreversibility due to side-reactions all contribute to difficulty in implementing non-aqueous solvents for redox flow batteries[3].

The present example characterizes and establishes a library of novel low-cost metal organic complexes to construct high energy redox flow batteries that are cost-efficient, energy-efficient, and adaptable. In particular, we investigate the coordination complex [Mn(CN)$_6^{3-}$], which is soluble in common inorganic solvents, and characterized its behavior with and without outer-sphere borane secondary ligands, specifically BPh$_3$ and (C$_6$F$_5$)$_3$B. Binding of highly soluble Lewis acids with stable redox active cores has been shown to lower the electron density of the central metal atom while preserving the substitutional stability and electrochemical reversibility[6,7]. We examine and characterize hexacyanocobaltate ([Co(III)(CN)$_6$]$^{3-}$) in tandem with hexacyanomanganate. We find that hexacyanomanganate borane complexes have promising reduction potential and has sufficient reversibility[5]. We do these characterizations by employing UV-Vis spectroscopy, EPR spectroscopy, X-ray crystallography, and spectroelectrochemistry. We determine shifts in electrode potentials, reversibility, and cyclic stability of the coordination complexes by voltammetry. We also evaluate material stability under cycling conditions as well as charge efficiency during charge and discharge by controlled potential cycling. With using these metal-coordination complexes in redox flow batteries, we increase energy density of non-aqueous flow batteries without detracting from other qualities while maintaining reasonable cost which will allow for more widespread adoption of effective energy storage and ultimately support the development of a stronger renewable energy infrastructure and smart grid deployment.

Figure 7:
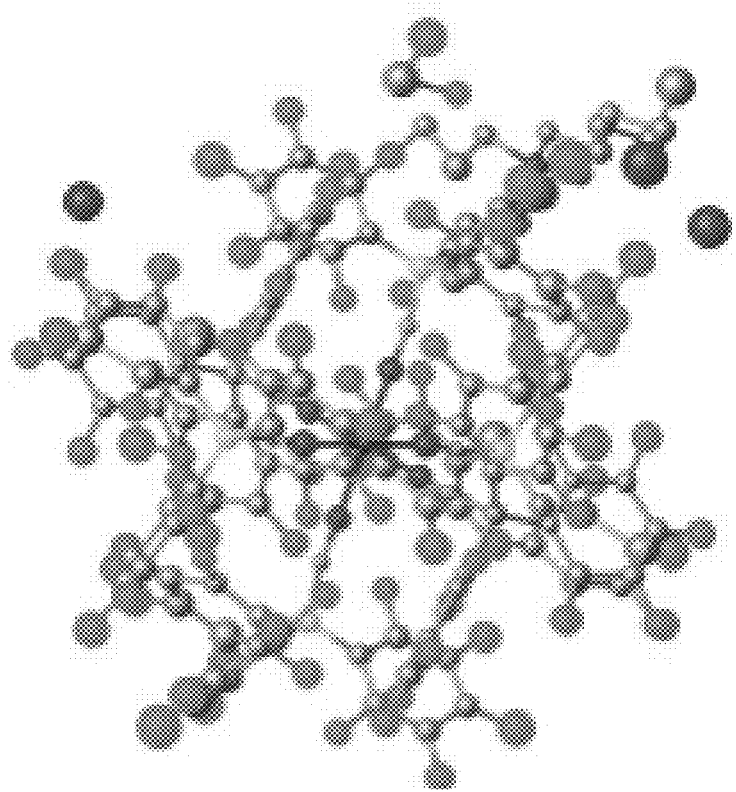
FIG. 7. Molecular structure of $(TBA)_3Mn(CN-B(C_6F_5)_3)_6$, where $[Mn(CN-B(C_6F_5)_3)_6]^{3-}$ is an exemplary metal-coordination complex of the present invention.

We successfully synthesize tetrabutylammonium hexacyano-manganate ((TBA)$_3$Mn(CN)$_6$) as a powder and tetraethylammonium hexacyanomanganate ((TEA)$_3$Mn(CN)$_6$) as crystals via metathesis of K$_3$Mn(CN)$_6$ with TBACl and TEACl. Triphenylborane (BPh$_3$) and pentafluorophenyl borane ((C$_6$F$_5$)$_3$B) secondary ligands are added separately to each complex, resulting in four different complexes in solution. The two (TBA)$_3$Mn(CN)$_6$ solutions are dissolved in DCM and (TEA)$_3$Mn(CN)$_6$ in MeCN. In all four test solutions, precipitates are observed ranging from orange-red to green-blue. We are able to grow crystals of (TBA)$_3$Mn(CN—B(C$_6$F$_5$)$_3$)$_6$ and obtain an unrefined crystal structure of the coordination complex (FIG. 7).

EPR spectroscopy was conducted to determine the oxidation state of the fully coordinated (TBA)$_3$Mn(CN—B(C$_6$F$_5$)$_3$)$_6$. The results reveal that the oxidation state of the manganese in the metal complex is Mn(II), not Mn(III) as previously thought. The zero-field splitting observed in parallel mode indicates that the nuclear spin is 5/2 and the g-value is 2; the forbidden transitions observed in parallel mode indicate that the oxidation state is entirely Mn(II). This is in line with the voltammetry and confirms that the full coordination of borane secondary ligands is able to stabilize the reduced state of the hexacyanomanganate complex. The fourth cation is variable or undetermined so for the remainder of this example, we use (TBA)$_3$XMn(CN—B(C$_6$F$_5$)$_3$)$_6$ to denote this complex.

Figure 9B:
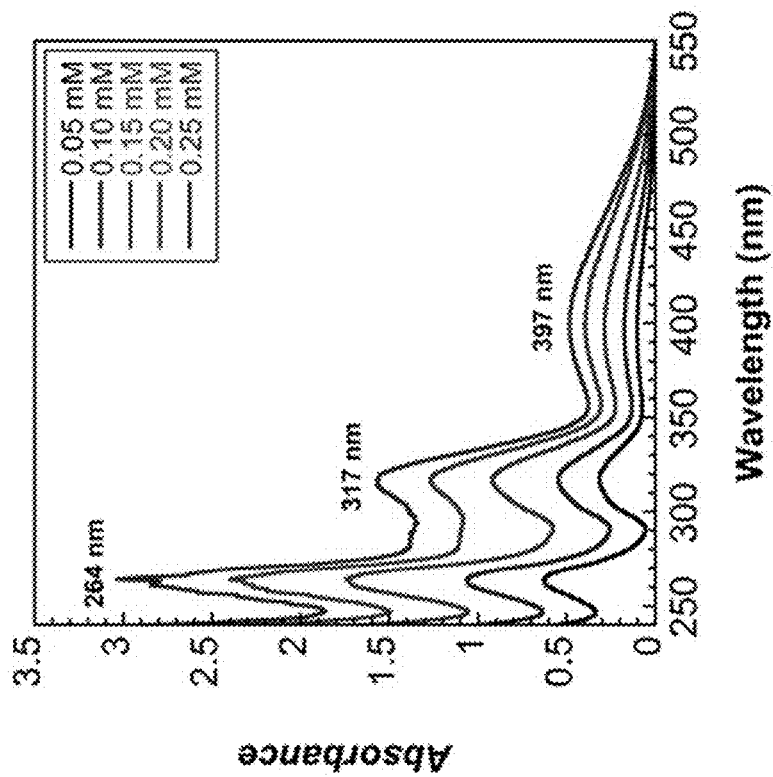
FIGS. 9A-9B. Absorption spectra of $(TBA)_3XMn(CN—B(C_6F_5)_3)_6$ in DCM (FIG. 9A) and linear fits of the absorption data of FIG. 9A (FIG. 9B).
Figure 9A:
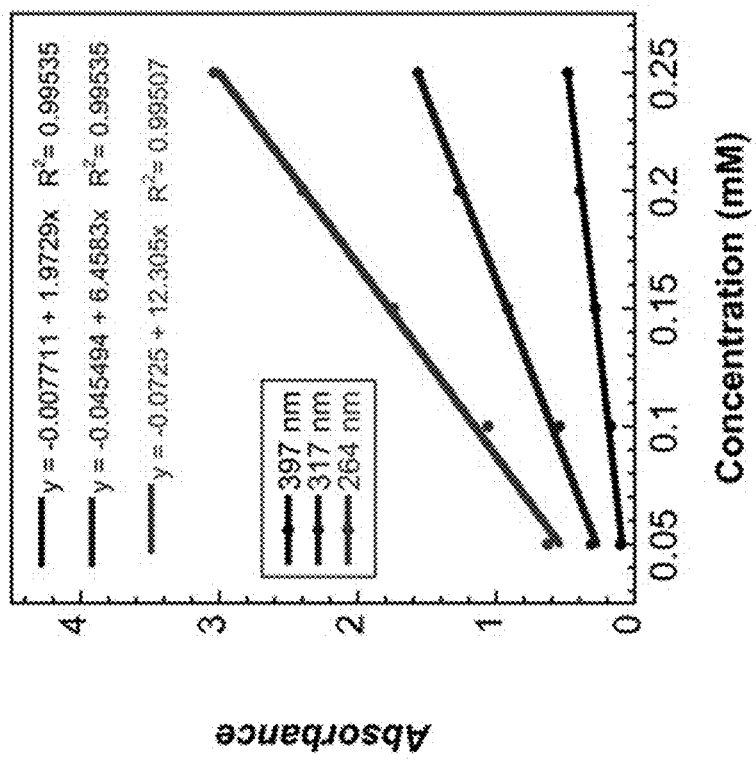
Figure 10A:
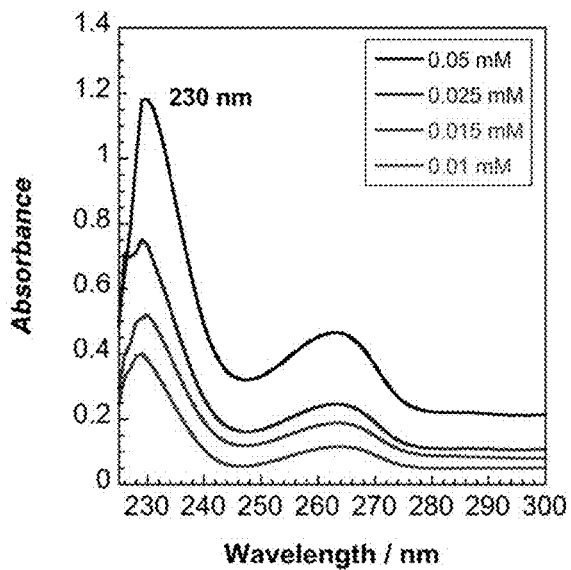
FIG. 10A. UV-Vis spectra of $(TBA)_3XMn(CN—B(C_6F_5))_6$ in DCM.
Figure 10B:
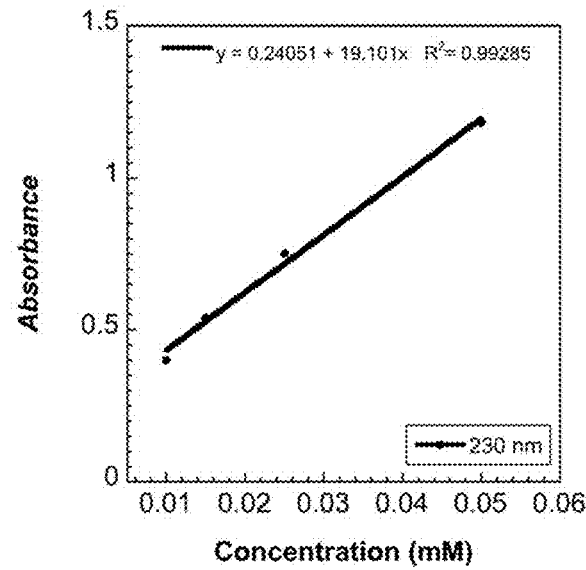
FIG. 10B. linear fit of concentration and absorbance for the 230 nm band.
Figure 10C:
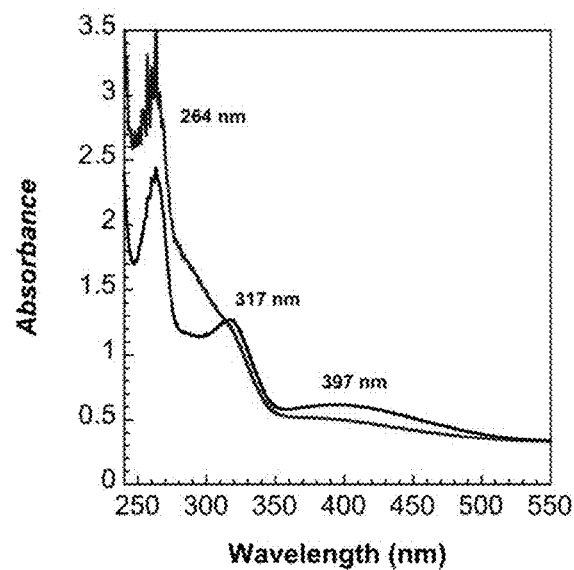
FIG. 10C. absorption spectra for the reduction of the $(C_6F_5)_3B$ coordinated complex from Mn(II), blue, to Mn(I), black.
Figure 10D:
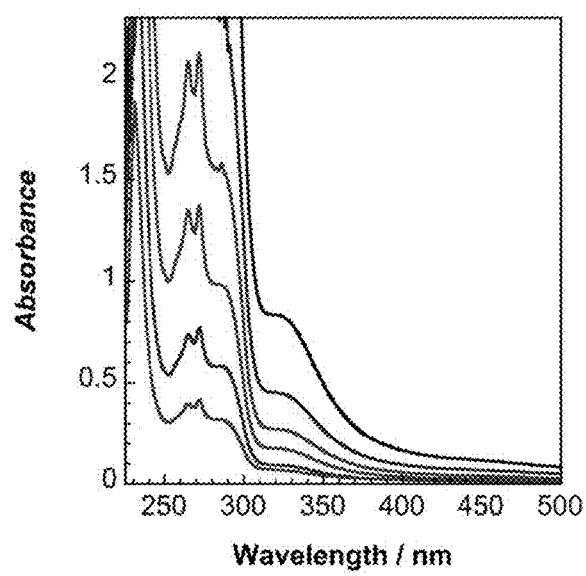
FIG. 10D. UV-Vis spectra for the $(TBA)_3Mn(CN—BPh_3)_6$ complex.

Absorption spectra for the (TBA)$_3$XMn(CN—B(C$_6$F$_5$)$_3$)$_6$ complex are observed in DCM (FIGS. 9A and 9B) and compared with the spectra of bare hexacyanomanganate. We found that the spectra of our complex is blue shifted with respect to that of the bare hexacyanomanganate due to the addition of the borane adduct. The 264 nm (37,900 cm$^{-1}$) band corresponds with the 37,100 cm$^{-1}$ band of the hexacyanomanganate, and the two overlapping bands at 303 nm and 317 nm (33,000 cm$^{-1}$ and 31,550 cm$^{-1}$ resp.) agree with the overlapping transitions at 31000 cm$^{-1}$ [8-10].

We measure the UV-Vis spectra of the 230 nm band (FIGS. 10A-10D) of the (TBA)$_3$XMn(CN—B(C$_6$F$_5$)$_3$)$_6$ complex, whose signal was previously saturated. The linear relationship between absorbance and concentration as described by Beer's Law gives us an extinction coefficient of 19,101 cm$^{-1}$M$^{-1}$. Spectroelectrochemistry allows us to measure the absorption spectra for the reduction of the complex. We observe a bleach of the 367 nm band and an alteration of the 317 nm band.

We synthesize (TBA)$_3$Mn(CN—BPh$_3$)$_6$ as we did with (C$_6$F$_5$)$_3$B. The complex is isolated as a pale tan solid that is brown-orange when dissolved in DCM. We measure the UV-Vis spectra for this complex which suggest that the oxidation state is Mn(III) due to the absence of the 400 nm intensity-stealing d-d transition band. The product may be pure or not pure and may be (TBA)$_3$Mn(CN—BPh$_3$)$_6$.

Figure 11:
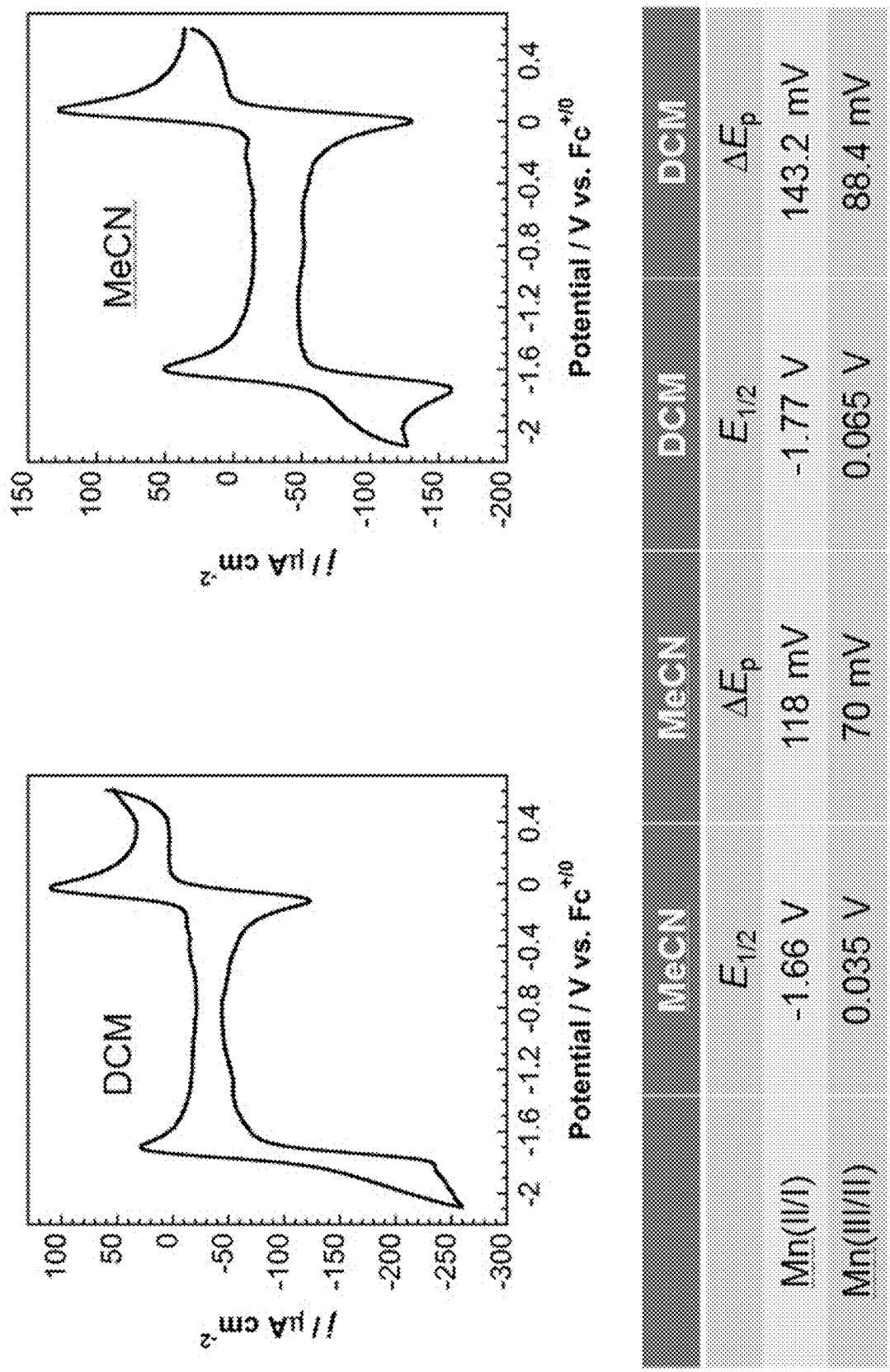
FIG. 11. Cyclic voltammograms for $(TBA)_3Mn(CN—B(C_6F_5))_6$ in MeCN (top left panel) and DCM (top right panel). A table (bottom panel) summarizes the cyclic voltammetry data corresponding to the top left and top right panels.

Voltammetry is performed for (TBA)$_3$XMn(CN—B(C$_6$F$_5$)$_3$)$_6$ in MeCN and DCM (FIG. 11). The voltammetry suggests that the materials involved were pure. In both solvents, the voltammogram displayed reversible Mn(III/II) redox couples that were shifted approximately 2.2 V from bare hexacyanomanganate. Only two waves are observed because the Mn(IV/III) couple is beyond the voltage range of the solvents.

Voltammetry is performed for both (TBA)$_3$Mn(CN—BPh$_3$)$_6$ and (TBA)$_3$XMn(CN—B(C$_6$F$_5$)$_3$)$_6$ with equivalents of borane adducts added incrementally to the base complex in acetonitrile (e.g., FIG. 12). The voltammograms for the first few equivalents confirm that the redox potential is shifted anodically by ~400 mV per B(C$_6$F$_5$)$_3$ and ~270 mV per BPh$_3$ added. The wave observed is likely the Mn(IV/III) couple that is shifted out of range when fully coordinated.

We tested the scan rate dependence of the anodic Mn(II/III) wave and cathodic Mn(I/II) wave of (TBA)$_3$XMn(CN—B(C$_6$F$_5$)$_3$)$_6$ with three cycles per scan rate (FIGS. 13A-13D). The observed peaks are clean and reversible for the anodic wave in MeCN. The cathodic wave in DCM is also reversible, but the peaks are separated due to the high resistance of the solution. The resistivity of the solution impedes charge transfer at the electrode interface.

In order to obtain more resolved crystal structures, we synthesized our complexes with PPN as the counter ion in place of TBA following the same synthesis method. Test reactions for the coordination of boranes are carried out in DCM, and we observe that (PPN)$_3$Mn(CN—BPh$_3$)$_6$ is a dark purple solution and (PPN)$_3$XMn(CN—B(C$_6$F$_5$)$_3$)$_6$ is a bright red-orange solution. The BPh$_3$ complex continues to be difficult to crystallize, but the B(C$_6$F$_5$)$_3$ complex readily crystallized as red-orange crystals. The crystal structure is nearly identical to the TBA analog.

We also began investigating the behavior and properties of hexacyanocobaltate. Synthesis of borane coordinated complexes were carried out using the the same methods as the synthesis of hexacyanomanganate complexes. We are able to successfully crystallize (TBA)$_3$Co(CN—B(C$_6$F$_5$)$_3$)$_6$ which is colorless. X-ray crystallography reveals the same crystal structure as the manganate complex.

From the EPR spectra and the observed bleach of the 367 nm band and an alteration of the 317 nm band during spectroelectrochemistry of (TBA)$_3$XMn(CN—B(C$_6$F$_5$)$_3$)$_6$, it appears that the oxidation state of manganese in the complex is Mn(II). Due to the disordered nature of the complex, it may be difficult to determine with certainty the structure of the complex through X-ray crystallography.

The 2.2V shift in the (TBA)$_3$XMn(CN—B(C$_6$F$_5$)$_3$)$_6$ redox couples with respect to bare hexacyanomanganate (FIG. 9 and Table 3) is the same shift observed in ferrocyanide with pentafluorophenyl borane, which indicates that the shift is entirely due to outer-sphere adduct interactions and the Lewis acidity of the borane. Although the current ratio for the Mn(II/I) couple in MeCN is approximately 1, the ΔEp suggests that the couple is quasireversible. Furthermore, the E$_{1/2}$ of the Mn(III/II) couple is nearly 0 V versus the Fc$^{+/0}$ reference, which suggests the presence of multiple oxidation states of Mn during voltammetry.

TABLE 3

Cyclic Voltammetry Results

| Solvent: | MeCN E$_{1/2}$ | MeCN ΔEp | DCM E$_{1/2}$ | DCM ΔEp |
|---|---|---|---|---|
| Mn (II/I) | −1.66 V | 118 mV | −1.77 V | 143.2 mV |
| Mn (III/II) | 35 mV | 70 mV | 65 mV | 88.4 mV |

Half-wave and peak potentials of the Mn(II/I) and Mn(III/II) redox couples in acetonitrile and DCM.

By performing cyclic voltammetry for each added equivalent of borane to (TBA)$_3$XMn(CN—B(C$_6$F$_5$)$_3$)$_6$ and (TBA)$_3$XMn(CN—BPh$_3$)$_6$ we can observe more clearly the relationship between the voltage shifts and the addition of borane. The voltage shifted 390 mV per B(C$_6$F$_5$)$_3$ and 270 mV per BPh$_3$ anodically, and these intervals almost exactly match the shifts in potential seen in hexacyanoferrate with coordination of the same boranes. The linear relationship further indicates that the shift is a direct result of outer-sphere adduct interactions and the Lewis acidity of a given borane.

The scan rate dependence of the anodic wave of (TBA)$_3$XMn(CN—B(C$_6$F$_5$)$_3$)$_6$ reveals a linear relationship between the peak current and the square root of the scan rate. We can apply the Randles-Sevcik Equation:

$$i_p = 0.4463\left(\frac{F^3}{RT}\right)^{1/2} n^{3/2} A D_o^{1/2} C_o^* v^{1/2} \qquad \text{(Equation 1)}$$

which describes reversible, diffusion-controlled electron transfers. A linear relationship between the peak current and the square root of the scan rate indicates a diffusion-controlled, reversible reaction, so we used this equation to calculate the diffusion coefficient of the complex, which was determined to be 7.93×10$^{-7}$ cm$^2$ s$^{-1}$. In comparison, the diffusion coefficient of ferrocene was calculated to be 2.3×10$^{-5}$ cm$^2$ s$^{-1}$, suggesting that the six-coordinate hexacyanomanganate molecule is bulkier and moves more sluggishly to the double layer of the working electrode. From this data, we can conclude that the voltammetry of (TBA)$_3$XMn(CN—B(C$_6$F$_5$)$_3$)$_6$ is diffusion controlled and implies electrochemical reversibility and cyclic stability.

Overall, we find the hexacyanomanganate complex to be a candidate for non-aqueous flow batteries. We also propose the hexacyanocobaltate complex.

Analytical Methods

UV-Vis spectra are recorded in DCM at room temperature on an Agilent 8453 spectrophotometer. Dilute solutions are prepared in a glovebox at various concentrations and placed in airtight standard 1 cm$^2$ quartz cuvettes.

EPR Spectroscopy is performed at the EPR lab at Caltech.

X-ray Crystallography is taken at the X-Ray Crystallography Facility at Caltech.

Cyclic voltammetry experiments are performed inside a glovebox with a cell composed of a carbon working electrode, a platinum counter electrode, and a reference electrode. Ferrocene (Fc$^+$) is added after each experiment for a more accurate reference.

Spectroelectrochemistry data is measured and recorded with the same equipment as above. Dilute solution is prepared inside the glovebox. The solution is removed from the glovebox and placed in an open spectroelectrochemical cell.

Hexacyanomanganate Coordination Complexes

The (TBA)$_3$X [Mn(CN—B(C$_6$F$_5$)$_3$)$_6$] complex is prepared by first performing a salt metathesis with 1 g of K$_3$Mn(CN)$_6$ and 2.54 g TBACl in acetonitrile in a glove box (air-free and moisture-free environment). The mixture is stirred overnight and the undissolved K$_3$Mn(CN)$_6$ is filtered out to obtain a clear yellow solution of (TBA)$_3$Mn(CN)$_6$. (TBA)$_3$Mn(CN)$_6$ is precipitated out by adding diethyl ether (Et$_2$O). The precipitate is further washed with ether, then dried. 50 mg of (TBA)$_3$Mn(CN)$_6$ and 164 mg B(C$_6$F$_5$)$_3$ (six molar equivalents) are separately dissolved in a minimum of DCM. Immediate color change upon combining the borane adduct with the manganate complex to form a red-orange solution that readily formed orange crystals of (TBA)$_3$Mn (CN—B(C$_6$F$_5$)$_3$)$_6$. The crystals are washed with ether and dried. Complexes with BPh$_3$ are prepared with 77.5 mg of BPh$_3$ instead of B(C$_6$F$_5$)$_3$, and a powder is obtained instead of crystals.

Hexacyanocobaltate Coordination Complexes (TBA)$_3$Co(CN)$_6$ is prepared according to the literature[11]. 100 mg of K$_3$Co(CN)$_6$ is dissolved in a minimum of water, and 281 mg of TBACLO$_4$ is dissolved in a minimum of ethanol. The two saturated solutions are combined and the KCl precipitate is filtered out. The remaining solution of (TBA)$_3$Co(CN)$_6$ is dried under vacuum. The product is redissolved in methanol and the residual KCl removed. The purified product is dried again under vacuum.

Borane secondary ligands are added in DCM with similar procedure as for hexacyanomanganate.

REFERENCES CORRESPONDING TO EXAMPLE 3

1. G. I. Soloveichik, *Chem Rev.*, 2015, 115, 11533-11558.
2. A. Z. Weber, M. M. Mench, J. P. Meyers, P. N. Ross, J. T. Gostick, Q. Liu, *J. Appl. Electrochem.*, 2011, 41, 1137-1164.
3. R. Dmello, J. D. Milshtein, F. R. Brushett, K. C. Smith, *J. Power Sources*, 2016, 330, 261-272
4. J. Winsberg, T. Hagemann, T. Janoschka, M. D. Hager, U. S. Schubert, *Angew. Chem. Int. Ed.*, 2017, 56, 686-711
5. R. Marco, *Technical University of Lisbon.*, 2013, 1-14.
6. J. S. Kristoff, D. F. Shriver, *Inorg. Chem.*, 1973, 12, 1788-1793
7. D. F. Shriver, J. Posner, *J. Am. Chem. Soc.*, 1966, 88, 1672-1677
8. J. J. Alexander, H. B. Gray, *J. Am. Chem. Soc.*, 1968, 90, 4260-4271
9. W. E. Buschmann, L. Liable-Sands, A. L. Rheingold, J. S. Miller, *Inorganica Chimica Acta.*, 1999, 284, 175-179
10. H. B. Gray, N. A. Beach, *J. Am. Chem. Soc.*, 1963, 85 (19), 2922-2927
11. S. J. Milder, H. B. Gray, V. M. Miskowski, *J. Am. Chem. Soc.*, 1984, 106(13), 3764-3767

Example 4: Octacyanomolybdate- and Tetracyanoferrate-Borane Adducts for Next-Generation Redox Flow Batteries In order to access higher potential reversible redox couples as redox flow battery electrolytes, octacyanomolybdate- and tetracyanoferrate-borane adducts are synthesized. The borane employed in coordination displayed a direct relation between its Lewis acidity and the redox potential shift per borane. In some cases, borane coordination eliminated electrochemical reversibility from the parent redox couple of the cyanometallate. In others, wildly different electrochemical behavior is observed due to the formation of a rare borane-linked cyanomolybdate(IV) dimer. However, redox potential control is established for the monomeric cyanometallates, revealing a promising platform for further investigation of cyanometallate-borane adducts.

Cyanometallates possess cyanide ligands bound to a metal center with nitrogen atoms with sufficient electron density and in the correct orientation to act as Lewis bases. Modulation of the electronic structure of these cyanometallates can be achieved by formation of Lewis acid-Lewis base complexes, withdrawing electron density from the metal center through inductive effects and perturbation the σ- and π-bonding frameworks.[1] Boranes offer a wide range of Lewis basicity with tris(pentafluorophenyl)borane being more Lewis basic than triphenylborane due to the greater electron-withdrawing capabilities of the fluorinated phenyl rings. Amongst boron trihalides, the Lewis basicity trend is BBr$_3$>BCl$_3$>BF$_3$ due to the differences in rehybridization energies.[2] Tris(pentafluorophenyl)borane and BF$_3$ are similar in Lewis basicity. With these tools for altering electronic structure to varying degrees coupled with an assortment of cyanometallates, a library of cyanometallate-borane adducts with unique electronic properties could be established.

Interesting electronic properties can equate to desirable electrochemical properties such as electrochemical reversible high-potential redox events. This trait is desirable in non-aqueous redox flow batteries (RFBs), where an anolyte and a catholyte charge and recharge for long periods of time by reversibly removing and replacing electrons on these systems. High-potential redox events are desirable since their can hugely expand the voltage of a redox flow battery. Furthermore, cyanometallate-borane adducts are highly charged, lending to greater solubility and thus greater current. Adducts of hexacyanoferrate(II) with triphenylborane and tris(pentafluorophenyl)borane are also contemplated. The homoleptic six-coordinate hexacyanoferrate(II)-tris (pentafluorophenyl)borane adduct exhibits a reversible redox event at 0.8 V vs Fc/Fc$^+$. Tris(pentafluorophenylborane)borane and triphenylborane effect a +380 mV and +250 mV redox potential shift per borane coordinated, respectively.[3] The homoleptic hexacyanoferrate(II)-tris(pentafluorophenyl)borane adduct is tested as a redox flow battery electrolyte, but initial tests led to depletion of current within 9 hours.

In order to access higher voltage redox couples (for non-aqueous RFBs) and/or bipolar redox materials with a large potential gap between two reversible redox events (for non-aqueous symmetric RFBs), cyanometallate-borane adducts are extended to include octacyanomolybdate(V), octacyanomolybdate(IV), tetracyanoferrate(II), and boron trihalides.

Synthesis.

Tetrabutylammonium (TBA) and bis(triphenylphosphine) iminium (PPN) salts of the octacyanomolybdate(V) anion are synthesized by oxidizing K$_4$Mo$^{IV}$(CN)$_8$ to Mo$^V$ via nitric acid followed by addition of three equivalents of TBACl or PPNCl.[4] (TBA)$_4$[Mo(CN)$_8$] is formed by mixing concentrated aqueous solutions of K$_4$Mo(CN)$_8$ and four equivalents of AgNO$_3$ to form Ag$_4$Mo(CN)$_8$, which is further reacted with TBACl.[5] (TEA)$_4$[Fe(CN)$_6$] is available from previous experiments.

Reaction of FeCl$_2$, four equivalents of TBACN, and one equivalent of L=2,2'-bipyridine (bpy) or 1,10-phenanthroline (phen) under N$_2$ atmosphere yield (TBA)$_4$[Fe(CN)$_4$L]. Addition of aqueous PPNCl precipitates (PPN)$_4$[Fe(CN)$_4$L].[6]

Figure 15:
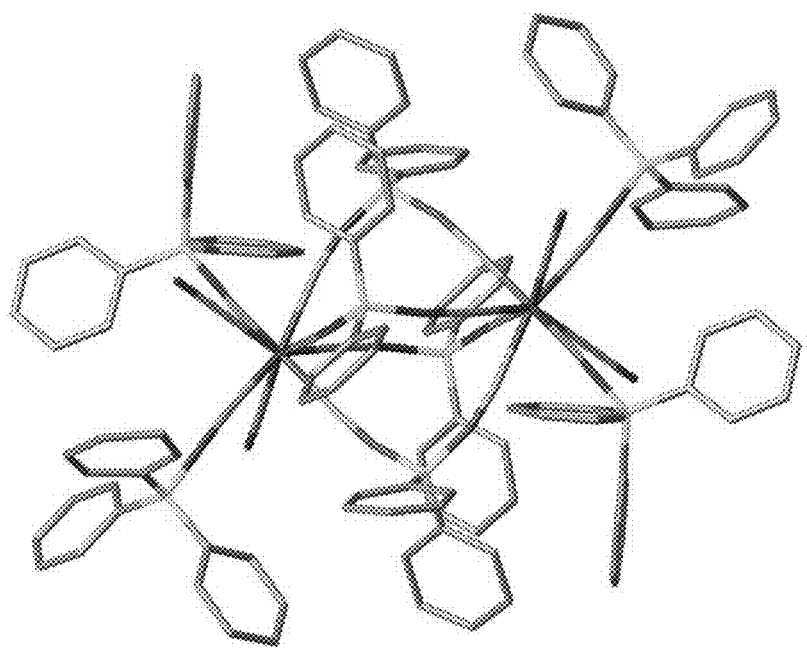
FIG. 15. Structural model of the Mo(IV)-Mo(IV) dimer metal-coordination complex, where the metal-coordination complex includes two metals each having ligands associated therewith. Crystals suitable for XRD obtained by slow diffusion of $Et_2O$ into DCM solution of the complex. Hydrogen atoms and four TBA atoms omitted for clarity.

Preparation of the cyanomolybdate- and cyanoferrate-borane adducts is achieved by mixing concentrated dichloromethane (DCM) or acetonitrile (MeCN) solutions of the cyanometallate and borane under N$_2$ atmosphere. XRD of Mo(CN)$_8^{3-}$ and Mo(CN)$_8^{4-}$ yield a unique Mo(IV)-Mo(IV) dimer (CMD) linked by a cyanide-boron-cyanide bridge when the cyanometallate is reacted with eight equivalents of triphenylborane (see FIG. 15). Reaction of eight equivalents of tris(pentafluorophenyl)borane provides the Mo(CNB (C$_6$F$_5$)$_3$)$_6$(CN)$_2$ as the major component as determined by preliminary XRD. Octacyanomolybdate- and hexacyanoferrate-trihaloborane adducts yield a mixture of products, evidenced by multiple peaks in $^{11}$B NMR.

Mass Spectrometry.

The identity of all cyanometallate complexes is confirmed by mass spectrometry (MS), revealing an m/z, of the complex missing one cation in the case of Mo(V) and Fe(II). The MS of the Mo(IV) analogues possessed an m/z of the complex missing two cations plus a $Na^+$ ion. MS of the boronated (~4 eq.) Mo(IV) contained a peak for the complex with loss of two cations.

Electrochemistry.

Figure 16:
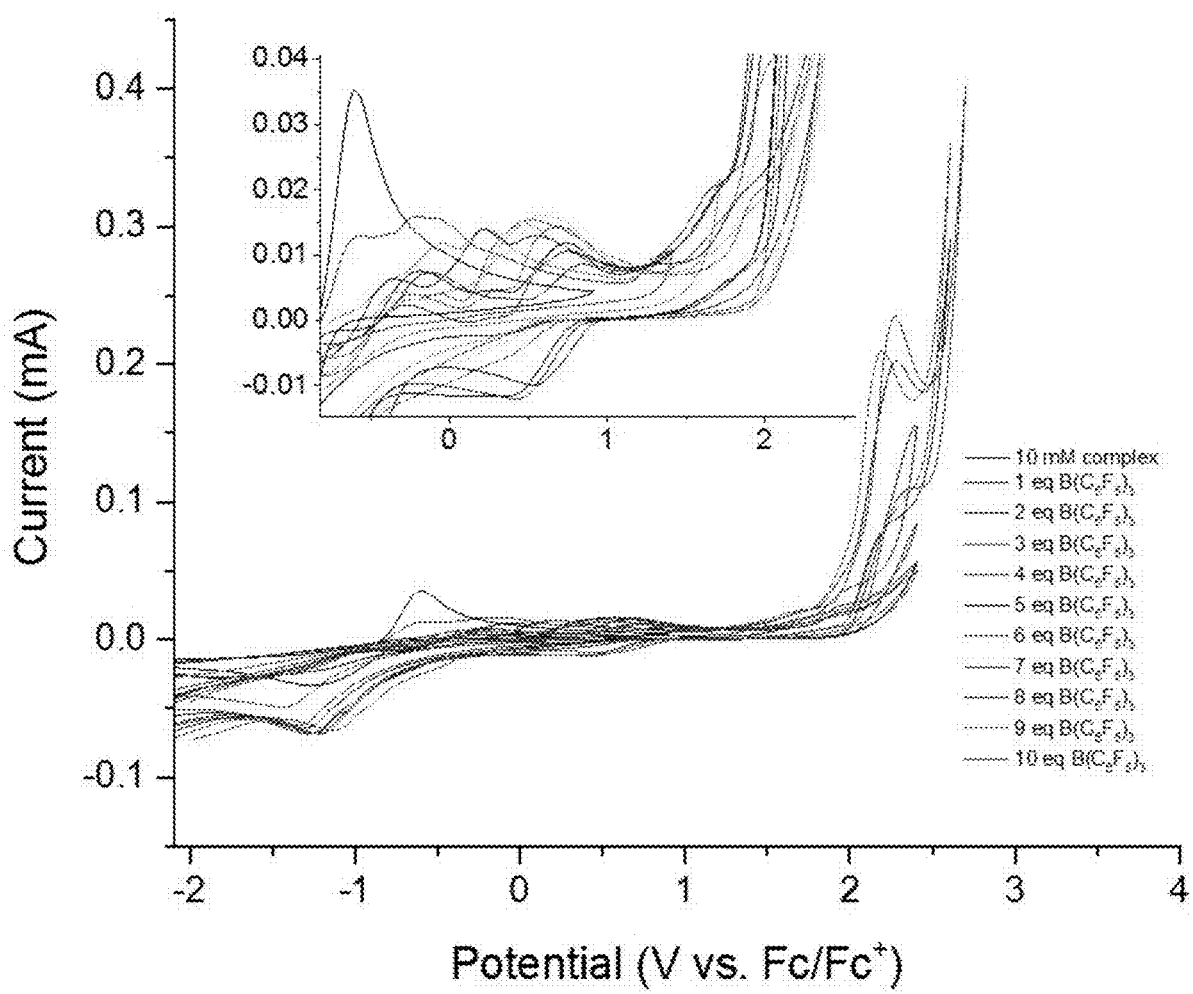
FIG. 16. Representative cyclic voltammogram of equivalents of $B(C_6F_5)_3$ added to $Mo(CN)_8^{3-}$. The appearance of a higher-current peak suggests decomposition at higher potentials. Many variables obscure any expected high-potential redox events of the cyanomolybdate-tris(pentafluorophenylborane) analogues.

Sequential addition of equivalents to base cyanometallates show growth of peaks corresponding to intermediately cyanometallate-borane adducts (see FIG. 16).

Sequential growth of peaks at regular intervals is also observed with addition of borane to other base cyanometallates, with the results summarized in Table 4.

TABLE 4

Cyanometallate-borane combinations and redox behavior.

| Cyanometallate | Borane | Initial $E_{1/2}$ (V vs Fc) | Redox Potential Shift per Borane (mV) | Borane Acceptor Number |
|---|---|---|---|---|
| $Mo(CN)_8$ | $BPh_3$ | −0.65 | 250 | 60 |
| | $B(C_6F_5)_3$ | −0.65 | 380 | 80 |
| | $BF_3$ | −0.65 | 400 | 82 |
| $Fe(CN)_6$ | $BF_3$ | −1.25 | 400 | 82 |
| | $BCl_3$ | −1.25 | 550 | 100 |
| | $BBr_3$ | −1.25 | 630 | 110 |

Cyclic voltammograms at 100 mV/s are obtained in an $N_2$ glove box in MeCN with 100 mM $TBAPF_6$ supporting electrolyte, using a glassy carbon working electrode, platinum wire counter electrode, and Ag/AgCl reference electrode.

Synthesis.

Coordination of boranes to octacyanomolybdate(V) leads to an autoreduction of the metal center to Mo(IV) both in the case of triphenylborane and tris(pentafluorophenyl)borane. Tris(pentafluorophenyl)borane coordinated six times to octacyanomolybdate(V), perhaps due to the depletion of Lewis-basic character. The same can be said for triphenylborane, yet an odd dimer formation is also observed. This could be a compromise for the steric hindrance of triphenylborane. Harsh conditions are required to form the CMD since, although there are four boranes per Mo(IV) center, reaction of cyanomolybdate(IV) with four equivalents of triphenylborane yields the product with four coordinated boranes as suggested by MS. A large excess of triphenylborane is required.

The synthesis of the trihaloborane adducts of octacyanomolybdate and hexacyanoferrate may be possible. However, due to a change in polarity, the mono- or bis-adduct (as indicated by the shift in the redox potential observed with cyclic voltammetry) of hexacyanoferrate(II) may crash out of DCM. Shriver et. al reported boranes' larger affinity for complexation to metal cyanides than organic nitriles, allowing reactions in MeCN.[7] Still, however, the $BBr_3$ adducts precipitate from the reaction mixture. The high polarity of the boron trihalides, especially when complexed to the cyanometallates, renders their non-gaseous syntheses improbable due to solvent incompatibilities. In addition, the great Lewis acidity of these boranes limits complexation to the cyanometallate due to the cyanometallate's insufficient Lewis basicity. Furthermore, the boron trihalides once complexed are prone to solventolysis or other unfavorable reactions due to the weakness and reactivity of the $sp^3$ B—X bond, where X is a halogen. For the cyanomolybdate systems, fully saturated trihaloborane coordination may yield redox events outside the potential window of MeCN, anyways.

In the synthesis of the tetracyanoferrate(II)-borane adducts color changes are observed, suggesting a redshift of the MLCT band coinciding with a lower LUMO level that is reflected in higher oxidation potentials.

In general, Lewis acid-base coordination affects the electronics of the cyanometallate metal center greatly, as reflected in the redox potential shift and the autoreduction during synthesis. Greater redox potentials indicate a larger energy needed for electrochemical oxidation and lower energy needed for electrochemical reduction. The energy level of the metal center decreases with increasing borane coordination due to inductive electron density withdrawal from the metal center. Greater lewis acidity (reflected in the acceptor number) leads to a larger redox potential shift per borane due to greater overlap with the lone pair on the cyanide nitrogen, more effectively decreasing electron density from the cyanide and thus the metal.

Boranes have been confirmed to be a powerful, consistent, and predictable tool in tuning electrochemical properties and electronic structure in a variety of cyanometallates. The one unpredictable trait of the altered electrochemistry is the electrochemical reversibility of the fully boronated complexes. Base complexes are be selected such that the arithmetic suggests potential for a 3 V RFB. So far, high solubility has been achieved. The present systems are compatible with a redox-active ligand that will allow access of high voltage bipolar redox couples.

REFERENCES CORRESPONDING TO EXAMPLE 4

1. Shriver D F, Posner J. Bridge Addition Compounds. III. The Influence of Boron-Containing Lewis Acids on Electronic Spectra, Vibrational Spectra, and Oxidation Potentials of Some Iron-Cynanide Complexes. Journal of the American Chemical Society 1966; 88(8):1672-1677.
2. Sivaev I B, Bregadze V I. Lewis acidity of boron compounds. Coordination Chemistry Reviews 2014; 270-271:75-88.
3. McNicholas B J. Cyanoferrate-Borane Adducts: Modulation of Electrochemical Properties. 2017.
4. Rowe G T, Rybak-Akimova E V, Caradonna J P. Unraveling the reactive species of a functional non-heme iron monooxygenase model using stopped-flow UV-vis spectroscopy. Inorg Chem 2007; 46(25):10594-606.
5. Francesco Ferranti A I. Conducatance of Aqueous Solutions of Cobalticyanides, Ferrocyanides, and Molybdocyanides of Potassium and of Tetraalkylammonium Ions. Journal of Solution Chemistry 1973; 3(8):619-627.
6. Contakes S M, Hsu S C N, Rauchfuss T B, Wilson S R. Preparative and Structural Studies on the Carbonyl Cyanides of Iron, Manganese, and Ruthenium: Fundamentals Relevant to the Hydrogenases. Inorganic Chemistry 2002; 41(6): 1670-1678.
7. Shriver D F. Bridge Adducts-the Interaction of BF3 with Transition Metal Cyanide Complexes. Journal of the American Chemical Society 1962; 84(23):4610-4611.

Example 5: Design of Experimental Flow Battery System for Testing of Ferro/Ferricyanide-Based Complexes Redox flow batteries are contemplated as a system to store electricity generated from solar energy during the day and dissipate it at night. Electrochemically active complexes that undergo highly reversible redox reactions are investigated for use in these batteries. In this example, the species $[Fe(CN)_6]^{3-/4-}$, $[Fe(CN-BPh_3)_6]^{3-/4-}$, and $[Fe(CN-B(C_6F_5)_3)_6]^{3-/4-}$ are characterized through UV-Vis spectroscopy and basic electrochemical testing. A flow battery created from these compounds is contemplated to produce a voltage of ≥3 V, higher than most commercial systems currently in use. Two systems are designed to test the practicality of using these compounds in flow batteries. The first is a fuel cell modified to have flow cell functionality. The second system is an H-cell with two active compartments separated by a membrane. An exemplary modified fuel cell results in high crossover of active species across the membrane, making it a poor system for flow cell testing. With modification of commercially available Nafion membranes, the H-cell is optimized for flow cell testing, thereby providing for improved redox flow batteries.

Within recent years, concerns have grown regarding the state of the environment. One of the key planetary boundaries that has been studied is climate change, which is often quantified by atmospheric $CO_2$ concentration [1]. Atmospheric carbon concentration is now within the "zone of uncertainty," meaning that emission levels are high enough that earth's ability to support human life could be at risk. A large source of carbon emissions is energy consumption based on burning fossil fuels [2]. Consequently, there has been a shift towards cleaner, renewable energy sources, such as wind and solar. Wind and solar installed capacity has been growing 25-50% per year worldwide since 2010, although again the associated energy storage component typically represents <5% of the total generating capacity from these sources [3]. Two major factors prevent more widespread adoption of energy storage as part of the renewable energy infrastructure: i) cost in $/kWh for suitable energy storage technologies and ii) available footprint for installation (which can be challenging for smaller sites with geographical idiosyncrasies, as is often the case with renewable sources).

One prospective solution for renewable energy storage is the incorporation of next-generation redox flow batteries. Redox flow batteries are gaining interest as an energy storage technology, in particular, to complement the intermittent power generation cycles characteristic of renewable energy sources such as wind and solar [4], [5]. Redox flow batteries typically convert energy through reversible redox processes occurring between electroactive materials in a solution or slurry (the anolyte and the catholyte). In a redox flow battery, these electroactive materials are stored in separate chambers until use, then are pumped through an area where electrochemical reaction can occur during operation (converting chemical energy to electrical energy upon discharge), and pumped then into storage tanks where they may be re-charged mechanically, chemically or electrochemically for further use when convenient (see FIG. 17). During charge or discharge operation, anolyte and catholyte active materials each pass along an inert electrode/current collector (typically, a high surface area, porous carbonaceous electrode) through which electrons are collected or delivered. These electrolyte materials are separated by an ionically-conducting membrane, similar to a conventional battery; however, there is no transfer of active material from solution to the electrode surface, nor (in the ideal case) does any transport of anolyte or catholyte material occur through the separator membrane (supporting electrolyte ions moving to balance charges as required). Redox flow batteries have certain advantages over conventional batteries (in particular, Li-ion type), as the electrochemical reactions are often highly reversible (occurring between solution-phase species and an inert electrode, with no exchange of material) and these systems offer a very long useful cycle life, often up to 10 years or more. Such redox reactions are typically fast and do not vary with state-of-charge (as the electrode does not change during the process), so redox flow batteries are able to support a high power density (charge/discharge rate) if desired. Most usefully, redox flow batteries can be configured independently for power (stack design, pump size) and energy (storage tank capacity) to meet a specific requirement. However, the practical energy density of redox flow batteries is typically low, limiting contemporary application to the stationary energy storage arena for installations where sufficient space is available (i.e., large power plant operation facilities). If the energy density of flow batteries could be increased without sacrificing their other attractive aspects at a suitable cost, their adoption would become much more widespread and help to support the development of a strong renewable energy infrastructure and smart grid deployment.

The purpose of this example is to establish a new materials set for high energy redox flow batteries through the development of low-cost metal-organic complexes with highly-tunable solubility and electrode potentials to achieve reversible operation at ≥3 V. Such redox flow battery technology for stationary applications may have energy densities >150 Wh/L, with very attractive cost structure around $150-250/kWh [6].

New materials are identified herein. Synthesis procedures for some complexes have been determined. An inorganic iron complex has been chosen as the electroactive material for this example. In this example, three compounds are synthesized and are characterized:

$[Fe(CN)_6]^{4-}$—Standard redox potential of −1.35 V vs Ferrocene (Fc)

$[Fe(CN-BPh_3)_6]^{4-}$—each $BPh_3$ (secondary ligand) equivalent shifts redox potential by 251 mV (potential=0.181 V vs Fc)

$[Fe(CN-B(C_6F_5)_3)_6]^{4-}$—each $C_6F_5$ (secondary ligand) equivalent shifts redox potential by 370 mV (potential=0.87 V vs Fc)

Either tetrabutylammonium (TBA+) or tetraethylammonium (TEA+) can serve as the counter cation (i.e., counter ion) for each of the complexes, leading to a total of 6 potential electrolytes for this example. All the anions are based on ferrocyanide—the variation comes from the borane compounds that are coordinated to the cyanide ligands in the outer sphere of the complex. These borane adducts significantly influence the operating potential of the electrolyte, enough so that one of the borane adduct complexes can function as the catholyte while $[Fe(CN)_6]^{4-}$ is used as the anolyte.

Before the full flow battery is assembled, each of the compounds is characterized and tested individually. The main quality being selected for in these materials is reversibility. The compound should cycle through charge and discharge cycles consistently to be viable for use in solar energy storage, as it would be reused every 24 hours. The compounds are characterized before and after electrochemical testing to determine whether they remain intact or decompose into other materials over several charge-discharge cycles.

Figure 18:
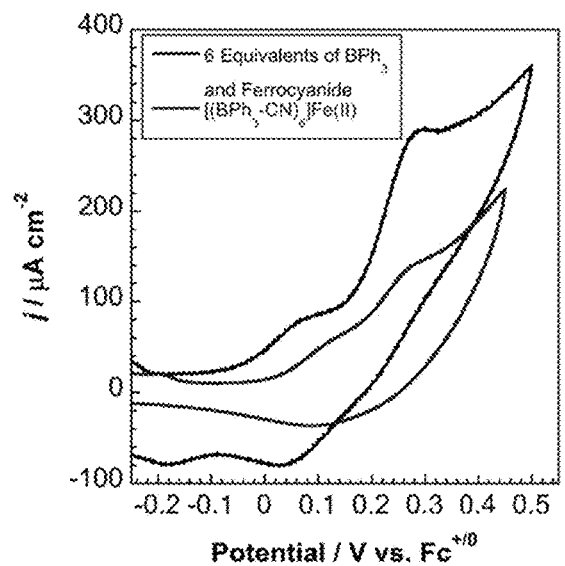
FIG. 18 shows a cyclic voltammogram corresponding to $[Fe(CN—BPh_3)_6]^{4-}$. A small reduction peak is around the theoretical potential of 0.181 V.

FIG. 18 shows the cyclic voltammogram of $[Fe(CN-BPh_3)_6]^{4-}$. A small reduction peak is around the theoretical potential of 0.181 V.

Figure 19:
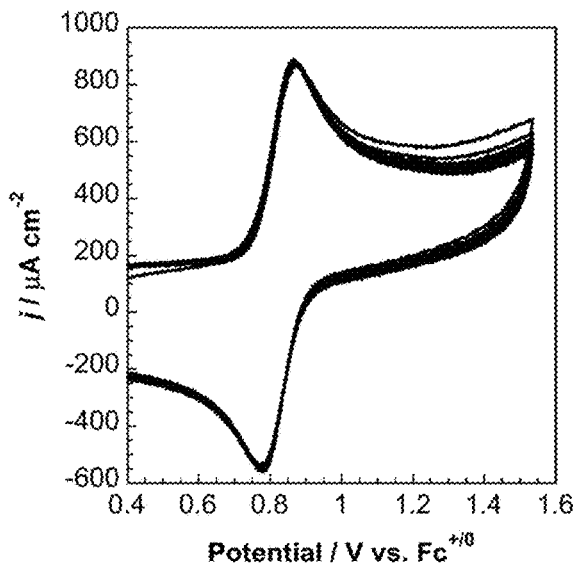
FIG. 19 shows a cyclic voltammogram corresponding to $[Fe(CN—B(C_6F_5)_3)_6]^{4-}$. The oxidation of this complex did appear to be highly reversible, as seen by the clearly defined peaks at ~0.8 V and ~0.9 V. Thus the standard redox potential was approximately 0.85 V, very close to the theoretical 0.87 V vs Fc.

FIG. 19 shows the cyclic voltammogram of $[Fe(CN-B(C_6F_5)_3)_6]^{4-}$. The oxidation of this complex did appear to be highly reversible, as seen by the clearly defined peaks at ~0.8 V and ~0.9 V. Thus the standard redox potential was approximately 0.85 V, very close to the theoretical 0.87 V vs Fc.

Figure 20:
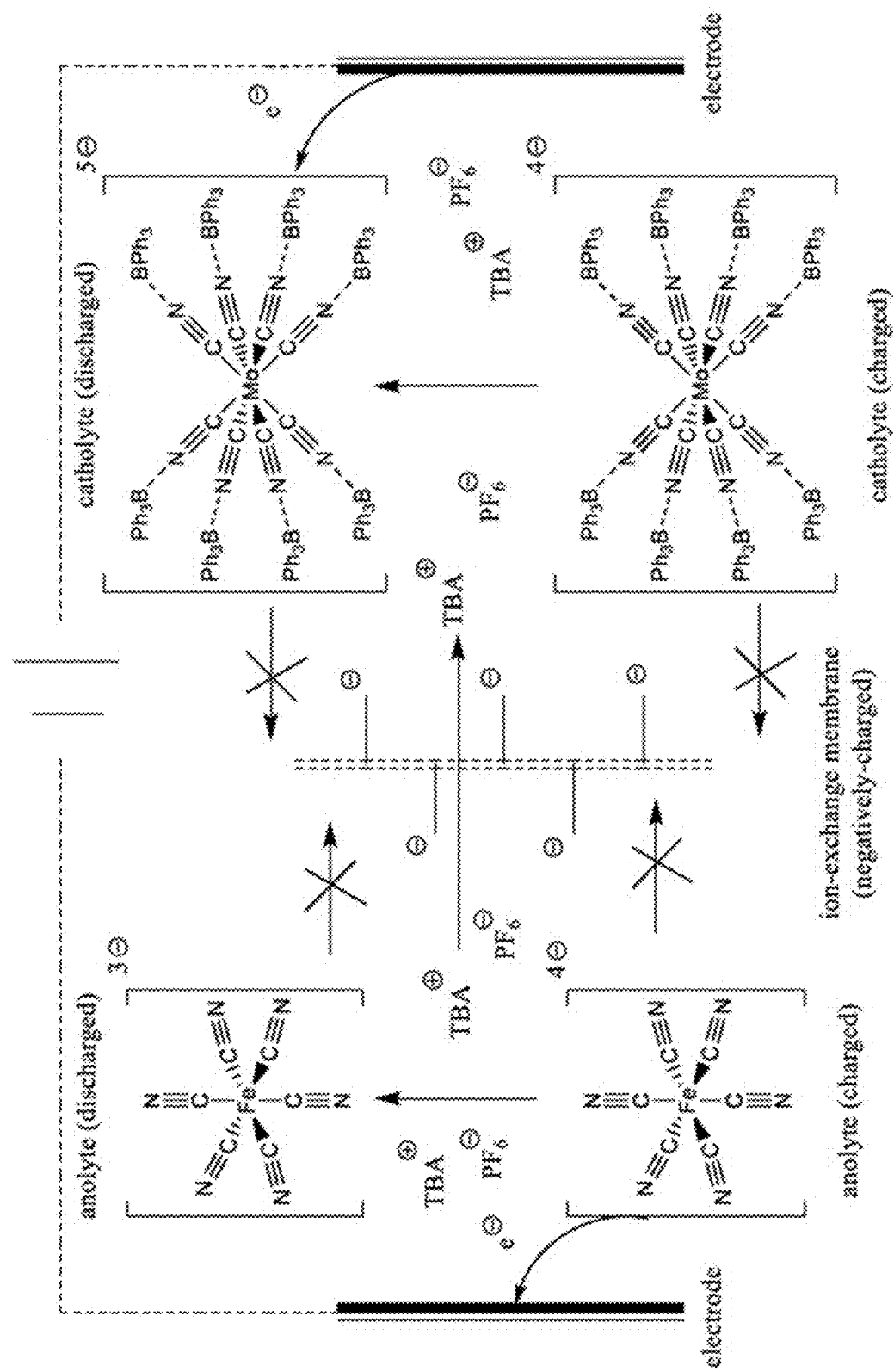
FIG. 20. Operational schematic for redox flow battery with $[Fe(CN)_6]^{4-}$ anolyte and $[Mo(CN)_8]^{4-}$ coordinated by 8 $BPh_3$ as the catholyte (discharge process depicted), with operating potential ~3V. A negatively-charged separator permits passage of counter ions (tetrabutylammonium ions (TBA+)) to balance charge while repelling active materials, inhibiting crossover between reactants. Other embodiments of this example may use other metal-coordination complexes, such as two different iron complexes instead of a molybdenum complex.

FIG. 20 shows an operational concept for redox flow battery with [Fe(CN)6]4− anolyte and [Mo(CN)8]4− coordinated by 8 $BPh_3$ as the catholyte (discharge process depicted), with operating potential ~3V. A negatively-charged separator permits passage of tetrabutylammonium ions (TBA+) to balance charge while repelling active materials, inhibiting crossover between reactants. Some embodiments of this example use two different iron complexes instead of a molybdenum complex.

I. Linear Sweep Voltammetry of $TBA_3[Fe(CN)_6]$

The first compound tested is tetrabutylammonium ferricyanide, $TBA_3[Fe(CN)_6]$, the oxidized form of tetrabutylammonium ferrocyanide. Unlike the ferrocyanide, ferricyanide is reasonably stable in air, and is thus the easiest to test. A bulk electrolysis experiment is performed first. The cell is discharged at −525 uA for 2 hours, and is set to stop when the potential reached −1.1 V relative to the reference electrode. The cell is initially discharged at 525 uA, but it is found that this led to unsteady behavior. Thus, the current is reduced by a factor of 10, to 52.5 uA, and s set to stop when the voltage reached 0 V with respect to the reference electrode.

To find the current range at which the cell could be stably run, a linear sweep voltammetry (LSV) test is performed. The iron complex begins in the Fe(III) form, so it was first reduced to Fe(II) by taking the overpotential (n) from 0 V to −1 V at a rate of 100 uV/s while the current between the working electrode and the counter electrode was measured. After measuring the OCV for 5 minutes, the complex is then converted to Fe(II) by applying a current of −610 uA for 2 hours (because the system was at 1.22 mAh). Once all of the complex is converted to the Fe(II) form, another LSV test is run, this time taking the overpotential from 0 V to +1 V at a rate of 100 uV/s. Finally, the OCV is again measured for 5 minutes.

Figure 21:
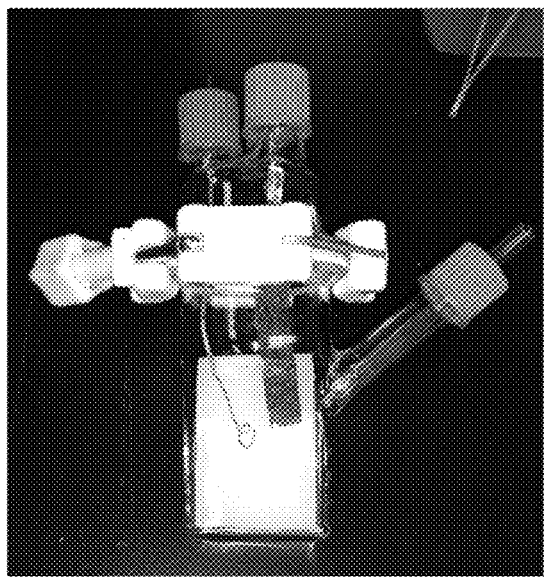
FIG. 21. The feedthrough on the right was used to hold the nonaqueous silver reference electrode tube. The carbon cloth electrode (black rectangle in middle) was used as the working electrode. The platinum wire (left) was used as the counter electrode.
Figure 22:
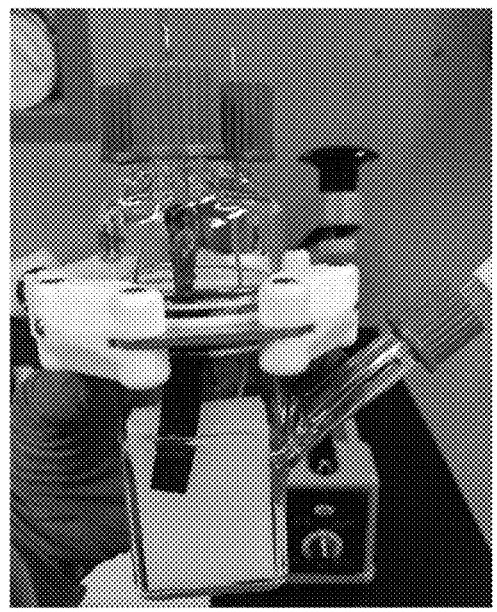
FIG. 22 depicts the setup with the silver wire in the reference tube. The yellow color in the cell body came from adding the active compound, $TBA_3Fe(CN)_6$, to the acetonitrile.

In FIG. 21 the feedthrough on the right is used to hold the nonaqueous silver reference electrode tube. The carbon cloth electrode (black rectangle in middle) is used as the working electrode. The platinum wire (left) is used as the counter electrode. FIG. 22 depicts the setup with the silver wire in the reference tube. The yellow color in the cell body comes from adding the active compound, $TBA_3Fe(CN)_6$, to the acetonitrile.

Figure 23:
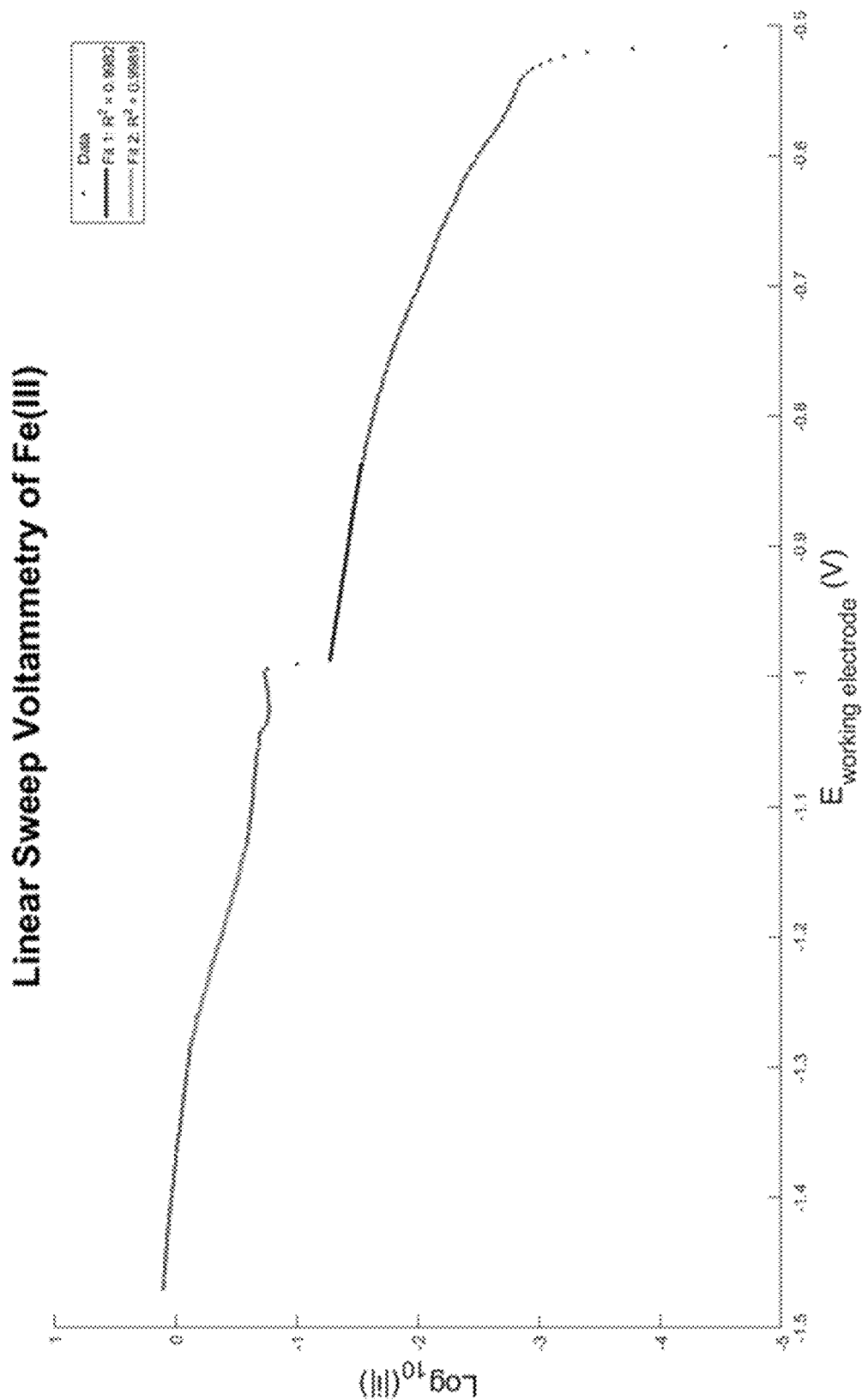
FIG. 23. Plot of LSV of $TBA_3[Fe(CN)_6]$. The discontinuity likely comes from the system changing the working current range. This would cause the instability seen between fits 1 and 2, even though those fits have high $R^2$ values. Fits were done for different sections because the discontinuity prevented one linear fit.

FIG. 23 is LSV of $TBA_3[Fe(CN)_6]$. The discontinuity likely comes from the system changing the working current range. This would cause the instability seen between fits 1 and 2, even though those fits have high $R^2$ values. Fits are done for different sections because the discontinuity prevented one linear fit.

Figure 24:
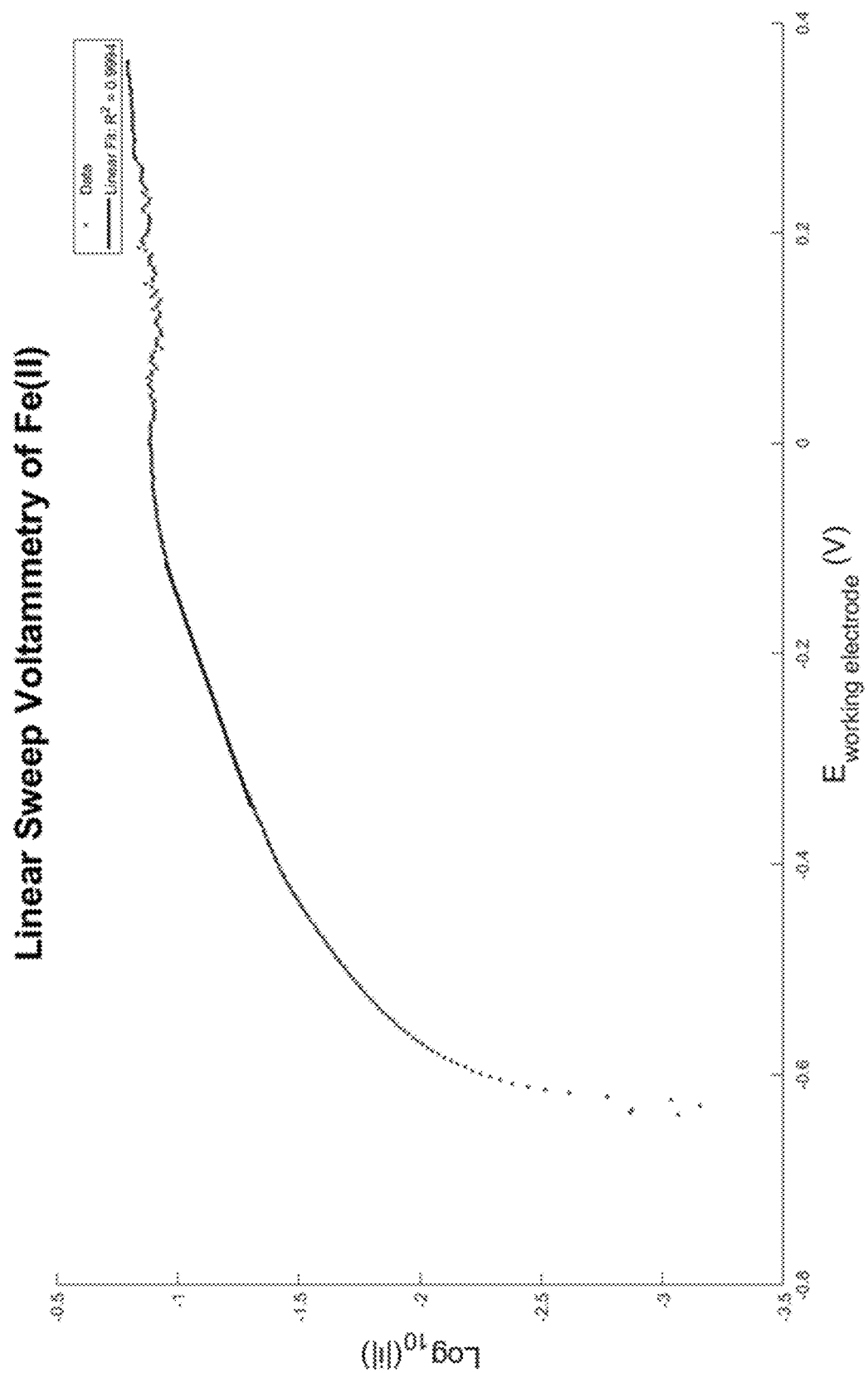
FIG. 24. Plot of LSV of $TBA_4[Fe(CN)_6]$. A fit was made to the linear section of the plot, which was used to determine the range of currents at which the cell could be charged.

FIG. 24 is LSV of $TBA_4[Fe(CN)_6]$. A fit is made to the linear section of the plot, which is used to determine the range of currents at which the cell could be charged.

Figure 27:
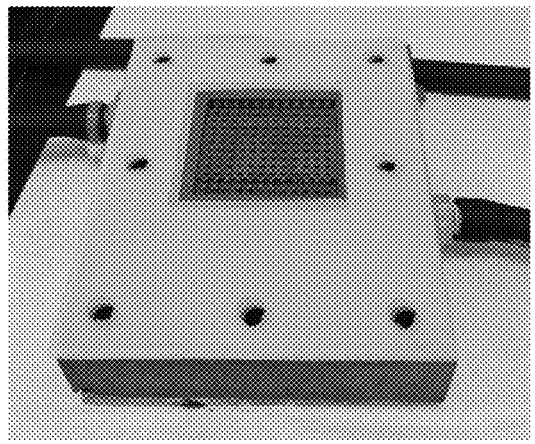
FIG. 27 shows one half of the cell assembly with the Teflon gasket, graphite block, and gold plated electrode. The membrane is not included in this picture.

It is found that the reduction of Fe(III) complex to Fe(II) could stably proceed at much higher currents than the oxidation of Fe(II) to Fe(III). Using the linear sweep voltammetry data, a Tafel plot is created by plotting $Log_{10}$ (i) vs n. The linear portion of the curve indicates the range of currents that would be stable for both the reduction and oxidation processes [9]. The LSV of the Fe(III) complex is shown in FIG. 27, and the Fe(II) complex in FIG. 28. The discontinuity in FIG. 27 is contemplated to come from the system changing current ranges (for measurement sensitivity) in the middle of the experiment. Thus two different fits are made, leaving out the instable section caused by the discontinuity, to determine when the curve starts to become nonlinear. The stable current range is determined to be between 28.6 uA and 743 uA. The LSV for the Fe(II) complex does not have the discontinuity, but exhibited linear behavior for a smaller current range. The stability region is determined to be between 48.7 uA and 110.6 uA. Current stability is often determined by the area of the working electrode, which in this experiment, was 1.5 $cm^2$. Converting the current ranges to $uA/cm^2$, the Fe(III) complex is stable between 19 $uA/cm^2$ and 495 $uA/cm^2$. The Fe(II) complex is stable between 32.5 and 73.7 $uA/cm^2$.

II. Bulk Electrolysis of $TBA_3[Fe(CN)_6]$

Bulk electrolysis is used to determine how reversible the reaction is over two cycles. However, as the bulk electrolysis experiment is performed before the linear sweep voltammetry experiment, the ideal charge and discharge current had not yet been determined. Thus the applied current is varied from cycle to cycle in an attempt to find an appropriate one. In the first charge cycle, the applied current is 525 uA. In the first discharge cycle, the applied current is 53 uA. In the second charge cycle, the applied current is 610 uA. In the second discharge cycle, the applied current is 122 uA. The total capacity of the cell is found to be approximately 1.2 mA-h. After the cell has reached that capacity, as seen in discharge cycle 1, the electrolyte itself begins oxidizing, implying that the electrochemically active compound had all been oxidized. The data seen here is consistent with the appropriate current ranges that are found from LSV—both the charge cycles are within the 28.6-743 uA range, and shows stable behavior. The discharge cycle that is within the 48.7-110.6 uA range shows stable behavior, but the one that is higher than the current range shows extremely erratic behavior, which indicates that the current at which the battery is charged or discharged at is significant.

Figure 25:
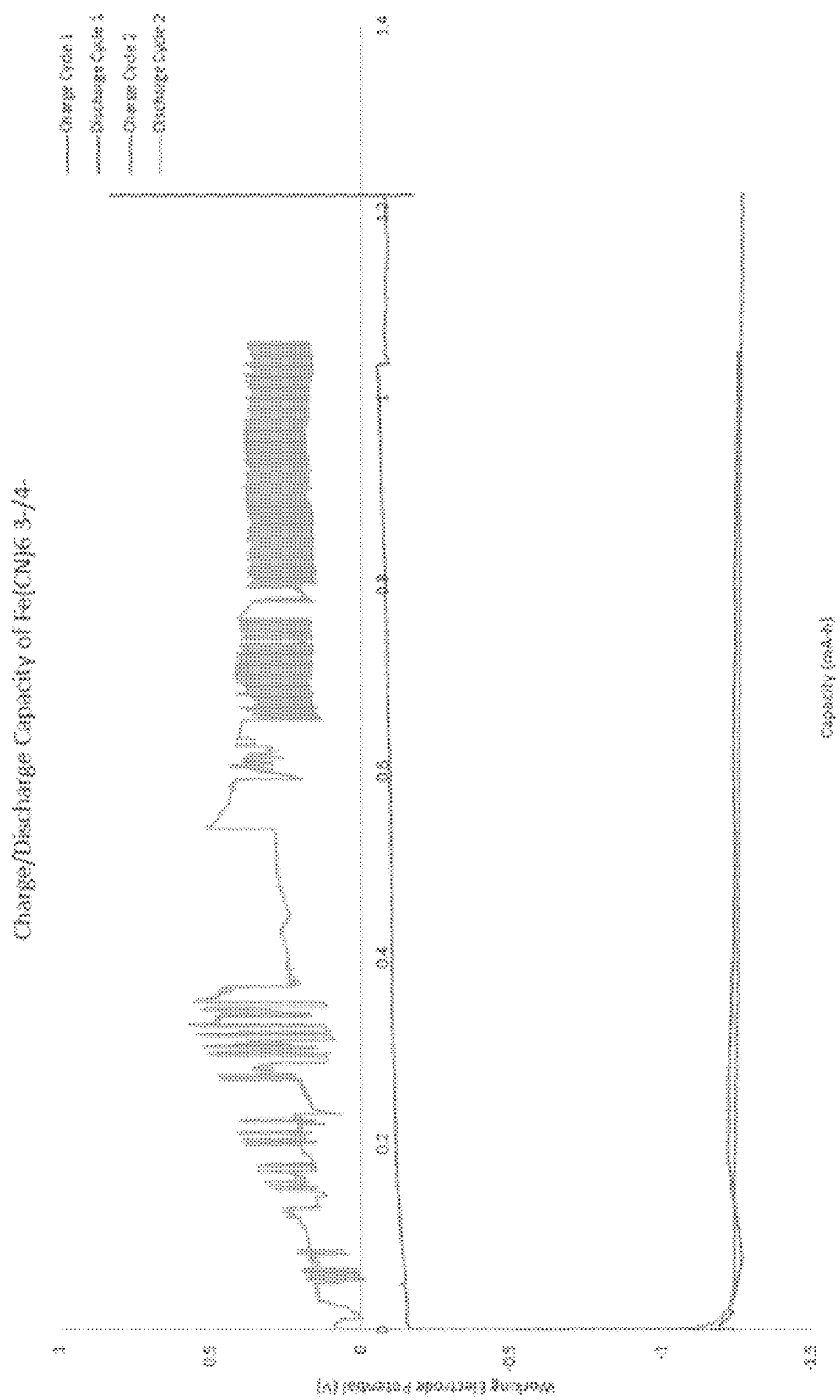
FIG. 25. Plot of capacity vs Working Electrode potential for Charge and Discharge cycles of Ferro/Ferricyanide. Two charge and discharge cycles were run. The last discharge cycle (yellow) was very unstable, most likely because the current being pulled from the cell was too high. Additionally, that experiment recorded data points much more frequently than the other experiments, which also may have contributed to noise.

FIG. 25 is a plot of Capacity vs Working Electrode potential for Charge and Discharge cycles of Ferro/Ferricyanide. Two charge and discharge cycles are run. The last discharge cycle (yellow) is very unstable, most likely because the current being pulled from the cell was too high. Additionally, that experiment recorded data points much more frequently than the other experiments, which also may have contributed to noise.

III. Flow Cell Assembly

Another aspect of the example involved designing a flow battery for testing purposes.

The cell itself consists of two graphite blocks and two gold plated electrodes. Each graphite block has two feedthroughs, one inlet and one outlet. These feedthroughs connect to an open area on the surface of the graphite block, which is the active exchange area. When fully assembled, the active exchange area on each block faced each other, and can be separated by a membrane. The entire cell was held together with a set of 8 bolts.

The first modification required to convert the fuel cell to a flow cell is finding appropriate tubing. The tubing is chemically compatible with the electrolyte solutions and fit with the Masterflex Peristaltic pumps that are available. Of the tubing available in the lab, both Masterflex Norprene and Masterflex C-Flex tubing are found to satisfy these criteria. However, the feedthroughs on the graphite blocks already has plastic fittings attached, and only the diameter of the Norprene (L/S 35, Item # HV-06404-35) worked with the fittings for the purpose of this example.

Once the tubing had been selected, sources of leaks from the system are eliminated as best as possible. To prevent leaks from the contact area between the two graphite blocks, two sheets of Teflon are cut into gaskets. The membrane is be sandwiched between these two gaskets, which is b placed between the two graphite blocks. Another source of leaks may be the connection between the tubing and the plastic fittings, as the tubing may simply be pushed on top of the fittings, although it is a fairly tight connection. Still, to prevent possible leaks, zip ties may be used to secure the tubing to the fittings.

After the chances of leaks are significantly reduced, the pumps are calibrated to determine what flow rate each setting on the pump produced. A Masterflex L/S Economy Drive Peristaltic pump (Item # HV-07554-90) with a Masterflex L/S Easy-Load II Head (Item # HV-77200-62) is used. A Gilmont Instruments 150 mm flow meter is used to measure the flow rate. It is found that the combination of the pump and the tubing results in each setting on the pump dial increasing the flow rate by 200 ccm. However, after setting 3 (600 ccm), the pumps and tubes may start shaking very violently, and so the use of pumps may be avoided at higher flow rates.

A component of the flow cell assembly is an appropriate membrane. The general purpose of the membrane is to prevent the chemically active compounds in the solution from crossing over, but allow the oppositely counter-ions to cross over to maintain charge balance in each cell during the redox reaction. However, depending on the solvent, and the nature of the ions in solution, appropriate membrane can vary greatly. Different membranes are used in different experiments, and will be specified accordingly.

Figure 26:
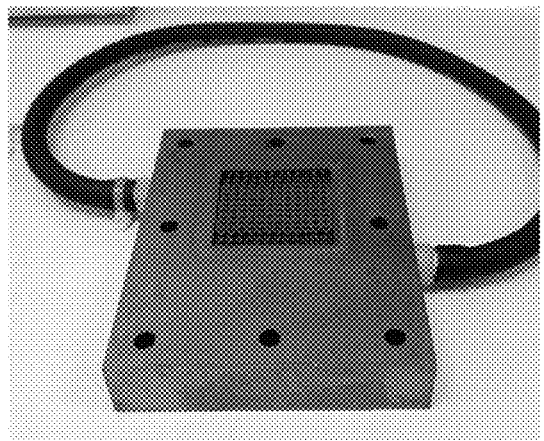
FIG. 26 shows the graphite block on its own. The active area is the indented square in the middle. The tubing is connected to inlet and outlet feedthroughs on the right and left.

FIG. 26 shows the graphite block on its own. The active area is the indented square in the middle. The tubing is connected to inlet and outlet feedthroughs on the right and left.

FIG. 27 shows one half of the cell assembly with the Teflon gasket, graphite block, and gold plated electrode. The membrane is not included in this picture.

Figure 28:
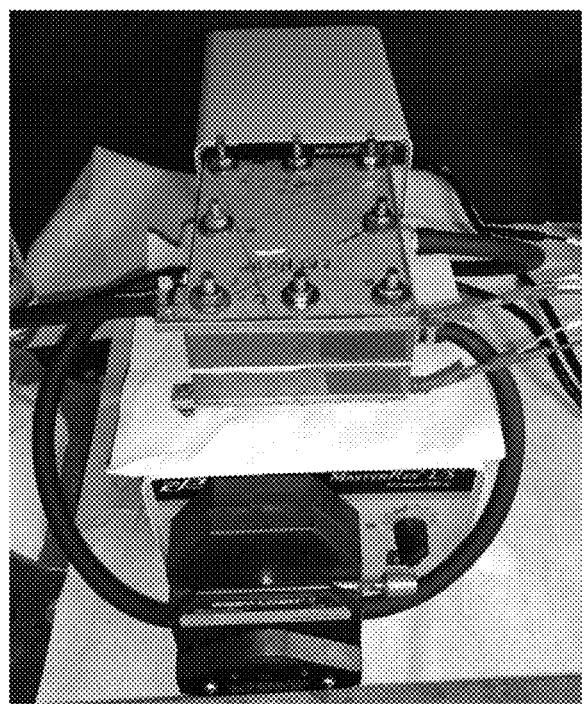
FIG. 28. Fully assembled flow cell, attached to pumps and electrodes (red and blue wires on right). The cell was operated inside a fume hood.

FIG. 28 is a fully assembled flow cell, attached to pumps and electrodes (red and blue wires on right). The cell may be operated inside a fume hood.

IV. Flow Battery Testing

A. Methyl Viologen—Ferrocyanide Battery

The first flow battery tested is a methyl viologen (catholye)—ferrocyanide (anolyte) cell. 5 mM solutions of each are created in 1 M NaCl (in DI $H_2O$). The NaCl behaves as the supporting electrolyte, the ions helping to maintain charge neutrality. The pumps are operated such that the flow rate is approximately 100 ccm. A wettable Teflon-based membrane is used to separate the two compartments.

Prior to starting the experiment, the ferricyanide, the more stable form, is reduced to ferrocyanide. This is achieved by creating a 5 mM solution of ferricyande and adding zinc powder to the solution. This mixture is stirred for 30 minutes, allowing time for the zinc to oxidize and the iron to reduce. The synthesis of ferrocyanide is confirmed by adding an Fe(III) salt to a small portion of the mixture and confirming that Prussian Blue was formed.

First, the cell is fully assembled with the membrane, gaskets, graphite blocks, and electrodes, and bolted together. The electrolyte solutions are loaded into the flow cell by disconnecting the tubing from one of the fitting and pumping fluid through the system until it begins to come out of the fitting. This indicates that the system is full, and so the tubing is then reconnected to the fitting, closing the system. The cell is then connected to a potentiostat, and the EC-Lab software may be used to program the electrochemical tests.

Figure 29:
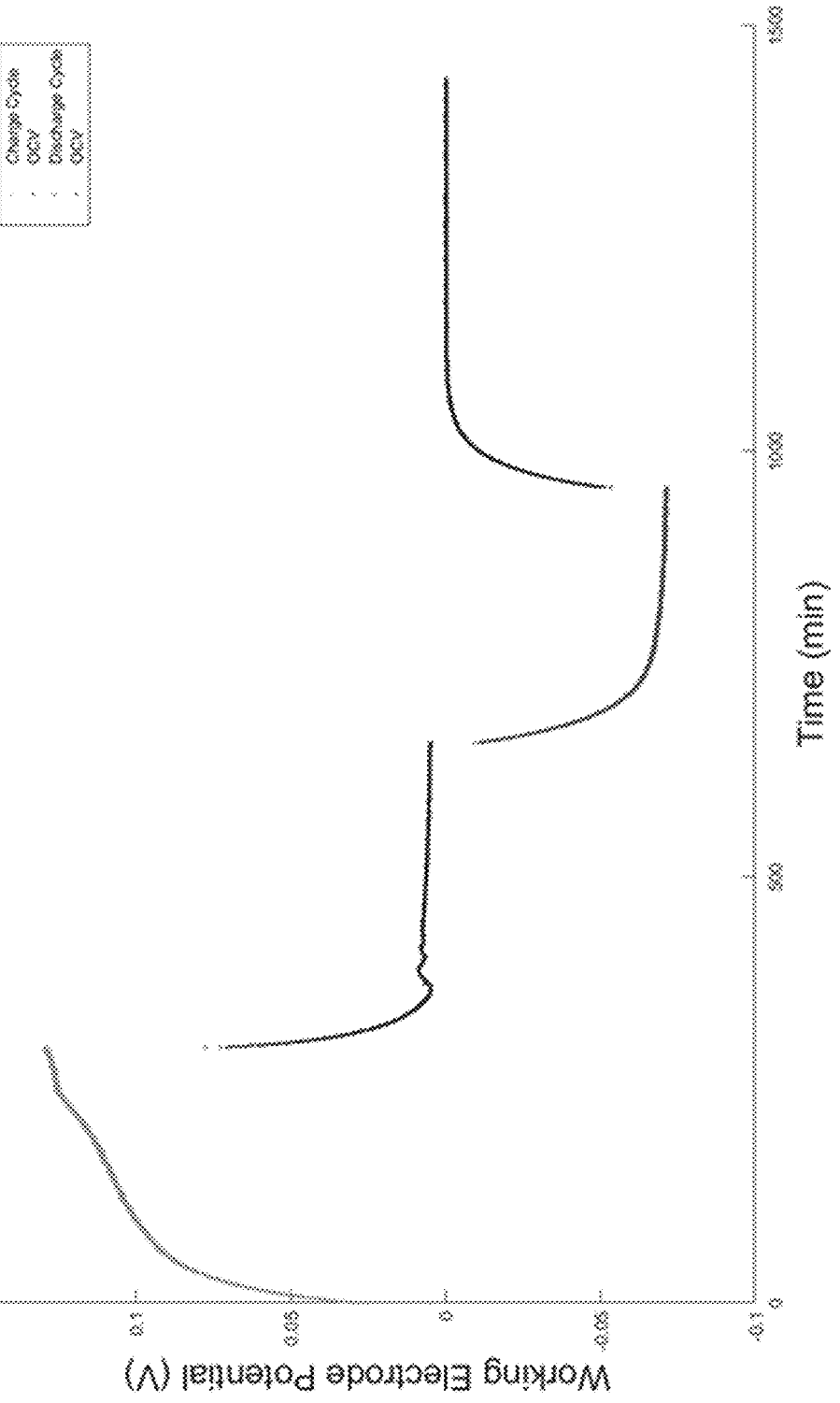
FIG. 29. Electrochemical test data from methyl viologen—Ferrocyanide flow battery. The battery was first charged with current 670 uA. In the open circuit voltage (OCV) segment, no current was applied and the cell voltage was allowed to stabilize. It settled at approximately 5 mV. During the discharge cycle, 670 uA of current were drawn from the cell. Finally, in the last OCV segment, no current was applied, and the cell potential stabilized at approximately 0 V.

FIG. 29 is electrochemical test data from methyl viologen—ferrocyanide flow battery. The battery is first charged with current 670 uA. In the open circuit voltage (OCV) segment, no current is applied and the cell voltage is allowed to stabilize. It settles at approximately 5 mV. During the discharge cycle, 670 uA of current are drawn from the cell. Finally, in the last OCV segment, no current is applied, and the cell potential stabilizes at approximately 0 V.

In this first particular experiment (methyl viologen—ferrocyanide), the cell potential did not get very high during the charge cycle—less than or equal to 0.15 V. The second issue was that once current was removed from the battery, the cell potential immediately dropped to almost 0 V. This indicated that the battery could not maintain a potential difference between electrodes when it was not charging. The discharge cycle brought the battery to a negative potential, which was also problematic, as the potential of a battery should remain positive even while discharging. The potential of the battery settled at 0 V in the final segment, showing that there was no potential difference across the cell, for this particular methyl viologen—ferrocyanide cell setup.

Upon further investigation, the theoretical potential of this cell (methyl viologen—ferrocyanide system) was only a few millivolts. This could partially explain why the cell performed poorly. Another possible explanation, which was confirmed through spectroscopy and visual characterization, was that crossover of active species across the membrane was significant, decreasing the cell capacity.

Figure 30:
FIG. 30. Image of methyl viologen solution before and after flow cell testing. The solution was colorless prior to flow testing, but was yellow after testing. This indicates a large amount of crossover, as the ferricyanide solution was the same shade of yellow.

FIG. 30 is an image of methyl viologen solution before and after flow cell testing. The solution is colorless prior to flow testing, but is yellow after testing. This indicates a large amount of crossover, as the ferricyanide solution is the same shade of yellow.

Figure 31:
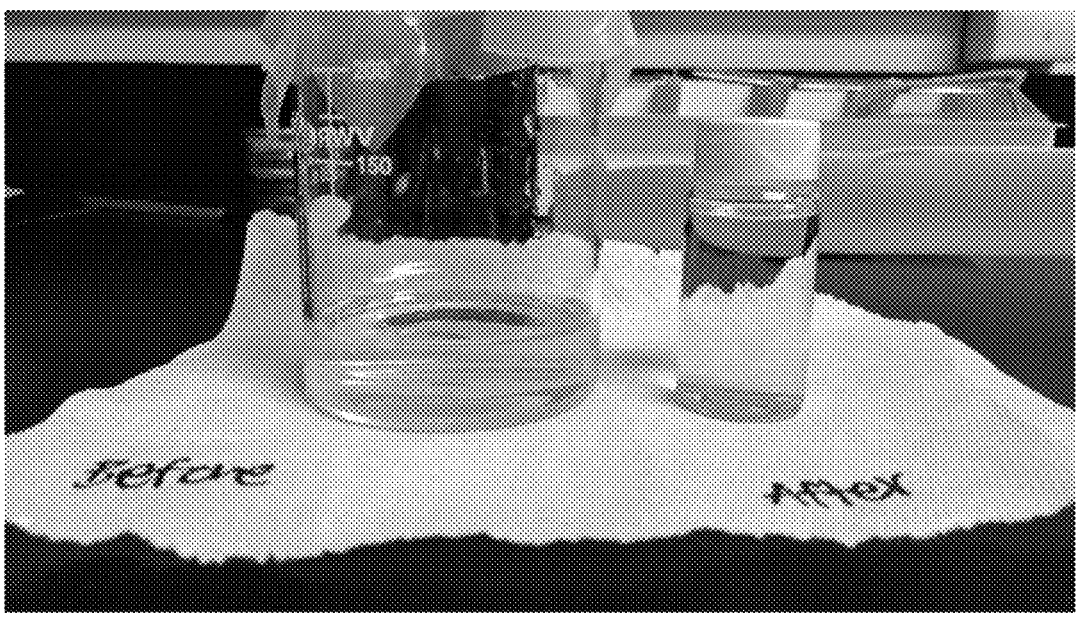
FIG. 31. Image of ferricyanide solution before and after flow cell testing. Crossover was harder to gauge visually with the ferricyanide, as the methyl viologen was colorless. The after solution looks slightly more dilute, but that could be attributed to the change in the shape of the container.

FIG. 31 is an image of Ferricyanide solution before and after flow cell testing. Crossover may be harder to gauge visually with the ferricyanide, as the methyl viologen was colorless. The after solution looks slightly more dilute, but that could be attributed to the change in the shape of the container.

Figure 32:
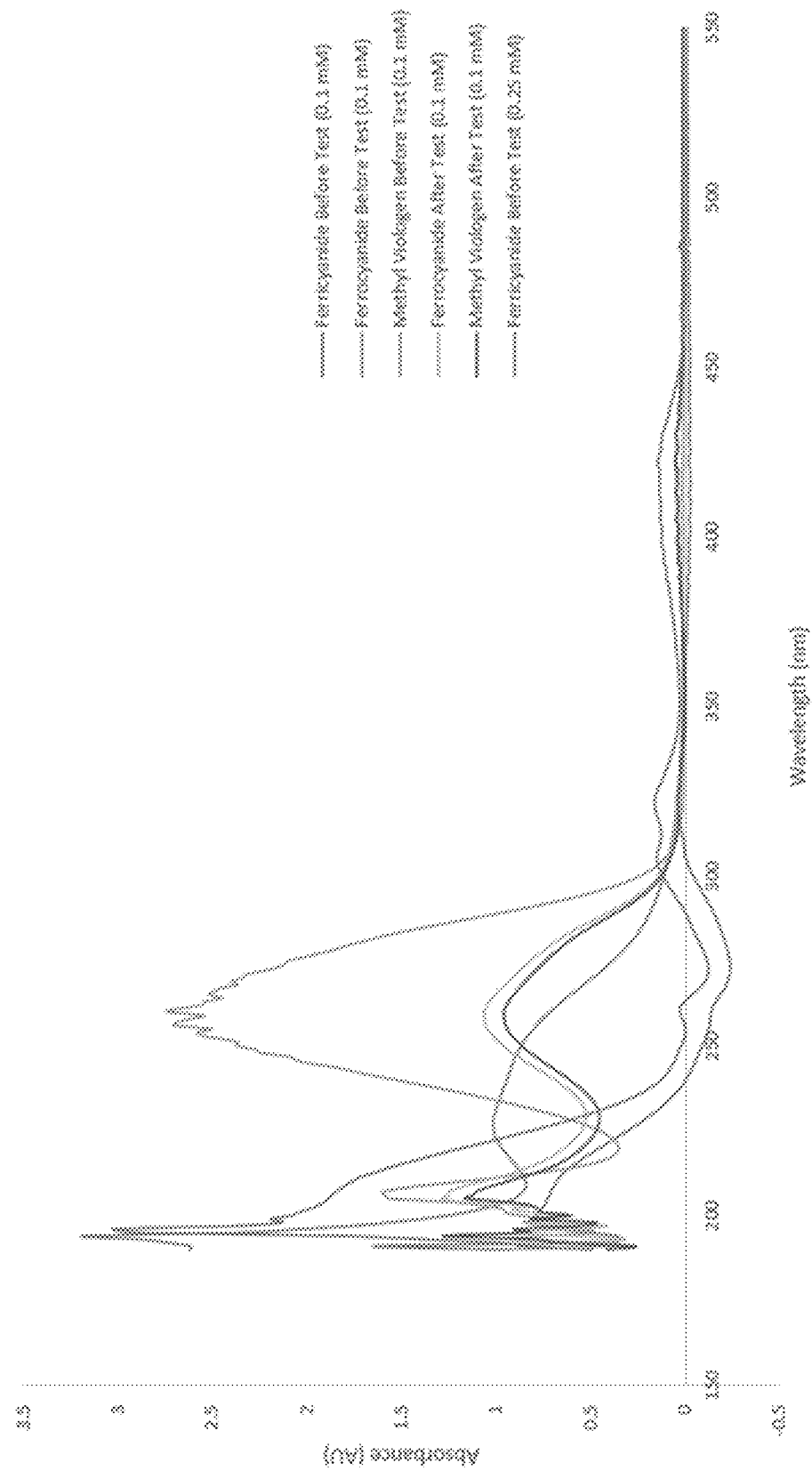
FIG. 32. UV-Vis absorption spectrum of methyl viologen, ferrocyanide, and ferricyanide before and after testing. Although the iron electrolyte should theoretically have been in the Fe(II) state, both Fe(II) and Fe(III) spectra before testing are shown for comparison.

FIG. 32 is a UV-Vis spectrum of Methyl Viologen, Ferrocyanide, and Ferricyanide before and after testing. Although the iron electrolyte should theoretically have been in the Fe(II) state, both Fe(II) and Fe(III) spectra before testing are shown for comparison.

Looking at the UV-Vis spectra, there is a large, well-defined peak centered at 260 nm and a smaller peak at 206 nm that are indicative of methyl viologen. A small, but broad peak centered at 420 nm is indicative of ferricyanide. A large peak at 228 nm is indicative of ferrocyanide. Analyzing the methyl viologen and ferrocyanide samples after testing, it is seen that the spectra are nearly identical. That the absorbances of the two samples were so close indicated that the compositions of the two solutions were very similar. This confirms what is seen visually, that crossover of chemically active species may be high in this particular experiment. Additionally, the small, broad peak centered at 420 nm which is indicative of ferricyanide is also seen in the samples after testing (the yellow and blue lines overlap exactly after ~350 nm). This indicates that there may be some ferricyanide present in the system after the test, even though it should all have theoretically been converted to ferrocyanide. This is likely due to the fact that ferricyanide is more stable than ferrocyanide, as the ferrocyanide can be oxidized by water or air.

From the analysis techniques, the poor performance of the this particular experiment's battery is likely explained by the high degree of crossover between cells.

B. Vanadium Battery

The second flow battery tested was a completely vanadium-based system. This system is chosen because it was well documented in the literature. The idea was that because the behavior of the vanadium electrolytes was well-known, it would be easier to troubleshoot the problems with the physical system.

100 mM solutions of V(III) and V(IV) are created by dissolving vanadium(III) 2,4-pentanedionate (V(III)) and vanadyl sulfate (V(IV)) in 5 M $H_2SO_4$. The membrane used in this system is Nafion 212, which has been described in the literature as being an appropriate membrane for vanadium flow cells [1]. Both the V(III) and the V(IV) are the discharged vanadium states. During the charging process, V(III) is reduced to V(II) and V(IV) is oxidized to (V).

Two experiments with the vanadium system are run. The first is at a lower flow rate, ~100 ccm. The second is at a higher flow rate, ~200 ccm. The vanadium solutions are taken from the same batch for both experiments. The membrane is replaced for each experiment, but both are Nafion 212.

Figure 33:
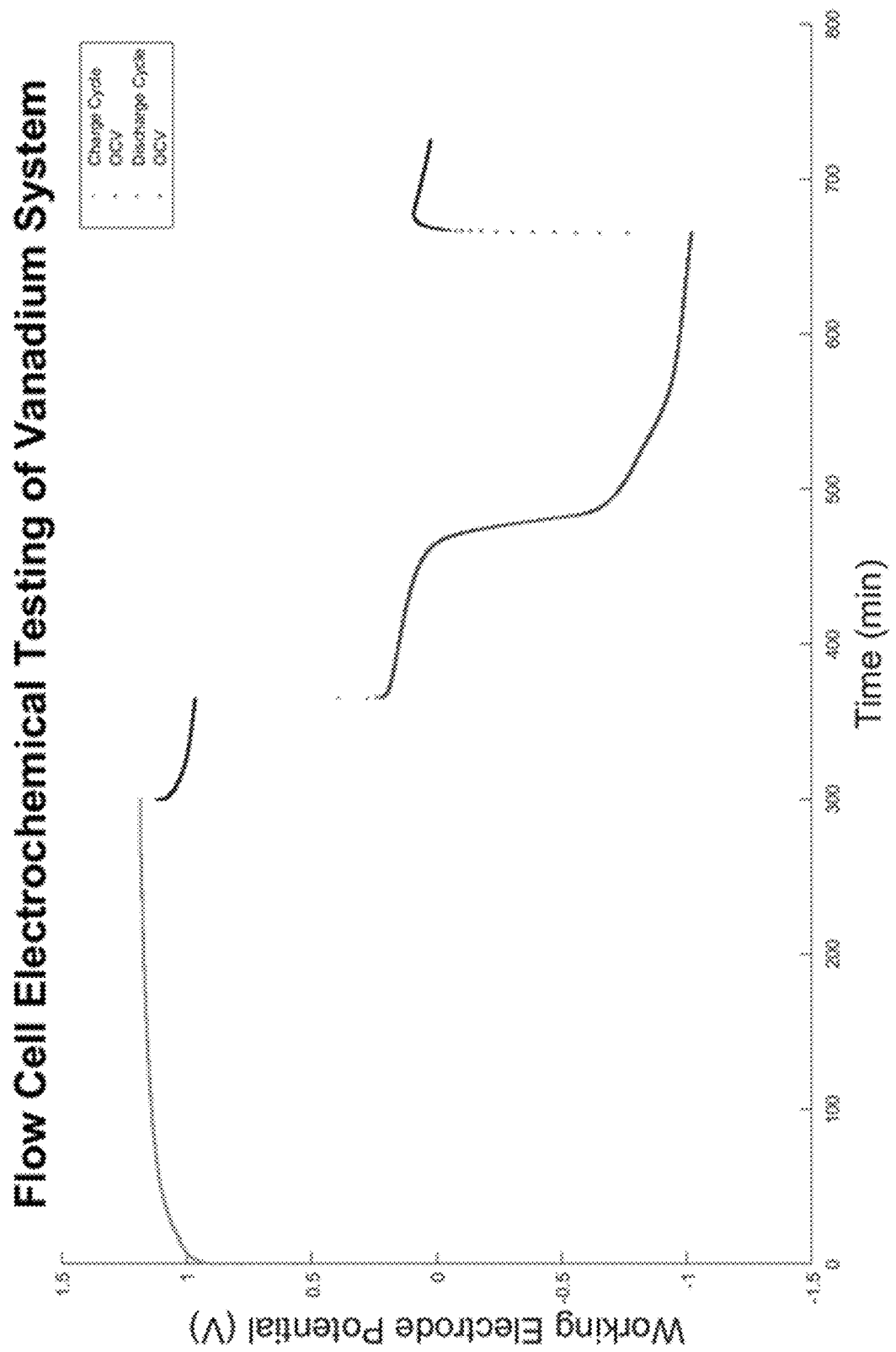
FIG. 33. Electrochemical data from first vanadium flow battery experiment, in which the solutions were flowed at 100 ccm. The battery was first charged with a 13 mA current. The current was then removed and the potential of the cell stabilized at approximately 0.9 V. The cell was then discharged with a 13 mA current. The load was then removed and the OCV settled around 25 mV.

FIG. 33 is electrochemical data from first vanadium flow battery experiment, in which the solutions are flowed at 100 ccm. The battery is first charged with a 13 mA current. The current is then removed and the potential of the cell stabilizes at approximately 0.9 V. The cell is then discharged with a 13 mA current. The load is then removed and the OCV settles around 25 mV.

Figure 34:
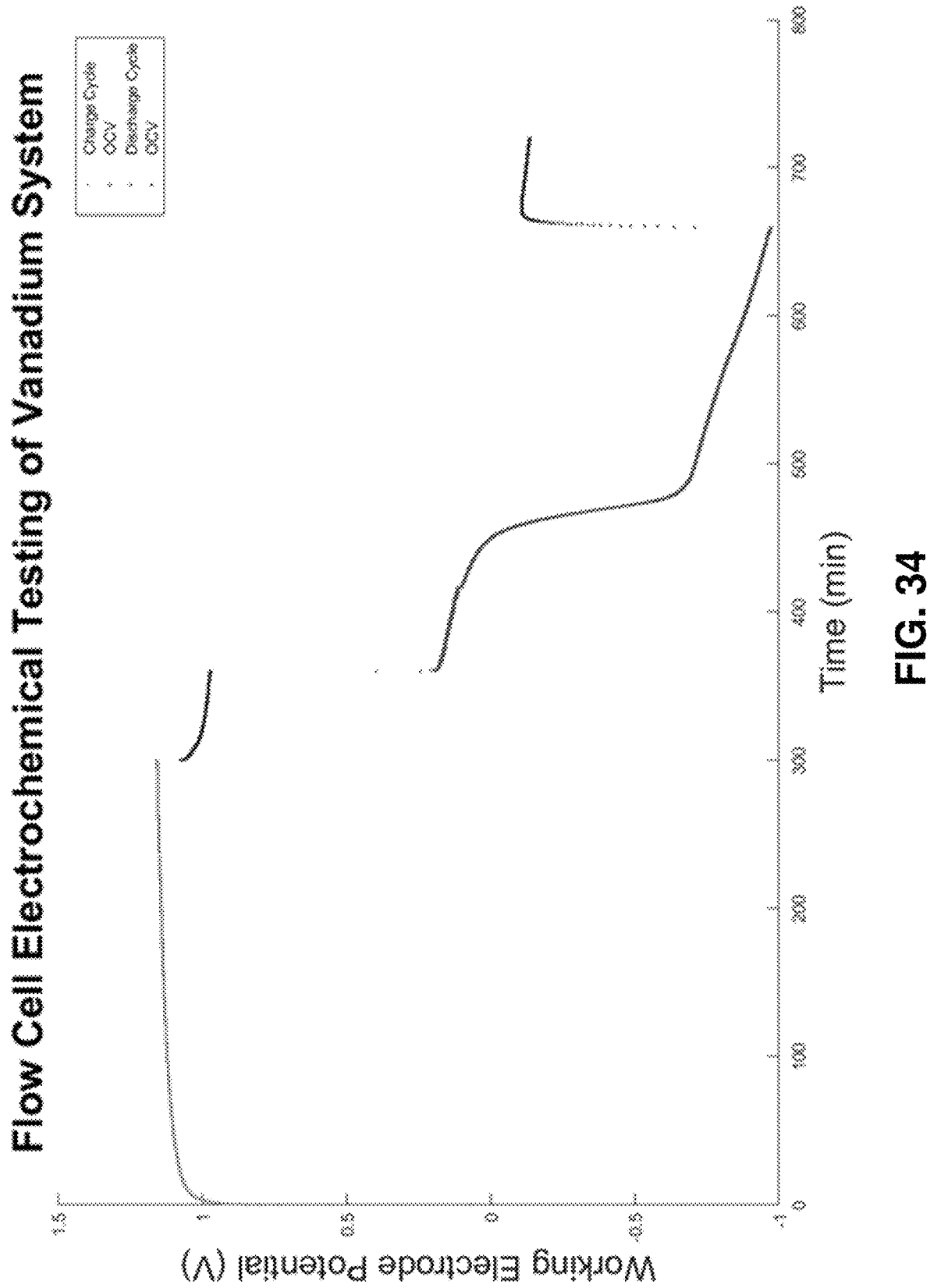
FIG. 34. Electrochemical data from second vanadium flow battery experiment. The vanadium system was tested again, but at a higher flow rate (200 ccm vs 100 ccm). Everything else remained constant. The battery was first charged with a 13 mA current. The current was then removed and the potential of the cell stabilized at approximately 0.97 V. The cell was then discharged with a 13 mA current. The load was then removed and the OCV settled around −0.136 V.

FIG. 34 is electrochemical data from second vanadium flow battery experiment. The vanadium system is tested again, but at a higher flow rate (200 ccm vs 100 ccm). Everything else remains constant. The battery is first charged with a 13 mA current. The current is then removed and the potential of the cell stabilizes at approximately 0.97 V. The cell is then discharged with a 13 mA current. The load is then removed and the OCV settles around −0.136 V.

The data from the first experiment is more promising than the methyl viologen—ferrocyanide system. During the charge cycle, the potential of the cell stabilized around 1.185 V. When the charging current is removed, the potential of the cell appeared to stabilize around 0.96 V, indicating that the cell itself is holding that potential difference. The cell was behaving like a functional battery. However, once the discharge cycle began, the potential of the cell dropped to approximately 0.2 V. At ~450 min, the potential dropped drastically, indicating that the chemically active species had reacted to completion, and the supporting electrolyte and water molecules had begun to oxidize or reduce. One of the issues seen in the discharge cycle was that the cell potential immediately dropped once current was drawn from it. The voltage should have gradually dropped from 0.9 V as the cell was discharged over time, not dropped so drastically. Another issue was that species other than the vanadium compounds began electrolyzing less than halfway through the discharge cycle. The charge cycle reaction had not electrolyzed the other species in solution. There may have been a problem with not enough vanadium compounds being near the electrodes during the discharge cycle, which could have been caused by crossover from prolonged experiment time, and thus a dilution of the active species on each side of the cell.

Although the second experiment was run at a higher flow rate, the main features of the plot remains the same. The idea was that with the higher flow rate, crossover of the active species may be decreased as the solution spends less time in contact with the membrane. Again, during the discharge cycle, the other species in solution began electrolyzing and the potential dropped significantly. The crossover is again analyzed using visual characterization and UV-Vis Spectroscopy.

Figure 35:
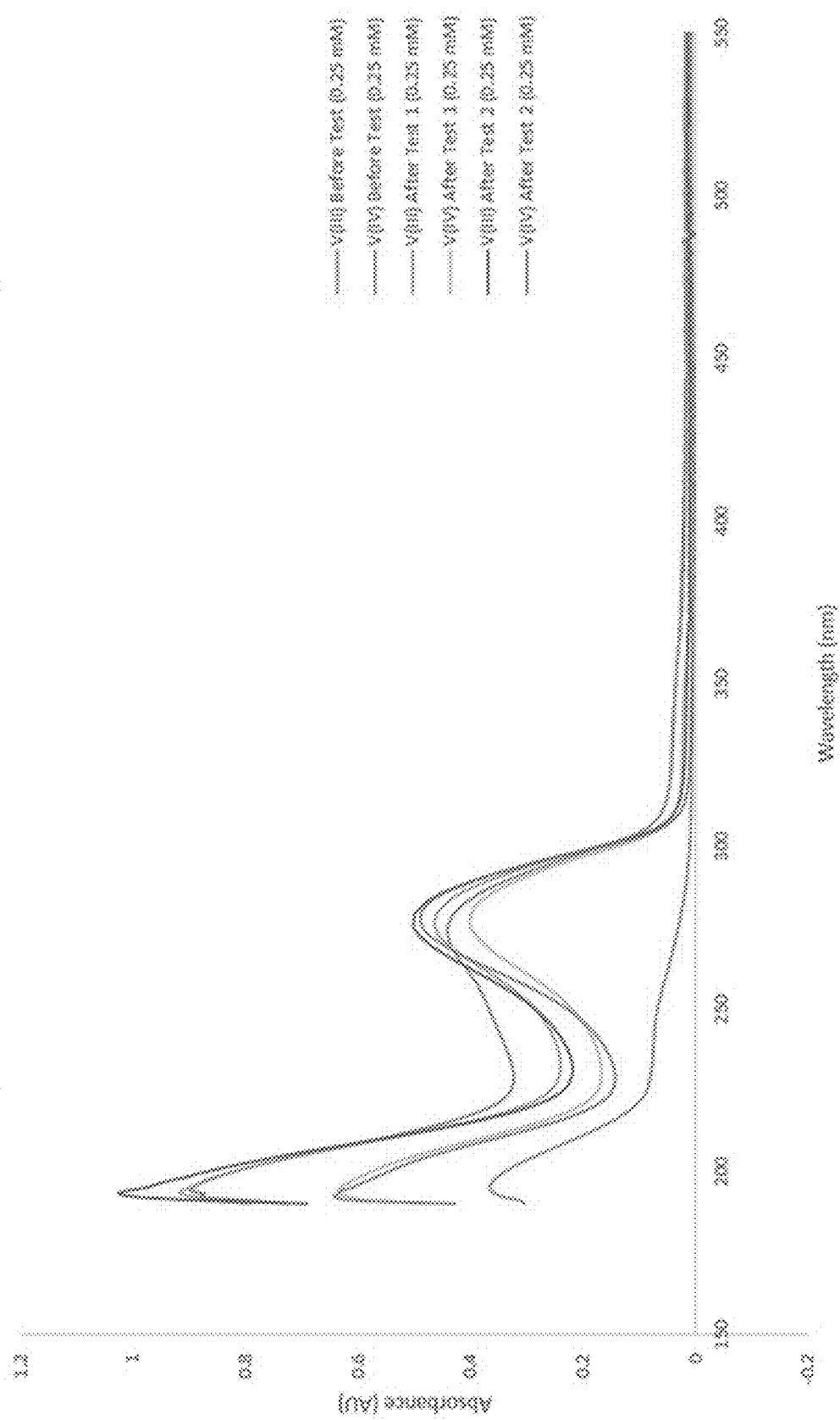
FIG. 35. UV-Vis absorption spectra of Vanadium III and IV before and after flow cell testing.

FIG. 35 is UV-Vis spectra of vanadium III and IV before and after flow cell testing.

The V(III) compound has a large, well-defined peak centered at 280 nm, and a narrower peak at approximately 193 nm. The V(IV) compound also had a peak at approximately 193 nm, but has no other characteristic peaks to distinguish it from V(III). As can be seen from the spectra, all the samples after flow cell testing have a large peak at 280 nm, indicating the presence of V(III) in all the solutions. This confirms what is seen visually, that there was crossover of vanadium species across the membrane. This may have been partially due to the fact that the Nafion membrane had deteriorated over the course of the experiment, which was realized after disassembling the cell.

Figure 36:
FIG. 36. Image of vanadium(III) solution before and after testing. Before, the solution was dark green in color, but changed drastically to a light blue after the experiment, indicating major crossover.

FIG. 36 is an image of Vanadium(III) solution before and after testing. Before, the solution is dark green in color, but changed drastically to a light blue after the experiment, indicating major crossover.

Figure 37:
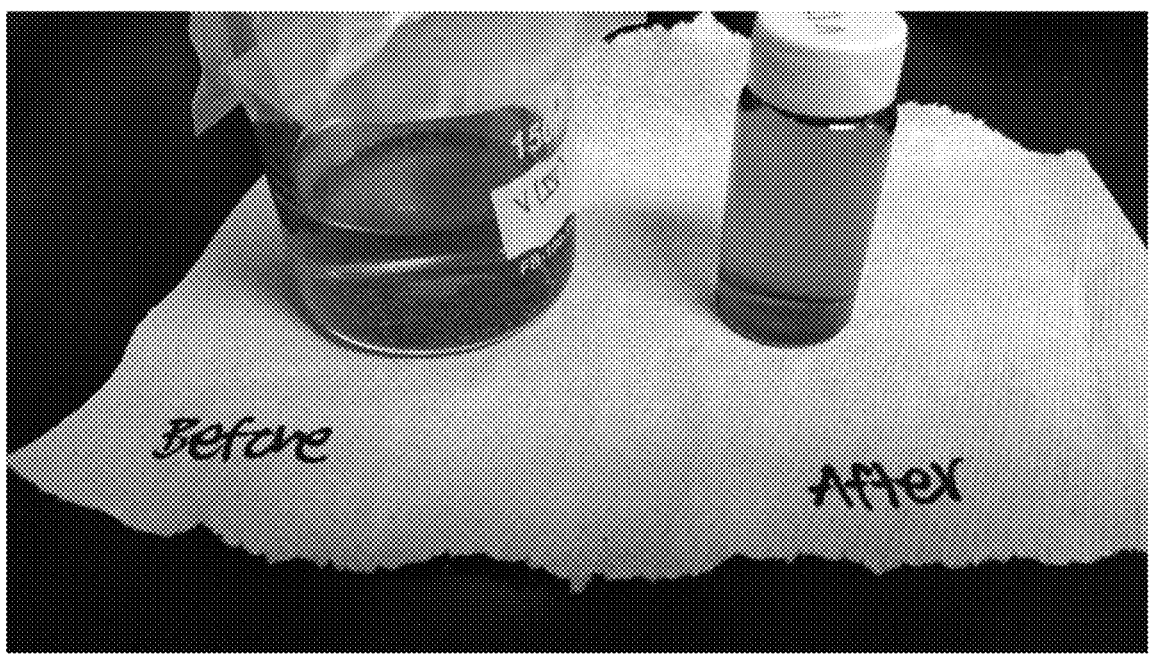
FIG. 37. Image of vanadium (IV) solution before and after testing. Before, the solution was a clear blue. Although the change was not as drastic as V(III) after testing, the solution appeared slightly greener. The solutions from both vanadium experiments were the same colors after testing.

FIG. 37 is an image of Vanadium (IV) solution before and after testing. Before, the solution is a clear blue. Although the change was not as drastic as V(III) after testing, the solution appears slightly greener. The solutions from both vanadium experiments are the same colors after testing.

Figure 38:
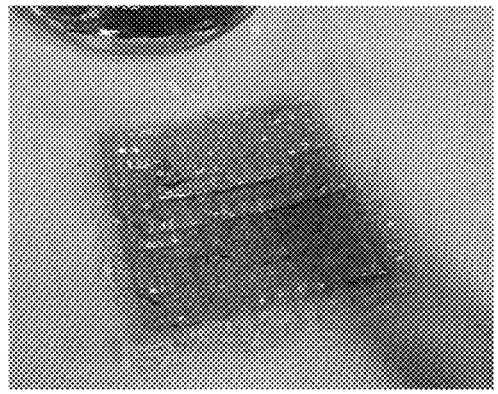
FIG. 38. Image of Nafion membrane after flow cell testing. The Nafion was originally transparent, as can be seen on the edges of the membrane. However, at the active area between the graphite blocks, the Nafion membrane had degraded significantly, turning brown. This may have been caused by the 5 M sulfuric acid which was used as the solvent for the vanadium compounds. This degradation likely allowed for more crossover between compartments.

FIG. 38 is an image of Nafion membrane after flow cell testing. The Nafion was originally transparent, as can be seen on the edges of the membrane. However, at the active area between the graphite blocks, the Nafion membrane degraded, turning brown. This may have been caused by the 5 M sulfuric acid which was used as the solvent for the vanadium compounds. This degradation likely allowed for more crossover between compartments.

V. H-Cell Assembly

Figure 40:
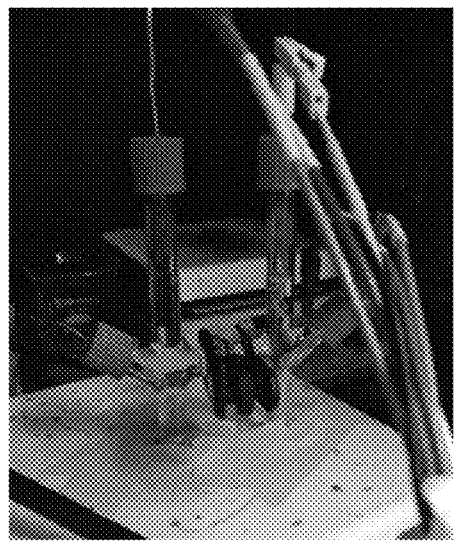
FIG. 40 is an image of an H-cell fully assembled.
Figure 39:
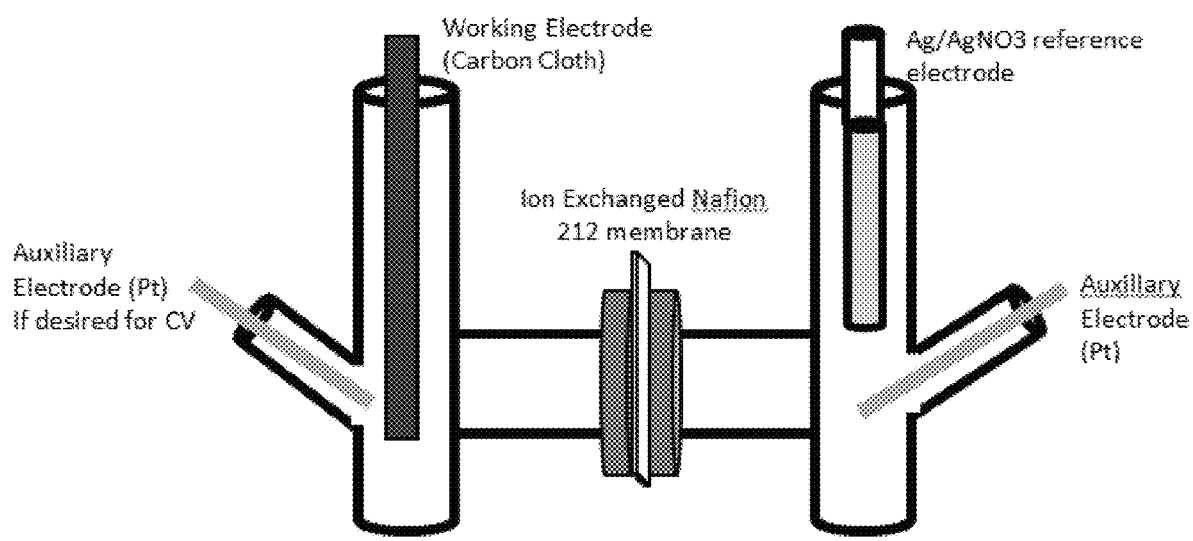
FIG. 39 shows a schematic of a hydrogen cell (H-Cell) assembly with labels on all the components.

After the Vanadium flow cell experiments, it became clear that using the modified fuel cell as it existed was not an ideal way to test the compounds of interest. A new H-cell configuration is contemplated as an improved experimental setup. This cell setup is used to test the electrochemical properties of $[Fe(CN-B(C_6F_5)_3)_6]^{4-}$, an exemplary metal-coordination complex in accordance with the present invention FIG. 39 shows a schematic of the H-Cell Assembly with labels on all the components. FIG. 40 shows the physical H-cell fully assembled.

For the bulk electrolysis experiment, a solution of 0.01 M $[Fe(CN-B(C_6F_5)_3)_6]^{4-}$ is created in 0.1 M $TBA_4BF_4$ in acetonitrile. The $TBA_4BF_4$ functions as the supporting electrolyte while the $[Fe(CN-B(C_6F_5)_3)_6]^{4-}$ is the active complex. The reference electrode used is 0.01 Ag/AgNO$_3$, also in 0.1 M $TBA_4BF_4$ in acetonitrile. The cell is charged and discharged at 100 uA for 16.08 hours each. The current is removed between charge and discharge cycles and the OCV is recorded for an hour.

Figure 41:
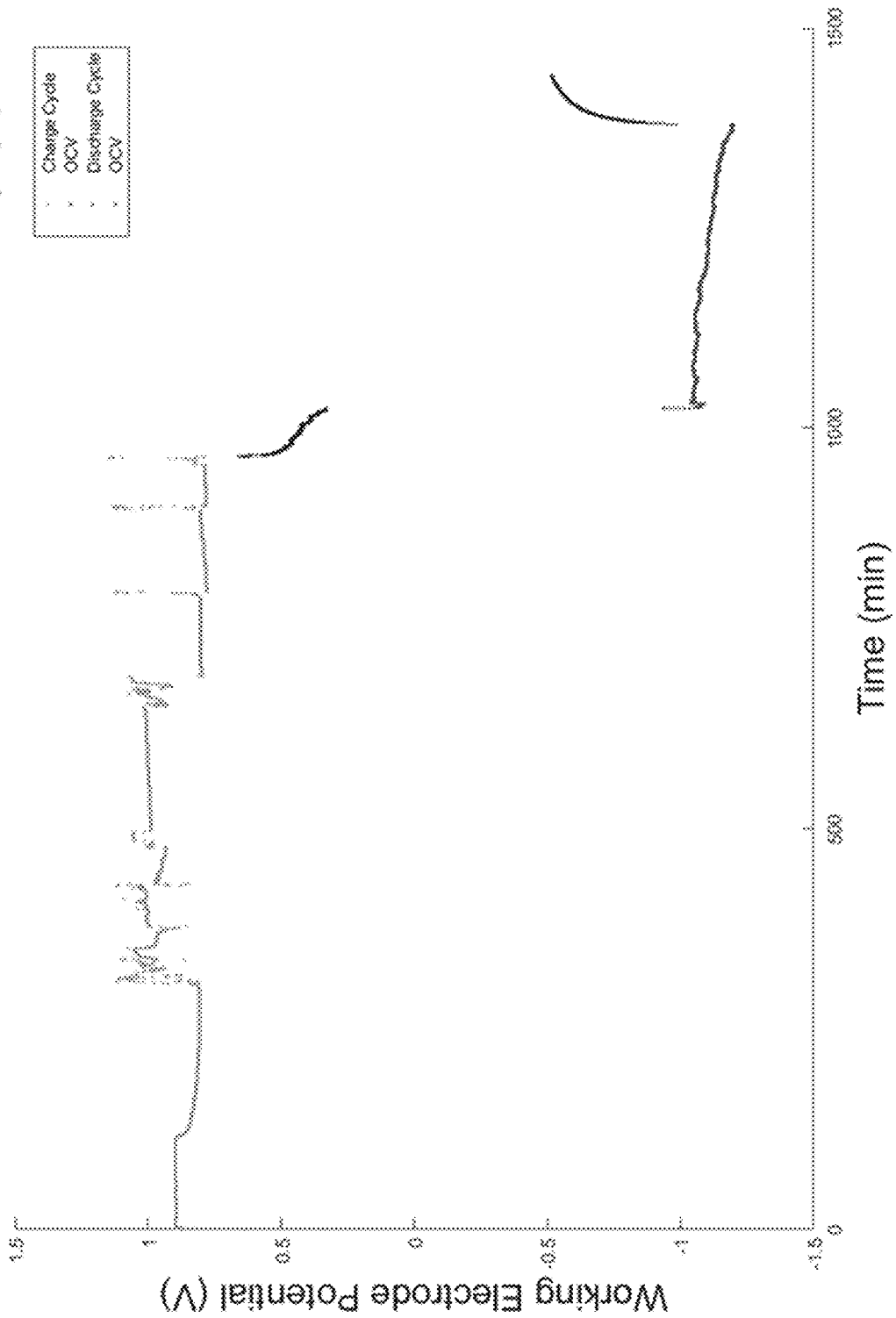
FIG. 41. Electrochemical data from H-Cell experiment. The cell was first charged at 100 uA for 16.08 hours. The current was removed between charge and discharge cycles and the OCV was recorded for an hour. The cell was then discharged at 100 uA, but it reached the −1.2 V potential limit before 16.08 hours had passed. The OCV was then recorded for another hour.

FIG. 41 is electrochemical data from this H-Cell Experiment. The cell is first charged at 100 uA for 16.08 hours. The current is removed between charge and discharge cycles and the OCV is recorded for an hour. The cell is then discharged at 100 uA. It reached a −1.2 V potential before 16.08 hours passed. The OCV is then recorded for another hour.

Figure 42:
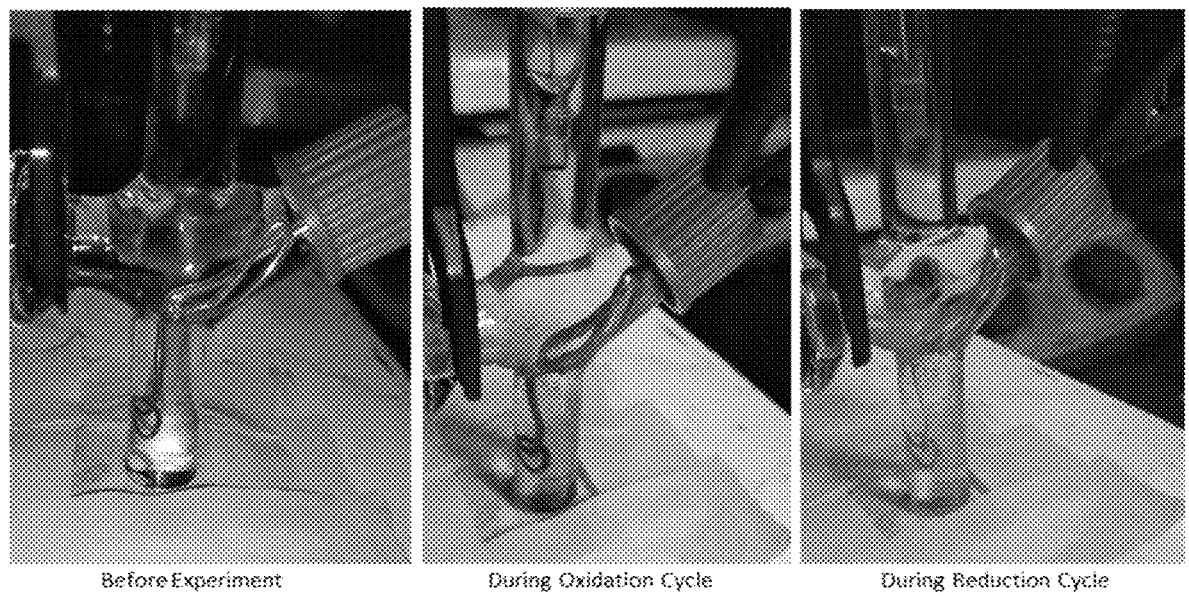
FIG. 42. Images of platinum counter electrode during experiment. Deposits were most apparent during oxidation.

FIG. 42 is images of platinum counter electrode during experiment. Deposits may be most apparent during oxidation.

Figure 43:
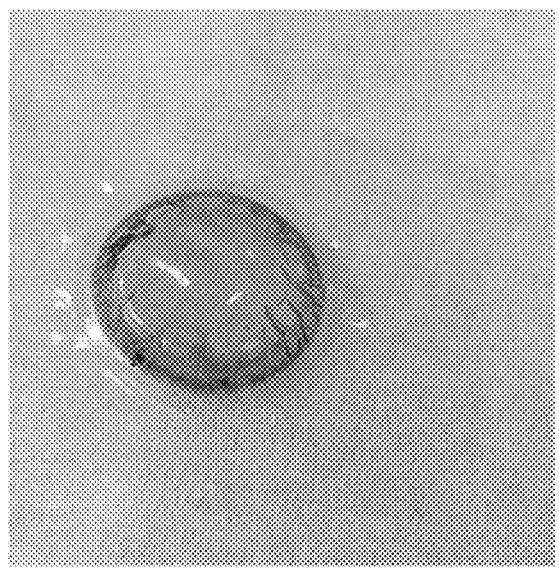
FIG. 43 shows an image of the membrane after the H-Cell experiment. It appeared to have deformed and changed in color, but the central area appeared to be intact.

FIG. 43 shows an image of the membrane after this H-Cell experiment. The central area appeared to be intact.

Figure 44:
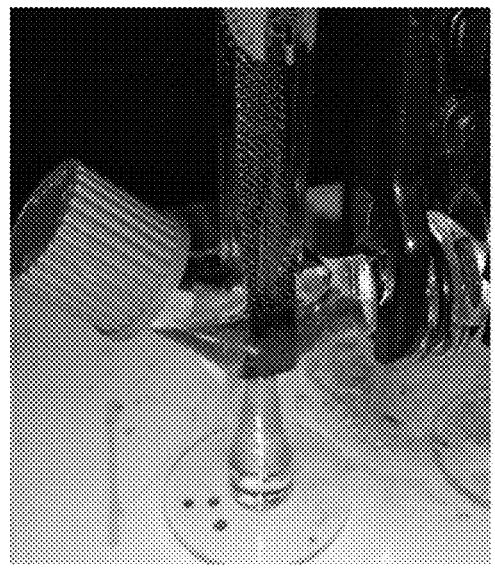
FIG. 44 shows the degradation of the carbon cloth electrode during the experiment. Pieces of the carbon cloth had begun to flake off, perhaps due to the prolonged exposure to the organic solvent.
Figure 45:
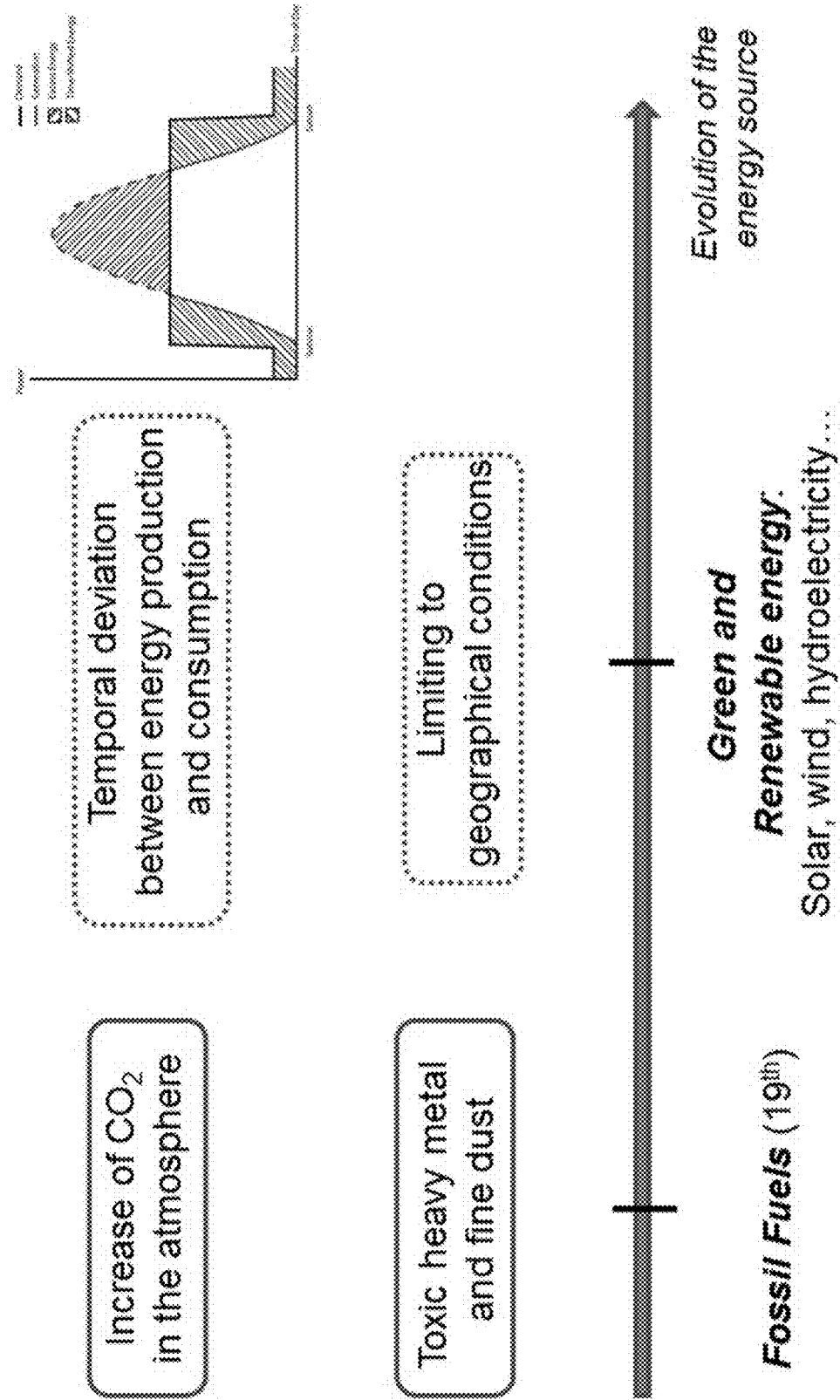
FIG. 45. Illustration of production of electricity and energy demand.

FIG. 44 shows the degradation of the carbon cloth electrode during the experiment. Pieces of the carbon cloth had begun to flake off, perhaps due to the prolonged exposure to the organic solvent.

The charge cycle looked fairly stable for the first few hours. The charge cycle may become unsteady after approximately 5 hours, which, if present, may have be caused by material deposits on the electrode. Deposits may be seen on the platinum wire during the oxidation cycle, but are then redissolved during reduction.

Conclusion

Over the course of this example, several different cell configurations were tested to see whether they would be appropriate for flow battery testing. Of these configurations, the most promising is the H-cell configuration, as it allows for some flow functionality, in that the solutions were constantly stirred, but also prevents severe crossover between cells. The modified fuel cell can also be used as a flow cell. Some ways to do this are to modify the flow pattern so that the solution spends less time in contact with the membrane, thus exerting less pressure. This is likely what caused the high crossover seen in a fuel cell that was used in this example.

REFERENCES CORRESPONDING TO EXAMPLE 5

[1] Steffen, W et al. Planetary boundaries: Guiding human development on a changing planet, *Science,* 13 Feb. 2015:Vol. 347, Issue 6223.
[2] Rosa, E. A and Dietz, T. Human drivers of national greenhouse-gas emissions. NATURE CLIMATE CHANGE, Volume 2, August 2012, pp 581-586.
[3] "Renewable Energy Integration in Power Grids", IRENA Technology Brief E15—April 2015, http://www.irena.org/Publications
[4] G. I. Soloveichik, Chem. Rev., 2015, 115, 11533-11558 (Proposal 1)
[5] A. Z. Weber, M. M. Mench, J. P. Meyers, P. N. Ross, J. T. Gostick, Q. Liu, J. Appl. Electrochem
[6] H. Gray, R. Grubbs, S. Jones. High Performance Inorganic Complexes for Next-Generation Redox Flow Batteries. November 2016. BERN Research Grants Proposal.
[7] Soloveichik, G. et al. Nature 505, 163-165 (2014).
[8] http://www.dow.com/en-us/water-and-process-solutions/markets/chemical-and-petrochemical/catalysis
[9] Bard, A. J., & Faulkner, L. R. (2007). *Electrochemical methods: fundamentals and applications.* Hoboken: John Wiley & Sons.

Example 6—High Performance Inorganic Complexes for Next Generation Redox Flow Batteries Redox flow batteries are becoming increasingly of interest as an energy storage technology, in particular to complement the intermittent power generation cycles characteristic of renewable energy sources such as wind and solar Prior redox-flow technologies have considerable challenges meeting the performance requirements for grid storage applications: (i) for aqueous systems, although water solvent has attractive features in terms of cost and high reactant solubility (above 5 M in many cases), the potential window for operation is severely limited by occurrence of the hydrogen and oxygen evolution reactions, which limits the maximum obtainable voltage and, hence, energy density (<100 Wh/L typical), leading to a high cost per kWh; (ii) for non-aqueous systems, major challenges with implementation of higher-potential inorganic redox couples in this context are the limited reversibility of the redox couple due to side-reactions (which leads to low efficiencies), and the low solubility of the metal complex (which results in low effective energy density; most simple inorganic complexes are <1 M). Hence, there is a need for non-aqueous redox flow batteries with high operating potentials, stability to repeated charging and discharging, and higher energy densities.

We disclose the use of novel inorganic complexes (outer-sphere metal coordination complexes) that are inexpensive, highly soluble in common organic solvents, and extremely stable in both oxidized and reduced forms to give redox couple pairings that can be cycled at potentials above 3 V in non-aqueous solvents. The redox flow batteries of the present invention can have energy densities at around 160 Wh/L, for an active material (catholyte, anolyte) concentration of 2 M and an operating potential of 3 V.

Figure 67:
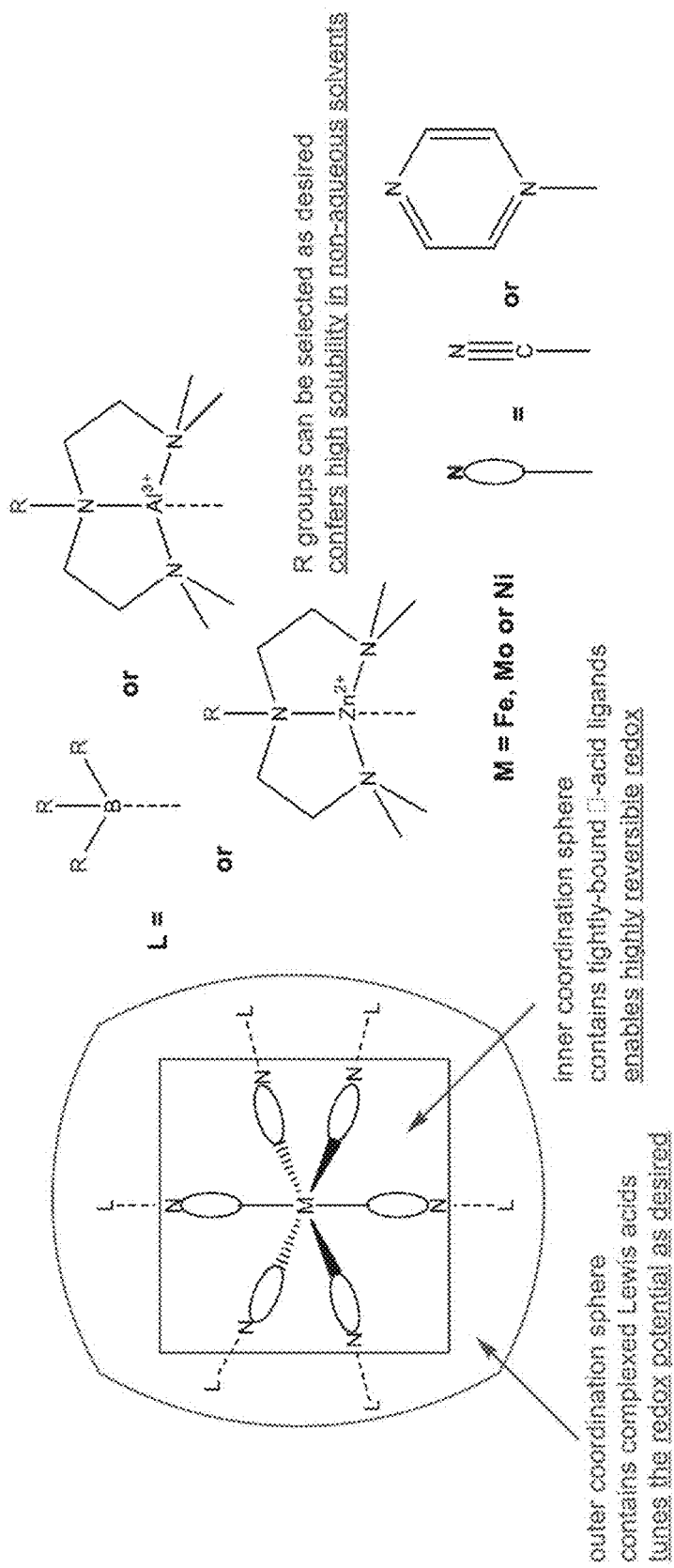
FIG. 67 is a schematic of showing some embodiments of the metal-coordination complexes disclosed herein.
Figure 68:
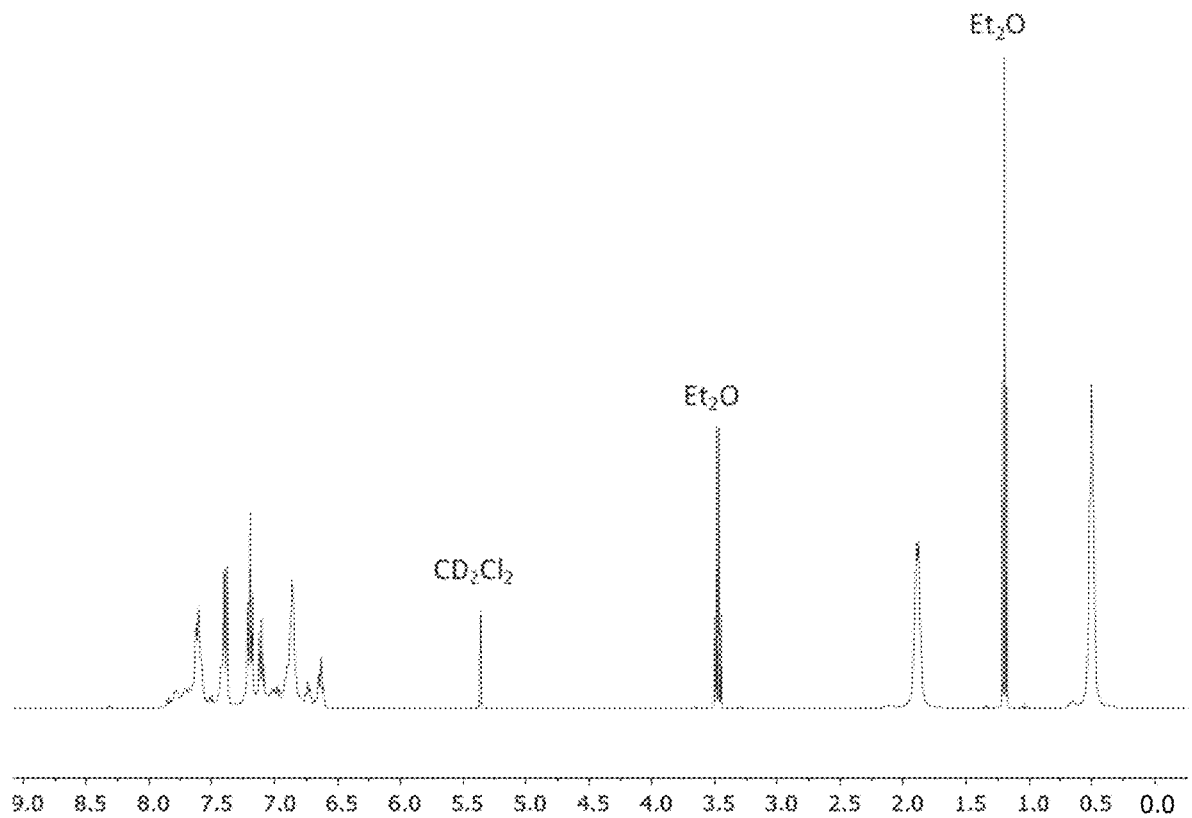
FIG. 68 is an $^1H$ NMR spectrum corresponding to $[Fe(CNBPh_3)_6][TEA]_4$.
Figure 69:
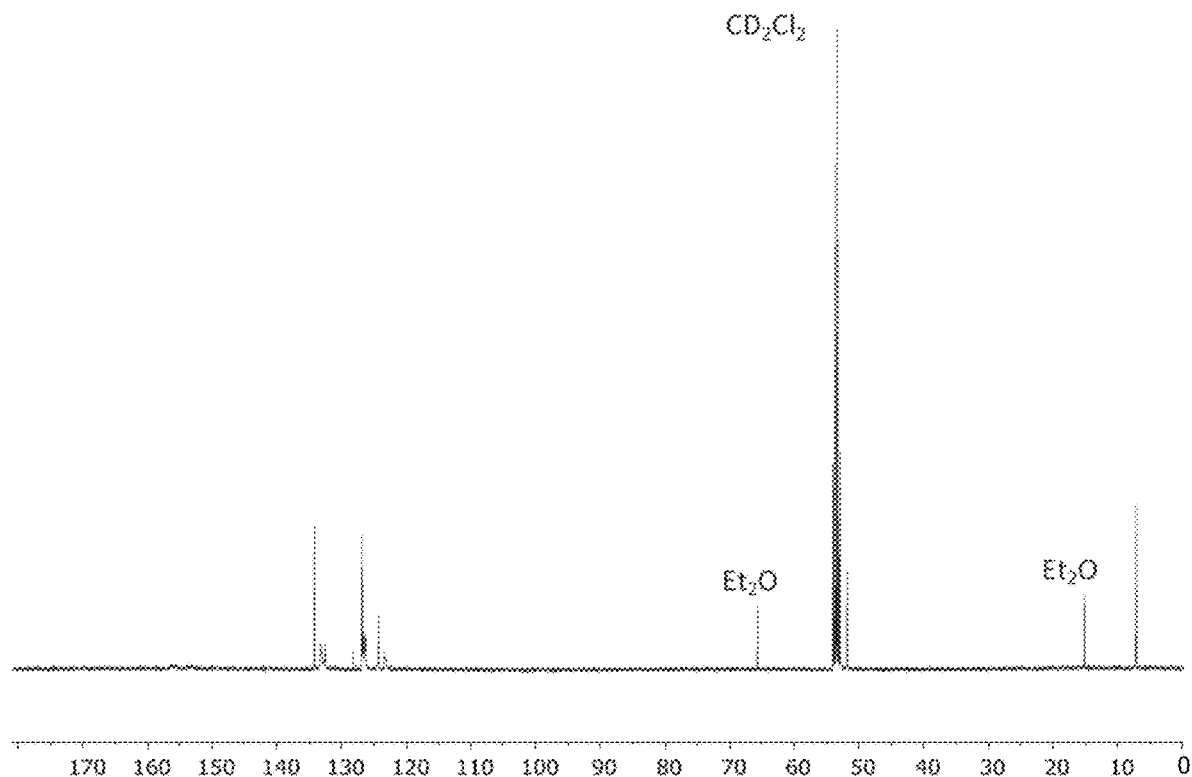
FIG. 69 is an $^{13}C$ NMR spectrum corresponding to $[Fe(CNBPh_3)_6][TEA]_4$.

FIG. 67 shows exemplary embodiments of the metal-coordination complexes in accordance with the present invention. As shown in FIG. 67, the metal-coordination complex has a central metal atom or ion, such as Fe, Mo, or Ni, with a primary coordination sphere and a secondary coordination sphere. The primary coordination sphere has primary ligands, associated (e.g., coordinated) with the central metal atom or ion. The primary ligands are, for example, Lewis basic ligands such as a nitrogen, a cyano group, or a pyridyl group. The secondary coordination sphere has secondary ligands associated (e.g., coordinated) with primary ligands. The secondary ligands are, for example, an organoborane ligand or a metal-triamine complex.

The metal-coordination complexes of the present invention may bear the same charge type (positive or negative) in both their reduced and oxidized forms in both the anolyte and catholyte. This inhibits crossover between anode and cathode reactant materials through the separator in a full cell, which leads to loss in Coulombic efficiency and limits in useful lifetime. Crossover can be limited through two approaches: (i) using redox-active species that are large compared to the separator pore size (which is most likely the case for our outer-sphere complexes); and (ii) incorporation of functional groups of the same charge as the active species into the separator structure (similar to an ion-exchange membrane), which repel the active species and keep them confined to a particular reactant chamber We have demonstrated the behavior of the ferricyanide couple $Fe(CN)_6^{3-/4-}$ (as the tetraethylammonium salt, $[Et_4N]_4[Fe(CN)_6]$) in dichloromethane upon titration of successive amounts (up to 6 equivalents) of triphenylborane ($BPh_3$).

Figure 70:
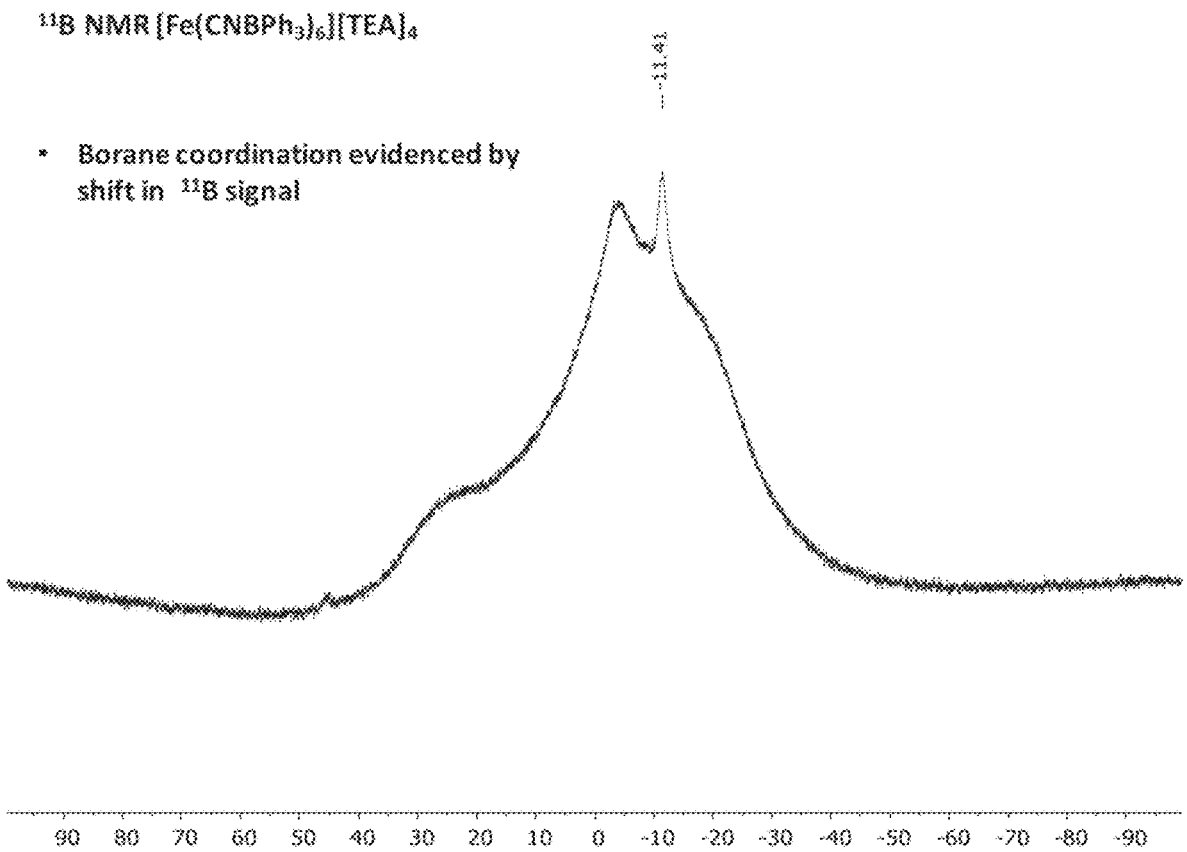
FIG. 70 is an $^{11}$B NMR spectrum corresponding to [Fe(CNBPh$_3$)$_6$][TEA]$_4$.
Figure 71:
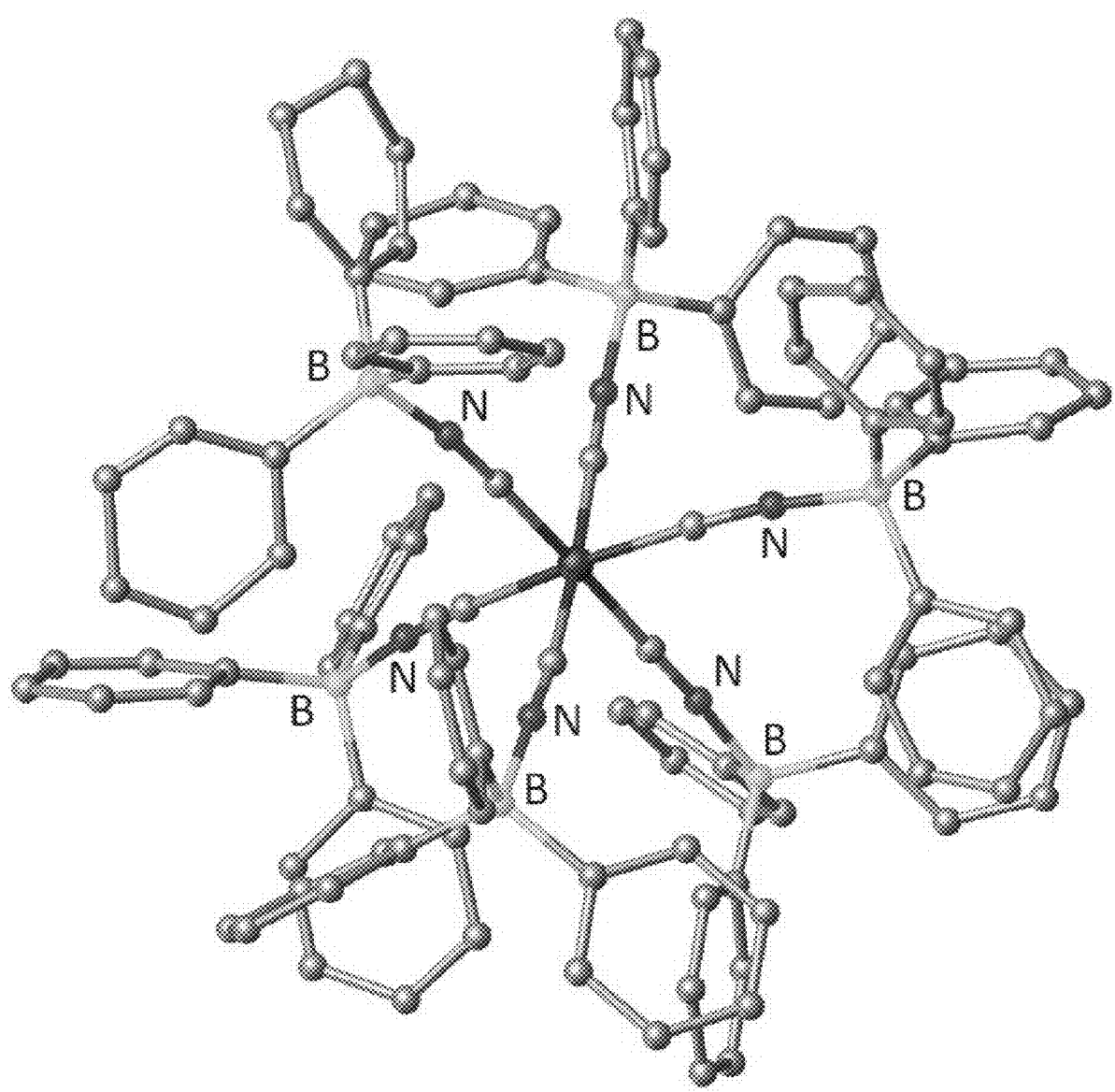
FIG. 71 is a chemical structure corresponding to [Fe(CNBPh$_3$)$_6$][TEA]$_4$ with each TEA and hydrogen omitted.
Figure 74A:
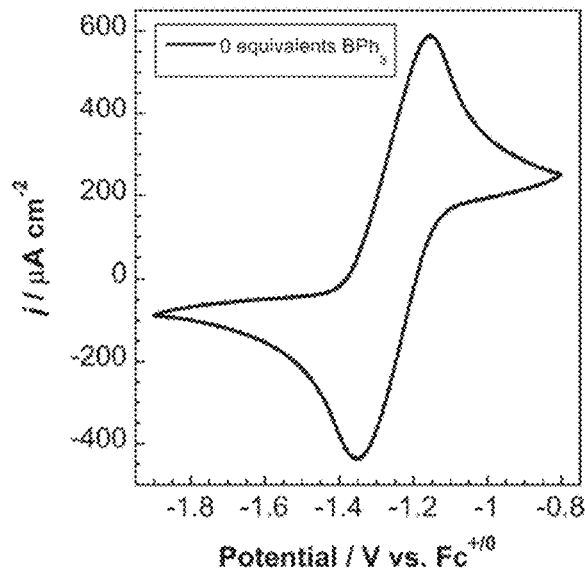
FIGS. 74A, 74B, 74C, and 74D are cyclic voltammetry plots corresponding to [Fe(CN)$_6$][TEA]$_4$ with 0, 0.5, 1, and 2 equivalents of BPh$_3$ as secondary ligands.
Figure 74B:
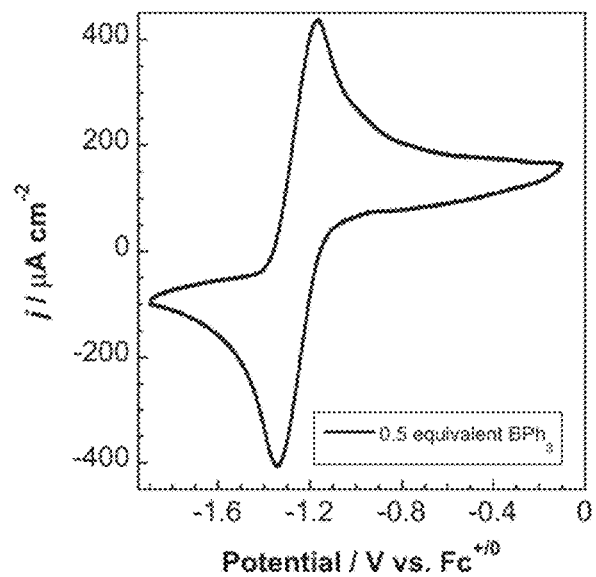
Figure 74C:
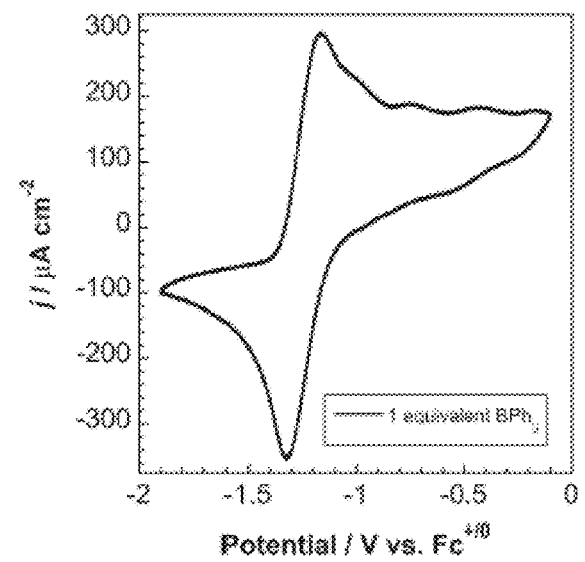
Figure 74D:
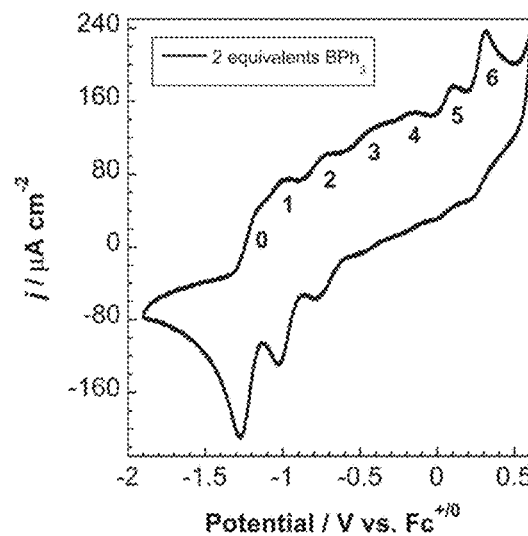
Figure 75:
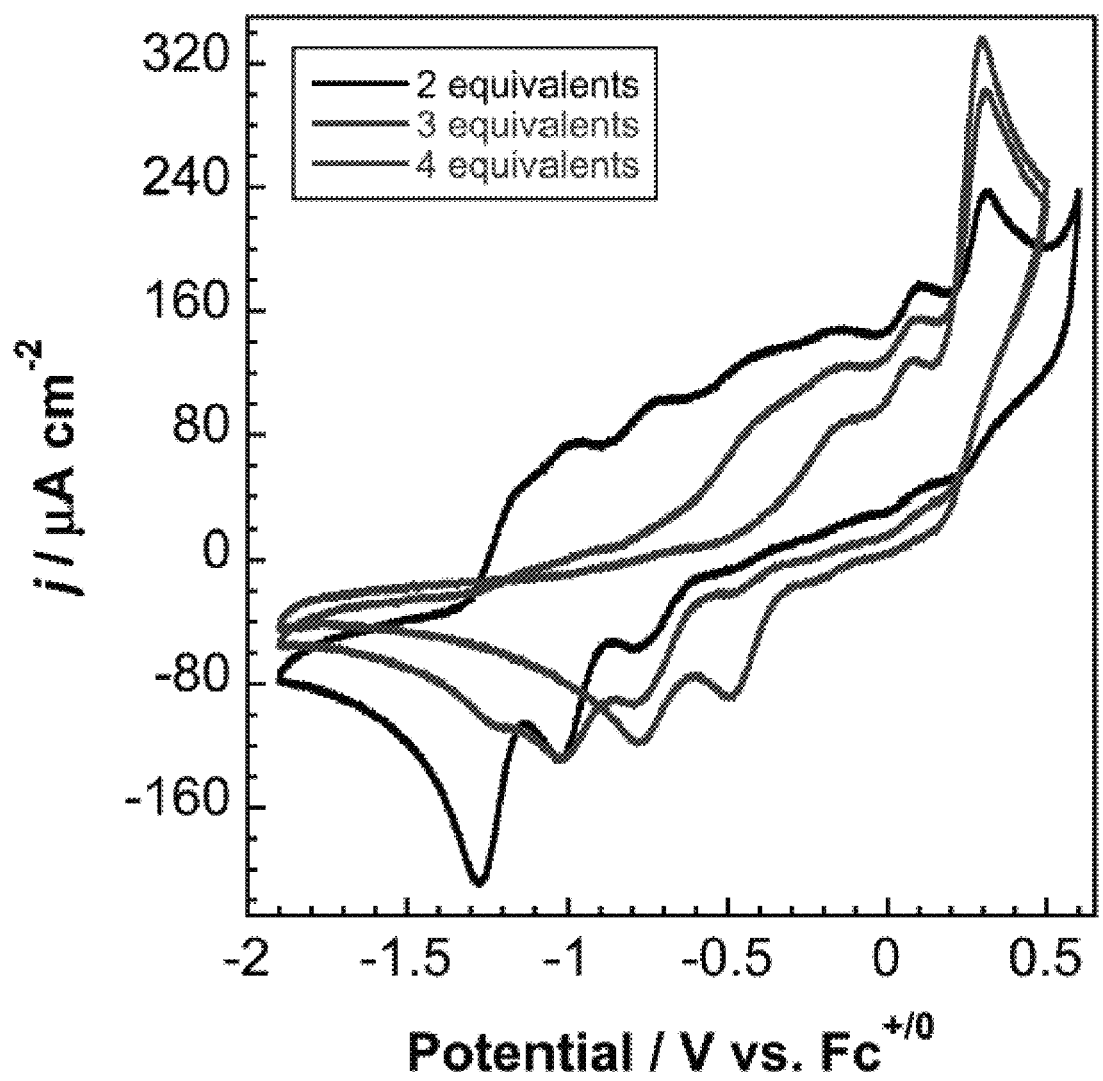
FIG. 75 is a plot of cyclic voltammetry corresponding to [Fe(CN)$_6$][TEA]$_4$ with 2, 3, and 4 equivalents of BPh$_3$ as secondary ligands. The cis/trans and fac/mer isomers result in broader and less intense peaks for 2 and 3 boranes, as secondary ligands. Gradual diminishing of more negative peaks is observed as more borane equivalents are added.
Figure 76:
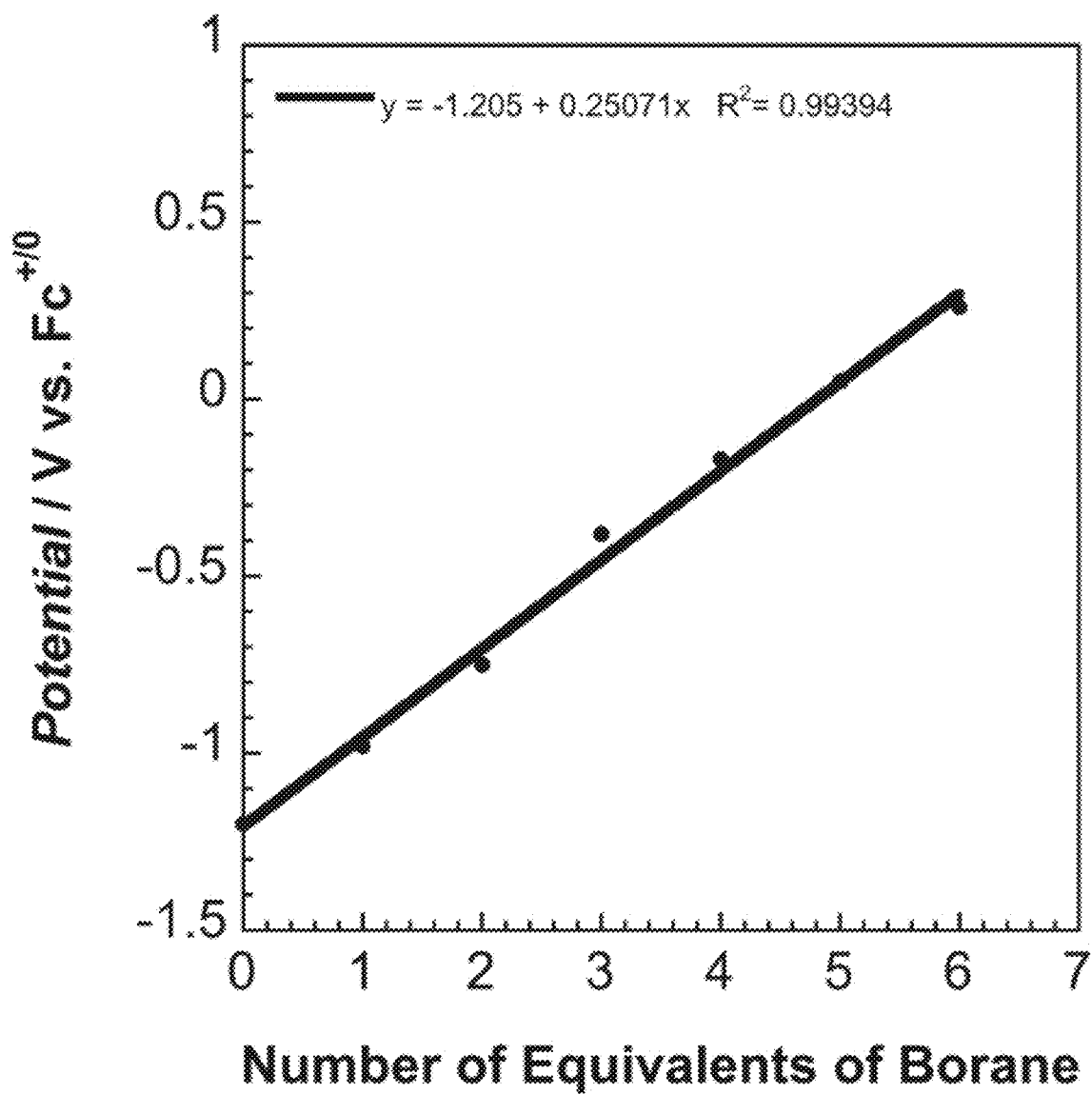
FIG. 76 is a plot showing potential (V vs. Fc$^{+/0}$) as a function of equivalents of BPh$_3$ as secondary ligands added to [Fe(CN)$_6$][TEA]$_4$. This data demonstrates that the redox potential shift, per secondary ligand, of some metal-coordination complexes is greater when pentrafluorophenylborane is used as secondary ligand(s) than when triphenylborane is used as the secondary ligand(s).
Figure 78:
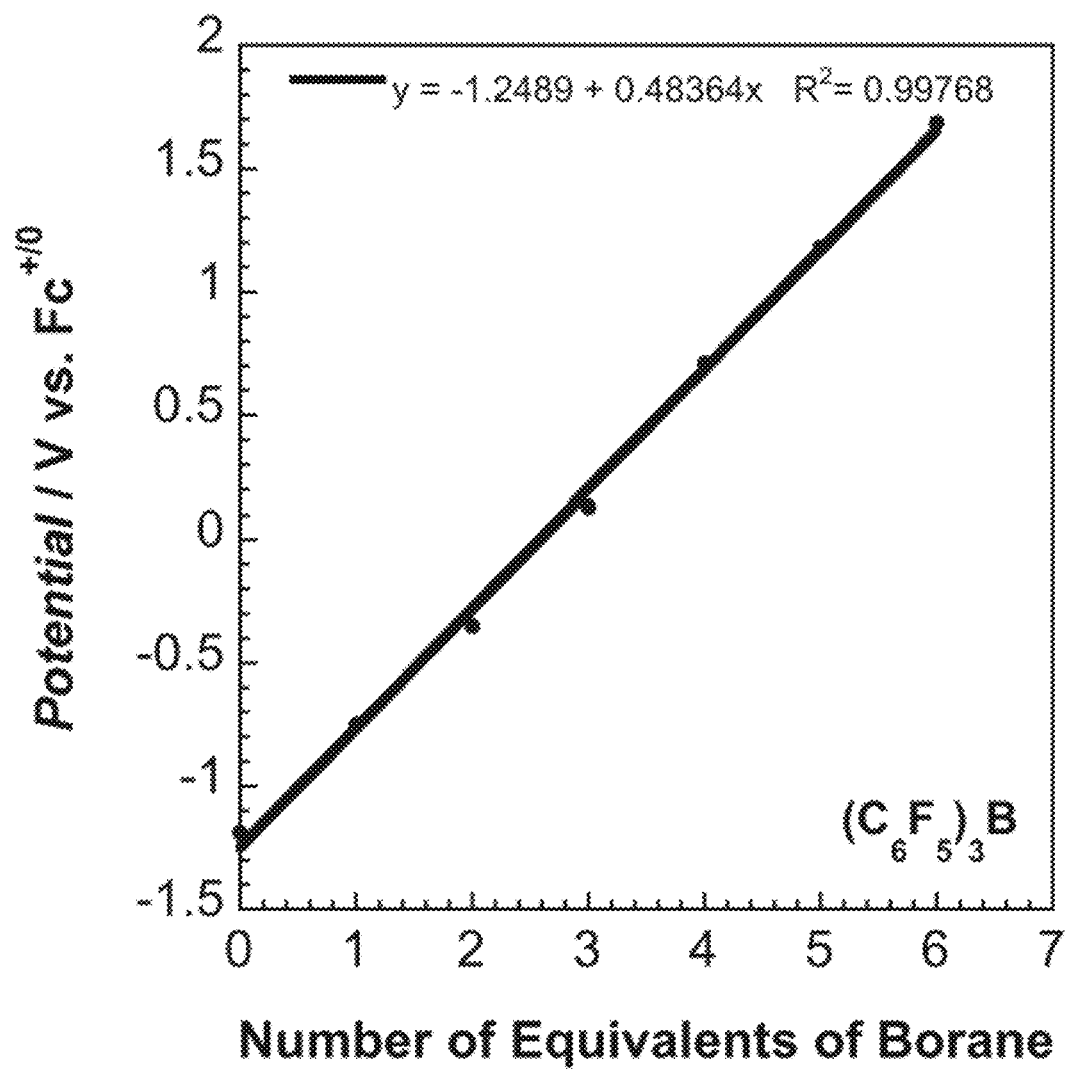
FIG. 78 is plot similar to FIG. 76 except where B(C$_6$F$_5$)$_3$ is used as each secondary ligand instead of BPh$_3$.

$^{11}B$ NMR experiments confirm that $BPh_3$ binds to the nitrogen groups of the cyano complex (e.g., see FIG. 70).

Cyclic voltammetry studies show (e.g., FIG. 72) that the redox potential of $Fe(CN)_6^{3-/4-}$ is shifted by approximately +1.5 V upon coordination of six $BPh_3$ groups (to give $[Fe(CN)_6 \cdot (BPh_3)_6]^{4-}$ in solution).

The cyclic voltammetry response is identical across five cycles, providing preliminary evidence for the reversibility of these outer-sphere redox complexes.

The potential of the complex may be tuned in a predictable manner by suitable choice of coordinating group and stoichiometry.

An ion-exchange separator with same charge as both the catholyte and anolyte may be used in redox flow batteries integrated device.

Example 7—Additional Examples and Data

Aqueous flow batteries are limited by the relatively narrow voltage window of water (1.23 V). Greater potential ranges are afford by use of by non-aqueous flow batteries. Difficulties of nonaqueous flow batteries (NAFB) include: low active material solubility, active material crossover, active materials having precious metals (cost), and low electrochemical irreversibility. Benefits of NAFB include: high electrochemical reversibility, consistent energy delivery, high power density, and customizable (stack design, pump size, tank capacity, etc.)

Figure 47:
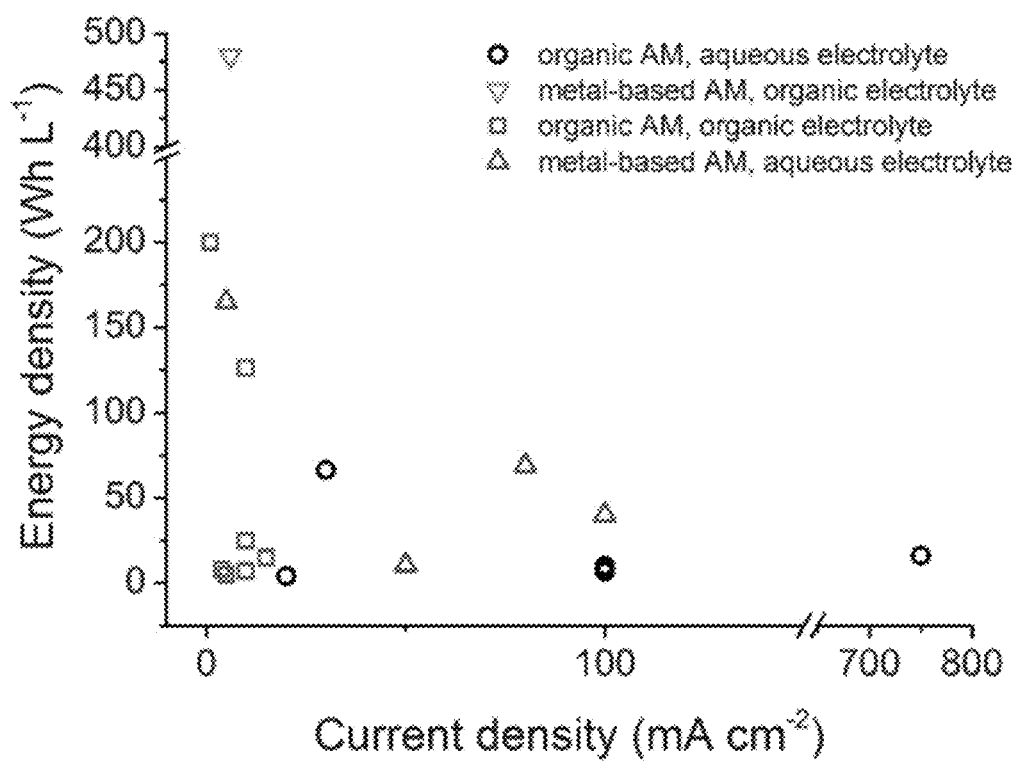
FIG. 47 is a plot of energy density vs. current density and shows an L-shaped diagram demonstrating limitations of current flow battery technologies (FBs).

FIG. 47 is a plot of energy density vs. current density and shows an L-shaped diagram demonstrating limitations of current flow battery technologies (FBs). Many FBs have metal-based redox couples dissolved in aqueous media, but an increasing number of organic redox couples are starting to be used in flow batteries. Organic solvents have wider potential windows. Conductivity in organic solvents is lower, however, limiting applicable current densities. The loss to performance can be mitigated by a higher voltage. Some organic materials are soluble in water, particularly if the molecule contains polar substituents. Energy density may be restricted for organic materials in water, though.

Metrics and equations for improving flow batteries are considered in this example. Energy density is increased with higher solubility, larger stoichiometry of electrons transferred, and voltage difference. Current density is increased with faster electrode kinetics, lower membrane resistance, and lower viscosity of electrolyte. Lifetime of the battery is increased with highly reversible redox couples. Overall efficiency of the battery is increased by expanding the temperature range.

Volumetric capacity is the amount of charge that can be stored in a given amount of solvent:

$$\text{Volumetric Capacity}(C) = \frac{m \times n \times F}{M \times V}$$

Energy Density $= C \times U$

Figure 48:
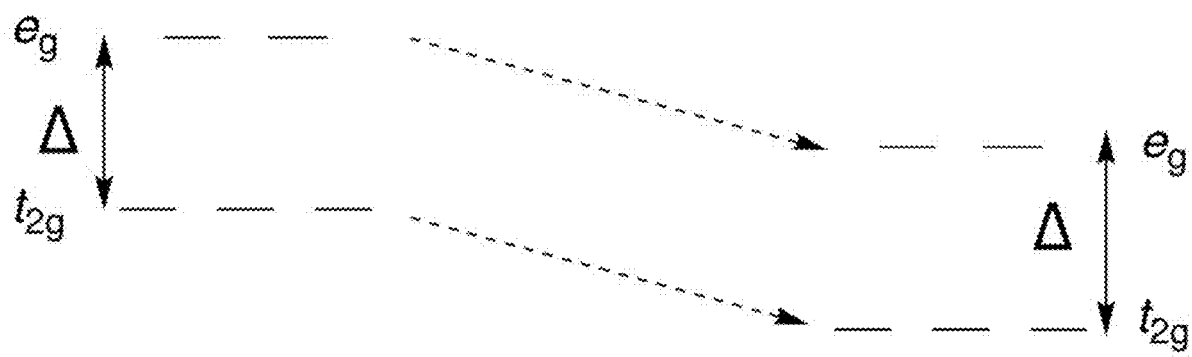
FIG. 48 illustrates a ligand field diagram for a metal-coordination complex (metal)-$CNBR_3$, where M may be Fe for example.

Energy Efficiency $= \eta_c \times \eta_V$ Diffusion, polarization, and ohmic over-potential affect VE FIG. 48 illustrates a ligand field Diagram for a metal-coordination complex (metal)-$CNBR_3$. In metal-coordination complexes such as $M(CN-BR_3)$, where M may be Fe for example, sigma bonding may be decreased and pi backbonding may be increased. A large change in absolute energies and small change in relative energies results in large anodic shifts in potential.

Figure 49:
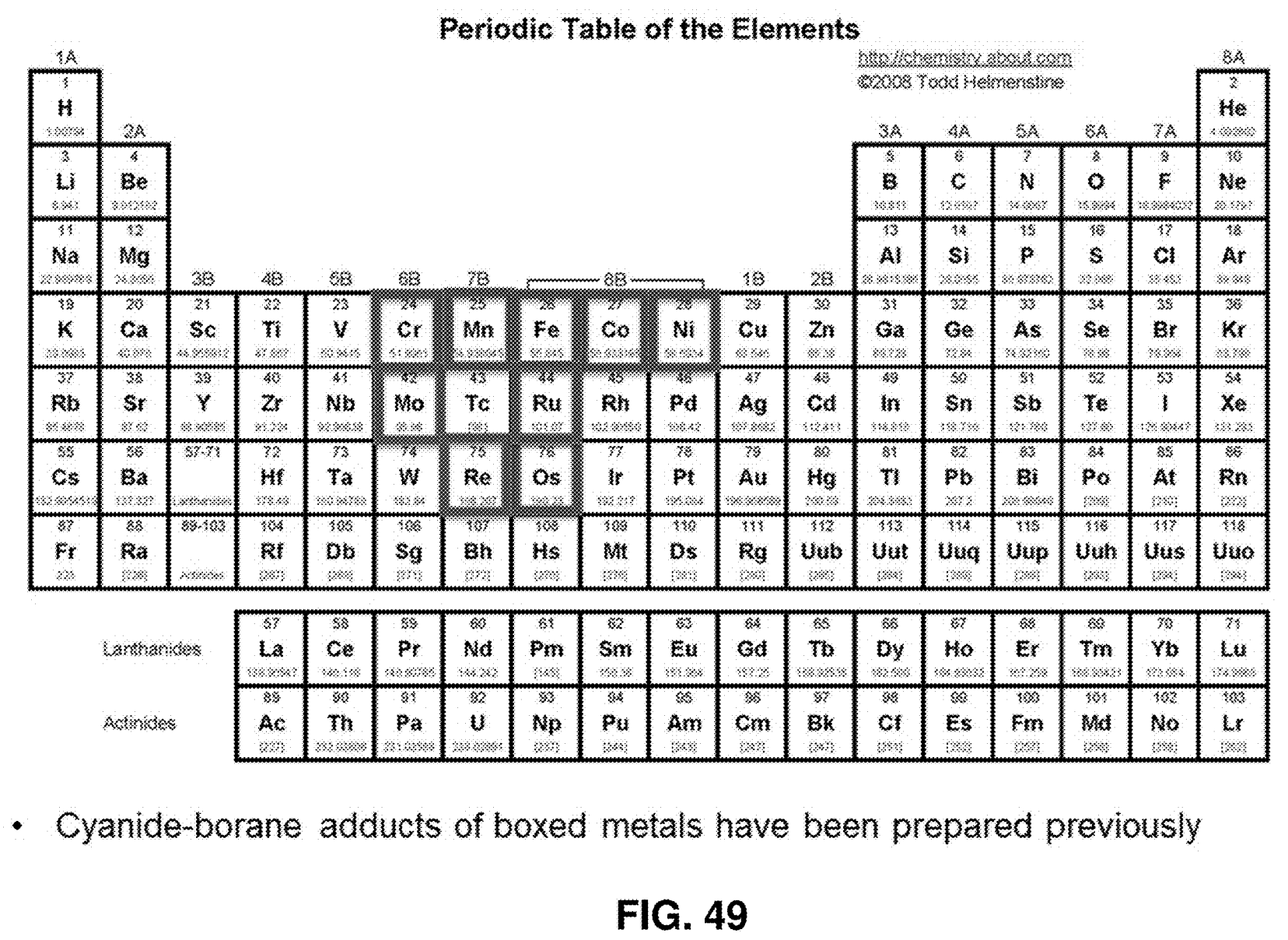

FIG. 49 shows a periodic table of elements where highlighted are exemplary metal elements which may be used in the metal-coordination complexes, such as cyano-borane containing metal-coordination complexes, in accordance with the present invention.

I. Hexacyanoferrate Adducts

Figure 50:
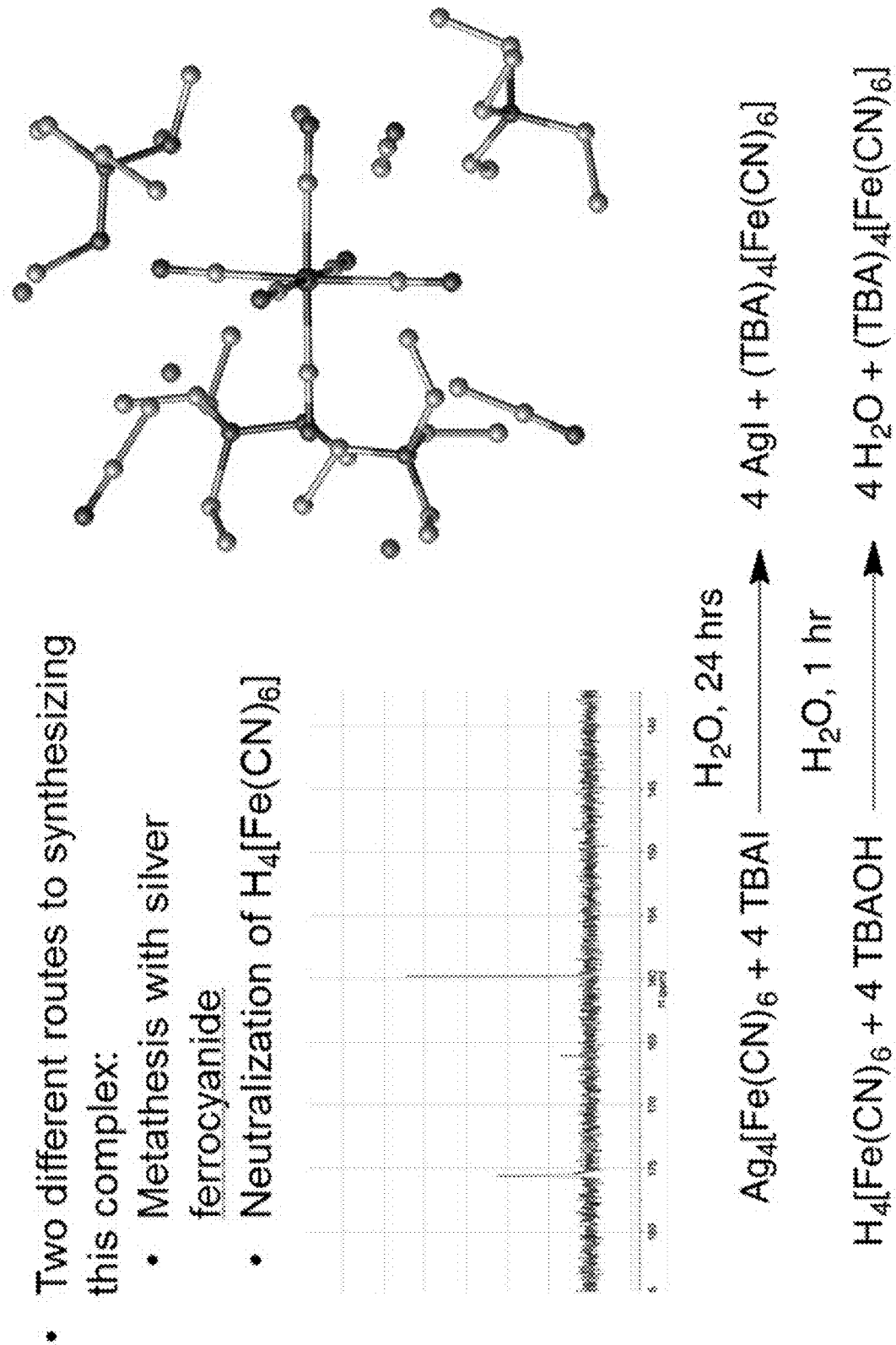
FIG. 50. Exemplary synthesis processes for $(TEA/TBA)_4[Fe(CN)_6]$.

Two exemplary method for synthesizing $[TEA]_4[Fe(CN)_6]$ and $[TBA]_4[Fe(CN)_6]$ are: metathesis with silver ferrocyanide and neutralization of $H_4[Fe(CN)_6]$. These processes are illustrated in FIG. 50.

Determined crystal structure confirms coordinative saturation of ferrocyanide with $BPh_3$ in $[TEA]_4[Fe(CN-BPh_3)_6]$ (see FIG. 51). Voltammetry of synthesized complex matches voltammetry with added equivalents (see FIG. 51).

Figure 52:
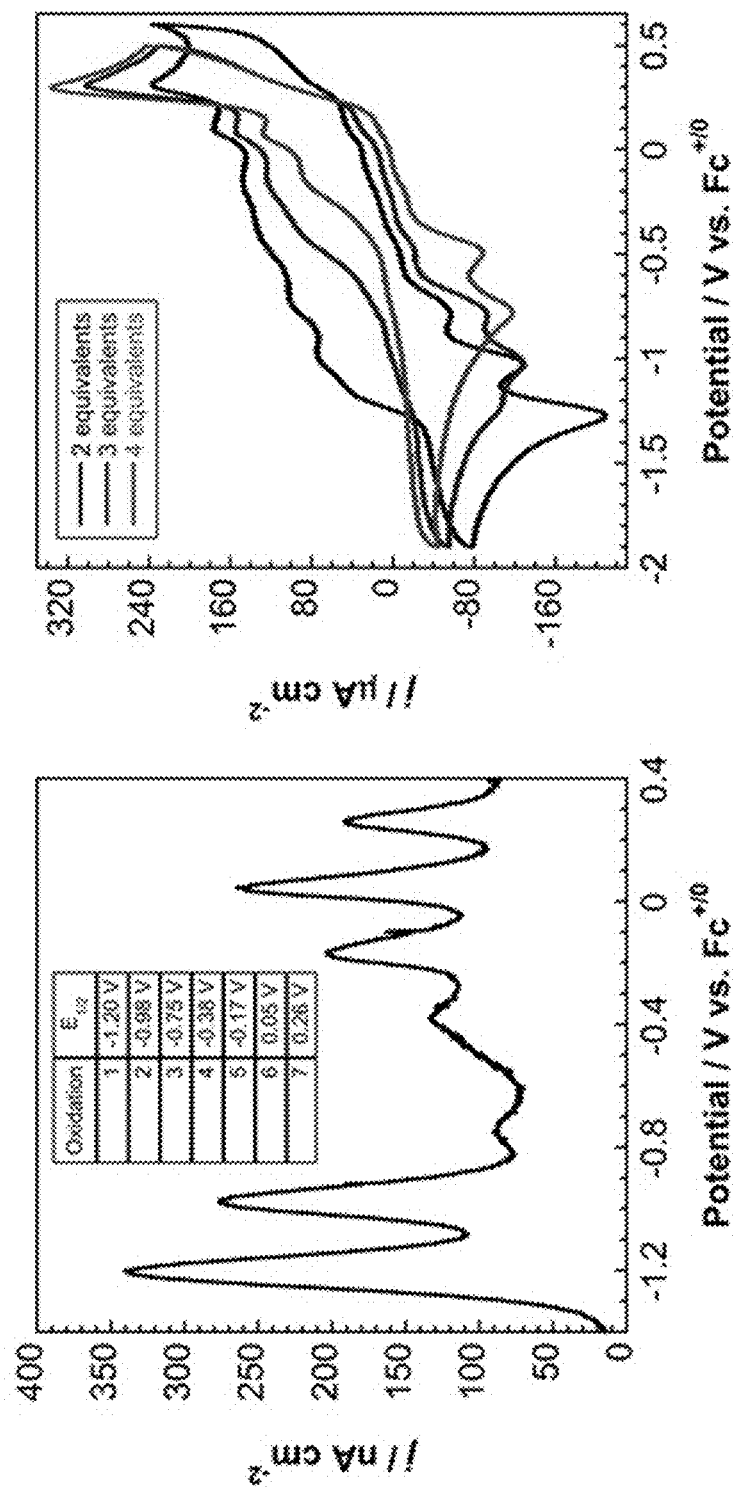
FIG. 52. Voltammetry corresponding to $(TEA)_4[Fe(CN)_6]$ in DCM with $BPh_3$ added stoichiometrically. Left panel corresponds to differential pulse voltammetry data.

FIG. 52 shows voltammetry data corresponding to $(TEA)_4[Fe(CN_6]$ in DCM with $BPh_3$ secondary ligands added stoichiometrically. In the differential pulse voltammetry (left panel) 7 resolved peaks are observed. The cis/trans; fac/mer isomers result in broader, less intense peaks for 2 and 3 borane equivalents added. Gradual diminishing of more negative peaks is observed as more borane (secondary ligand) equivalents are added.

Figure 53:
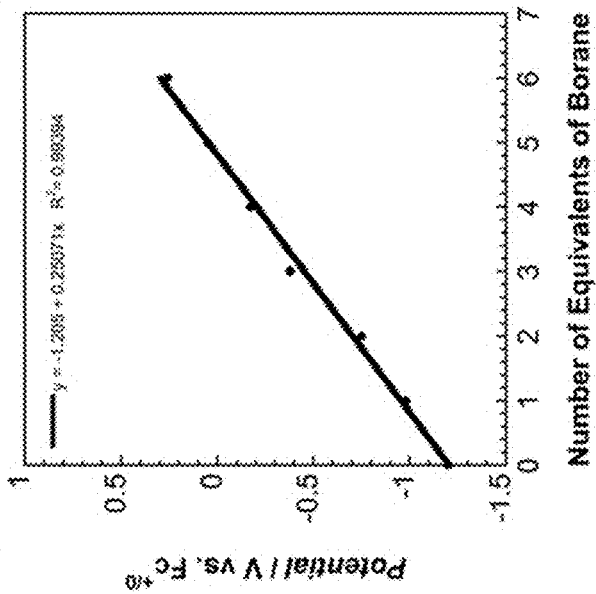
FIG. 53. Voltammetry data corresponding to $(TEA)_4[Fe(CN)_6]$ in DCM with $BPh_3$ added stoichiometrically.

FIG. 53 shows a table and chart summary of the voltammetry corresponding to $(TEA)_4[Fe(CN_6]$. A linear potential shift (e.g., 250 mV per ligand) is observed as additional secondary ligands are added to the metal-coordination complex.

FIG. 54 describes an exemplary synthesis method of the metal-coordination complex $(TBA)_4[Fe(CN-B(C_6F_5)_3)_6]$, where TBA are tetrabutylammonium counter ions.

Figure 55:
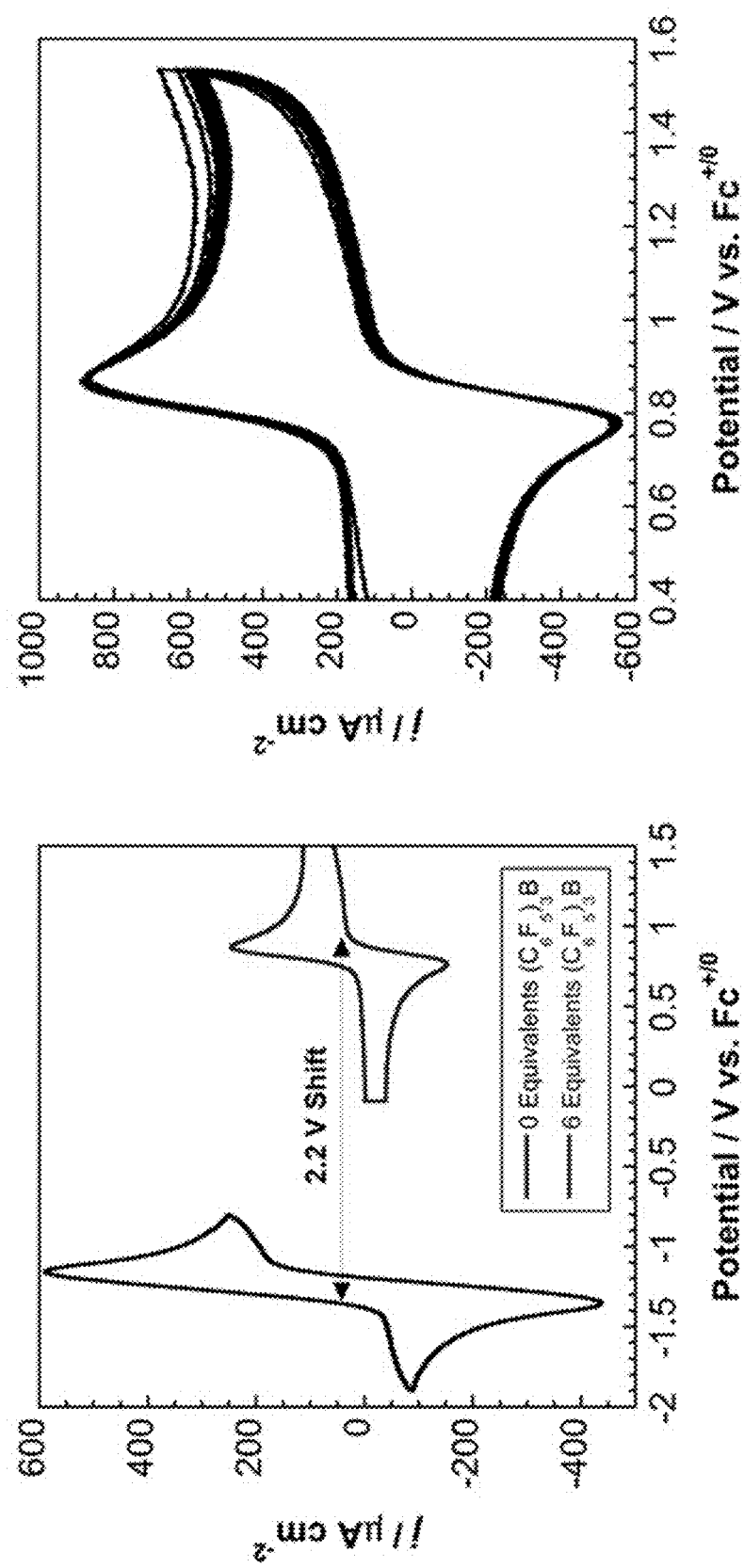
FIG. 55. Cyclic voltammetry data corresponding to $(TBA)_4[Fe(CN-B(C_6F_5)_3)_6]$.

FIG. 55 shows cyclic voltammetry data corresponding to $(TBA)_4[Fe(CN-B(C_6F_5)_3)_6]$. The potential corresponding to six-coordinate (coordination number of 6) species gives a potential shift per borane (per secondary ligand) of 350 mV. Reversible reduction wave with $\Delta E=80$ mV is observed. A total shift in potential $E_{tot}=+2.23$ V is also observed.

Figure 56:
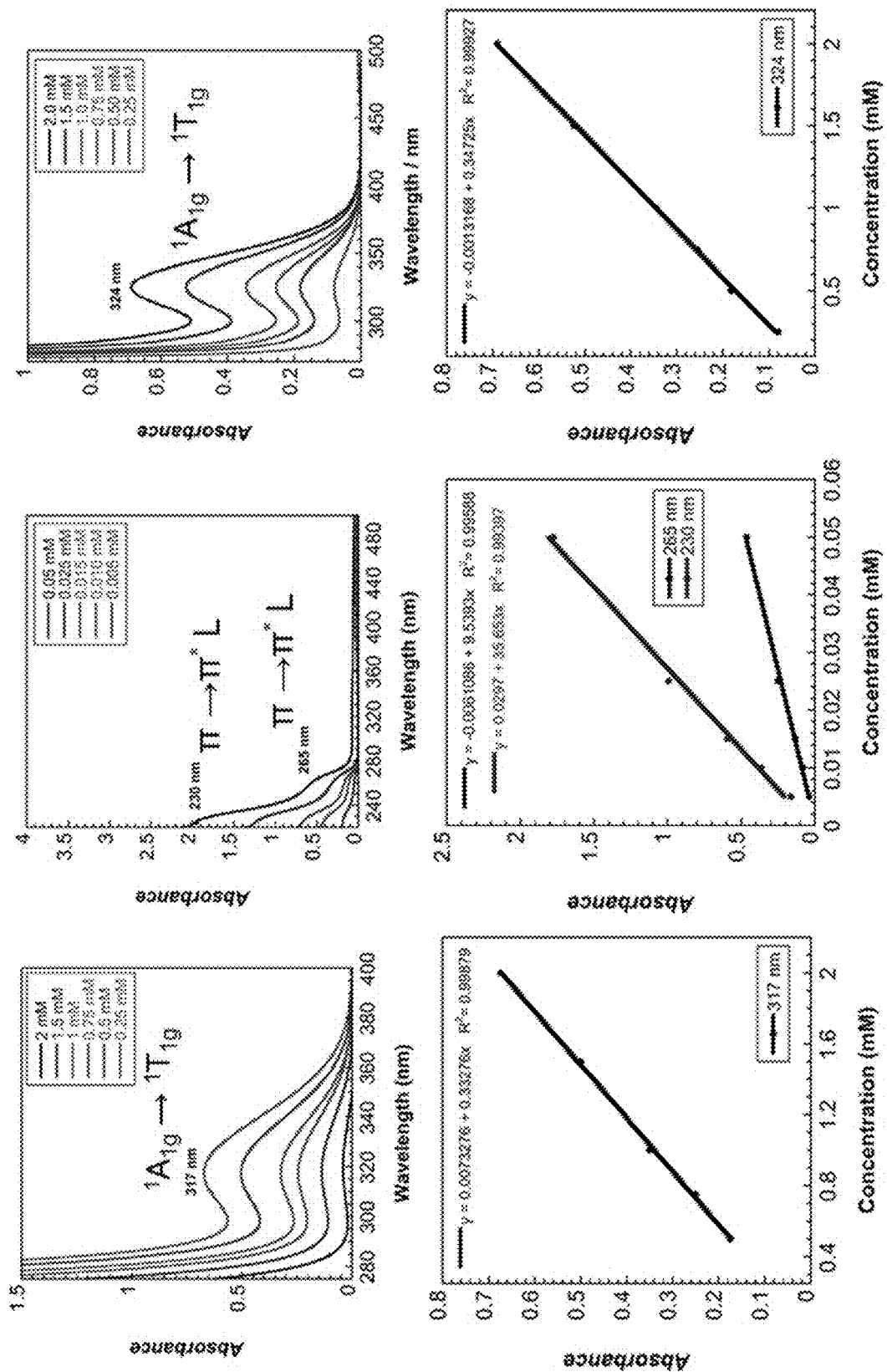
FIG. 56. Absorbance data corresponding to $(TEA)_4[Fe(CN-BPh_3)_6]$ (right panels) and $(TBA)_4[Fe(CN-B(C_6F_5)_3)_6]$ (middle & left panels). The absorbance data is shown for different concentrations of the metal-coordination complex(es). Certain optical transitions in the metal-coordination complex(es) are labeled.
Figure 57:
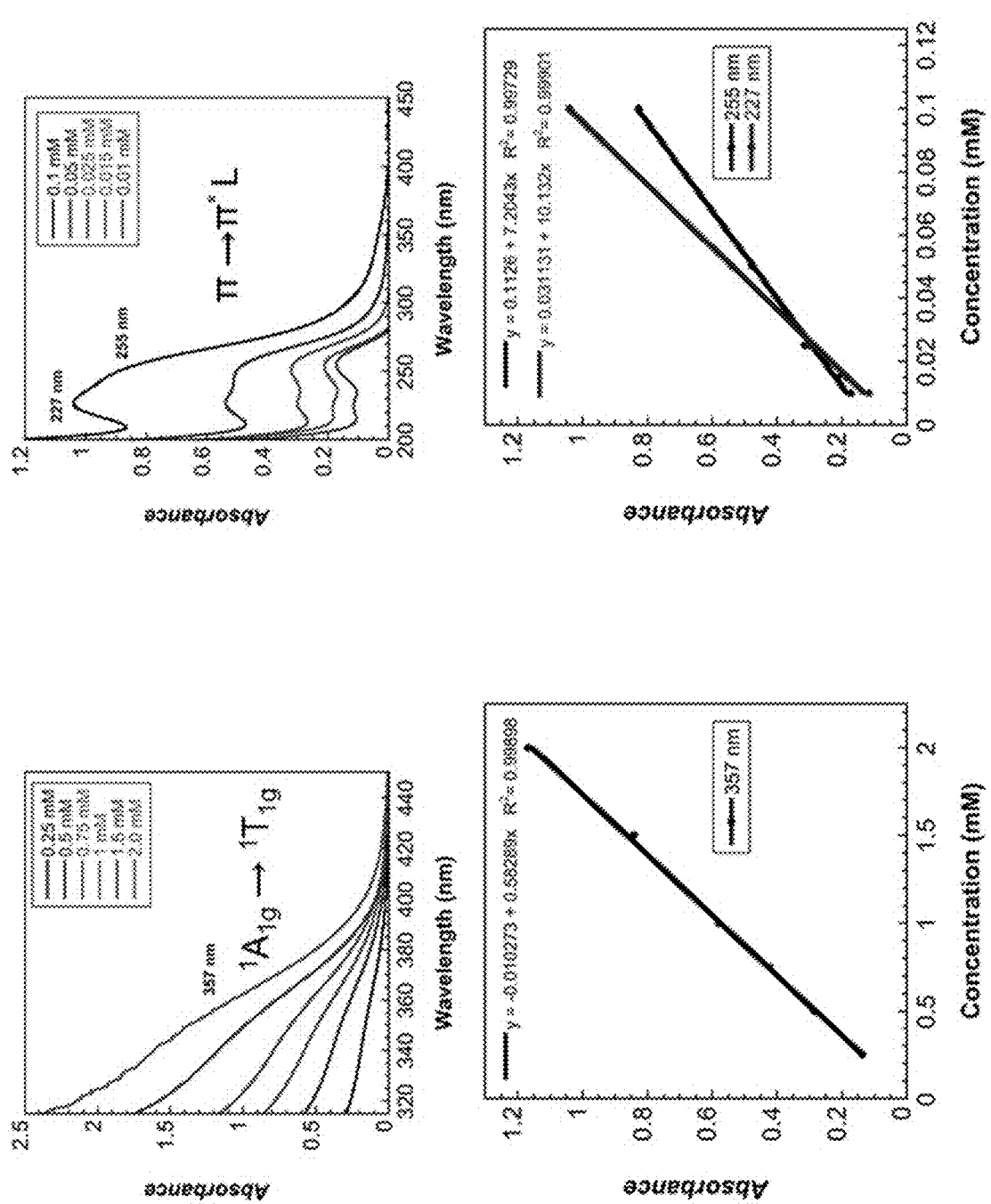
FIG. 57. UV-Vis absorbance spectra corresponding to $(TEA)_4[Fe(CN)_6]$. The absorbance data is shown for different concentrations of the metal-coordination complex(es). Certain optical transitions in the metal-coordination complex(es) are labeled.
Figure 58:
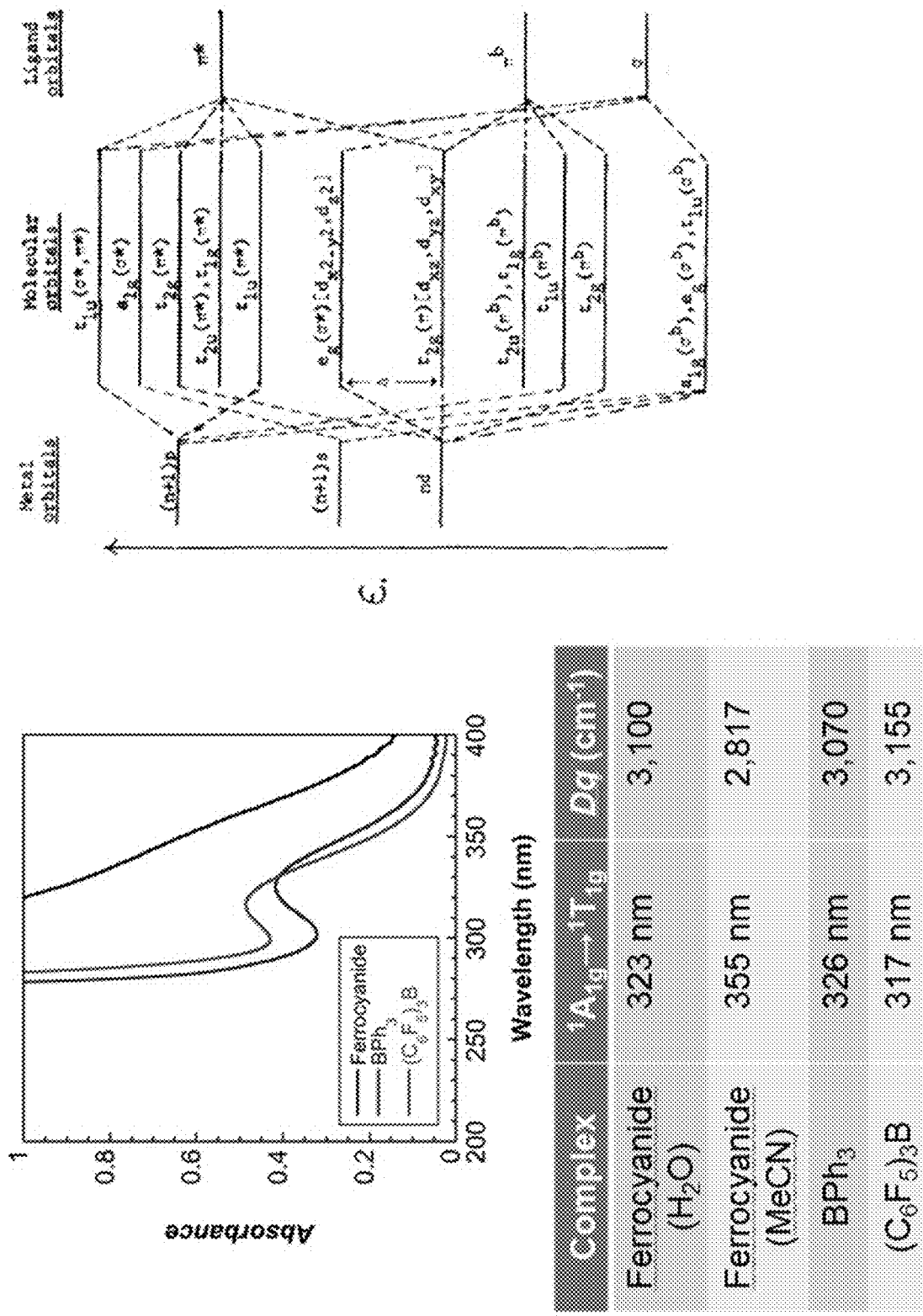
FIG. 58. UV-Vis absorbance spectra corresponding to borane adducts and comparative species.

The panels of FIG. 56 show absorbance data corresponding to $(TEA)_4[Fe(CN-BPh_3)_6]$ (right panels) and $(TBA)_4[Fe(CN-B(C_6F_5)_3)_6]$ (middle & left panels). The panels of FIG. 57 show additional absorbance data corresponding to $(TEA)_4[Fe(CN-BPh_3)_6]$. Absorbance data is shown for different concentrations of the complex and certain absorbance peaks corresponding to certain transitions are labeled. The panels of FIG. 58 summarize particular aspects of the absorbance data corresponding to ferrocyanide in water, ferrocyanide in acetonitrile, $BPh_3$, and $B(C_6F_5)_3$.

Figure 59:
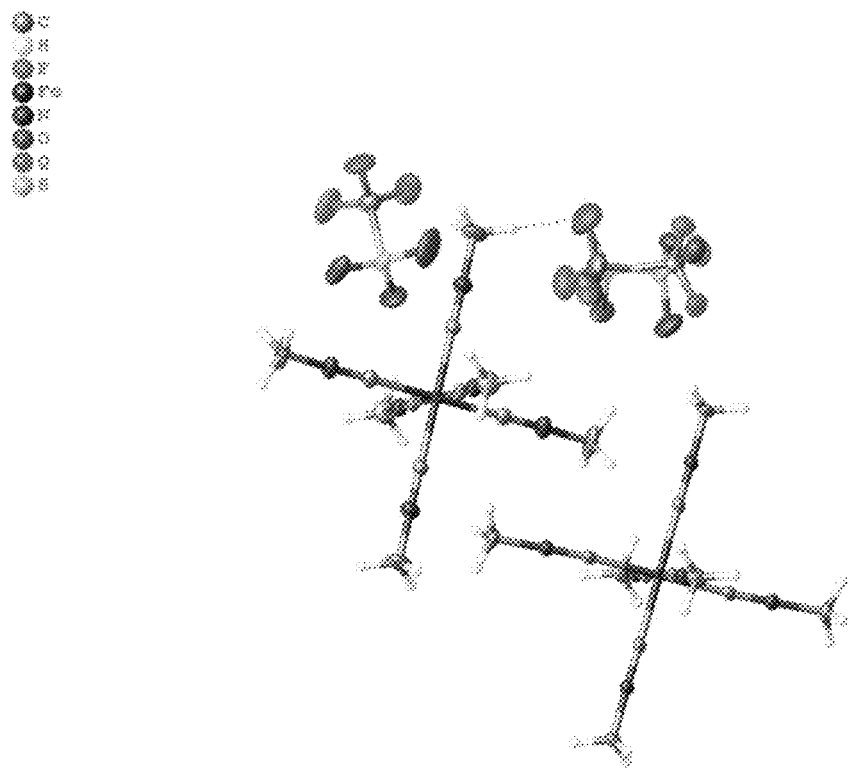
FIG. 59 shows a chemical structure corresponding to $[(Me-NC)_6Fe](OTf)_2$. $[(Me-NC)_6Fe](OTf)_2$ is synthesized by combining six equivalents of MeOTf with $(TEA)_4[Fe(CN)_6]$ in DCM, where MeOTf is methyl trifluoromethanesulfonate, OTf is trifluoromethanesulfonate, and Me is methyl.

FIG. 59 shows a chemical structure corresponding to $[(Me-NC)_6Fe](OTf)_2$. $[(Me-NC)_6Fe](OTf)_2$ is synthesized by combining six equivalents of MeOTf with $(TEA)_4[Fe(CN)_6]$ in DCM, where MeOTf is methyl trifluoromethanesulfonate, OTf is trifluoromethanesulfonate, and Me is methyl, followed by washing the precipitate that forms with DCM, and followed by recrystallization from DCM/ether.

Figure 60:
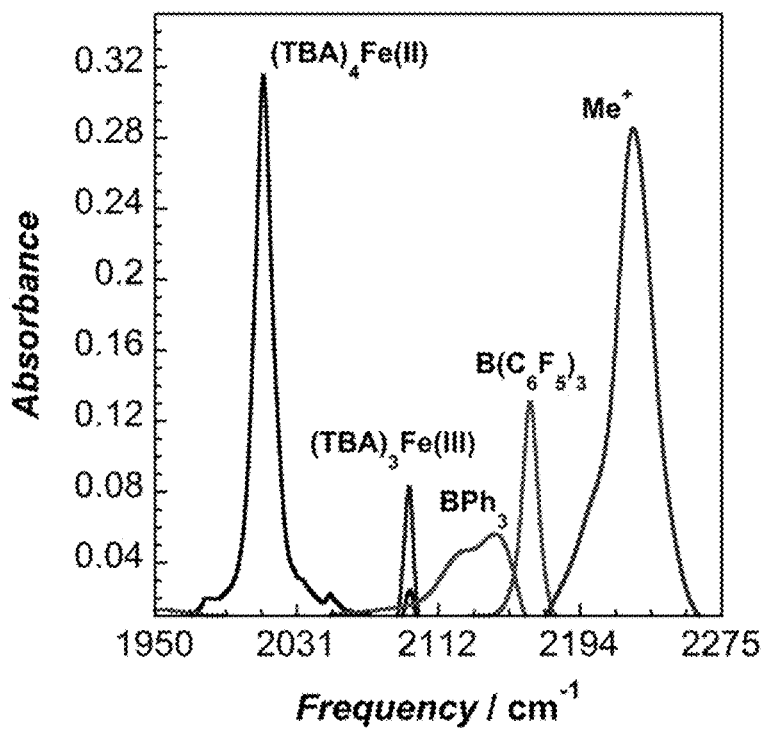
FIG. 60. Attenuated total internal reflection (ATIR) spectra corresponding to constituents of certain metal-coordination complexes.

FIG. 60 shows attenuated total internal reflection (ATIR) spectra corresponding to constituents of certain metal-coordination complexes.

II. Hexacyanomanganate Adducts

Figure 61:
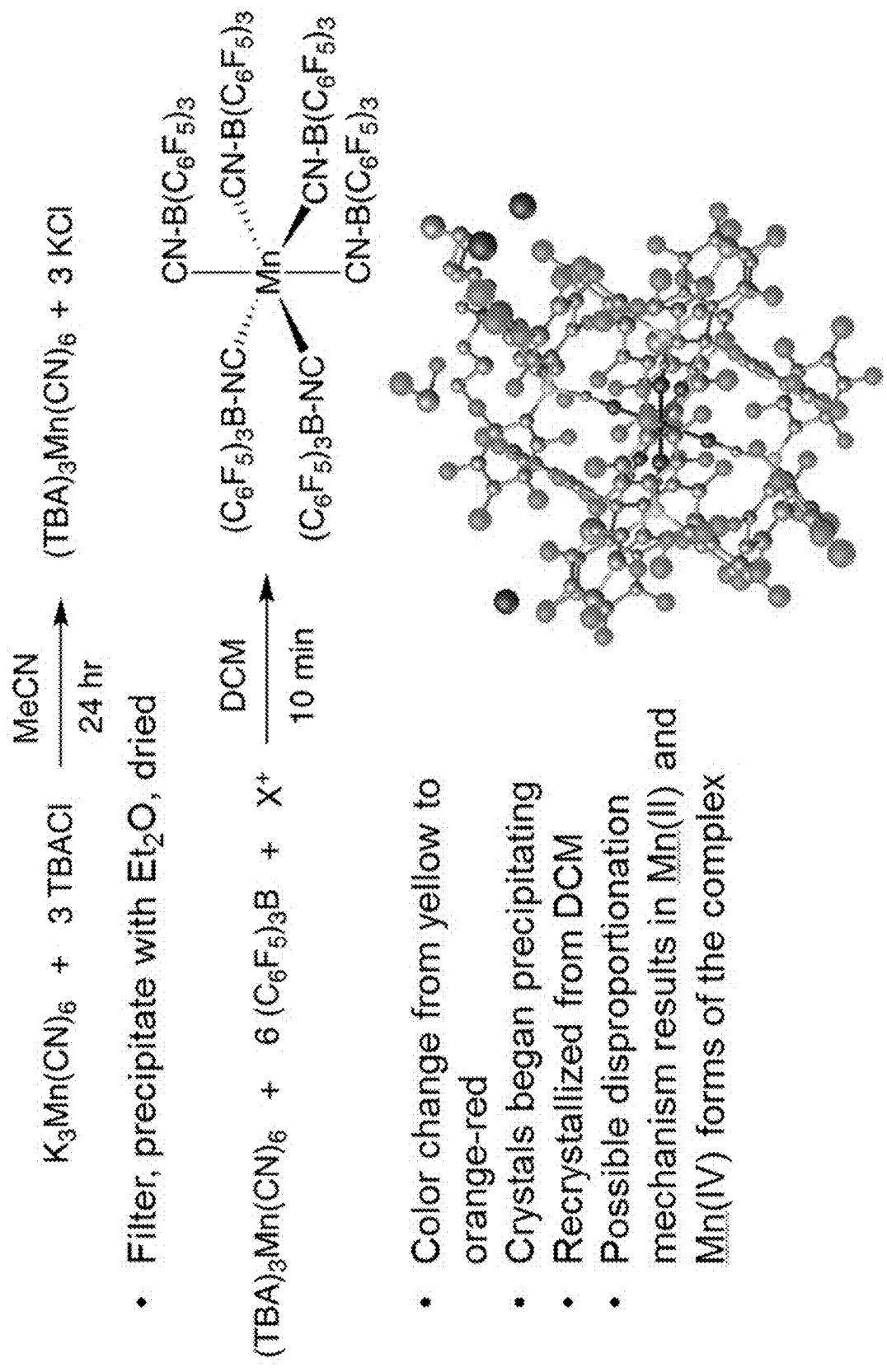
FIG. 61 illustrates an exemplary synthesis method for forming the metal-coordination complex $[Mn(CN-B(C_6F_5)_3)_6]^{4-}$ and a molecular structure thereof.

FIG. 61 illustrates an exemplary synthesis method for forming the metal-coordination complex $[Mn(CN-B(C_6F_5)_3)_6]^{4-}$. The synthesis involves a color change from yellow to orange-red. Precipitated crystals are recrystallized from DCM. Optionally, disproportionation yields Mn(II) and Mn(IV) variations on this metal-coordination complex.

The panels of FIG. 11 show cyclic voltammetry data for the complex $[Mn(CN-B(C_6F_5)_3)_6]^{4-}$ in different solvents and corresponding to different oxidation states of the Mn metal center.

The panels of FIG. 12 show additional cyclic voltammetry data for the complex $[Mn(CN-B(C_6F_5)_3)_6]^{4-}$. Left top and bottom panels show cyclic voltammetry corresponding to the addition of different equivalents of borane secondary ligands. The right top and bottom panels show linear fits for the potential shift observed per addition of additional equivalents of borane secondary ligand. A cyclic voltammetry peak observed corresponds to Mn(III/IV) oxidation. Consistent voltage shifts per borane equivalent are observed. A potential shift of ~390 mV is observed per addition of $B(C_6F_5)_3$ ligand and a potential shift of ~270 mV is observed per addition of $BPh_3$ ligand.

Figure 13A:
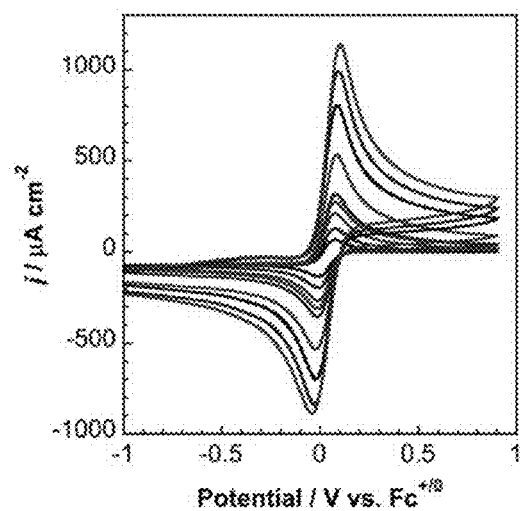
FIG. 13A. Cyclic voltammetry to measure scan rate dependence of $(TBA)_3Mn(CN—B(C_6F_5)_3)_6$ in MeCN.
Figure 13B:
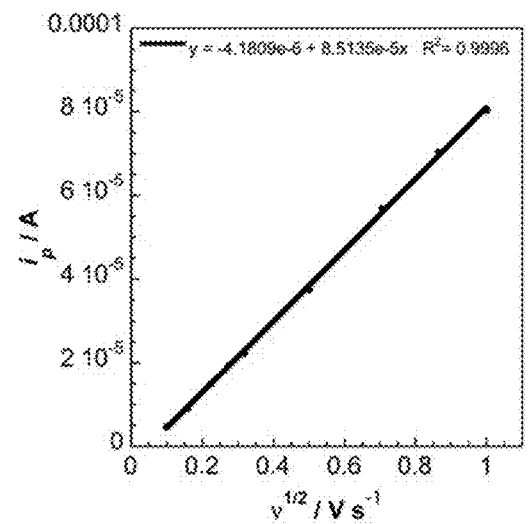
FIG. 13B. linear fit of the square root of the scan rate and peak potential of the scan rate dependence in MeCN.
Figure 13C:
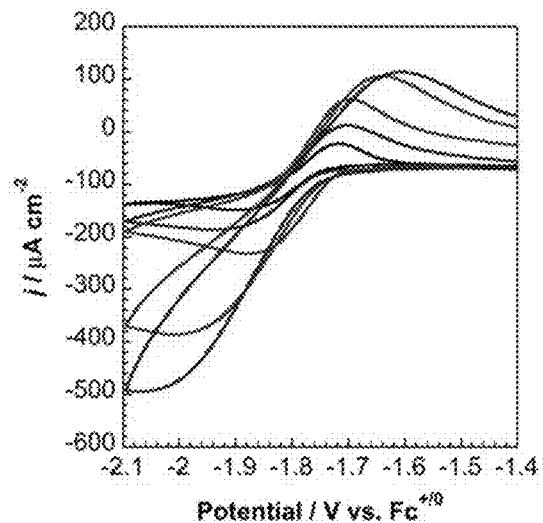
FIG. 13C. Cyclic voltammetry to measure scan rate dependence of $(TBA)_3Mn(CN—B(C_6F_5)_3)_6$ in DCM.
Figure 13D:
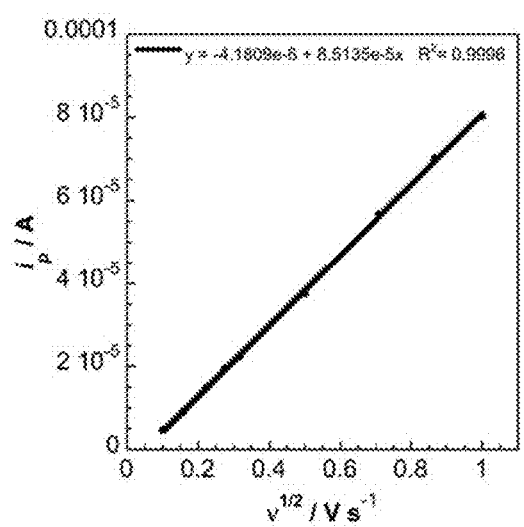
FIG. 13D. linear fit of the square root of the scan rate and peak potential of the scan rate dependence in DCM.
Figure 14:
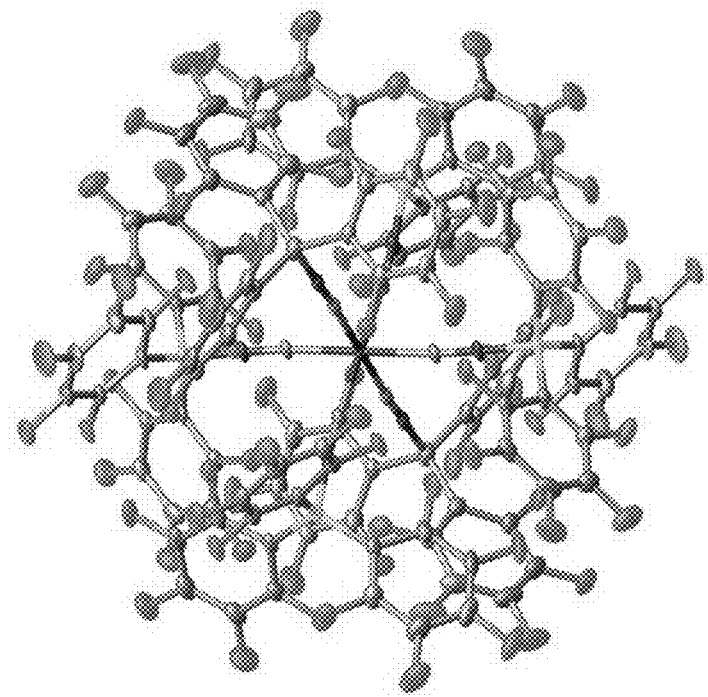
FIG. 14. Crystal structure for $(TBA)_3Co(CN—B(C_6F_5)_3)_6$.

FIG. 13A shows cyclic voltammetry to measure scan rate dependence of $(TBA)_3Mn(CN-B(C_6F_5)_3)_6$ in MeCN; FIG. 13B shows a linear fit of the square root of the scan rate and peak potential of the scan rate dependence in MeCN; FIG. 13C shows cyclic voltammetry to measure scan rate dependence of $(TBA)_3Mn(CN-B(C_6F_5)_3)_6$ in DCM; and FIG. 13D shows a linear fit of the square root of the scan rate and peak potential of the scan rate dependence in DCM. Electrochemical reversibility and cyclic stability was observed for the metal-coordination complexes. The observed linear relationship between peak current and square root of the scan rate implies a diffusion controlled, reversible reaction. A diffusion coefficient is determined to be 7.9E-7 $cm^2s^{-1}$; which may be compared with 2.3E-5 $cm^2s^{-1}$ for ferrocene. The metal-coordination complexes are highly soluble in MeCN.

Figure 62:
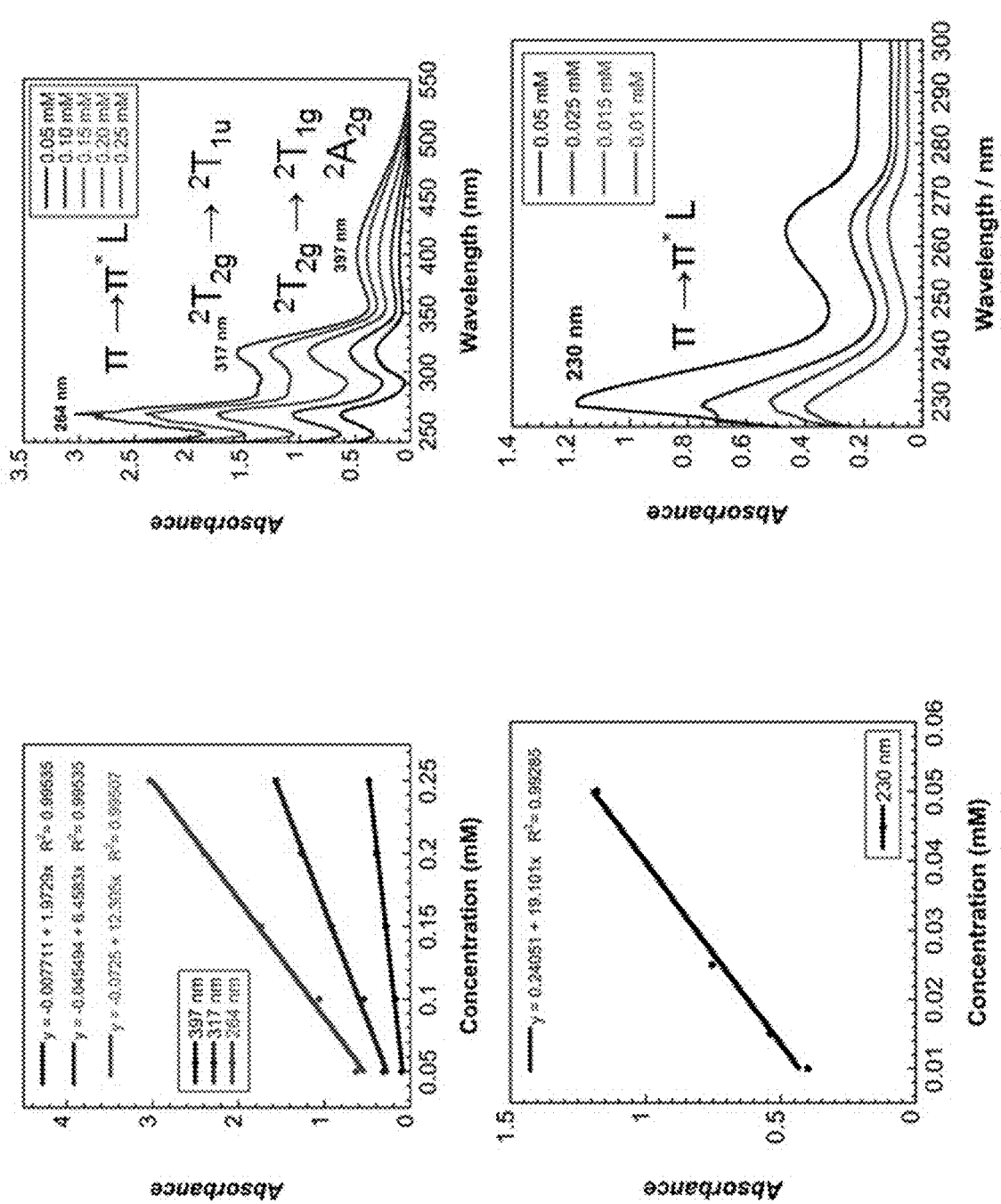
FIG. 62. UV-Vis absorbance spectra corresponding to $[Mn(CN-B(C_6F_5)_3)_6]^{4-}$. The absorbance data is shown for different concentrations of the metal-coordination complex (es). Certain optical transitions in the metal-coordination complex(es) are labeled.
Figure 63:
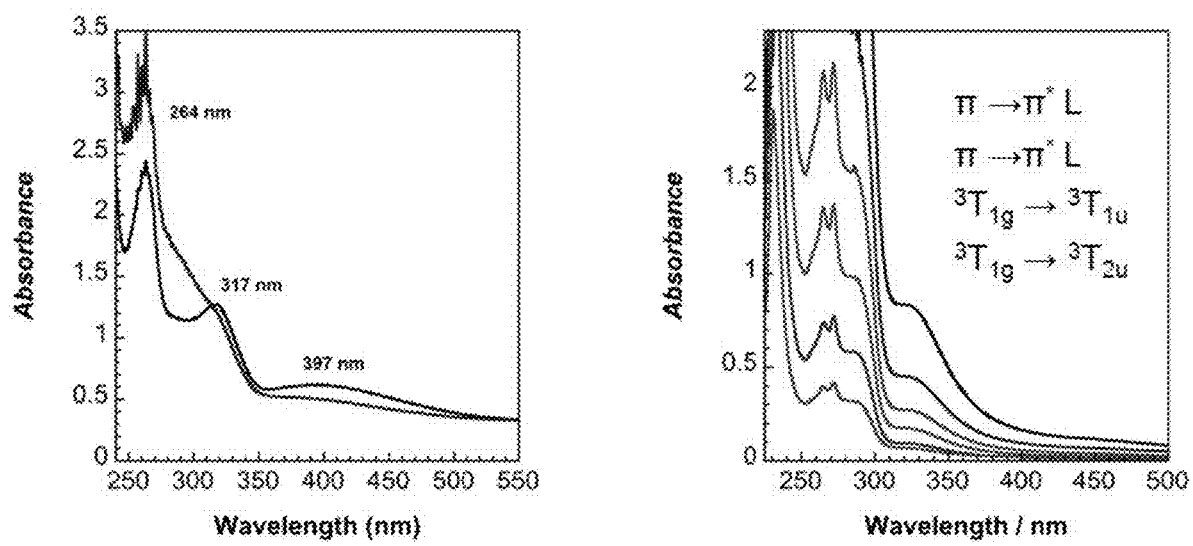
FIG. 63. Left: Spectroelectrochemistry of pentafluorophenylborane adduct in DCM electrolyte; Right: UV-Vis spectra of crude triphenylborane adduct in DCM.

The panels of FIG. 62 show absorbance data corresponding to $[Mn(CN-B(C_6F_5)_3)_6]^{4-}$, including a dependence on concentration of the metal-coordination complex. Certain peaks in the absorbance data are labeled as corresponding to certain optical transitions in the metal-coordination complex. The panels of FIG. 63 show additional absorbance data corresponding to $[Mn(CN-B(C_6F_5)_3)_6]^{4-}$, with the left panel showing spectroelectrochemistry of pentafluorophenylborane adduct in DCM electrolyte and the right panel showing UV-Vis absorbance of crude triphenylborane adduct in DCM.

Figure 8B:
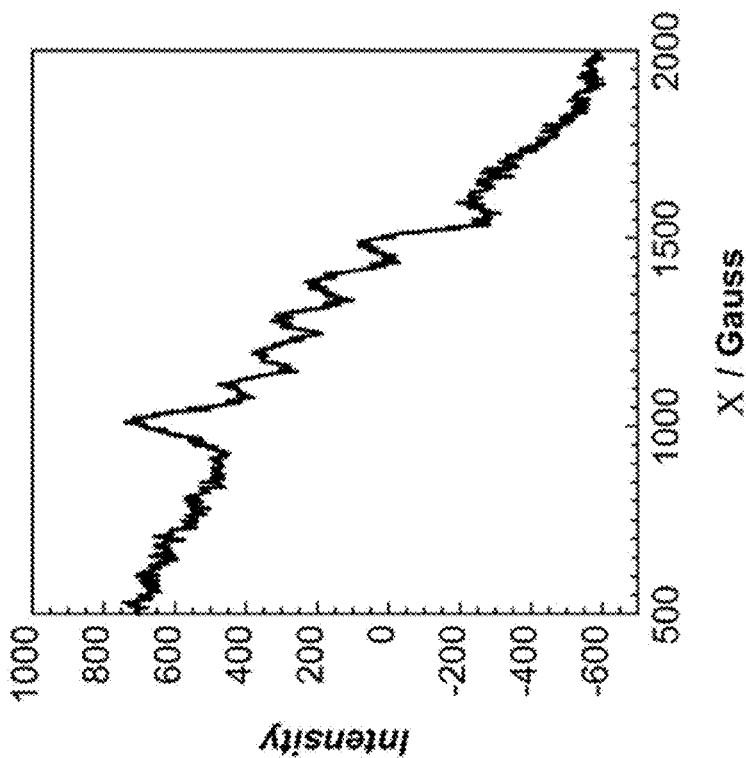
FIGS. 8A and 8B. Electron paramagnetic resonance (EPR) spectra for $(TBA)_3XMn(CN—B(C_6F_5)_3)_6$ in perpendicular mode (FIG. 8A) and parallel mode (FIG. 8B).
Figure 8A:
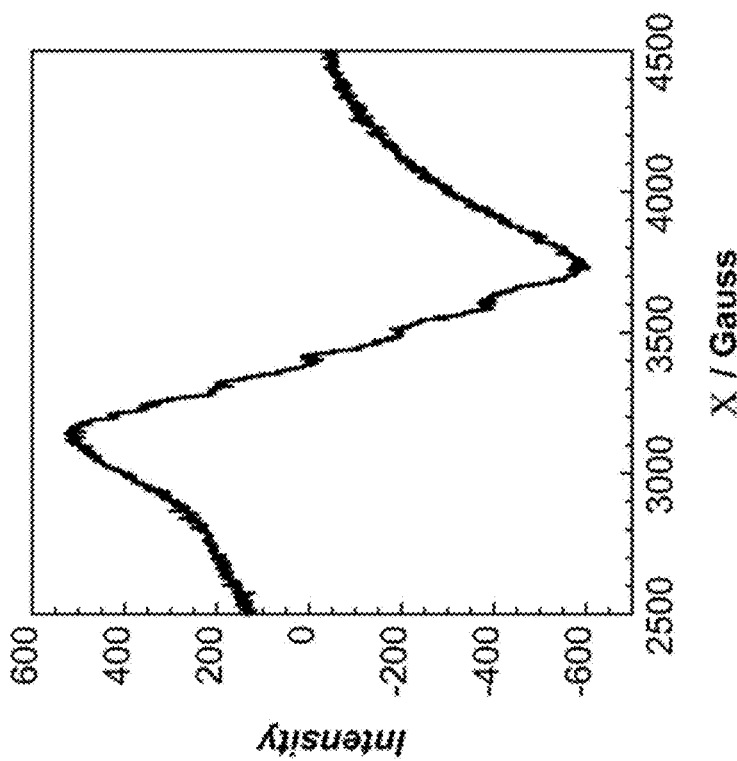

FIGS. 8A and 8B show electron paramagnetic resonance (EPR) spectra for $(TBA)_3Mn(CN-B(C_6F_5)_3)_6$ in perpendicular mode (FIG. 8A) and parallel mode (FIG. 8B). These EPR were taken at 5 K in MeCN/toluene glass. The data suggests the presence of Mn(II). Observations include broad zero-field splitting, six line hyperfine ($^{55}Mn$, S=5/2), and parallel mode shows weak spin-forbidden transition.

III. Adducts of Hexacyanocobaltate

Figure 64:
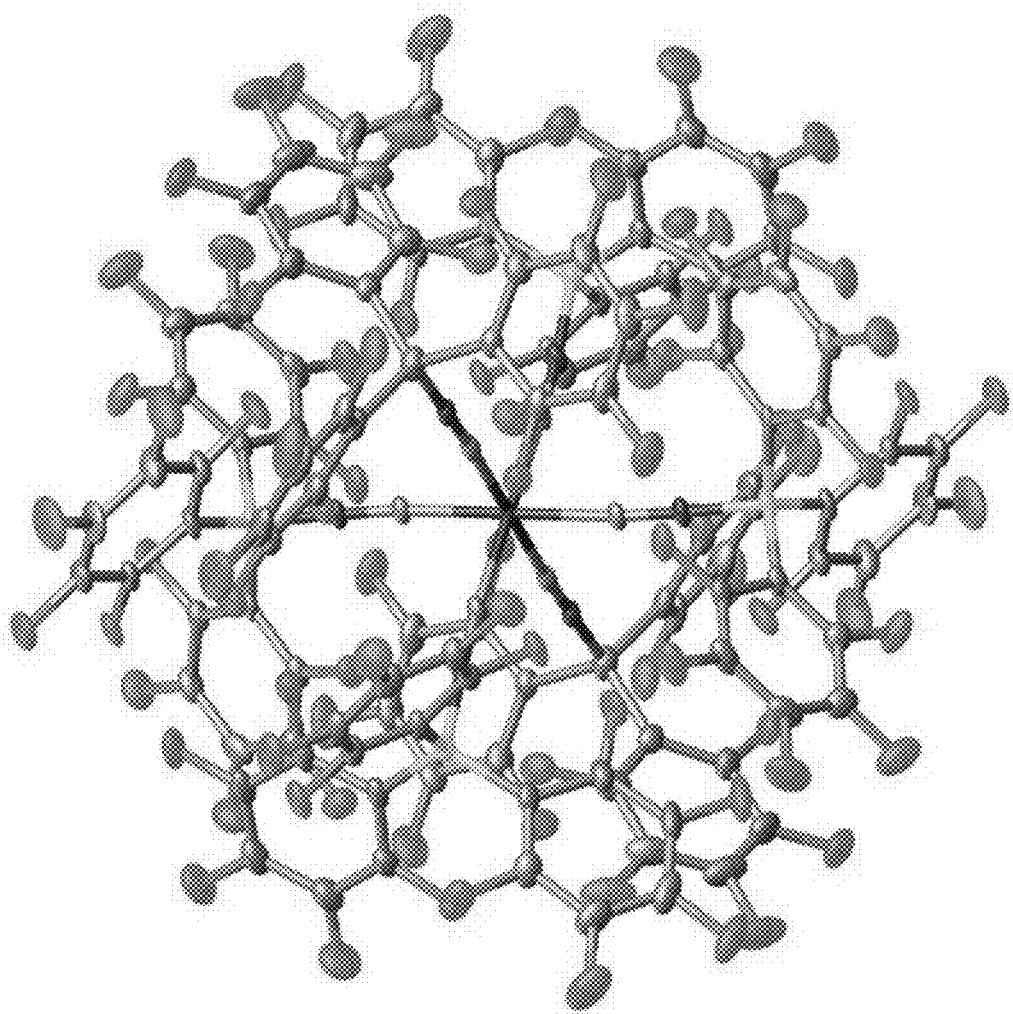
FIG. 64. Chemical structure for $(TBA)_3[Co(CN-B(C_6F_5)_3)_6]$.

FIG. 64 shows a chemical structure for $(TBA)_3[Co(CN-B(C_6F_5)_3)_6]$. Hexacyanocobaltate displays one irreversible reduction. Boronated complex is examined by voltammetry.

IV. Symmetric Redox Flow Batteries

FIG. 65 summarizes formation processes for forming metal-coordination complexes with various heteroleptic ligands, including borane secondary ligands. FIG. 65 also shows cyclic voltammetry data corresponding to such metal-coordination complexes. Combining ligand-based and metal-based redox events as SRFB species. Boronation may affect $M^{X/X-1}$.

A separator is not necessarily required for symmetric redox flow batteries.

Figure 66:
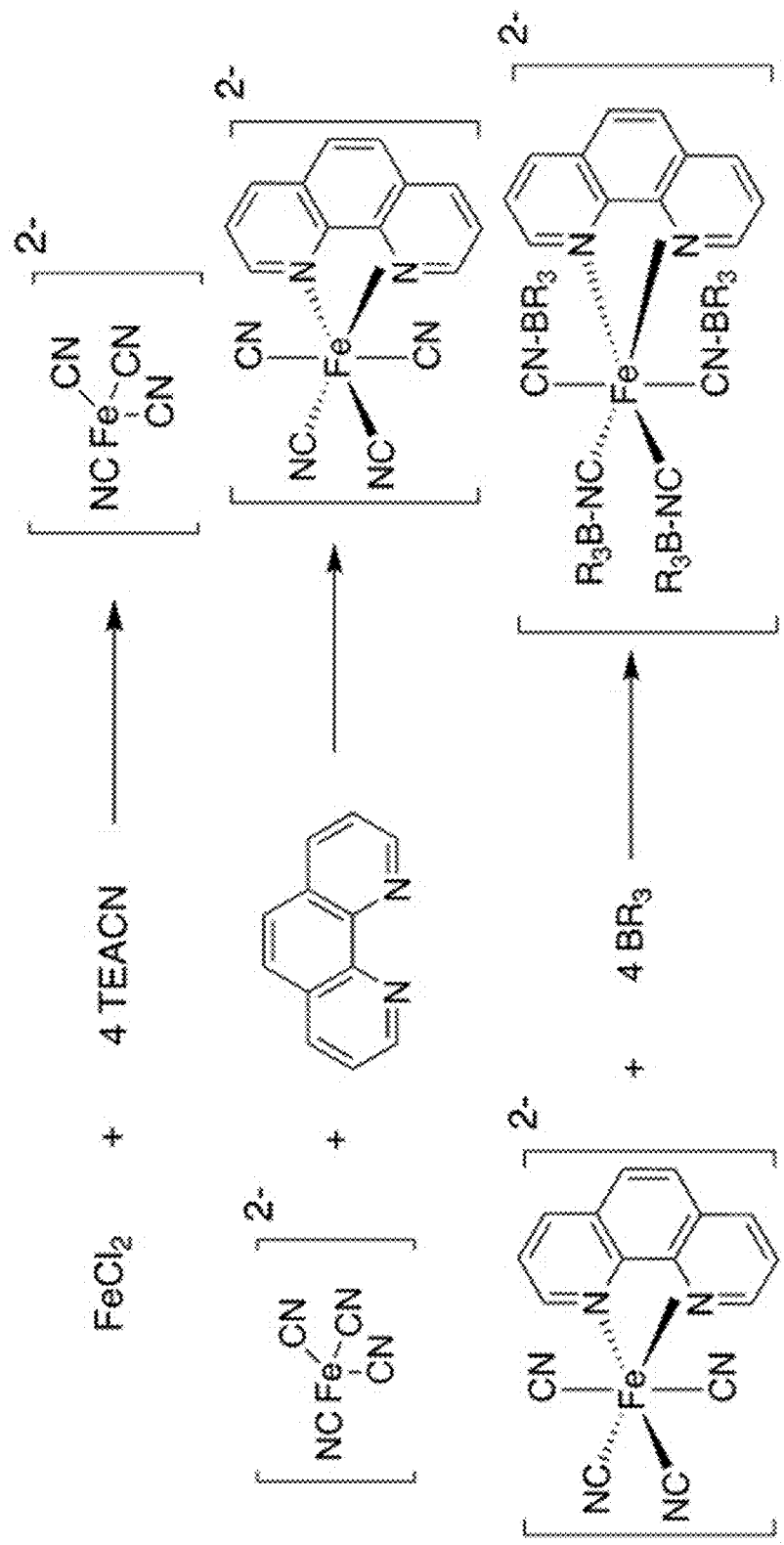
FIG. 66. Reactions/processes for forming metal-coordination complexes, ultimately yielding $(TEA)_2Fe(bpy/phen)[(CN-B(C_6F_5)_3)_4]$, where bpy is bipyridine and phen is phenanthroline

FIG. 66 illustrates reactions/processes for forming metal-coordination complexes, ultimately yielding $(TEA)_2Fe(bpy/phen)[(CN-B(C_6F_5)_3)_4]$, where bpy is bipyridine and phen is phenanthroline.

Example 8—Additional Examples and Data

Figure 80:
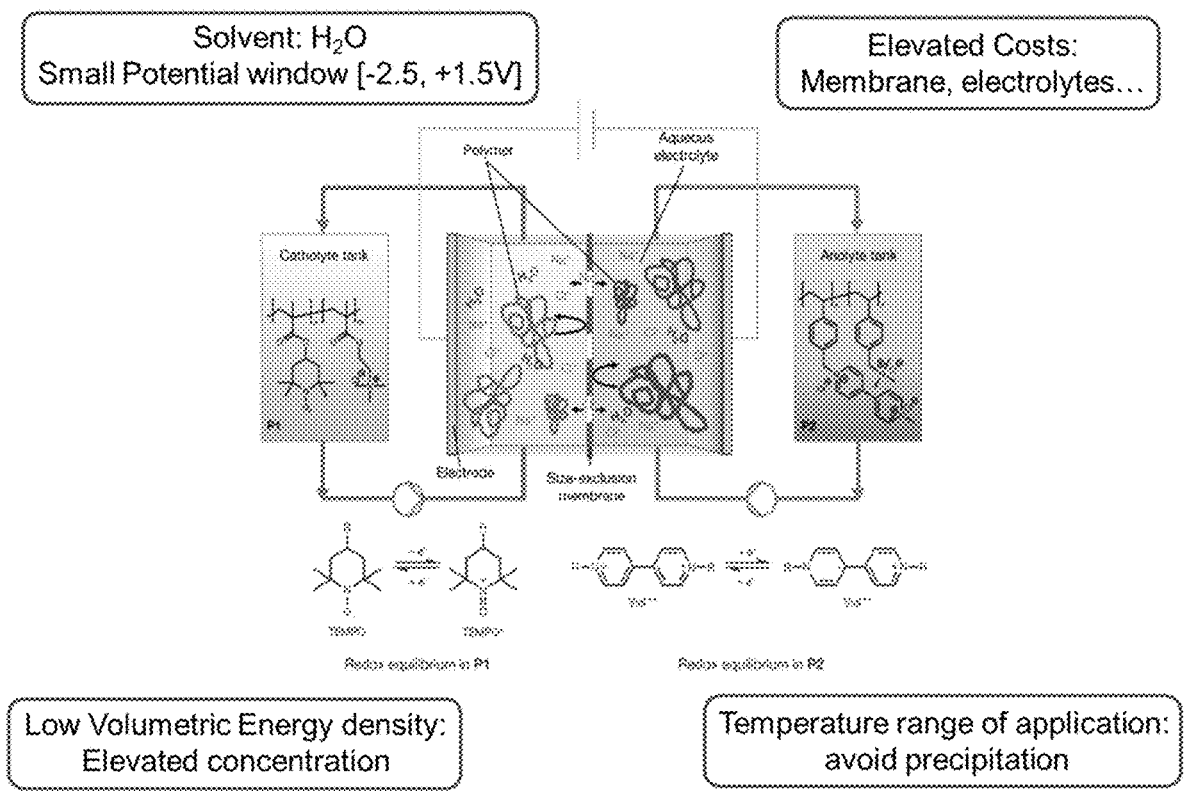
FIG. 80 is an illustration of exemplary aqueous redox flow batteries.

FIG. 80 is an illustration of exemplary aqueous redox flow batteries. Conventional redox flow batteries may be improved in the following ways: (i) increase energy density with higher solubility catholyte and anolyte which increases volumetric capacity, leading to larger stoichiometry of transferred electrons and larger voltage difference ($E^0_{cell}=E^0_{cathode}-E^0_{anode}$); (ii) increase current density via faster electrode kinetics and/or lower membrane resistance; (iii) increase lifetime with highly reversible redox couples; and (iv) increase overall efficiency via expanding the temperature range. The metal-coordination complexes of the present invention address these approaches and provide improved redox flow batteries. Tuning the outer-coordination sphere ("secondary coordination sphere") of $Fe(CN)_6^{4-}$, for example, with Lewis acidic secondary ligands yields metal-coordination complexes that ae highly soluble in organic solvents (e.g., $CH_3CN$: [−3.6, +2.9V]) and that have reversible redox reactions and are inexpensive.

Figure 81:
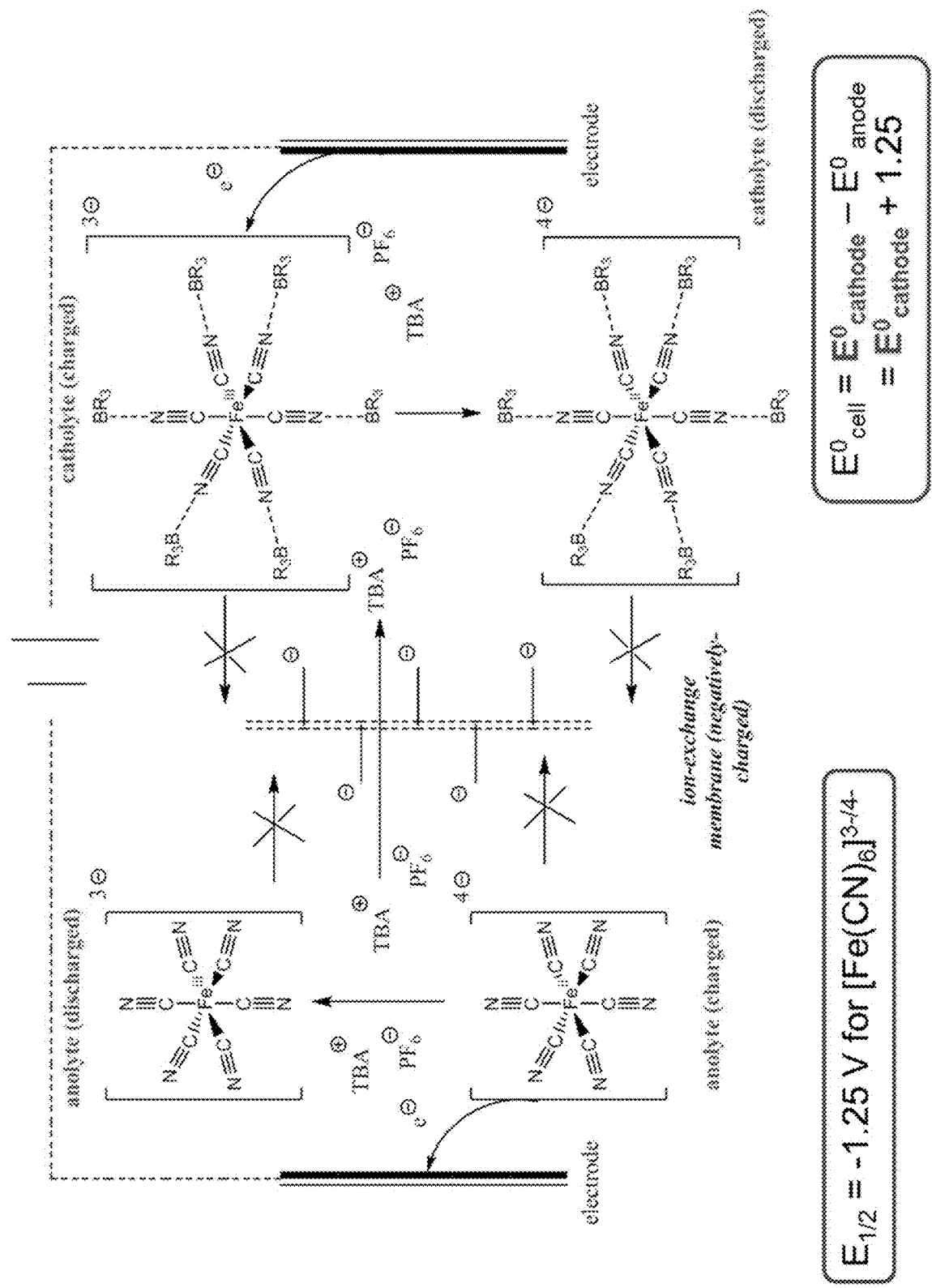
FIG. 81 is a schematic of an exemplary redox flow battery in accordance with the present invention, the battery including metal-coordination complexes in accordance with the present invention.

FIG. 81 is a schematic of an exemplary redox flow battery in accordance with the present invention, the battery including metal-coordination complexes in accordance with the present invention.

Figure 82:
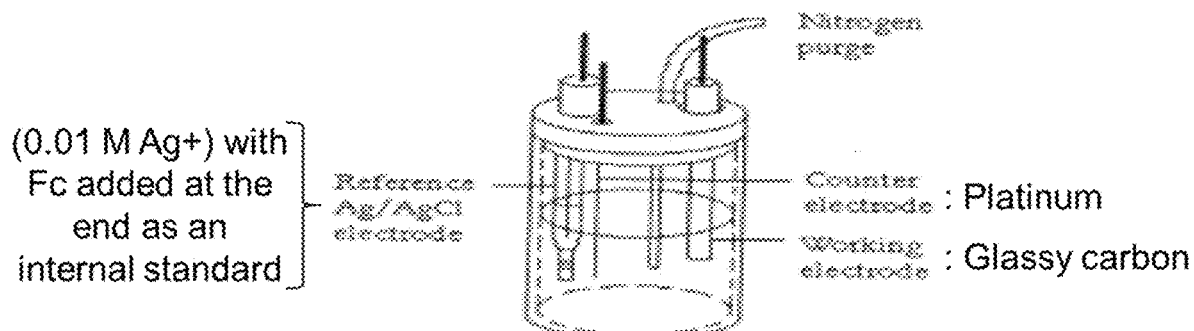
FIG. 82 is a schematic of an electrochemical cell which may be used to measure some of the data described herein. The working electrode may be glassy carbon; the counter electrode may be platinum; the reference electrode may be Ag/AgCl (0.01 M Ag$^+$) with ferrocene added at the end as an internal standard; the solution may have 5-10 mM of the measured species (e.g., metal-coordination complex) in CH$_3$CN/[TBA][PF$_6$]; and a scan rate of 100-250 mV/s may be used.

FIG. 82 is a schematic of an electrochemical cell which may be used to measure some of the data described herein. The working electrode may be glassy carbon; the counter electrode may be platinum; the reference electrode may be Ag/AgCl (0.01 M Ag$^+$) with ferrocene added at the end as an internal standard; the solution may have 5-10 mM of the measured species (e.g., metal-coordination complex) in $CH_3CN/[TBA][PF_6]$; and a scan rate of 100-250 mV/s may be used.

FIGS. 83A and 83B are plots of current density versus potential corresponding to different amounts of $BPh_3$ secondary ligands in exemplary metal-coordination complexes. FIG. 83A shows cyclic voltammetry data and FIG. 83B shows differential pulse voltammetry data. In the differential pulse voltammetry 7 resolved peaks are observed. The cis/trans; fac/mer isomers result in broader, less intense peaks for 2 and 3 borane equivalents added. Gradual diminishing of more negative peaks is observed as more borane (secondary ligand) equivalents are added.

The right panel of FIG. 51 shows cyclic voltammetry data comparing in-situ addition of borane equivalents with an isolated metal-coordination complex, as labeled in the legend.

Figure 84A:
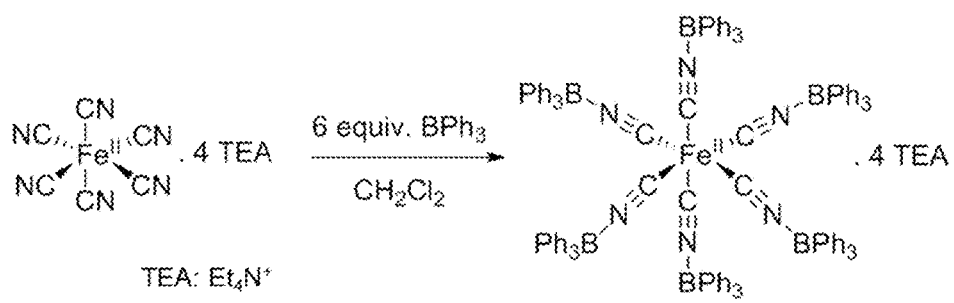
FIG. 84A is a schematic illustrating the formation of an exemplary metal-coordination complex.
Figure 84B:
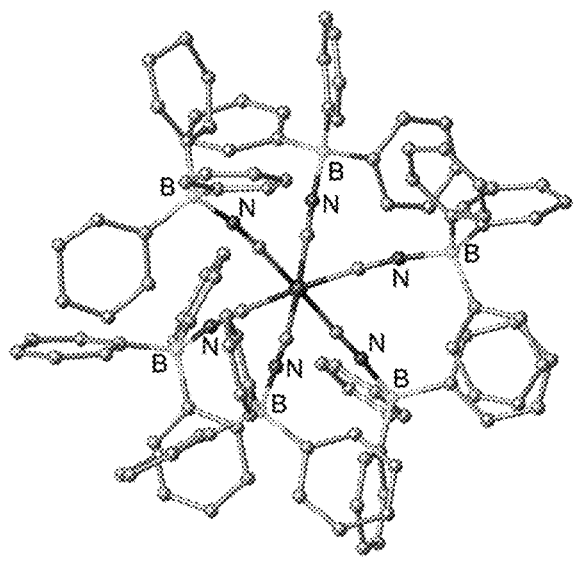
FIG. 84B is a chemical structure illustration of the metal-coordination complex formed in FIG. 84A.
Figure 84C:
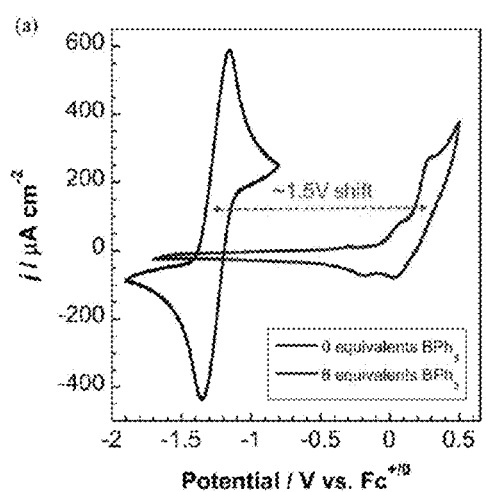
FIG. 84C is a cyclic voltammetry plot corresponding to [Fe(CN)$_6$][TEA]$_4$ and [Fe(CN)$_6$(BPh$_3$)$_6$][TEA]$_4$.

FIG. 84A is a schematic illustrating the formation of an exemplary metal-coordination complex ($[Fe(CN)_6(BPh_3)_6][TEA]_4$). FIG. 84B is a chemical structure illustration of the metal-coordination complex formed in FIG. 84A. FIG. 84C is a cyclic voltammetry plot corresponding to $[Fe(CN)_6][TEA]_4$ and $[Fe(CN)_6(BPh_3)_6][TEA]_4$. A potential shift of +2.23 V is observed.

Figure 85A:
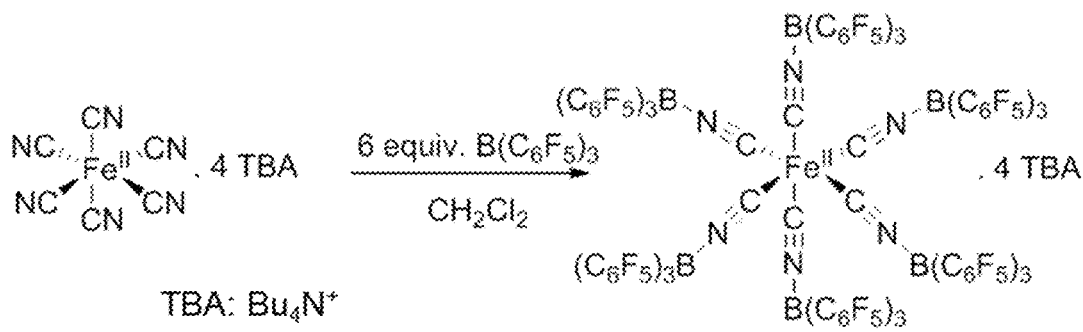
FIG. 85A is a schematic illustrating the formation of an exemplary metal-coordination complex.
Figure 85B:
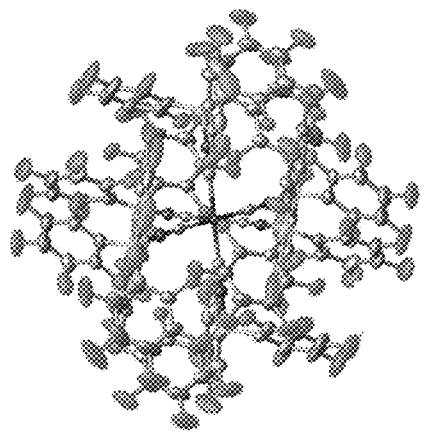
FIG. 85B is a chemical structure illustration of the metal-coordination complex formed in FIG. 85A.
Figure 85C:
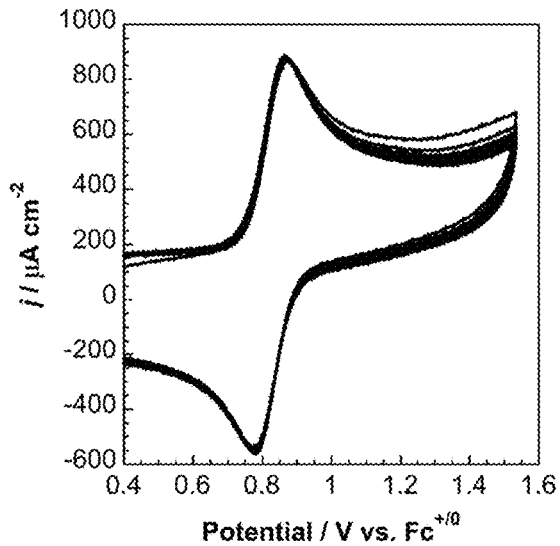
FIG. 85C is a cyclic voltammetry plot corresponding to the metal-coordination complex of FIG. 85B.

FIG. 85A is a schematic illustrating the formation of an exemplary metal-coordination complex ($(TBA)_4[Fe(CN-B(C_6F_5)_3)_6]$). FIG. 85B is a chemical structure illustration of the metal-coordination complex formed in FIG. 85A. FIG. 85C is a cyclic voltammetry plot corresponding to the metal-coordination complex of FIG. 85B.

Figure 86A:
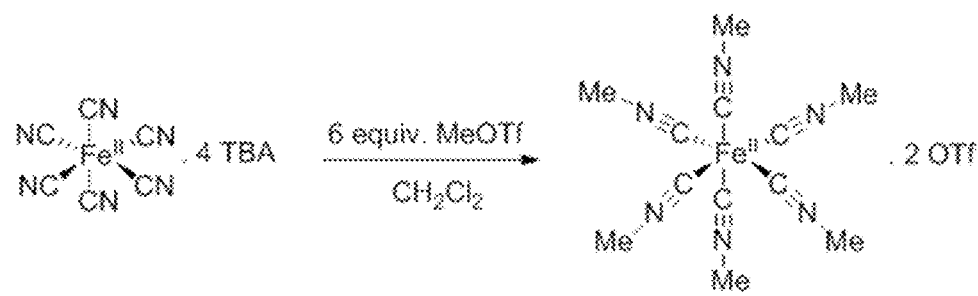
FIG. 86A is a schematic illustrating the formation of an exemplary metal-coordination complex.
Figure 86B:
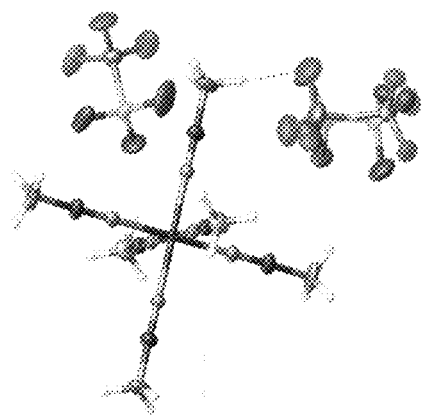
FIG. 86B is a chemical structure illustration of the metal-coordination complex formed in FIG. 86A.
Figure 86C:
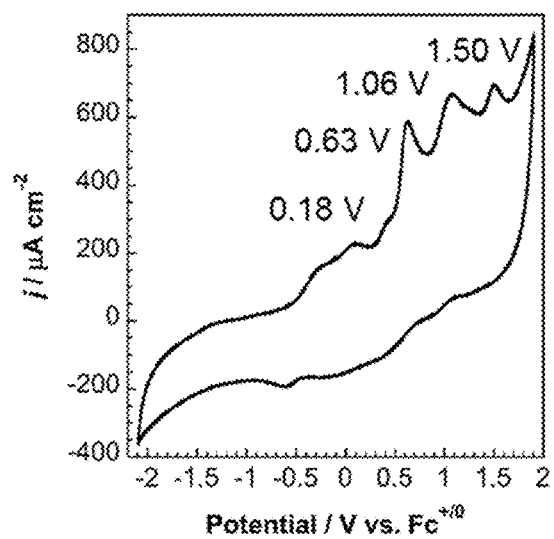
FIG. 86C is a cyclic voltammetry plot corresponding to the metal-coordination complex of FIG. 86B.

FIG. 86A is a schematic illustrating the formation of an exemplary metal-coordination complex ((OTf)$_2$[Fe(CN-Me)$_6$]). FIG. 86B is a chemical structure illustration of the metal-coordination complex formed in FIG. 86A. FIG. 86C is a cyclic voltammetry plot corresponding to the metal-coordination complex of FIG. 86B. A potential shift of +2.83 V is observed.

The methyl adduct of hexacyanoferrate (corresponding to [Fe(CN-Me)$_6$]) has a redox potential at 2.3 V vs. Fc.

FIG. 87 is a table summarizing redox potentials and other parameters for some metal-coordination complexes corresponding to the different secondary ligands ("Lewis acids").

Figure 88A:
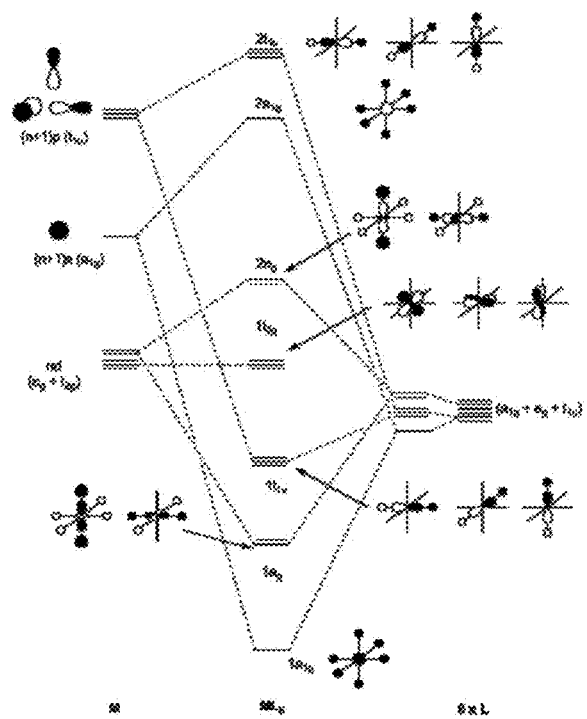
FIGS. 88A and 88B are molecular orbital diagrams corresponding to exemplary metal-coordination complexes.
Figure 88B:
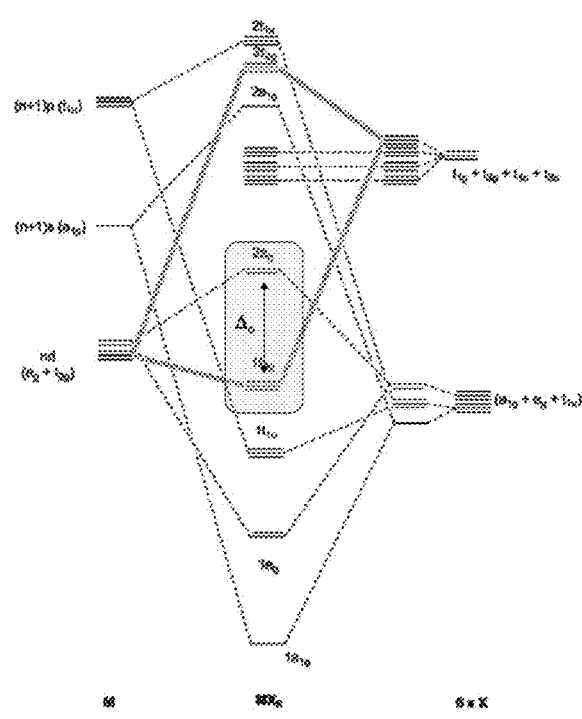

FIGS. 88A and 88B are molecular orbital diagrams corresponding to exemplary metal-coordination complexes. FIG. 88A is a σ-only molecular orbital diagram. FIG. 88B is a π-acceptor ligand molecular orbital diagram.

FIG. 89A is a plot of absorbance versus wavelength and FIG. 89B is a plot of absorbance versus concentration corresponding to [Fe(CN)$_6$][TBA]$_4$.

FIG. 90A is a plot of absorbance versus wavelength and FIG. 90B is a plot of absorbance versus concentration corresponding to [Fe(CN)$_6$(BPh$_3$)$_6$][TEA]$_4$.

FIG. 91A is a plot of absorbance versus wavelength and FIG. 91B is a plot of absorbance versus concentration corresponding to [Fe(CN)$_6$(B(C$_6$F$_5$)$_3$)$_6$][TEA]$_4$.

FIG. 92 is a table showing various parameters corresponding to certain metal-coordination complexes, including those corresponding to FIGS. 89-91.

In conclusion, tuning the potential of [Fe(CN)$_6$][TBA]4 with borane Lewis acidic secondary ligands is demonstrated. A linear fit between the number of equivalents of BR$_3$ added and the potential shift is demonstrated.

Borane adducts are stable and easily handled, such as isolation and characterization.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Many of the molecules disclosed herein contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:
1. A redox flow battery comprising:
a catholyte;
an anolyte;
wherein at least one of said catholyte and said anolyte is a metal-coordination complex, said metal-coordination complex comprising:
(i) a metal;
(ii) one or more first ligands coordinated with said metal atom, wherein each of said first ligands is independently a Lewis basic ligand; and
(iii) one or more second ligands coordinated with said one or more first ligands, wherein each of said second ligands is independently a Lewis acidic ligand; and
a nonaqueous solvent, wherein said catholyte, said anolyte or both are dissolved in said nonaqueous solvent.
2. The redox flow battery of claim 1, wherein said one or more first ligands are provided in a primary coordination sphere of said metal-coordination complex, and wherein said one or more second ligands are provided in a secondary coordination sphere of said metal-coordination complex.
3. The redox flow battery of claim 1, wherein each of said one or more first ligands independently comprises one or more Lewis basic functional groups and each of said one or more second ligands independently comprises one or more Lewis acidic functional groups.
4. The redox flow battery of claim 3, wherein said one or more second ligands associate with said first ligands to result in electron density being distributed away from said Lewis basic functional groups and to said Lewis acidic functional groups.
5. The redox flow battery of claim 1, wherein each of said catholyte and said anolyte is independently a metal-coordination complex.
6. The redox flow battery of claim 1, wherein said metal-coordination complex is characterized by the formula (F1):

$$[M_j(L^1)_x(L^2)_y]^z$$ (F1), wherein:

M is said metal selected from the group consisting of Cr, Mn, Fe, Co, Ni, Mo, Tc, Ru, Re, Os, W, Rh, Ir, Pd, and Pt;
each of $L^1$ is independently said first ligand;
each of $L^2$ is independently said second ligand;
z is 0 or an integer selected from the range of −5 to 5;
each of x and y is independently an integer selected from the range of 1 to 8; and
j is an integer selected from the range of 1 to 3.
7. The redox flow battery of claim 6, wherein each of L1 is independently nitrogen or a substituted or unsubstituted functional group or molecule corresponding to a nitrile, a pyridyl, a diamine, a triamine, an imine, an amine, an azide, a diimine, a triimine, an amide, a diimide, pyridine, pyrazine, imidazole, pyrazole, pyridazine, pyrimidine, triazine, quinoline, isoquinoline, quinoxaline, acridine, quinazoline, cinnoline, phthalazine, indazole, indole, isoindole, pyrrole, benzimidazole, purine, oxazole, bipyridine, terpyridine, phenanthroline, or any combination thereof.
8. The redox flow battery of claim 6, wherein each of $L^2$ is independently —$G^a(G^b)_q$; where:
$G^a$ is selected from the group consisting of C, B, Si, Ge, Al, Zn, Sn, Sb, Te, Bi, and Pb;
each of $G^b$ is independently selected from the group consisting of a hydrogen, a halide, nitrogen, and a substituted or an unsubstituted $C_1$-$C_{10}$ alkyl, $C_3$-$C_{10}$ cycloalkyl, $C_5$-$C_{10}$ aryl, $C_5$-$C_{10}$ heteroaryl, acyl, $C_1$-$C_{10}$ hydroxyl, $C_1$-$C_{10}$ alkoxy, $C_2$-$C_{10}$ alkenyl, $C_2$-$C_{10}$ alkynyl, $C_5$-$C_{10}$ alkylaryl, $C_3$-$C_{10}$ arylene, $C_3$-$C_{10}$ heteroarylene, $C_2$-$C_{10}$ alkenylene, $C_3$-$C_{10}$ cycloalkenylene, $C_2$-$C_{10}$ alkynylene, cyanide, pyridine, pyrazine, imidazole, pyrazole, pyridazine, pyrimidine, bipyridine, terpyridine, phenanthroline, a diamine, a triamine, an imine, an amine, an azide, a diimine, a triimine, an amide, or any combination thereof;
and q is an integer selected from the range of 1 to 8.
9. The redox flow battery of claim 8, wherein $G^b$ is characterized by the formula (F2):

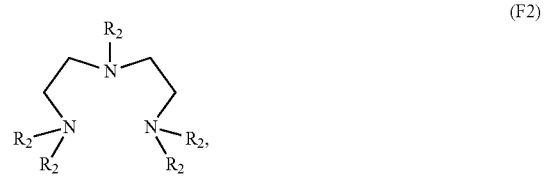

(F2)

wherein:
  each of $R^2$ is independently selected from the group consisting of a hydrogen, a halide, a $C_5$-$C_6$ aryl, a $C_1$-$C_5$ alkyl, and any combination thereof.

10. The redox flow battery of claim 8, wherein $G^a$ is B and wherein $G^b$ is a quintuply fluorinated phenyl group [—($C_6F_5$)].

11. The redox flow battery of claim 6, wherein $L^1$ is characterized by the formula (F3), (F4), (F5a), (F5b), (F5c), (F5d), or (F5e):

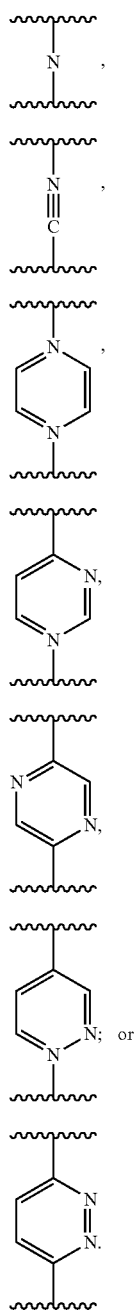

(F3)

(F4)

(F5a)

(F5b)

(F5c)

(F5d)

(F5e)

12. The redox flow battery of claim 6, wherein $L^2$ is characterized by the formula (F6), (F7), or (F8):

(F6)

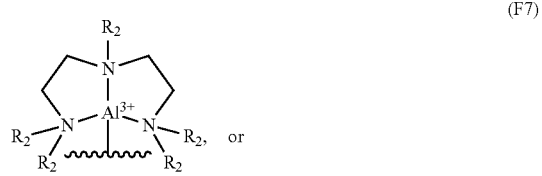

(F7)

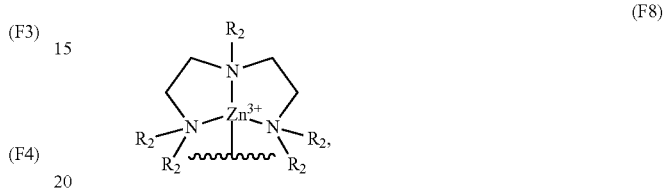

(F8)

where:
  each of $R^2$ is independently selected from the group consisting of a hydrogen, a halide, a $C_5$-$C_6$ aryl, a $C_1$-$C_5$ alkyl, and any combination thereof.

13. The redox flow battery of claim 6, wherein said metal-coordination complex is selected from the group consisting of $[Fe(CN)_6(BPh_3)_6]^{3-\ or\ 4-\ or\ 5-}$, $[Fe(CN)_6(B(C_6F_5)_3)_6]^{3-\ or\ 4-\ or\ 5-}$, $[Mn(CN)_6(BPh_3)_6]^{2-\ or\ 3-\ or\ 4-\ or\ 5-}$, $[Mn(CN)_6(B(C_6F_5)_3)_6]^{2-\ or\ 3-\ or\ 4-\ or\ 5-}$, $[Co(CN)_6(BPh_3)_6]^{3-\ or\ 4-}$, $[Co(CN)_6(B(C_6F_5)_3)_6]^{3-\ or\ 4-}$, $[Mo(CN)_8(BPh_3)_8]^{4-\ or\ 5-}$, $[Mo(CN)_8(B(C_6F_5)_3)_8]^{4-\ or\ 5-}$, $[Mo(CN)_8(BPh_3)_6]^{4-\ or\ 5-}$, $[Mo(CN)_8(B(C_6F_5)_3)_6]^{4-\ or\ 5-}$ and $[Fe(CN)_6(CH_3)_6]^{3+\ or\ 2+\ or\ 1+}$.

14. The redox flow battery of claim 1, wherein a redox potential of said metal-coordination complex increases by $\Delta P$ milliVolts; wherein $\Delta P=(m)(x)$, m is selected from the range of 200 to 700, and x is the number of first ligands coordinated with the metal in said metal-coordination complex.

15. The redox flow battery of claim 1, wherein a redox potential of said metal-coordination complex is selected from the range of −1.77 V to 2.30 V vs. $Fc^{+/0}$.

16. The redox flow battery of claim 1, wherein a solubility limit of said metal-coordination complex in said nonaqueous solvent is at least 1.0 M.

17. The redox flow battery of claim 1, wherein said catholyte and said anolyte are selected such that said redox flow battery has a theoretical open circuit voltage greater than 1.0 V.

18. The redox flow battery of claim 1, wherein a concentration of said metal-coordination complex in said nonaqueous solvent is at least 1.0 M.

19. The redox flow battery of claim 1, wherein said redox flow battery has an operating potential equal to or greater than 1 V.

20. The redox flow battery of claim 1, wherein said redox flow battery has an energy density equal to or greater than 50 Wh/L.

21. The redox flow battery of claim 1, wherein said redox flow battery has a lifetime of at least 200 cycles of discharging and charging.

22. The redox flow battery of claim 1, further comprising a separator configured to separate said catholyte and said anolyte, wherein said separator is an ion-exchange membrane.

23. The redox flow battery of claim 22, wherein said metal-coordination complex is positively charged and said separator is positively charged or said metal-coordination complex is negatively charged and said separator is negatively charged.

24. The redox flow battery of claim 22, further comprising a plurality of counter ions associated with said metal-coordination complex, wherein said counter ions are configured to pass through said separator during charging and discharging of said redox flow battery.

25. The redox flow battery of claim 22, wherein said separator is porous and wherein a size of said metal-coordination complex is greater than an average size of pores of said separator.

26. The redox flow battery of claim 6, wherein j is 1.

27. A method for forming a redox flow battery, comprising the steps of:
(a) dissolving a catholyte, dissolving an anolyte, or dissolving both said catholyte and said anolyte in a nonaqueous solvent;
(b) providing a cathode in electrochemical communication with said catholyte; and
(c) providing an anode in electrochemical communication with said anolyte;
wherein at least one of said catholyte and said anolyte is a metal-coordination complex, said metal-coordination complex comprising:
(i) a metal;
(ii) one or more first ligands coordinated with said metal atom, wherein each of said first ligands is independently a Lewis basic ligand; and
(iii) one or more second ligands coordinated with said one or more first ligands, wherein each of said second ligands is independently a Lewis acidic ligand.

28. A method for discharging a redox flow battery, comprising the steps of:
(a) reducing a catholyte; and
(b) oxidizing an anolyte;
wherein said catholyte, said anolyte, or both said catholyte and said anolyte are dissolved in a nonaqueous solvent;
wherein at least one of said catholyte and said anolyte is a metal-coordination complex, said metal-coordination complex comprising:
(i) a metal;
(ii) one or more first ligands coordinated with said metal atom, wherein each of said first ligands is independently a Lewis basic ligand; and
(iii) one or more second ligands coordinated with said one or more first ligands, wherein each of said second ligands is independently a Lewis acidic ligand.

29. A redox flow battery comprising:
a catholyte;
an anolyte;
wherein at least one of said catholyte and said anolyte is a metal-coordination complex, said metal-coordination complex comprising:
(i) a metal;
(ii) one or more first ligands coordinated with said metal atom, wherein each of said first ligands is independently a Lewis basic ligand; and
(iii) one or more second ligands associated with said one or more first ligands, wherein each of said second ligands is independently a Lewis acidic ligand; and
a nonaqueous solvent, wherein said catholyte, said anolyte or both are dissolved in said nonaqueous solvent;
wherein said metal-coordination complex is characterized by the formula (F1):

$$[M_j(L^1)_x(L^2)_y]^z \quad \text{(F1), wherein:}$$

M is said metal selected from the group consisting of Cr, Mn, Fe, Co, Ni, Mo, Tc, Ru, Re, Os, W, Rh, Ir, Pd, and Pt;
each of $L^1$ is independently said first ligand;
each of $L^2$ is independently said second ligand;
z is 0 or an integer selected from the range of −5 to 5;
each of x and y is independently an integer selected from the range of 1 to 8; and
j is an integer selected from the range of 1 to 3;
wherein each of $L^2$ is independently —$G^a(G^b)_q$; wherein:
$G^a$ is B and wherein $G^b$ is a quintuply fluorinated phenyl group [—$(C_6F_5)$]; and
q is an integer selected from the range of 1 to 8.

30. A redox flow battery comprising:
a catholyte;
an anolyte;
wherein at least one of said catholyte and said anolyte is a metal-coordination complex, said metal-coordination complex comprising:
(i) a metal;
(ii) one or more first ligands coordinated with said metal atom, wherein each of said first ligands is independently a Lewis basic ligand; and
(iii) one or more second ligands associated with said one or more first ligands, wherein each of said second ligands is independently a Lewis acidic ligand; and
a nonaqueous solvent, wherein said catholyte, said anolyte or both are dissolved in said nonaqueous solvent; and
wherein said metal-coordination complex is selected from the group consisting of $[Fe(CN)_6(BPh_3)_6]^{3- \text{ or } 4- \text{ or } 5-}$, $[Fe(CN)_6(B(C_6F_5)_3)_6]^{3- \text{ or } 4- \text{ or } 5-}$, $[Mn(CN)_6(BPh_3)_6]^{2- \text{ or } 3- \text{ or } 4- \text{ or } 5-}$, $[Mn(CN)_6(B(C_6F_5)_3)_6]^{2- \text{ or } 3- \text{ or } 4- \text{ or } 5-}$, $[Co(CN)_6(BPh_3)_6]^{3- \text{ or } 4-}$, $[Co(CN)_6(B(C_6F_5)_3)_6]^{3- \text{ or } 4-}$, $[Mo(CN)_8(BPh_3)_8]^{4- \text{ or } 5-}$, $[Mo(CN)_8(B(C_6F_5)_3)_8]^{4- \text{ or } 5-}$, $[Mo(CN)_8(BPh_3)_6]^{4- \text{ or } 5-}$, $[Mo(CN)_8(B(C_6F_5)_3)_6]^{4- \text{ or } 5-}$ and $[Fe(CN)_6(CH_3)_6]^{3+ \text{ or } 2+ \text{ or } 1+}$.

* * * * *

UNITED STATES PATENT AND TRADEMARK OFFICE
CERTIFICATE OF CORRECTION

PATENT NO. : 10,840,504 B2
APPLICATION NO. : 15/903553
DATED : November 17, 2020
INVENTOR(S) : Jones et al.

Page 1 of 1

It is certified that error appears in the above-identified patent and that said Letters Patent is hereby corrected as shown below:

In the Claims

• In Claim 12, equation (F6) (Column 66, Line 1) please replace the topmost term, $F_2$, with the correct term, --$R_2$--.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*